United States Patent
Caffio et al.

(10) Patent No.: US 12,497,295 B2
(45) Date of Patent: *Dec. 16, 2025

(54) LASER-INDUCED CARBON NANOSTRUCTURES

(71) Applicant: INTEGRATED GRAPHENE HOLDING LIMITED, Stirling (GB)

(72) Inventors: Marco Caffio, Stirling (GB); Matthew Edgar, Stirling (GB)

(73) Assignee: INTEGRATED GRAPHENE HOLDING LIMITED, Stirling (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/967,223

(22) Filed: Dec. 3, 2024

(65) Prior Publication Data

US 2025/0091878 A1 Mar. 20, 2025

Related U.S. Application Data

(63) Continuation of application No. 18/751,866, filed on Jun. 24, 2024, now Pat. No. 12,371,325, which is a
(Continued)

(30) Foreign Application Priority Data

| Dec. 23, 2021 | (GB) | 2118948 |
| Feb. 22, 2022 | (GB) | 2022382 |

(Continued)

(51) Int. Cl.
*C01B 32/05* (2017.01)
*B23K 26/361* (2014.01)
(Continued)

(52) U.S. Cl.
CPC ............ *C01B 32/05* (2017.08); *B23K 26/361* (2015.10); *C01B 32/18* (2017.08); *G01N 27/308* (2013.01);
(Continued)

(58) Field of Classification Search
None
See application file for complete search history.

(56) References Cited

U.S. PATENT DOCUMENTS

| 2003/0000486 A1 | 1/2003 | Ott et al. |
| 2017/0370866 A1 | 12/2017 | Desa et al. |

(Continued)

FOREIGN PATENT DOCUMENTS

| EP | 2769967 A1 | 8/2014 |
| GB | 2585842 A * | 1/2021 |
| RO | 135060 A2 | 6/2021 |

OTHER PUBLICATIONS

A. V Rode et al.: "Formation of cluster-assembled carbon nanofoam by high-repetition-rate laser ablation", Appl. Phys A. 70, Year 2000, p. 135-144 (Year: 2000).*

(Continued)

*Primary Examiner* — Mohammad M Ameen
(74) *Attorney, Agent, or Firm* — Saul Ewing LLP

(57) ABSTRACT

A method of manufacturing a carbon nanostructure, such as a carbon foam material, is disclosed. The method comprises the steps of: (a) using a first laser beam to irradiate an encapsulated or sub-surface region of a carbon pre-cursor material below a surface of the material, to create carbon foam in that sub-surface region, and a disorganised, amorphous non-graphene material above the carbon foam, and then (b) using a second laser beam to remove or ablate the disorganised, amorphous non-graphene material sitting above the carbon foam, to expose at least some of the carbon foam. The resultant carbon foam material shows a significant D peak; the 2D peak is significantly less than the G peak; and the peak D: peak G ratio is significantly above zero. In appearance and Raman signature, it appears similar (Continued)

to a carbon nano-onion material. It can be used in biosensors, supercapacitors and pseudo-capacitors.

26 Claims, 100 Drawing Sheets

Related U.S. Application Data continuation of application No. PCT/GB2022/053345, filed on Dec. 21, 2022.

(30) Foreign Application Priority Data

| Feb. 22, 2022 | (GB) | 2202353 |
|---|---|---|
| Feb. 22, 2022 | (GB) | 2202356 |
| Feb. 22, 2022 | (GB) | 2202357 |
| Feb. 22, 2022 | (GB) | 2202360 |
| Feb. 22, 2022 | (GB) | 2202362 |
| Feb. 22, 2022 | (GB) | 2202364 |
| Feb. 22, 2022 | (GB) | 2202366 |
| Feb. 22, 2022 | (GB) | 2202369 |
| Feb. 22, 2022 | (GB) | 2202372 |
| Feb. 22, 2022 | (GB) | 2202375 |
| Feb. 22, 2022 | (GB) | 2202376 |
| Feb. 22, 2022 | (GB) | 2202380 |
| Feb. 22, 2022 | (GB) | 2202384 |
| Feb. 22, 2022 | (GB) | 2202387 |
| Feb. 22, 2022 | (GB) | 2202388 |
| Feb. 22, 2022 | (GB) | 2202389 |
| Feb. 22, 2022 | (GB) | 22023725 |

(51) Int. Cl.
 *C01B 32/18* (2017.01)
 *G01N 27/30* (2006.01)
 *G01N 27/327* (2006.01)

(52) U.S. Cl.
 CPC ..... *G01N 27/3276* (2013.01); *G01N 27/3278* (2013.01); *C01P 2002/82* (2013.01); *C01P 2004/03* (2013.01); *C01P 2006/40* (2013.01)

(56) References Cited

U.S. PATENT DOCUMENTS

| 2019/0308880 A1* | 10/2019 | Tour | C01B 32/184 |
| 2020/0180963 A1* | 6/2020 | Caffio | C30B 29/02 |
| 2024/0425374 A1 | 12/2024 | Caffio et al. | |
| 2025/0091874 A1 | 3/2025 | Caffio et al. | |
| 2025/0091875 A1 | 3/2025 | Caffio et al. | |

OTHER PUBLICATIONS

Lin, Jian, et al., "Laser-induced porous graphene films from commercial polymers," Nature Communications, vol. 5, No. 1 (Dec. 1, 2014) XP055878437; Retrieved from the Internet: URL:http://www.nature.com/articles/ncomms6714>abstract.

Rode, Av, "Formation of cluster-assembled carbon nano-foam by high-repetition-rate laser ablation," Applied Physics A, vol. A70, No. 2, pp. 135-144 (Jan. 21, 2000) XP002314578.

* cited by examiner

Step 1

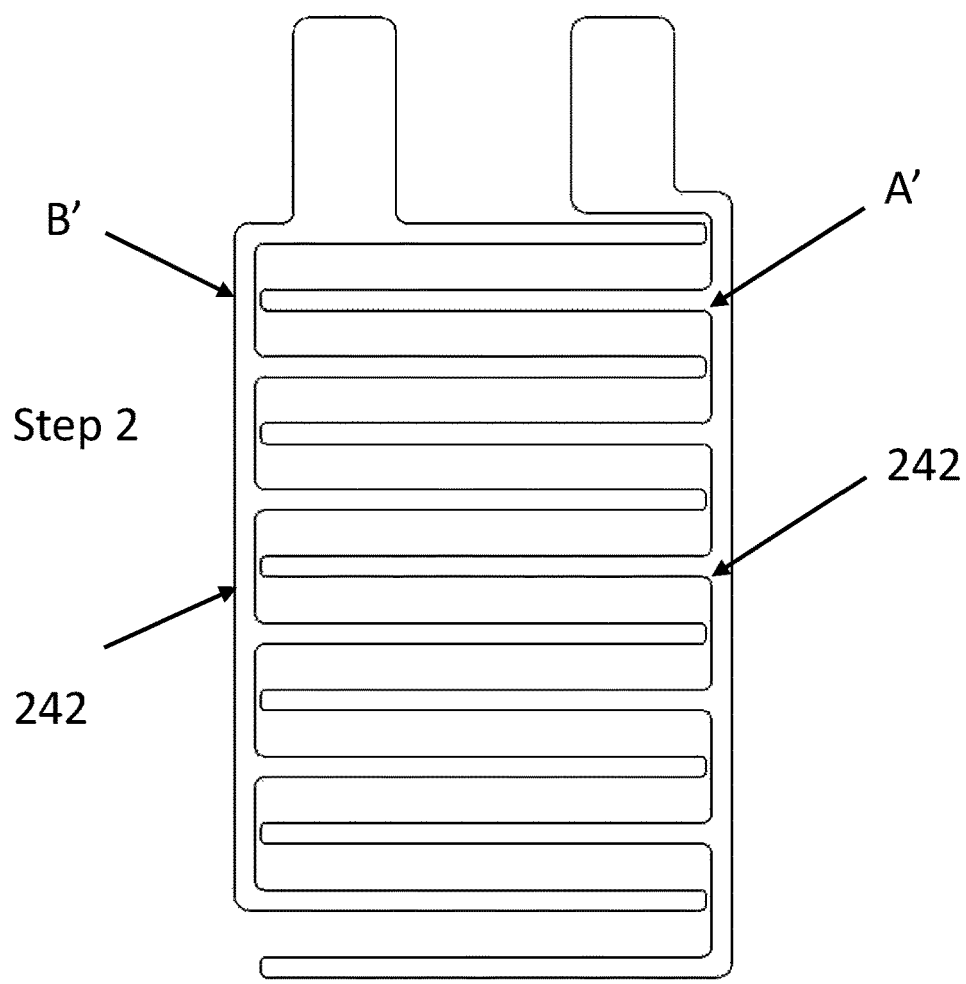
Figure 26C
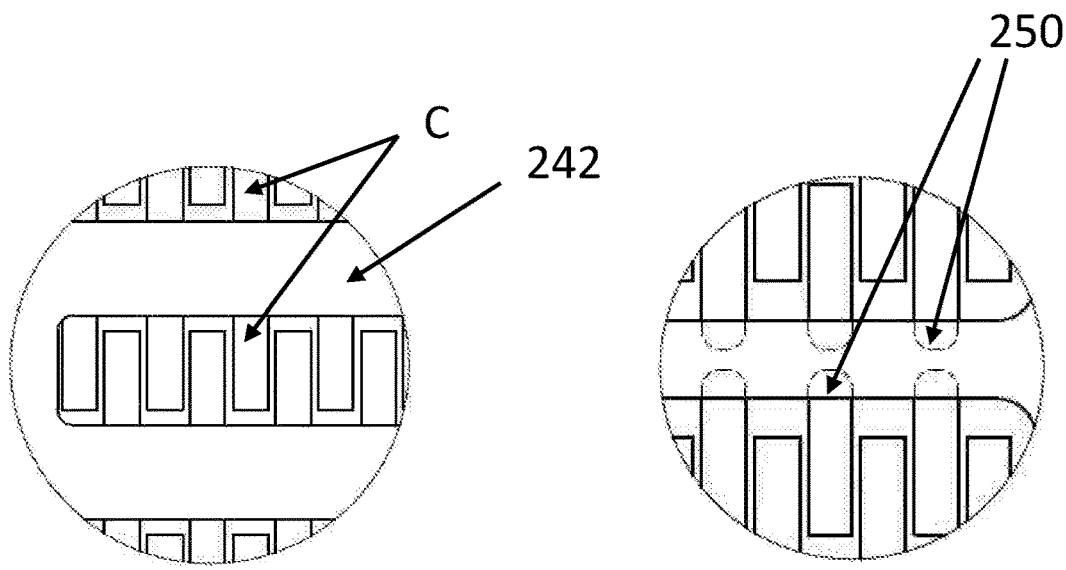
Figure 26D
Figure 26E

Step 4

Step 5

Step 6

A

100 μm

20 μm

500nm

LASER-INDUCED CARBON NANOSTRUCTURES

CROSS-REFERENCE TO RELATED APPLICATIONS

This application is a continuation of U.S. application Ser. No. 18/751,866, filed on Jun. 24, 2024, which is a bypass continuation of International Application No. PCT/GB2022/053345, filed on Dec. 21, 2022, which claims priority to GB Applications Nos. GB 2118948.5 filed Dec. 23, 2021; GB 2202353.5 filed Feb. 22, 2022; GB 2202356.8 filed Feb. 22, 2022; GB 2202357.6, filed Feb. 22, 2022; GB 2202360.0 filed Feb. 22, 2022; GB 2202362.6 filed Feb. 22, 2022; GB 2202364.2 filed Feb. 22, 2022; GB 2202366.7 filed Feb. 22, 2022; GB 2202369.1 filed Feb. 22, 2022; GB 2202372.5 filed Feb. 22, 2022; GB 2202375.8 filed Feb. 22, 2022; GB 2202376.6 filed Feb. 22, 2022; GB 2202380.8 filed Feb. 22, 2022; GB 2202382.4 filed Feb. 22, 2022; GB 2202384.0 filed Feb. 22, 2022; GB 2202387.3 filed Feb. 22, 2022; GB 2202388.1 filed Feb. 22, 2022; and GB 2202389.9 filed Feb. 22, 2022, the entire contents of each of which being fully incorporated herein by reference.

FIELD OF THE INVENTION

This invention relates to the laser-induced production of carbon nanostructures, including turbostratic twisted multilayer carbon foam.

BACKGROUND TO THE INVENTION

Carbon nanostructures are both fascinating and the subject of intense research. Carbon nano-onions, also known as multi-layered fullerene, exemplify this. See 'Raman spectroscopy of polyhedral carbon nano-onions'. DOI: 10.1007/s00339-015-9315-9 and also 'Carbon nano-onions: unique carbon nano-structures with fascinating properties and their potential applications'. DOI: 10.1016/j.ica.2017.07.021, the contents of which are incorporated by reference.

Another carbon nanostructure, graphene, has for many years been of great interest for applications including biosensors, electrochemical sensing systems, supercapacitors, electrodes, and fuel cells. Known methods of producing 3D graphene include the laser induced graphene production described in WO 2019/038558; when a suitable carbon pre-cursor material, such as polyimide film, is positioned on a supporting substrate, and irradiated with a $CO_2$ laser, then 3D graphene forms at the surface of the exposed polyimide film. Experience has shown that the thickness of the 3D graphene produced by this method is less than 50 μm; further, the 3D graphene itself can be brittle and adhere poorly to an underlying substrate and may flake off that substrate. It is hence unsuited to many applications.

A note on terminology used in the carbon nanostructure field: if we just take the term 'graphene', there are many different forms of 'graphene'; for example, the literature describes monolayer graphene, bilayer graphene, turbostratic graphene, graphene superlattices, graphene fiber, 3D graphene, graphene aerogel, crumpled graphene, and many other forms. This presents a definitional challenge because use of a specific term (e.g., '3D graphene') might imply a limitation to only that specific form of graphene. Further, The IUPAC (International Union for Pure and Applied Chemistry) recommends use of the name "graphite" for the three-dimensional material, and "graphene" only when the reactions, structural relations or other properties of individual layers are discussed.

In this specification, we therefore use the term 'carbon foam' as a generalised term, and this term should be expansively construed to cover any carbon nanostructure, such as 3D carbon material foam, including turbostratic twisted multilayer 3D carbon material foam.

One instance of the term 'carbon foam' refers to a material that is manufactured using the methods described in this specification; this material has properties that are somewhat distinct from conventional graphene or conventional graphene foam. For example, graphene foam has several characteristics: it is hydrophobic, with low wettability. Raman analysis of a typical graphene foam reveals the following signatures: absence of a D peak; the 2D peak is higher than the G peak; the peak D: peak G ratio is close to zero. As we will describe in more detail below, the carbon foam generated in an implementation of this invention shares none of these characteristics; it is hydrophilic, with a contact angle below 20°; it lacks the tell-tale Raman signature of graphene: it shows a significant D peak; the 2D peak is significantly less than the G peak; the peak D: peak G ratio is significantly above zero. In appearance and Raman signature, it appears closer to carbon nano-onion material. The term 'carbon foam' hence also includes within its scope materials that are carbonaceous nanostructures, such as carbon nano-onion, carbon nano-horn, carbon nano-tubes, carbon nano-dots, nanodiamonds and fullerene, or combinations of any of these.

SUMMARY OF THE INVENTION

In this specification, we describe an approach in which the surface of a carbon pre-cursor is not converted to graphene at all; instead, a sub-surface or encapsulated region of the carbon pre-cursor is converted to a carbon foam by a focussed laser beam.

We generalise to the invention as defined in claim 1, namely a method of manufacturing a carbon foam material comprising the steps of:
  (a) using a first laser beam to irradiate an encapsulated or sub-surface region of a carbon pre-cursor material below a surface of the material, to create carbon foam in that sub-surface region, and a disorganised, amorphous non-graphene material above the carbon foam, and then
  (b) using a second laser beam to remove or ablate the disorganised, amorphous non-graphene material sitting above the carbon foam, to expose at least some of the carbon foam.

The amorphous non-graphene material is 'above' the carbon foam in that it is closer to the laser generating the laser beam than the carbon foam is. One implementation of the invention is described as a 'Dual Laser' process, since two separate lasers are used in the production of the carbon foam material. The carbon foam material shows a significant D peak; the 2D peak is significantly less than the G peak; and the peak D: peak G ratio is significantly above zero. In appearance and Raman signature, it appears similar to a carbon nano-onion material. It can be used in biosensors, supercapacitors and pseudo-capacitors. In one implementation, the carbon foam is called 'Gii' carbon foam.

BRIEF DESCRIPTION OF THE FIGURES

The invention will be described with reference to implementations of the invention shown in the following Figures.

Appendix 1 A Supercapacitor Implementation with a Hydrogel Electrolyte

Figure 59:
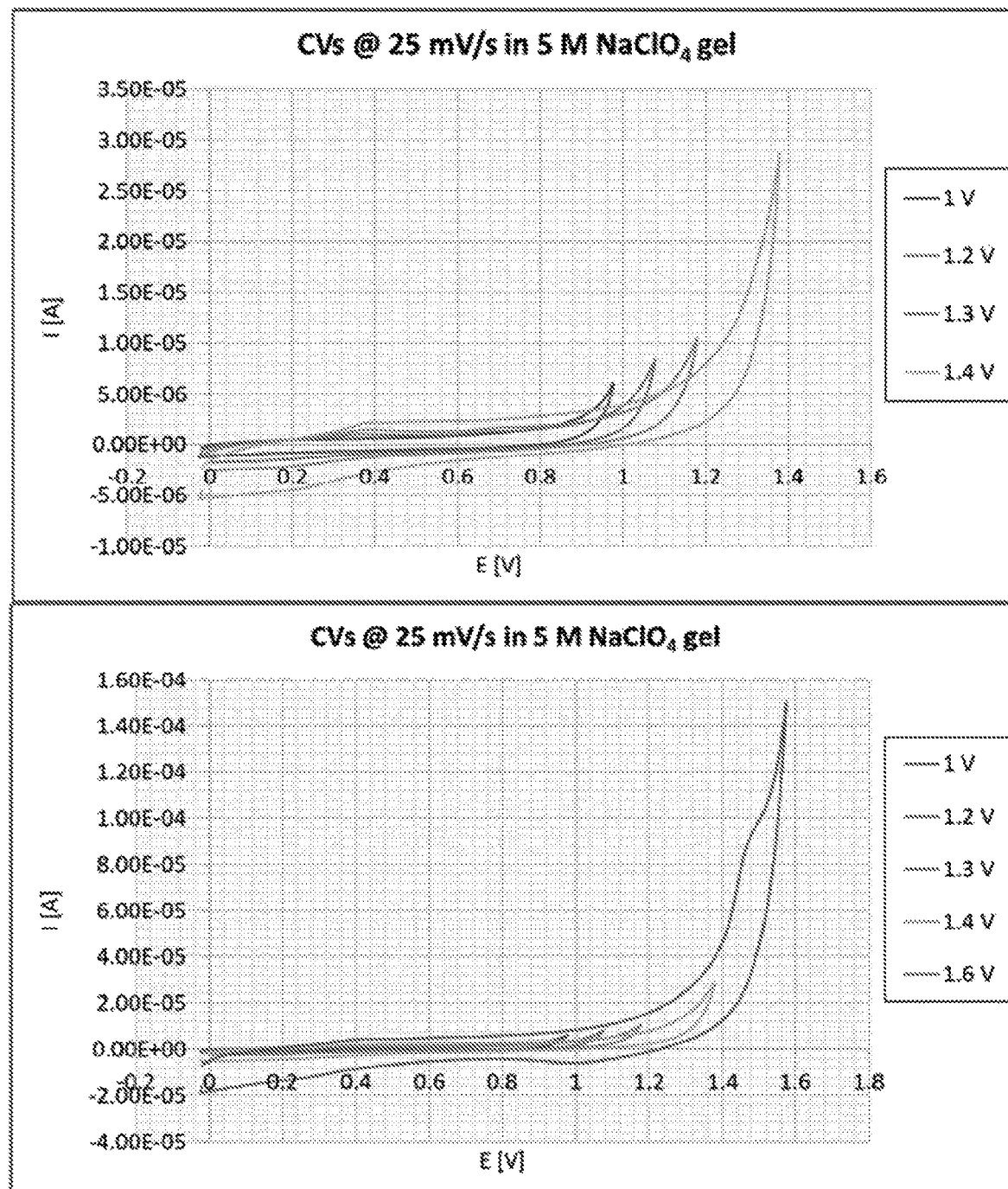

FIG. 59 presents carbon foam cyclic voltammograms for positive voltages measured at 25 mV/s.

Figure 60:
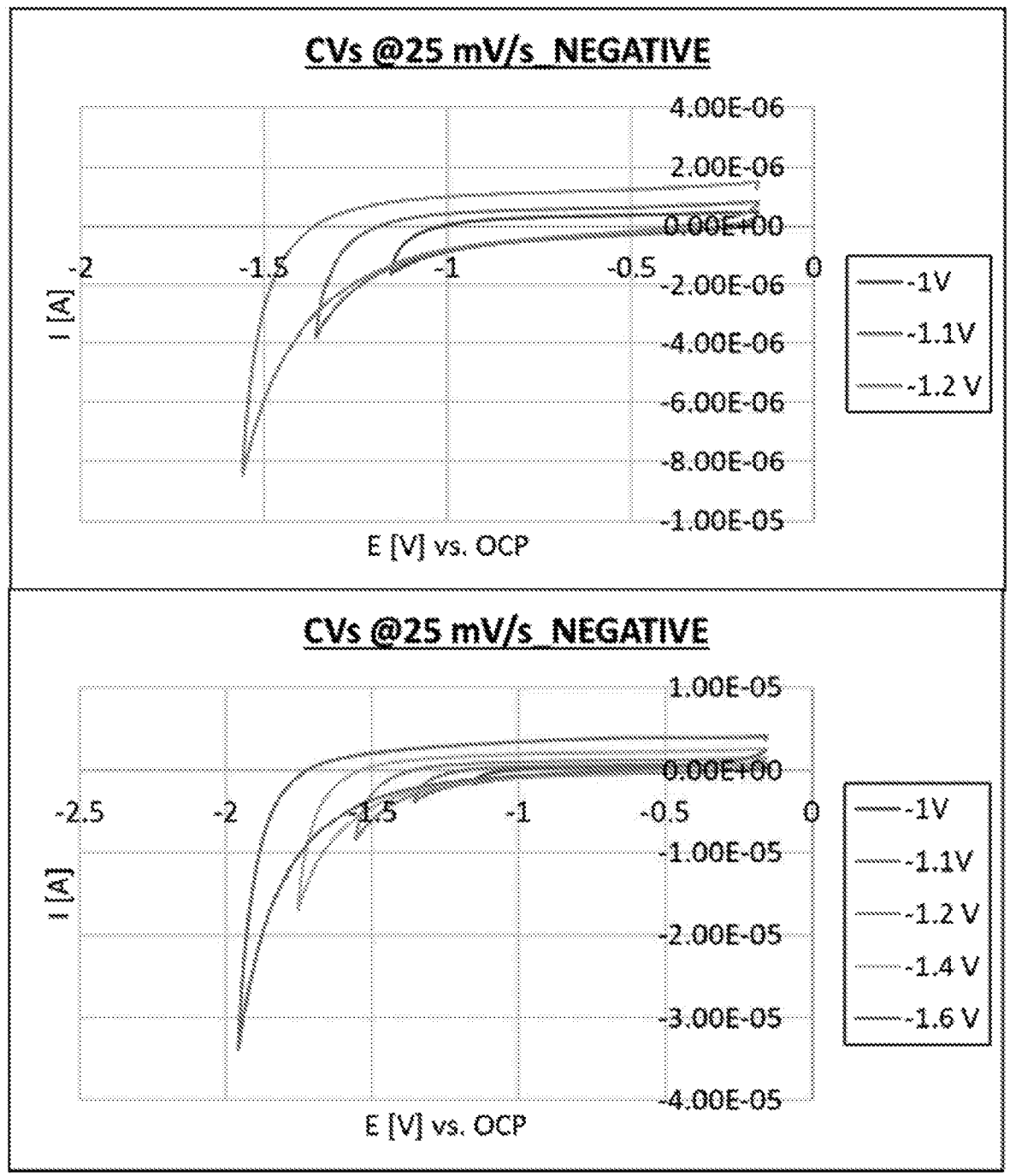

FIG. 60 shows carbon foam cyclic voltammograms for negative voltages measured at 25 mV/s.

Figure 61:
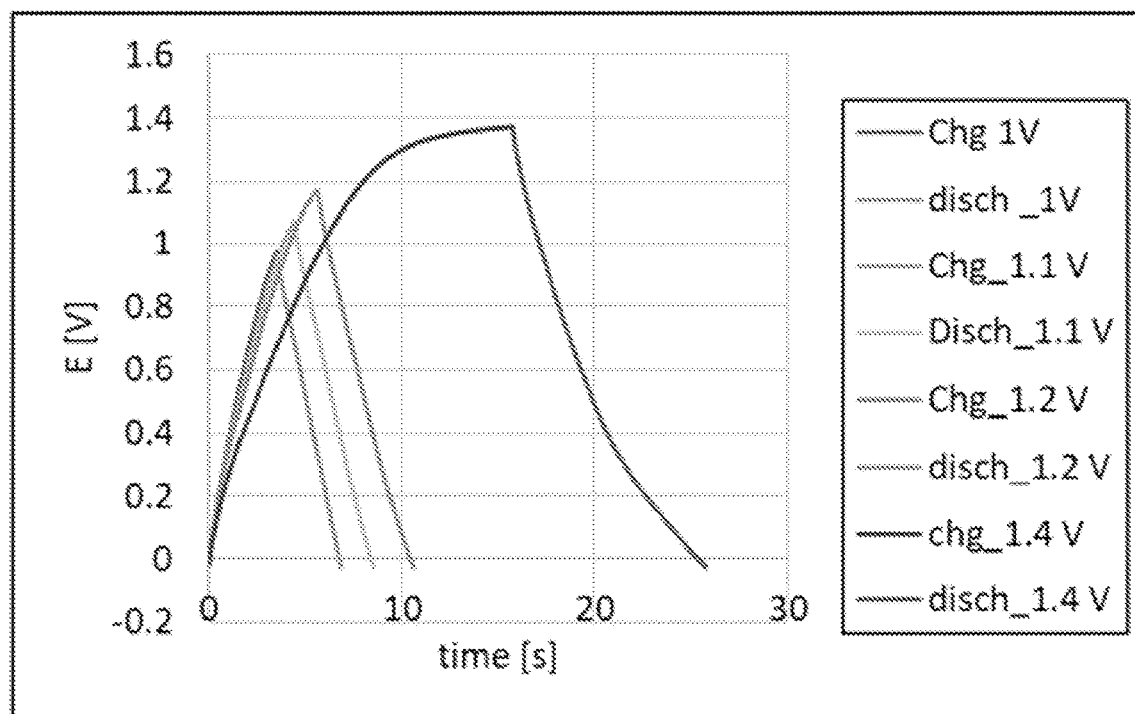

FIG. 61 shows carbon foam galvanostatic charge discharge (GCD) curves measured at 0.5 mA/cm$^2$ for positive voltage windows.

Figure 62:
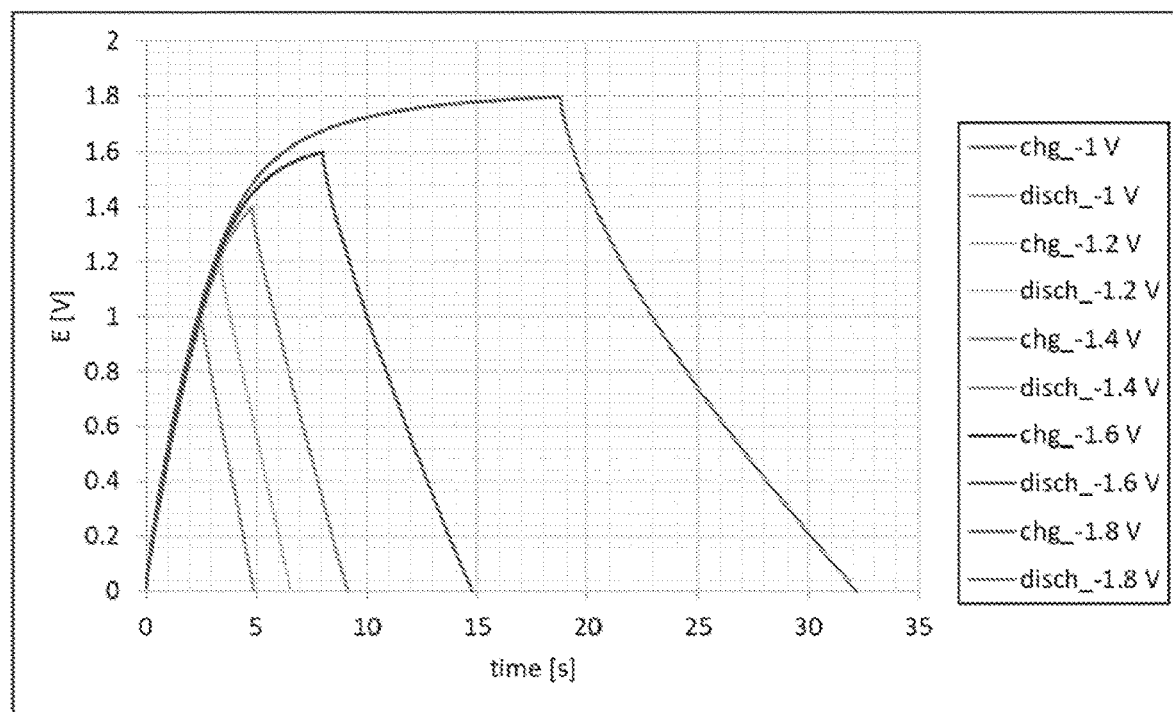

FIG. 62 shows carbon foam galvanostatic charge discharge (GCD) curves measured at 0.5 mA/cm$^2$ for negative voltage windows.

Figure 63A:
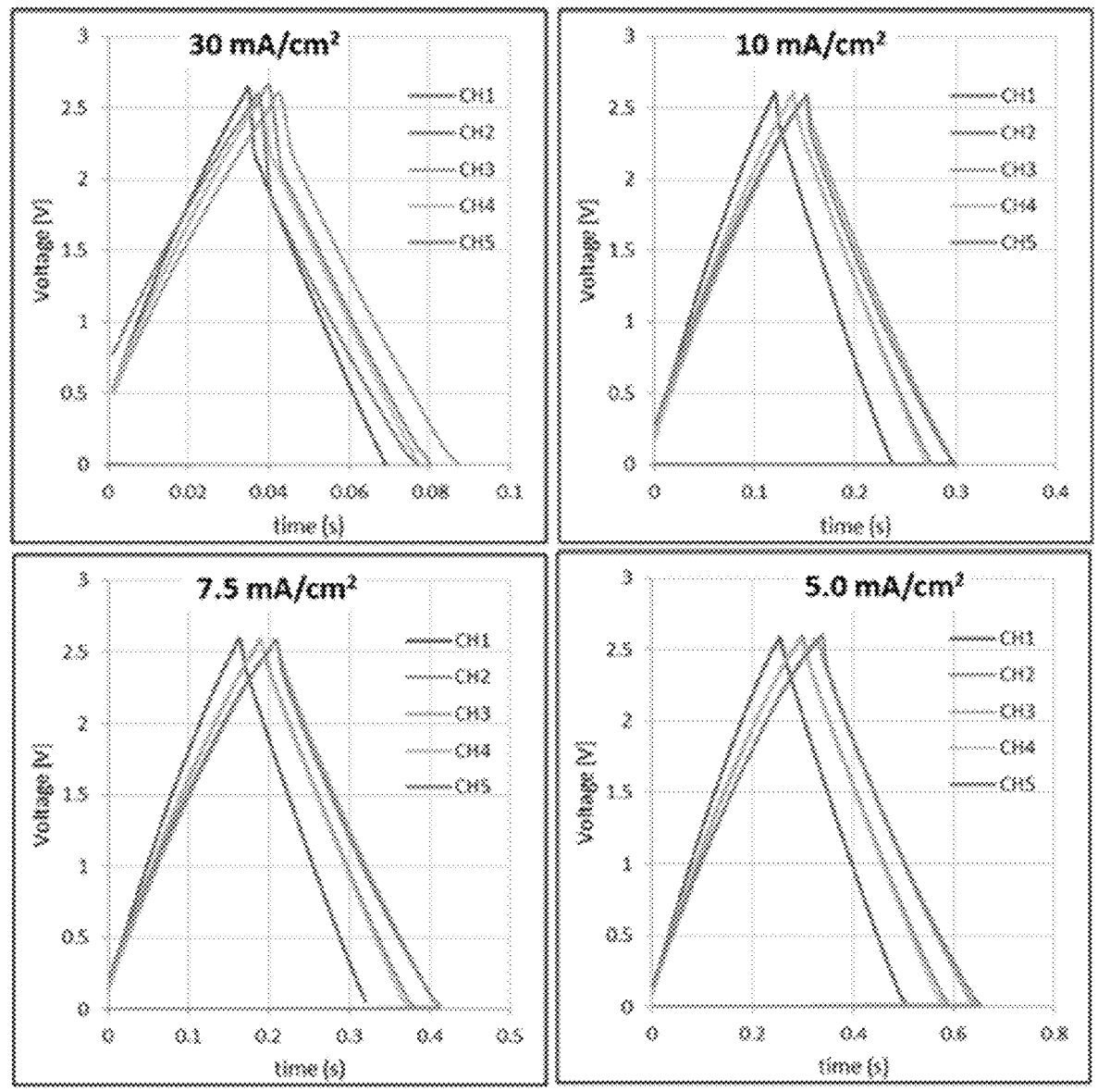
Figure 63B:
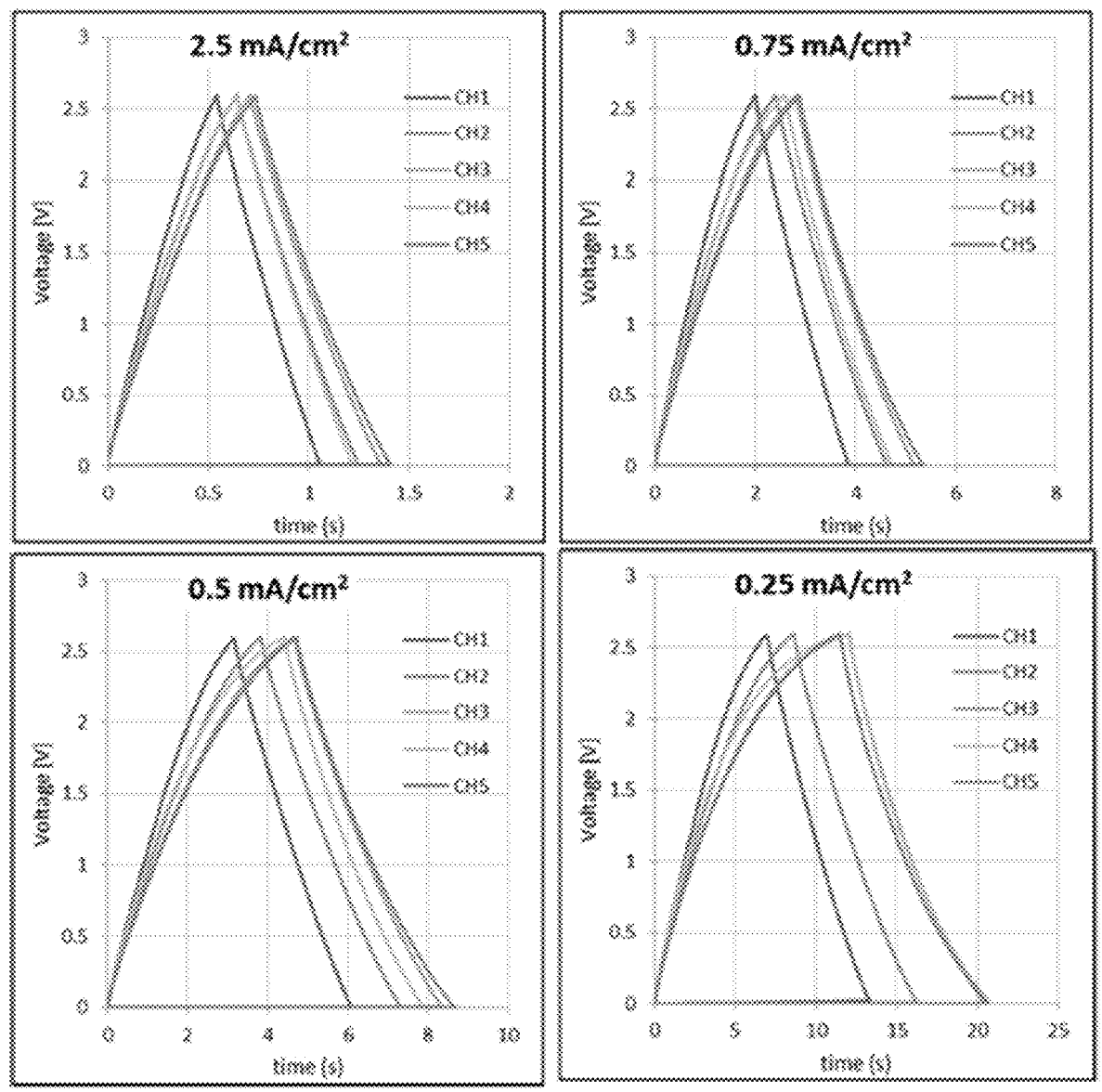

FIGS. 63A and 63B show carbon foam galvanostatic charge discharge (GCD) data taken from five two-electrode devices.

Figure 64A:
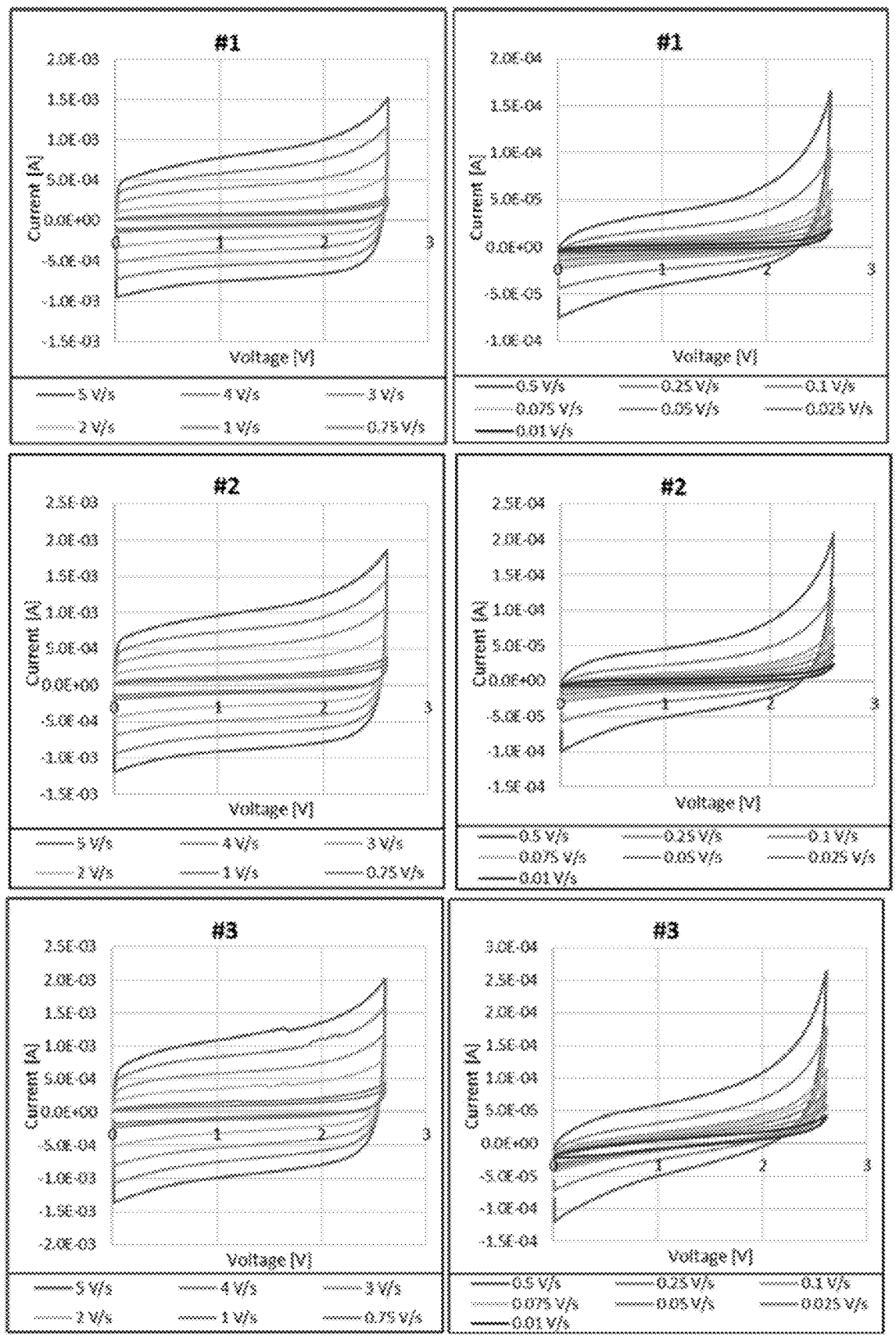
Figure 64B:
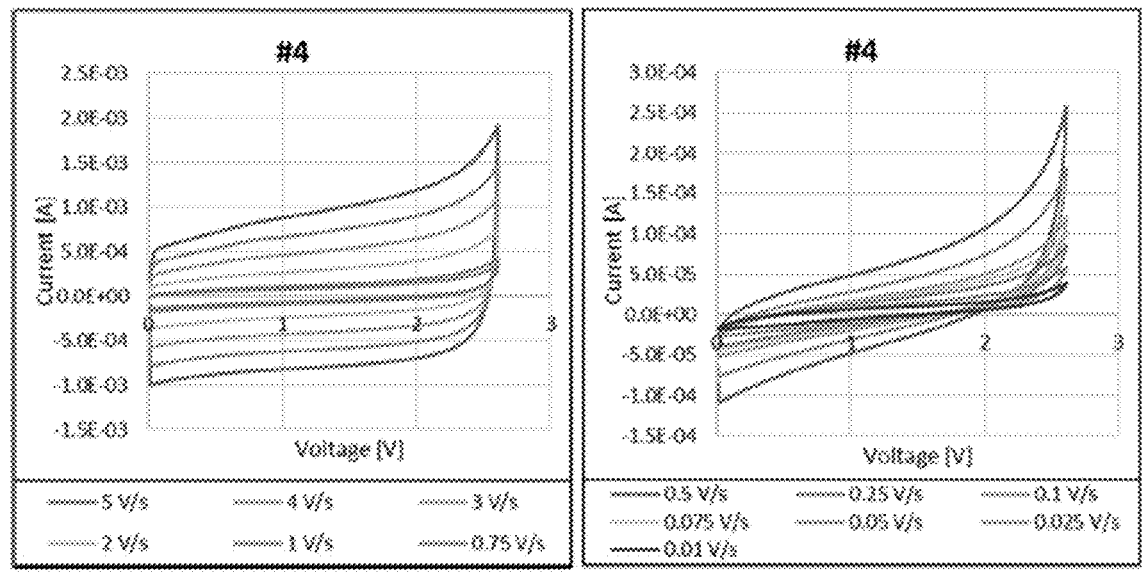

FIGS. 64A and 64B show carbon foam cyclic voltammograms recorded from five different two-electrode devices at high (left) and low (right) scan rates.

Figure 65A:
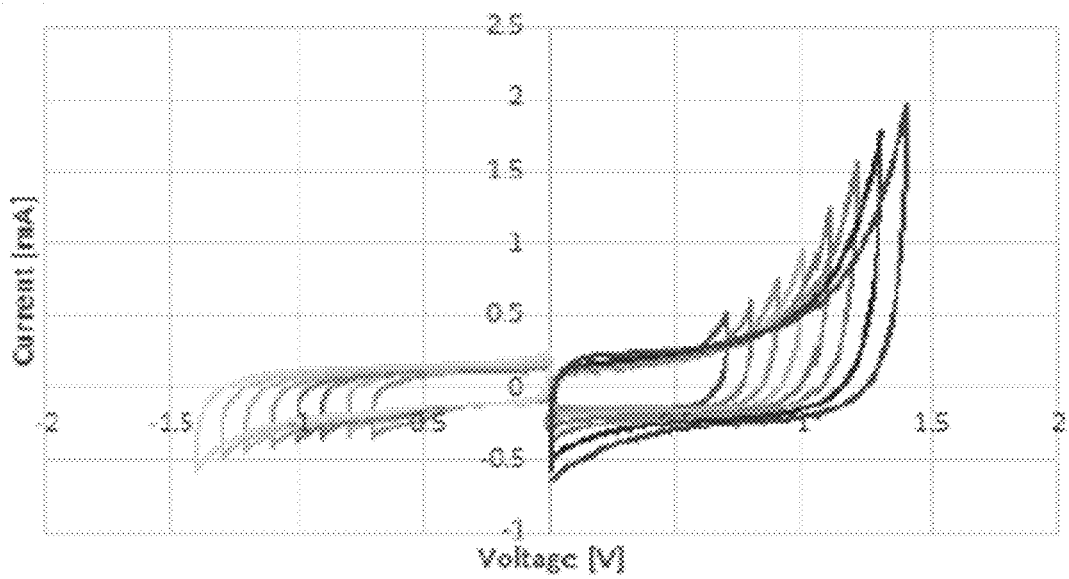
Figure 65A:
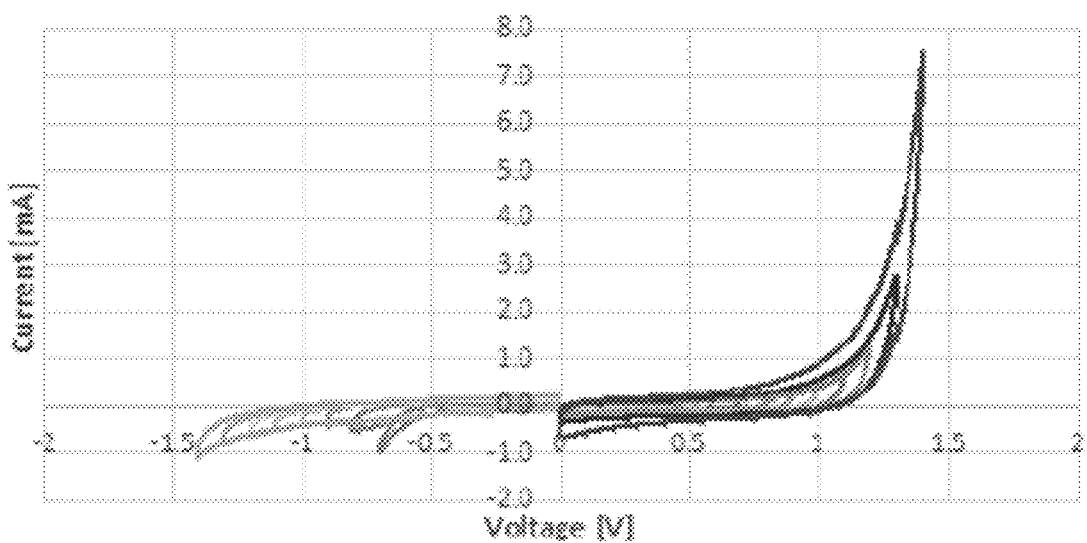
Figure 65B:
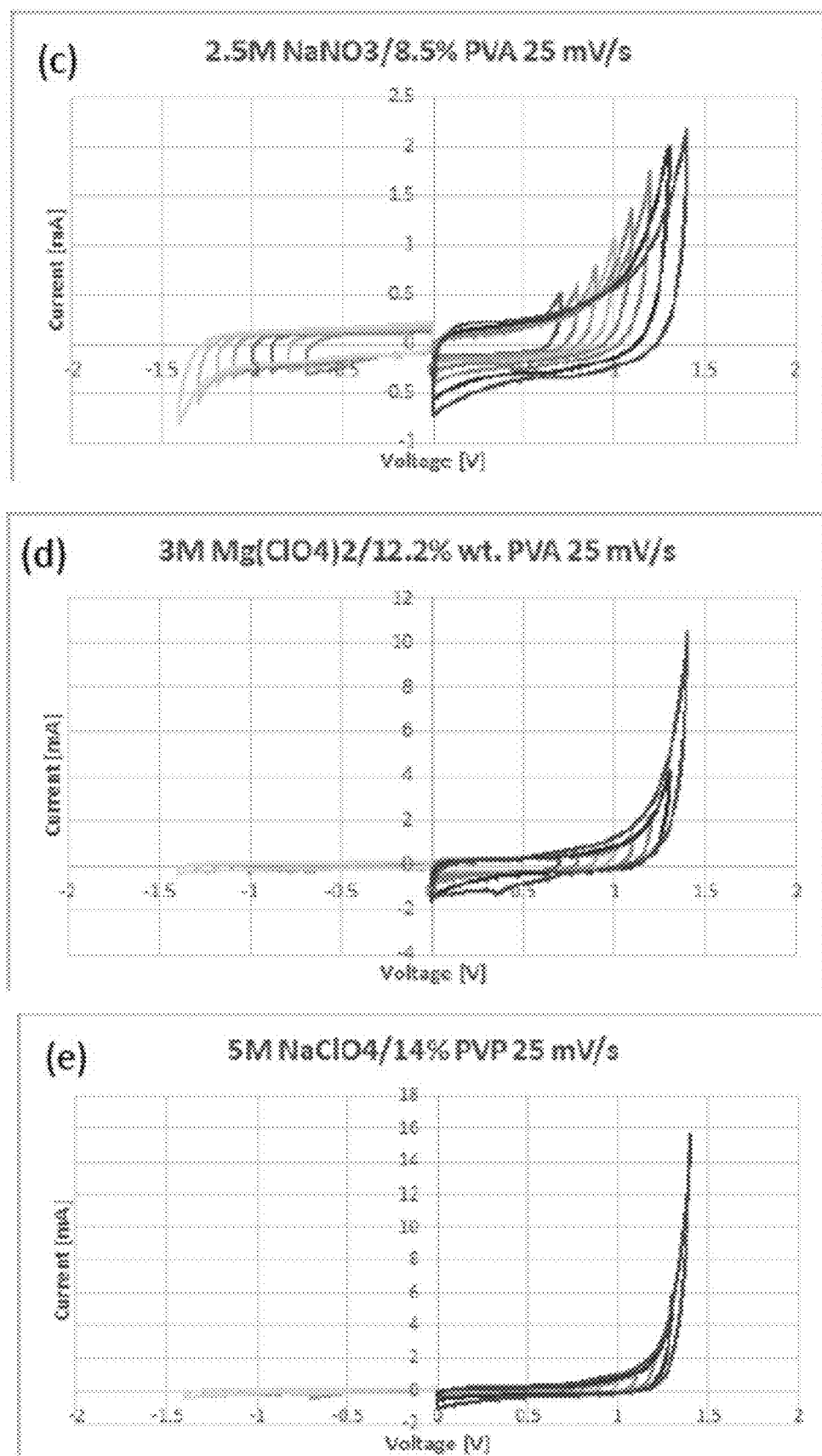

FIGS. 65A and 65B show carbon foam cyclic voltammogram data for five additional systems, differing through the nature of the hydrogel electrolyte: (a) 3M NaClO$_4$ and PVA; (b) 1M NaClO$_4$ and PVA; (c) 2.5M NaNO$_3$ and PVA; (d) 3M Mg(ClO$_4$)$_2$ and PVA; and (e) 5M NaClO$_4$ and PVP.

Appendix 2: Gii-Cap+ Hydrogel

Figure 66:
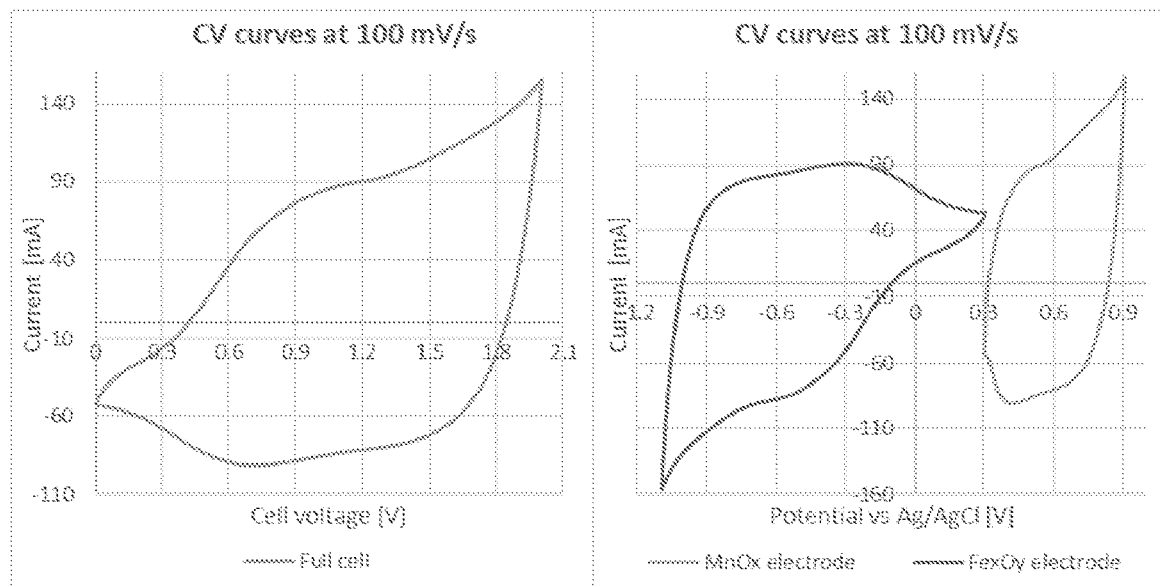

FIG. 66 are typical CV curves for Gii-Cap+ Hydrogel devices.

Figure 67:
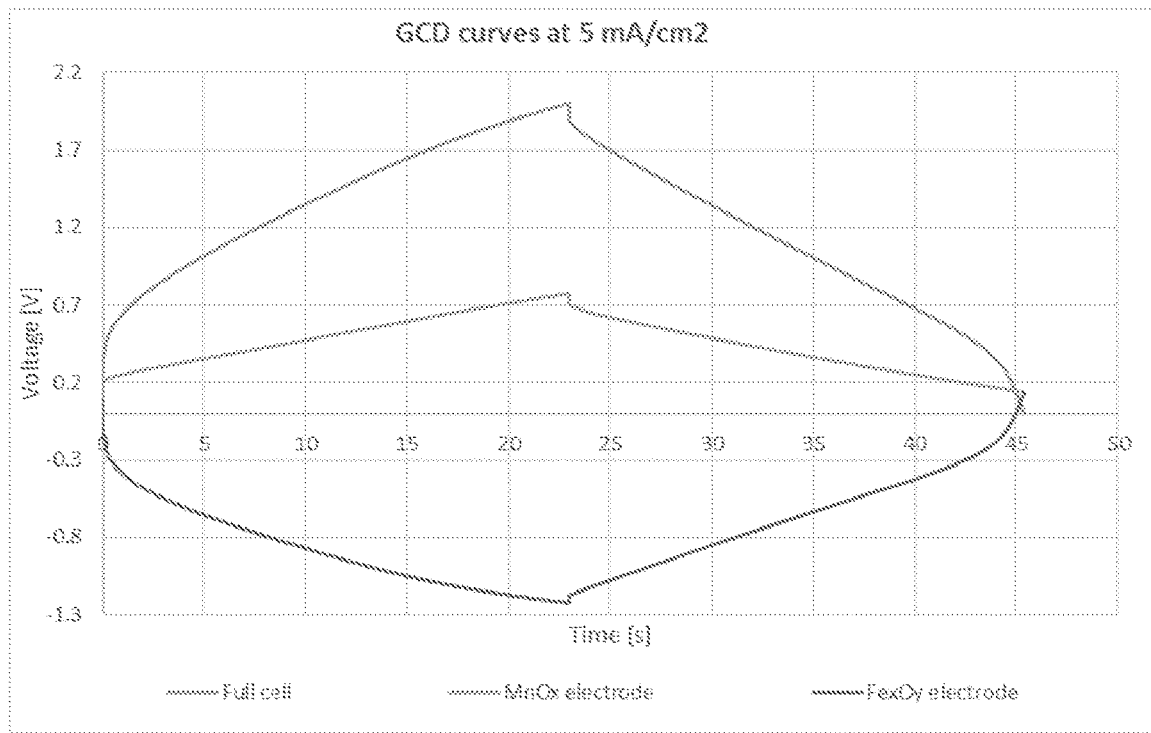

FIG. 67 are typical GCD curves for Gii-Cap+ Hydrogel devices after conditioning.

Figure 68:
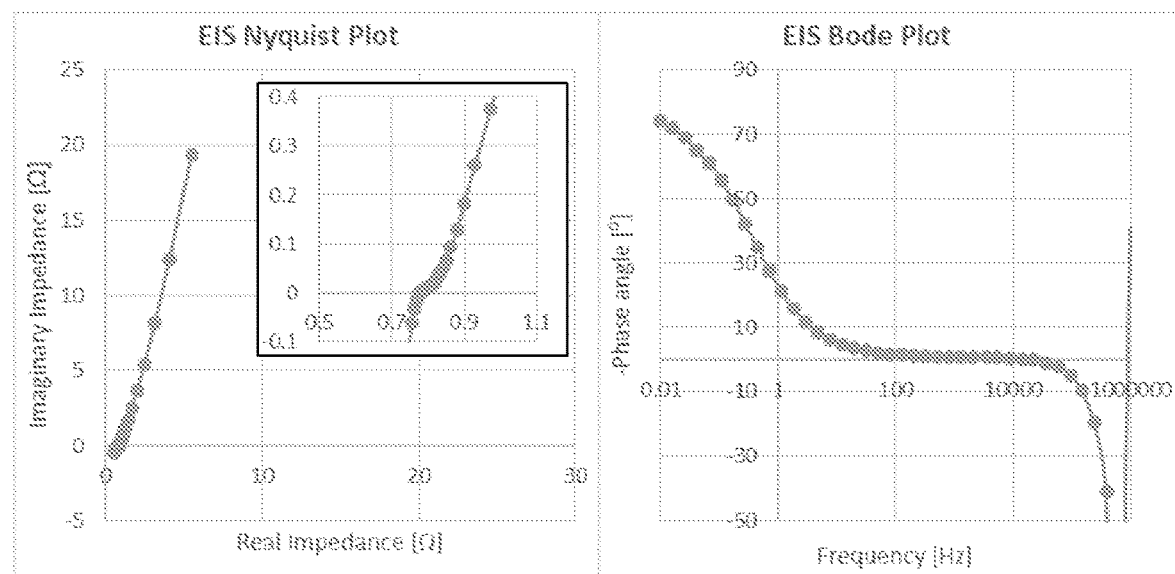

FIG. 68 shows post-conditioning Nyquist (left) and Bode (right) plots for Gii-Cap+ devices.

Appendix 3 GiiCap Iongel

FIG. 69-74 are results for GiiCap Iongel devices.

Appendix 4 3-Month Gii-Sens Assay Feasibility Proposal

FIG. 75-78 are schematic views of assay procedures for a Gii-Sens 3D Carbon Foam assay system.

Figure 79:
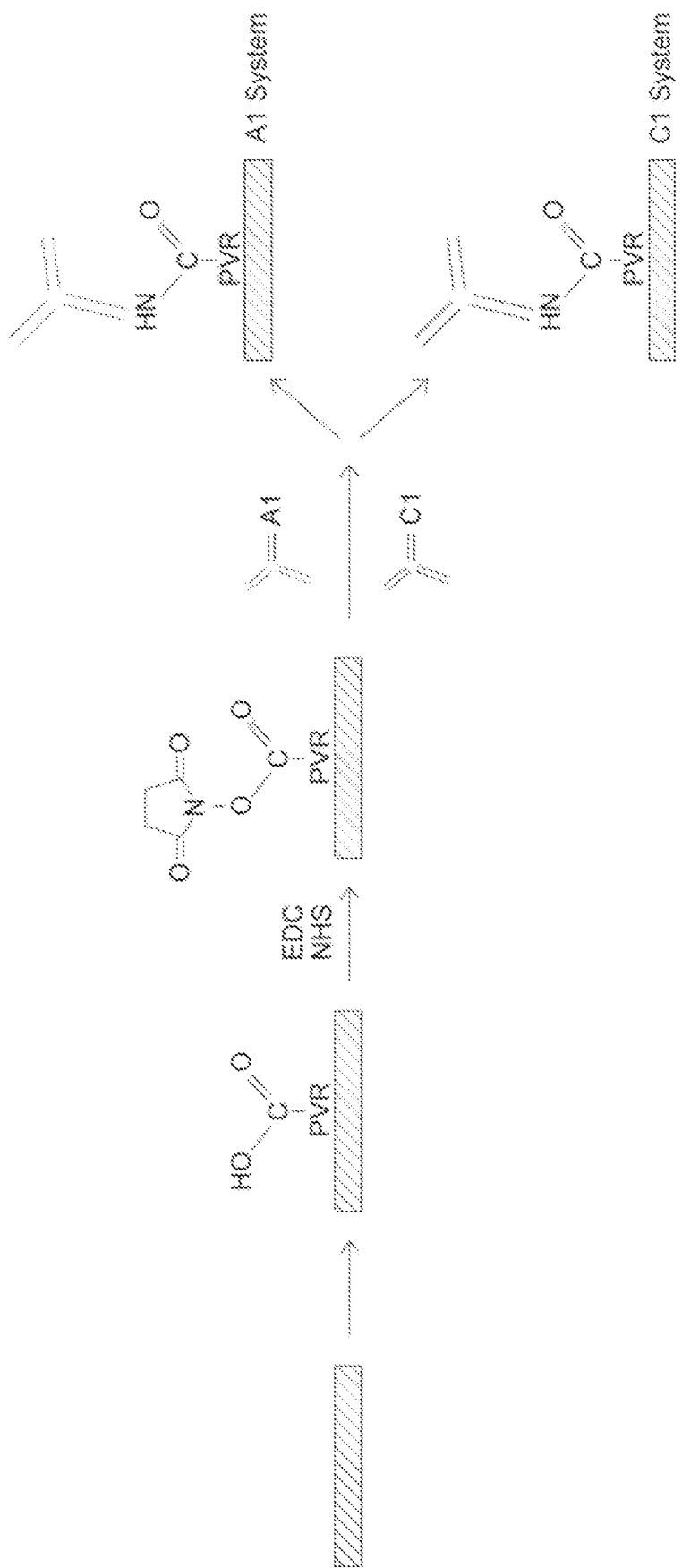
Figure 80:
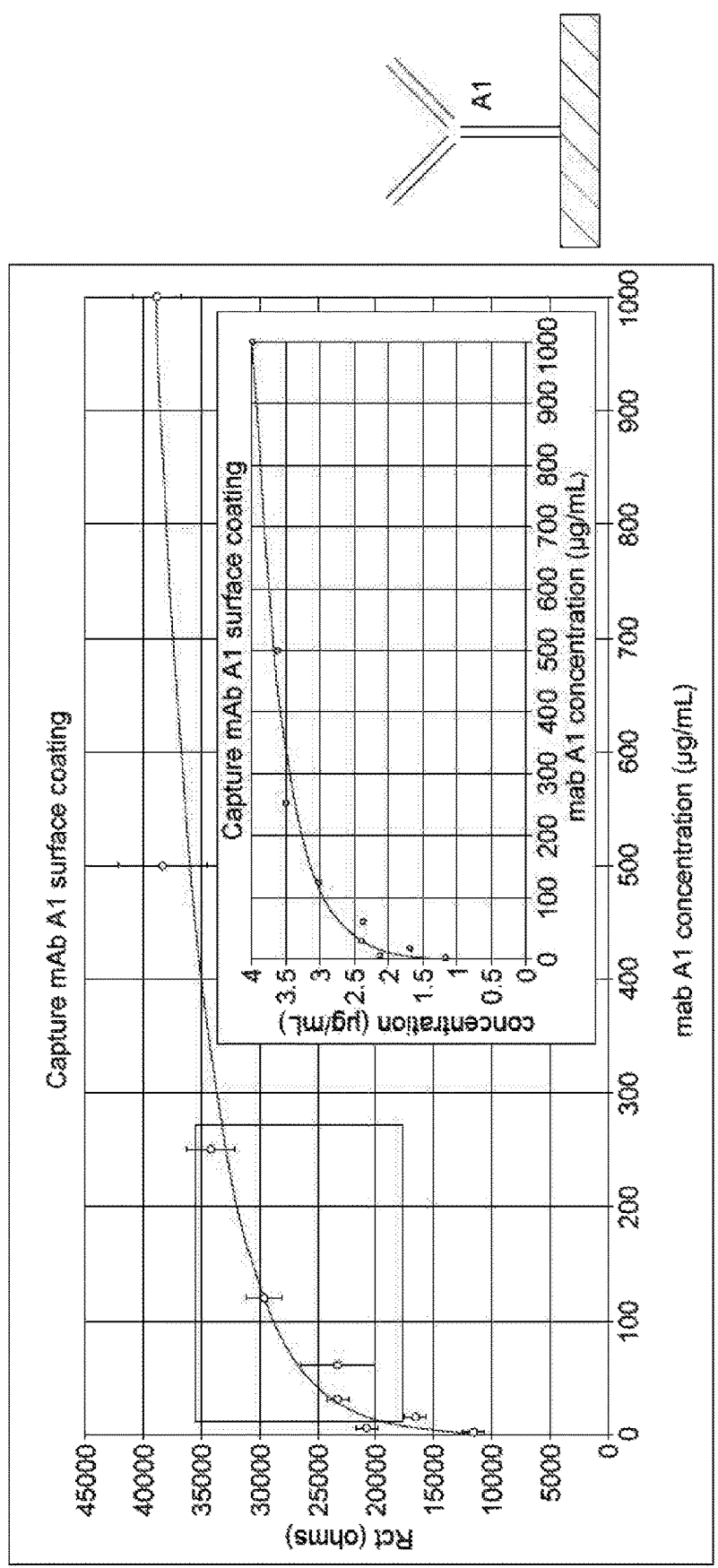
Figure 81:
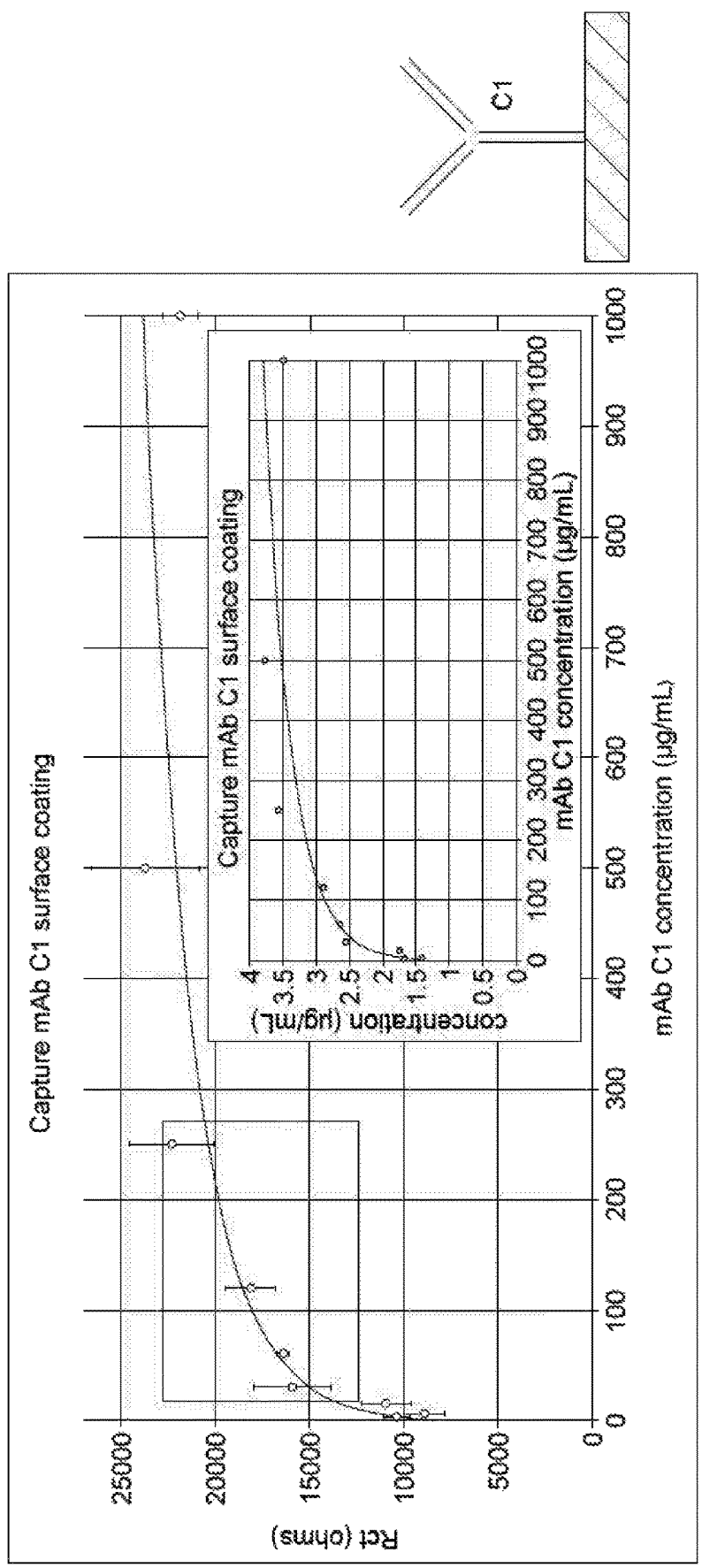

FIG. 79-81 shows the surface chemistry for Gii-Sens 3D Carbon Foam.

Figure 82:
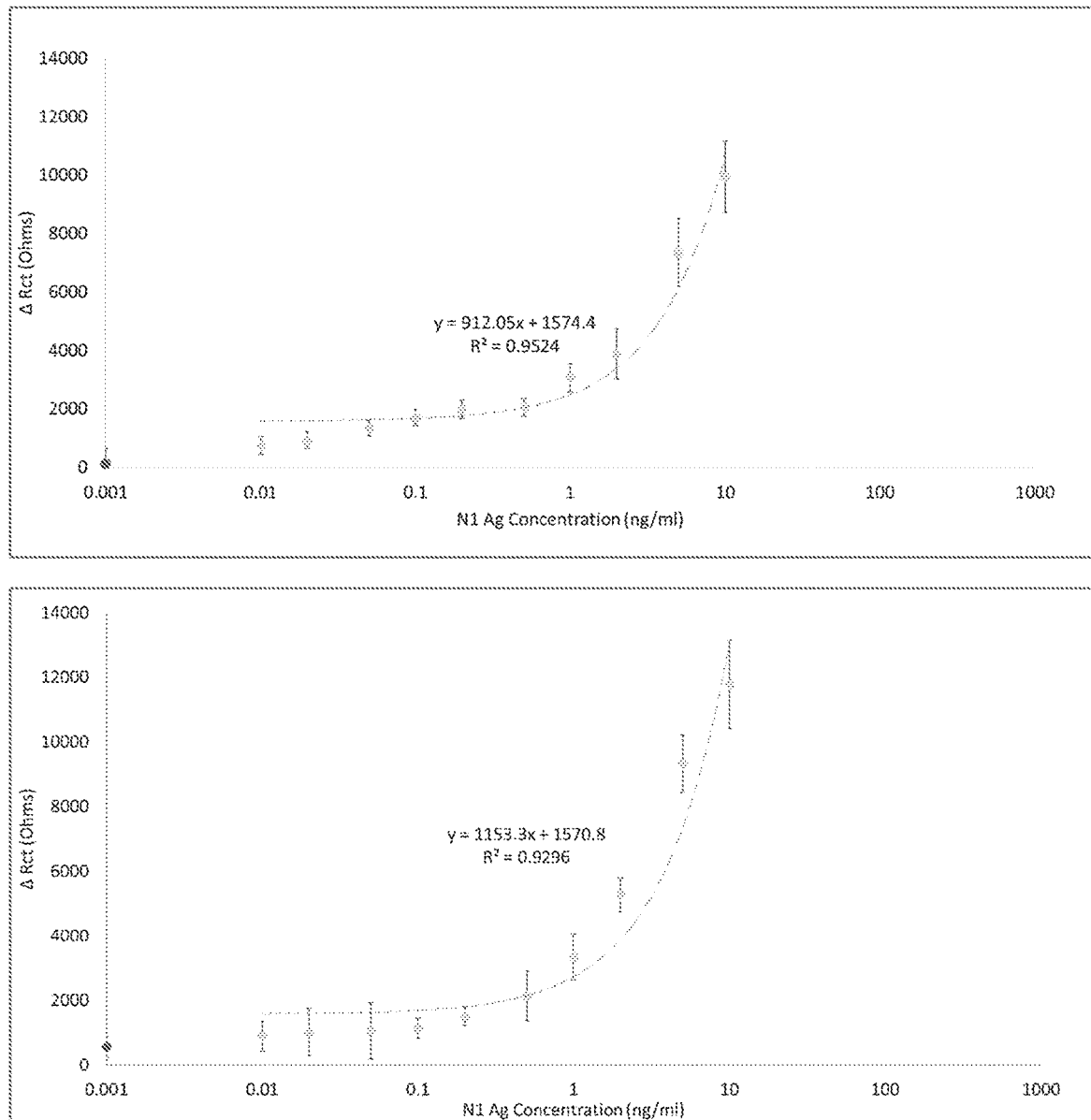
Figure 83:
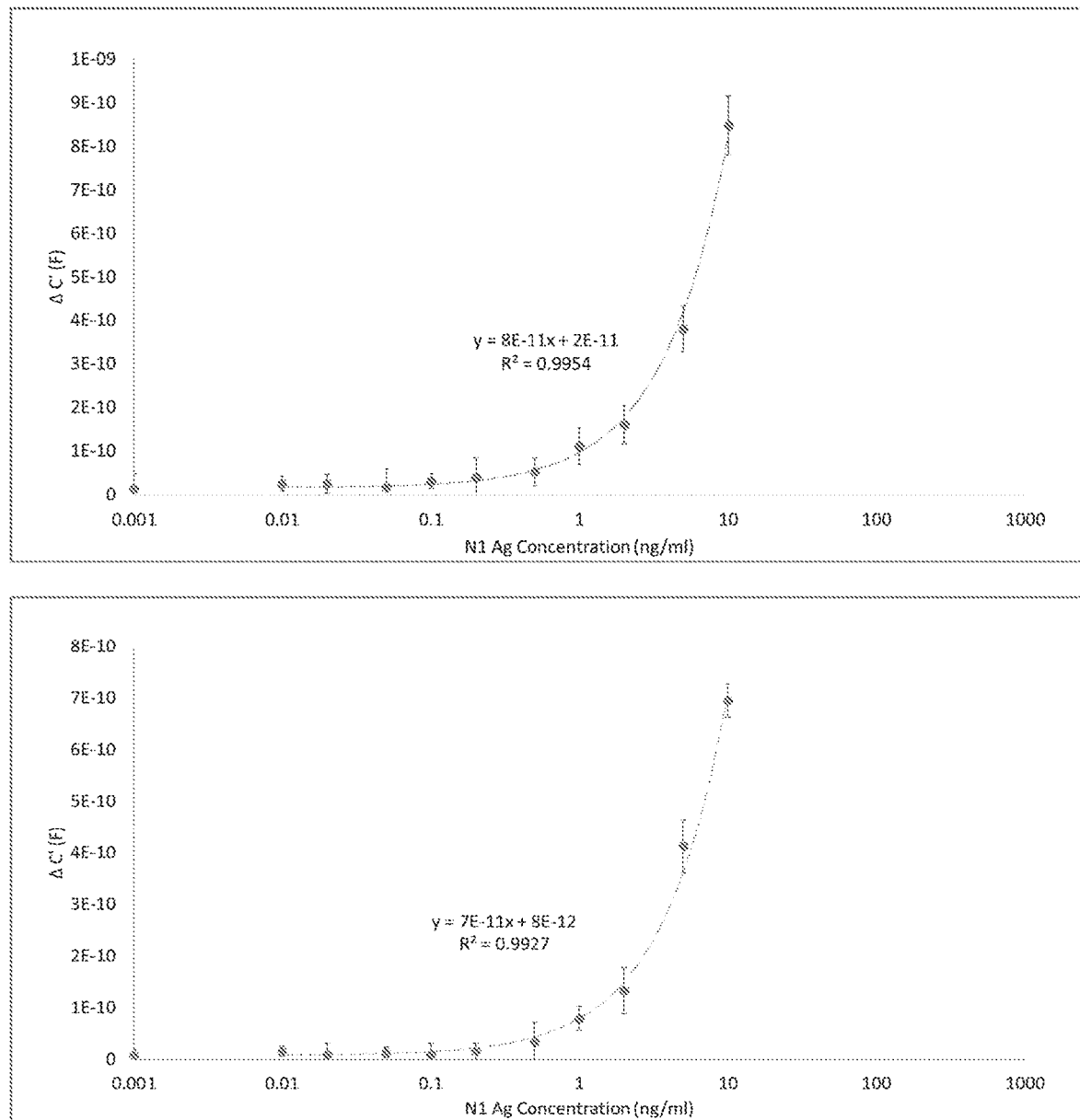

FIG. 82-83 shows a labeless assay exploration for Gii-Sens 3D Carbon Foam.

Appendix 6 Benchmark Experimental Conditions

Figure 84:
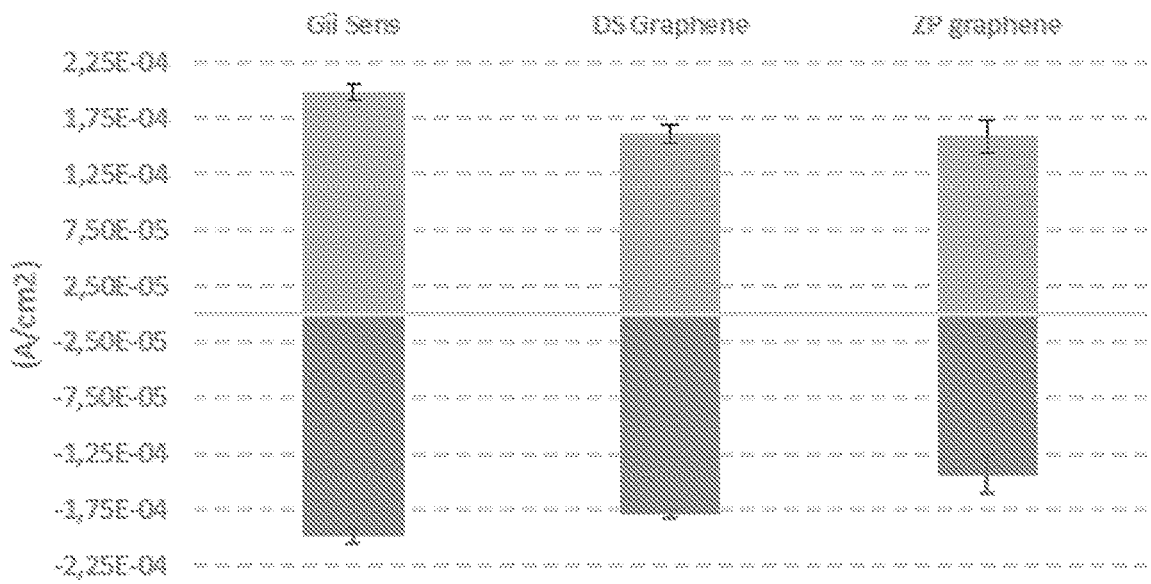
Figure 85:
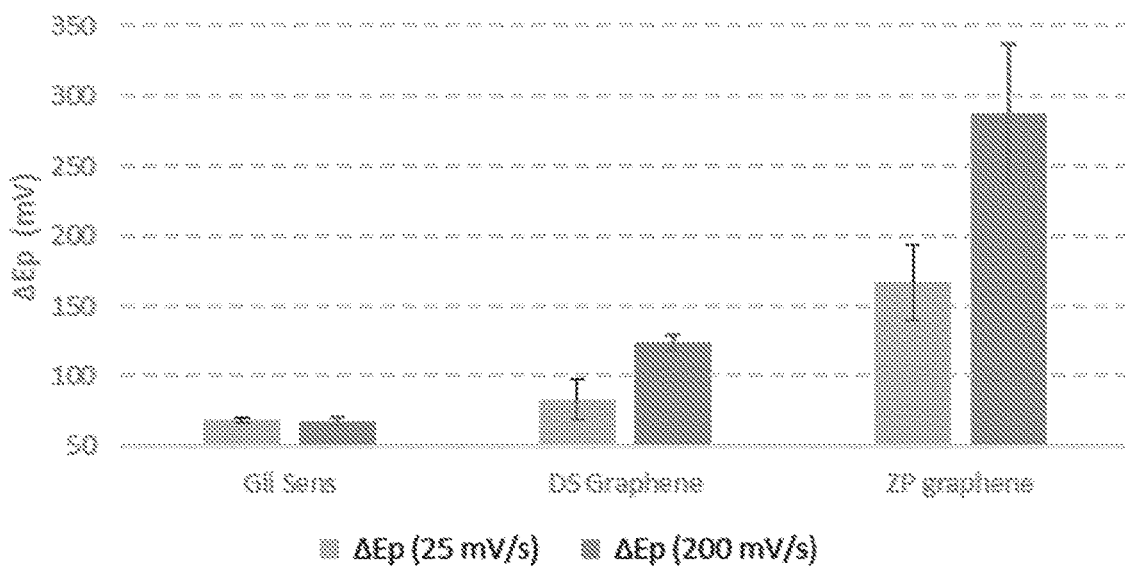
Figure 86:
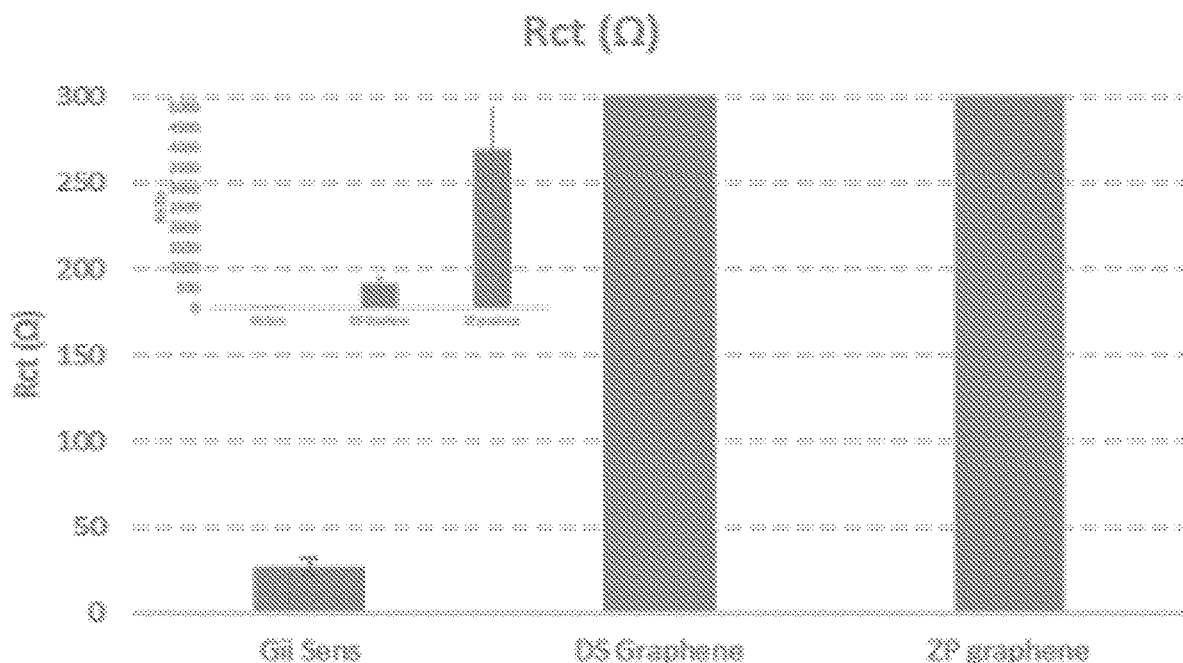

FIG. 84-86 are graphs comparing the performance of Gii-Sens carbon foam with graphene electrode materials.

Figure 87:
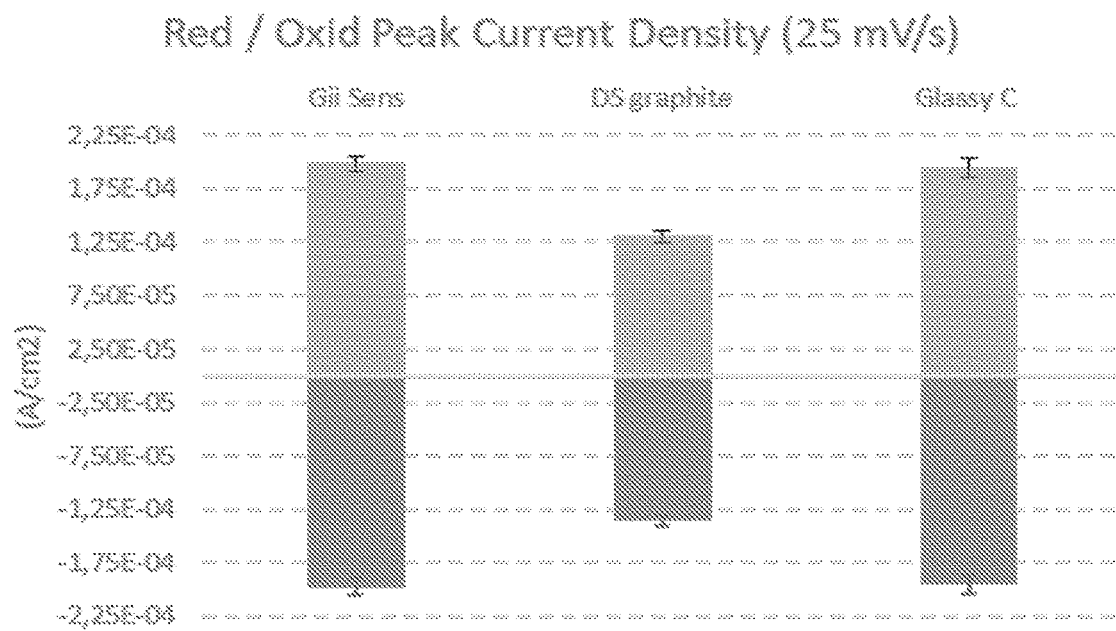
Figure 88:
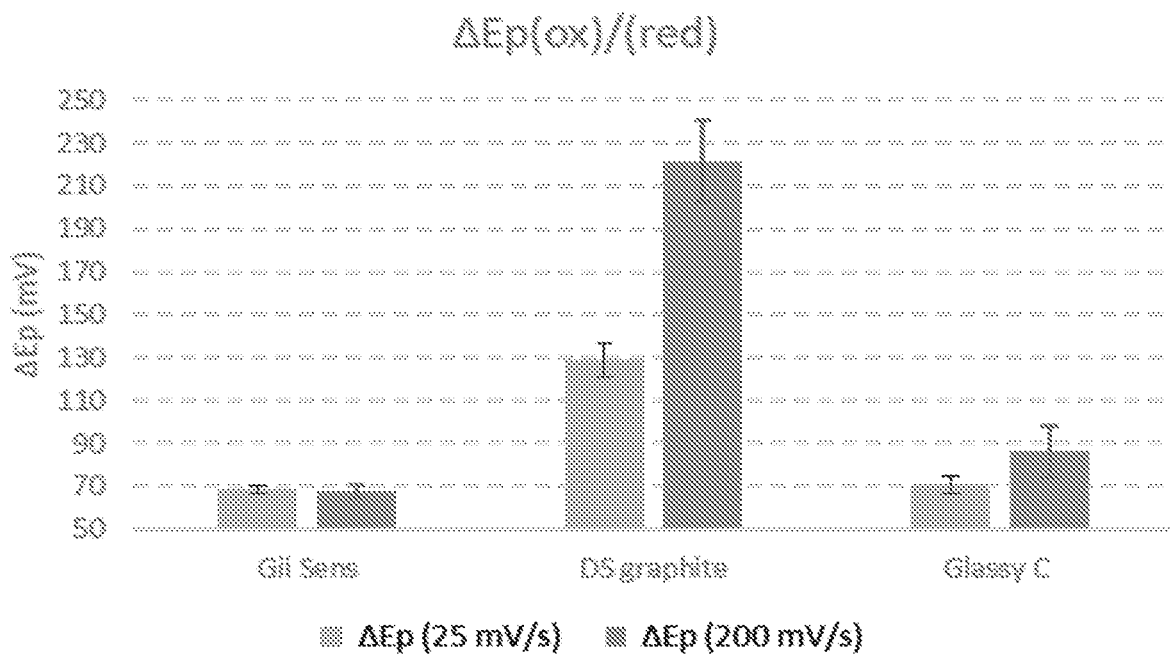
Figure 89:
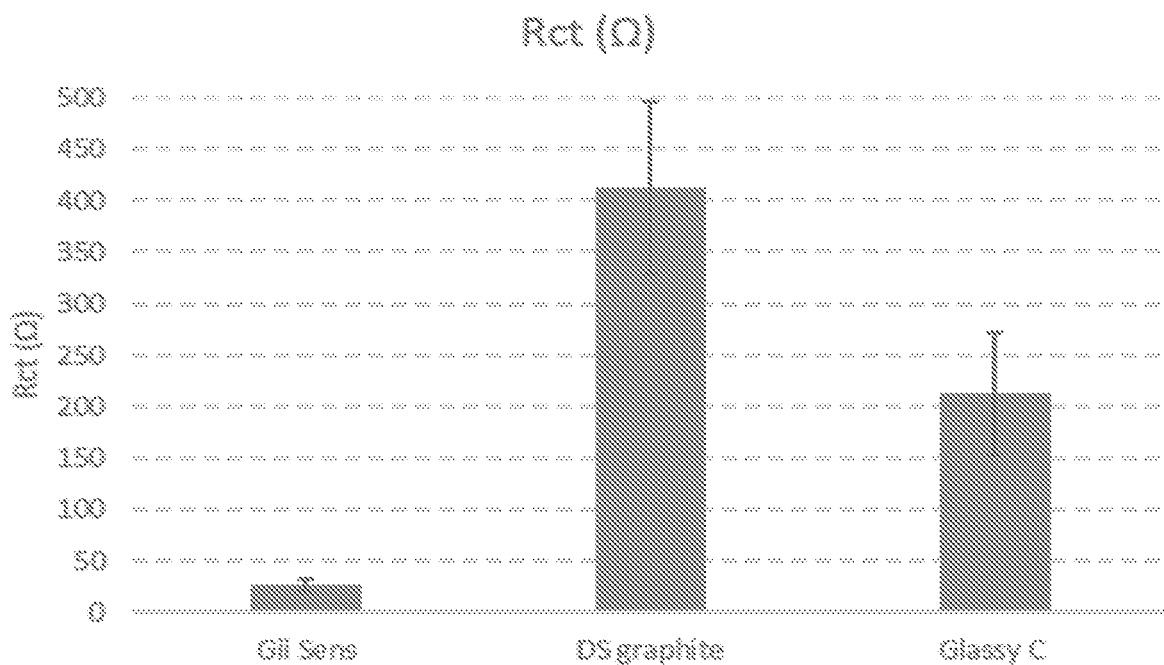

FIG. 87-89 are graphs comparing the performance of Gii-Sens carbon foam with carbon-based electrode materials.

Figure 90:
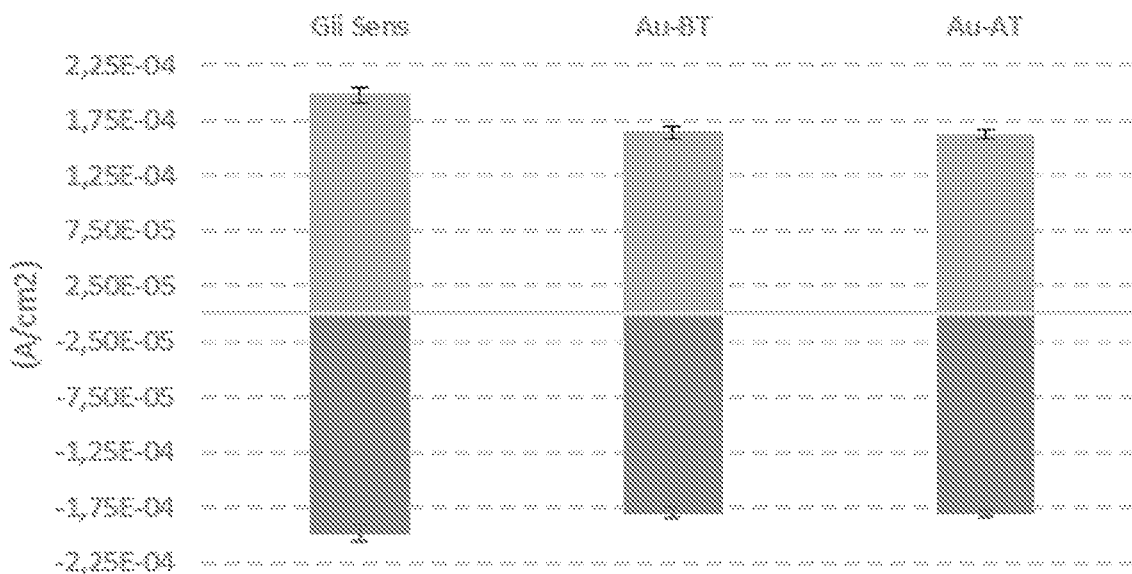
Figure 91:
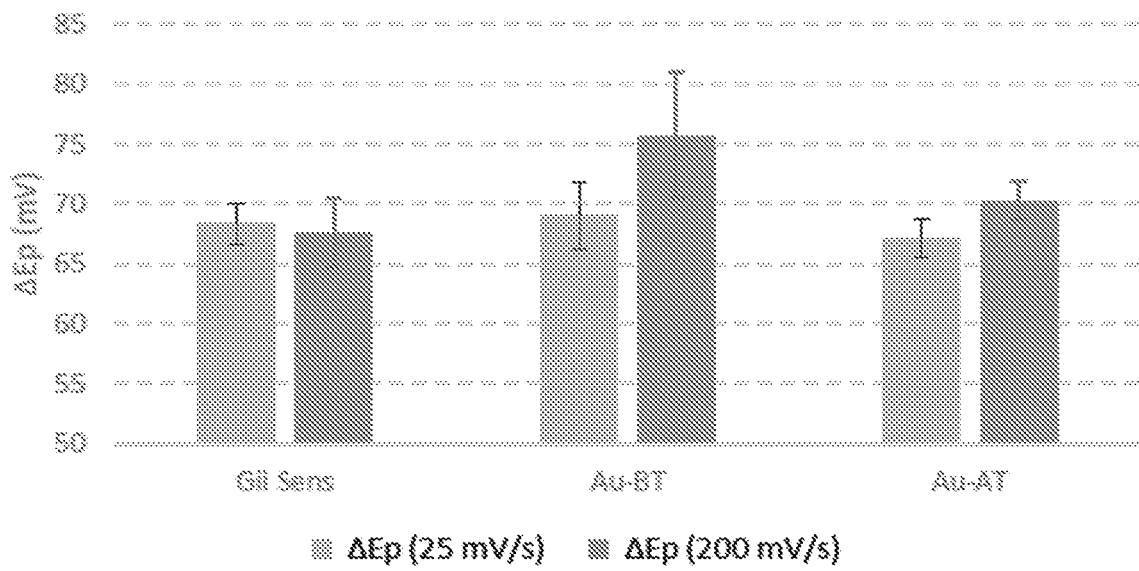
Figure 92:
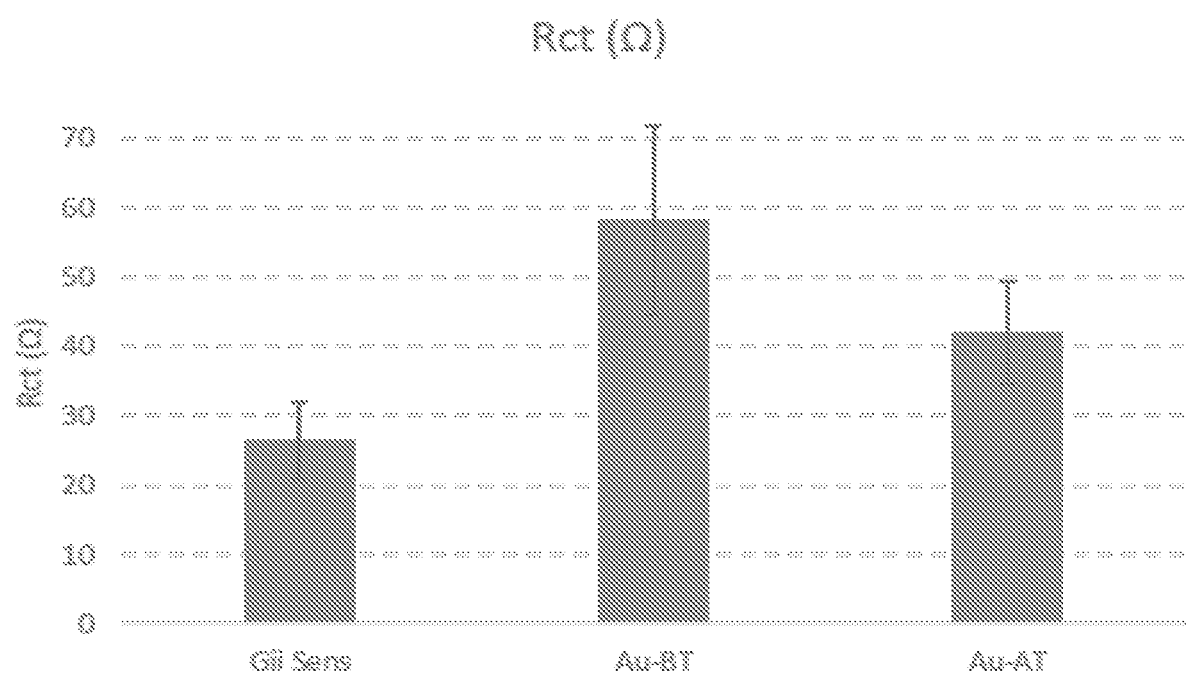

FIG. 90-92 are graphs comparing the performance of Gii-Sens carbon foam with Screen Printed Gold.

Appendix 7: Optimisation of the Surface Immobilization of Anti Human Procalcitonin (cAb)

Figure 93:
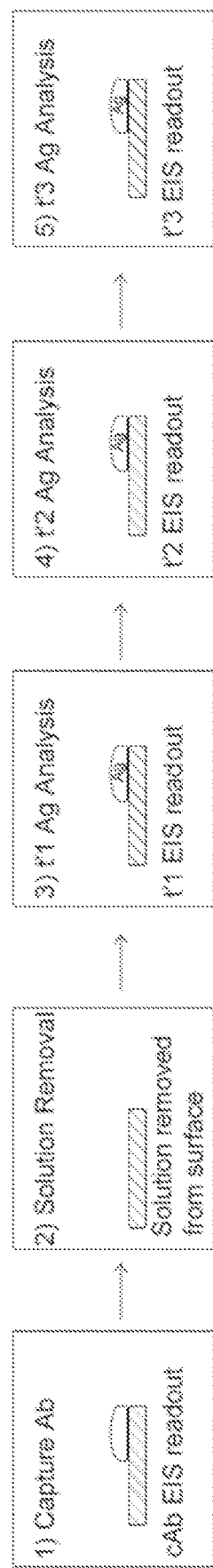

FIG. 93 shows the direct assay procedure for optimisation of the surface immobilization of anti human procalcitonin (cAb).

Figure 94:
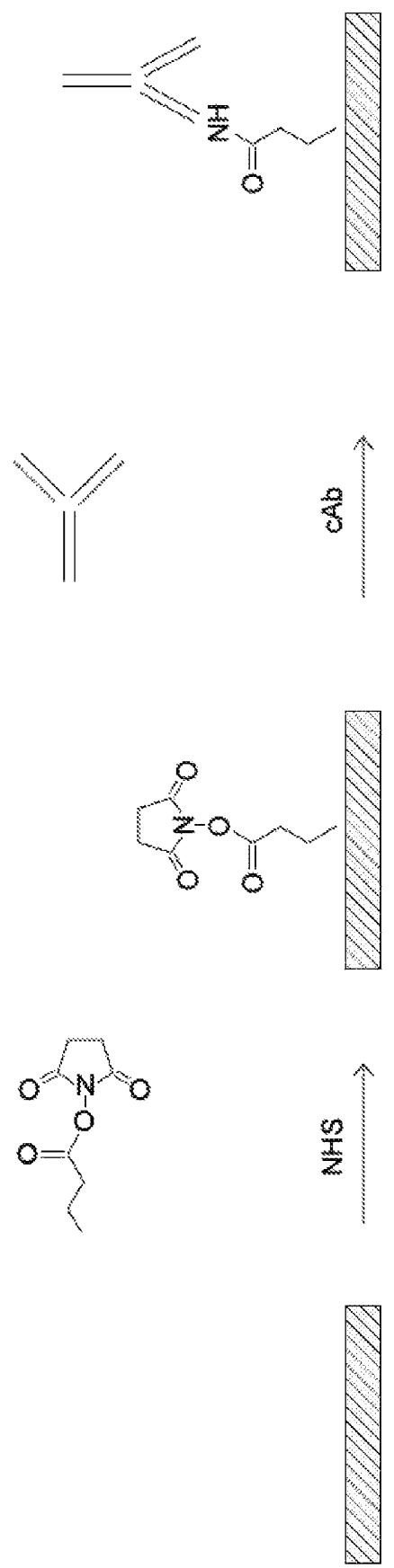

FIG. 94 is a surface immobilization reaction schematic.

Figure 95:
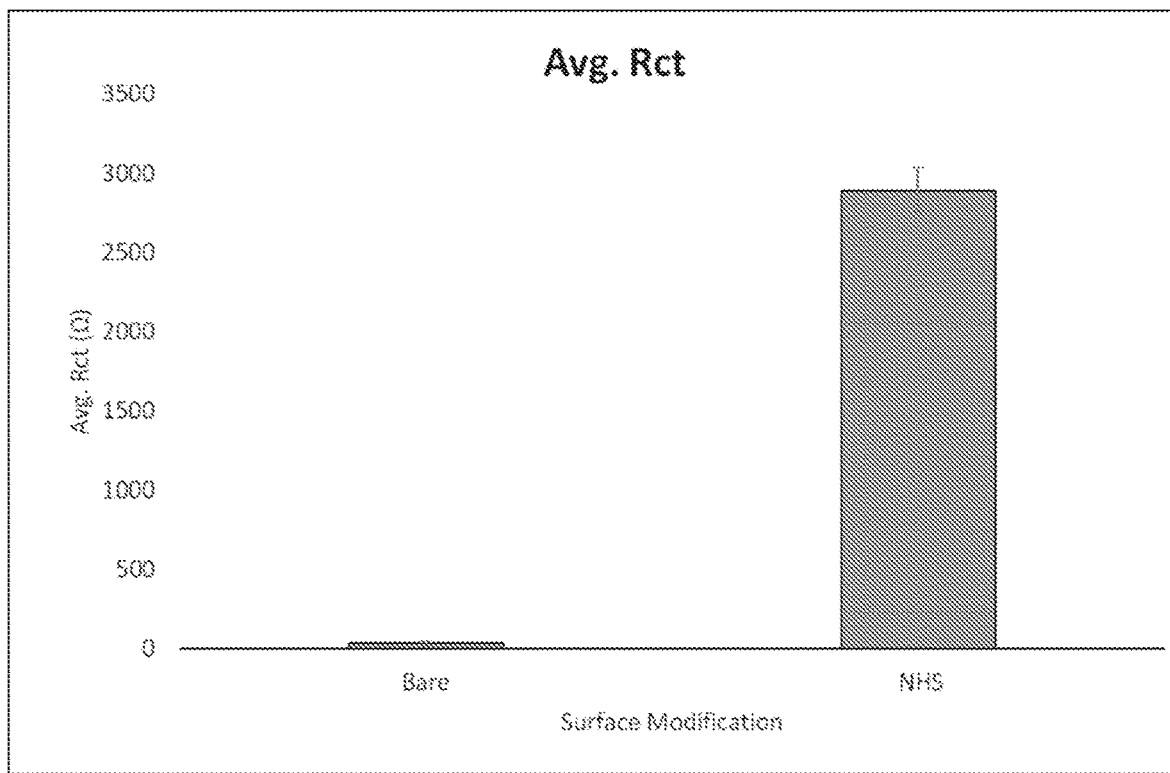

FIG. 95 shows Ret & ΔEp signal response for NHS functionalization of Gii-Sens electrodes.

Figure 96:
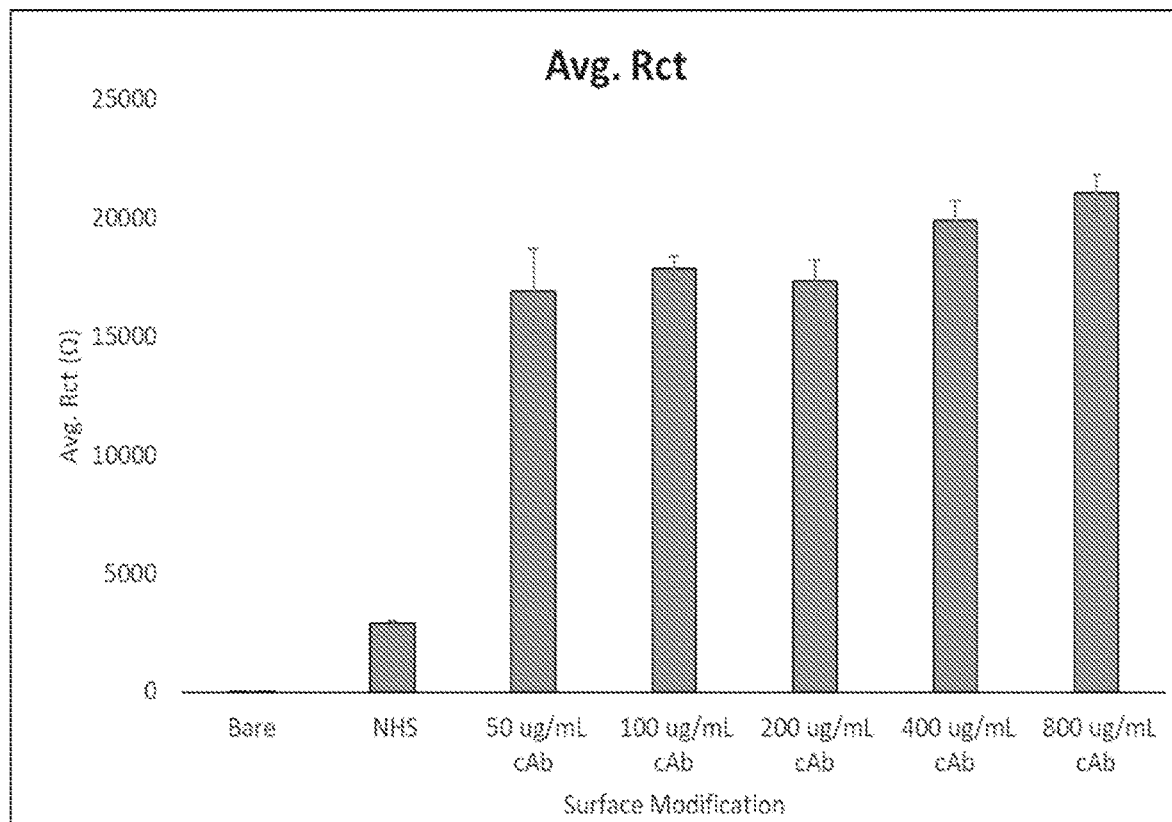

FIG. 96 shows cAb immobilisation on GiiSens electrodes.

Figure 97:
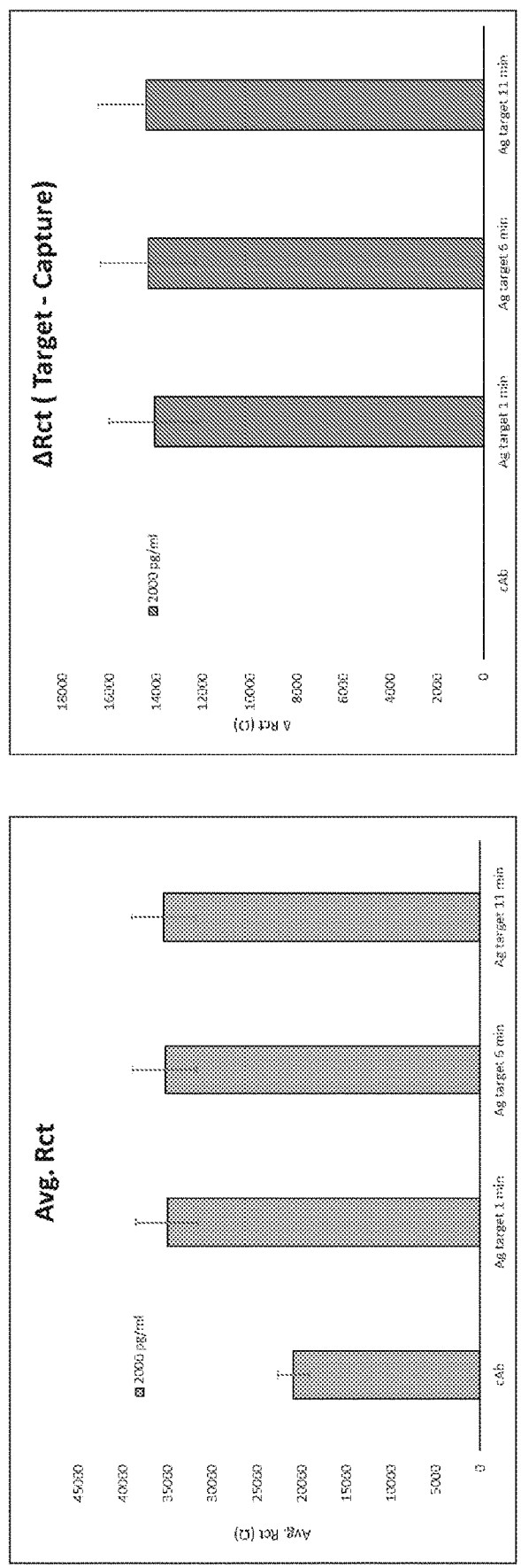

FIG. 97 shows signal response from 2000 μg/ml in direct assay format using 100 μg/ml cAb surface coating.

Note that Gii, Gii-Sens, Gii-Sens+, Gii-Cap, Gii-Cap+, Gii-Thru and PPC Gii are trademarks of the patent proprietor. 'Gii' refers generally to the carbon foam made using the Dual Laser process. 'Gii-Sens' refers to the Gii carbon foam used in a sensor, such as a biosensor. 'Gii-Cap' refers to the Gii carbon foam used in a supercapacitor. The + suffix refers to the Gii carbon foam when modified with a metal oxide layer or film. 'Gii-Thru' refers to the Gii carbon foam when arranged into a specific three dimensional structure. 'PPC' refers to a specific manufacturing process, 'post printing conversion', where the Gii carbon foam is created after various screen printing steps have been completed.

INDEX TO FIGURES

Dual laser process
    11 IR laser
    12 IR laser beam
    13 interior of PI film
    14 PI film
    15 substrate
    16 sub-surface carbon foam region
    17 disorganised, amorphous, non-graphene material below the sub-surface carbon foam region
    18 expanded region of disorganised, amorphous, non-graphene material above the sub-surface carbon foam region
    20 CO2 laser
    21 unique surface morphology of the exposed carbon foam region Biosensor
    201 polyimide substrate
    202 carbon foam working electrode
    203 carbon foam counter electrode
    204 carbon foam reference electrode
    205 screen printed silver connection tracks
    206 dielectric layer
    207 area where silver connection tracks overlap the electrodes Gii-Cap Supercapacitor
    241 array of carbon foam electrodes
    242 screen printed silver connectors
    243 dielectric layer
    244 polyimide base layer
    245 copper connection tabs
    246 electrolyte layer
    247 aluminium-laminate heat-seal pouch
    250 rounded edges of a carbon foam digit
Combined Sensor and Supercapacitor
    301 upper polyimide layer
    302 Gii-Sens biosensor
    303 lower polyimide layer
    304 supercapacitor
    305 plastic piece
    306 microchannels
    307 connector tracks
    308 flexible electronics
    310 inductive power loop
    312 Gii-Cap supercapacitor
    313 Gii-Sens biosensor
    314 device layer with microelectronics
    315 top panel
    316 display
    317 circular analyte well
Environmental Monitor
    330 Gii-Sens carbon foam sensor
    331 Control electronics
    332 PV solar cell
    333 Gii-Cap carbon foam supercapacitor
    334 Peelable back
Combined Supercapacitor and Battery
    351 first polyimide layer
    352 supercapacitor
    353 second polyimide layer
    354 battery
    355 BMS (battery management system)
    356 flexible electronics
    357 electrical connections
Smart Label
    360 flexible battery
    361 supercapacitor
    362 electronics module
    363 exposed label surface
    364 adhesive release liner 364
Gii-Thru Cap
    371 PI film
    372 screen printed conductive ink or paste layer
    373 screen printed collector
    374 dielectric isolator
    375 encapsulated carbon foam layer
    376 disorganised, amorphous non-graphene layer under the carbon foam layer
    377 unique surface morphology layer
    390 hydrogel electrolyte layer
    391 carbon foam layer with unique surface morphology
    392 PI film
    393 screen printed carbon paste layer
    394 screen printed silver connector layer
    395 copper tab for the silver connector layer
    396 dispensed dielectric isolation layer
    397 second carbon foam layer with unique surface morphology
    398 PI film
    399 hydrogel electrolyte layer
    400 dielectric isolation layer
    401 screen printed silver collector layer 402 copper tab
403 screen printed carbon paste layer
404 carbon foam layer
405 PI film
Gii-Thru Sens
Three Spot Array Microfluidic Diagnostic Device
  440 analyte sample wells
  441 laminated well spacer layer
  442 polyimide film
  443 screen printed conductive carbon layer
  444A reference electrode connection
  444B working electrode connection
  444C counter electrode connection
  447 screen printed dielectric layer
  448A reference electrode
  448B working electrode
  448C counter electrode
  449 reference electrode screen printed carbon layer
Eight Spot Array Microfluidic Diagnostic Device
  451 laminated well spacer
  452 array of eight analyte wells
  453 wells for a counter electrode
  454 wells for a reference electrode
  455 polyimide layer
  456 polyimide layer
  457 eight working electrodes
  458 counter electrodes
  459 reference electrodes
  460 screen printed carbon connection interface layer
  461 screen printed silver connection tracks
  462 screen printed dielectric layer
  470 top layer microfluidic foil
  471 middle layer microfluidic foil
  472 printed or moulded microfluidic fluid channel
  473 bottom layer microfluidic foil with adhesive
  474 Gii-Thru sensor
  475 connectors
  481 clear resin barb connectors
  482 top foil
  483 clear resin moulded microfluidic card
  484 microfluidic channels
  485 well unit
  486 Gii-Thru sensor

DETAILED DESCRIPTION

We will start with a simplified, schematic walk-through of implementations of the invention. We give two walk-throughs; the first (FIGS. 1-6) will describe at a high level the carbon foam production process when the carbon pre-cursor (e.g. polyimide (PI) film, such as Kapton® film in this case) is mounted on a substrate; the second walk-through (FIGS. 9-14) covers the carbon foam production process when the polyimide film is not mounted on a substrate. In each case, we use a Dual Laser process; we will explain what the term means below.

In the first stage, (see FIG. 1), laser 11 with wavelength A irradiates with laser beam 12 the interior 13 of polyimide film 14, positioned on a substrate 15 suitable for the end application. This laser can be a pulsed IR laser that delivers IR radiation with a 1064 nm wavelength.

Figure 1:
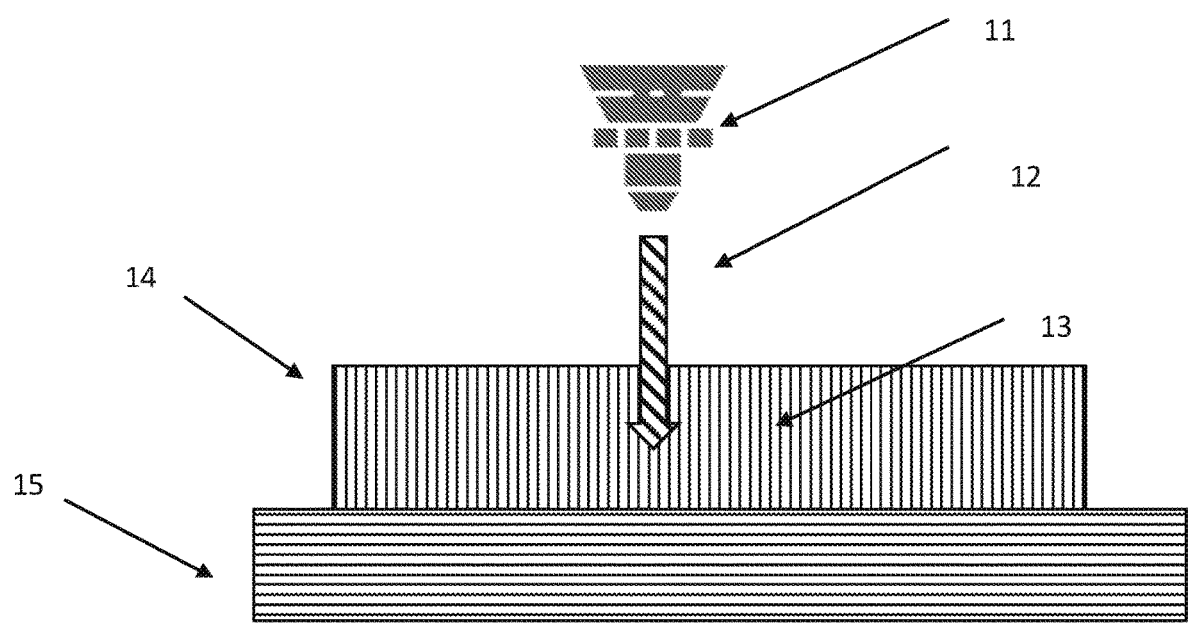
FIGS. 1-6 schematically show the Dual Laser process used to create carbon foam when a polyimide (PI) film, acting as the carbon pre-cursor, is positioned on a substrate.
Figure 2:
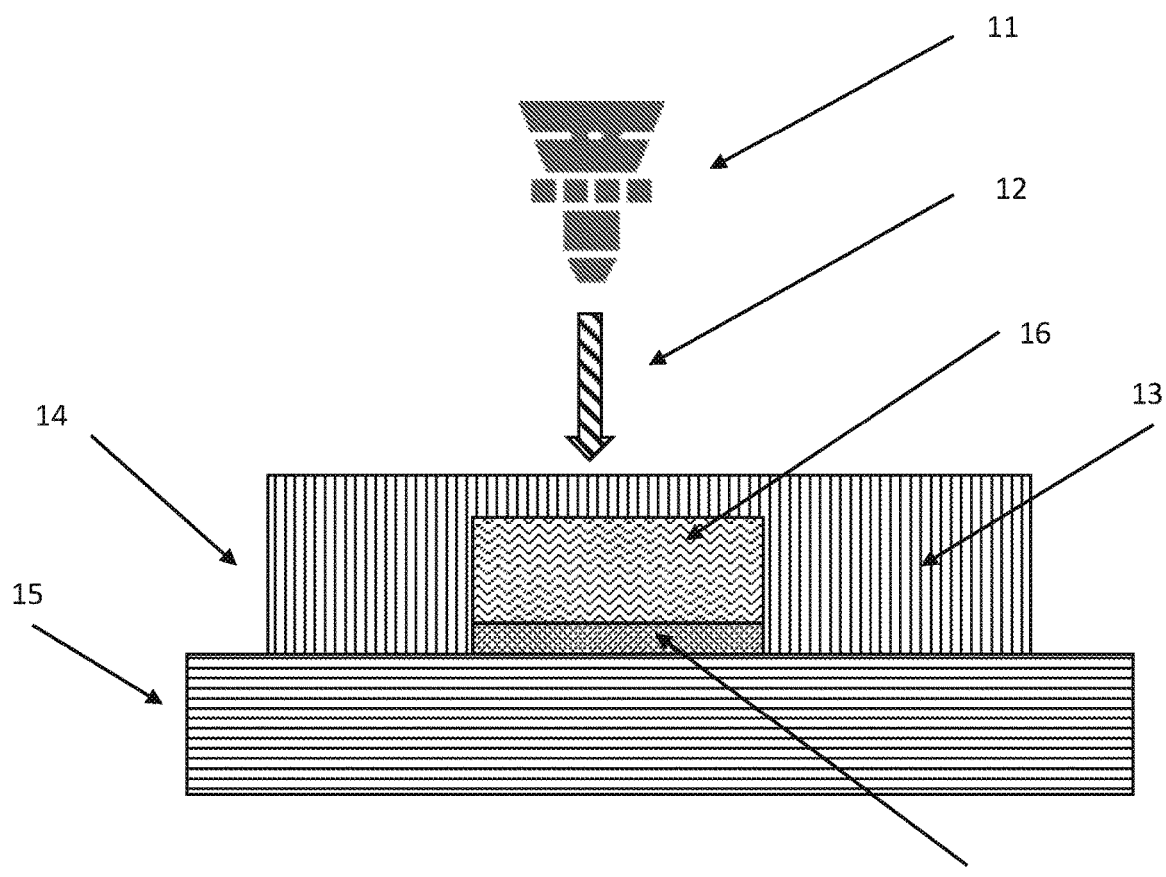

As shown in FIG. 2, the laser 11 with wavelength A is tuned so that a sub-surface region 16, is converted to carbon foam. The focus of laser A moves progressively through the interior 13 of the polyimide film 14 to create the entire carbon foam region 16. The carbon foam region 16 can be approximately 50 µm or greater in depth or height—far taller than is possible with other methods. Note that there is no carbon foam created on the exposed surface (i.e. the surface that the laser beam is incident on) of the polyimide film 14 at any time. The region above the carbon foam 16 (i.e. closer to the laser than the carbon foam region 16) is not converted to carbon foam. The region 17 below the carbon foam region 16 (i.e. the lower surface of the PI film) is also not converted to carbon foam but is instead converted to a disorganised, amorphous non-graphene material that adheres to the underlying substrate 15.

Figure 3:
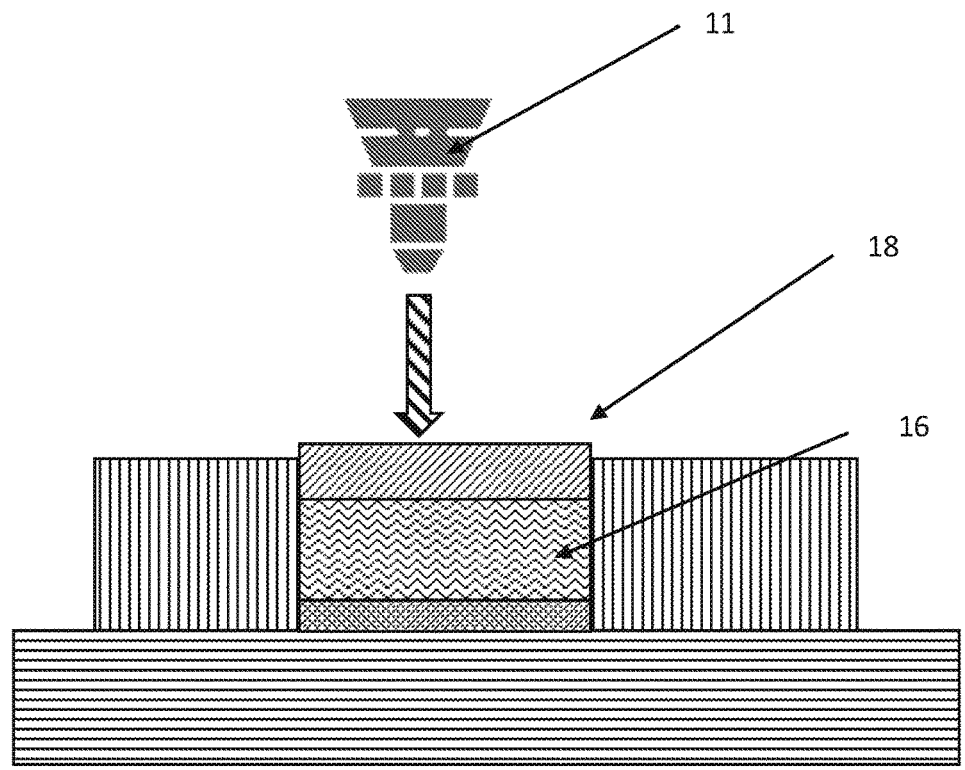

FIG. 3 shows that laser 11 with wavelength A causes a physical expansion at the region 18 above (i.e. closer to the laser than the carbon foam region 16) the internal carbon foam zone 16 due to trapped gasses. This region 18 is not 3D graphene, nor is it a polymer; it is a disorganised, amorphous material.

Figure 4:
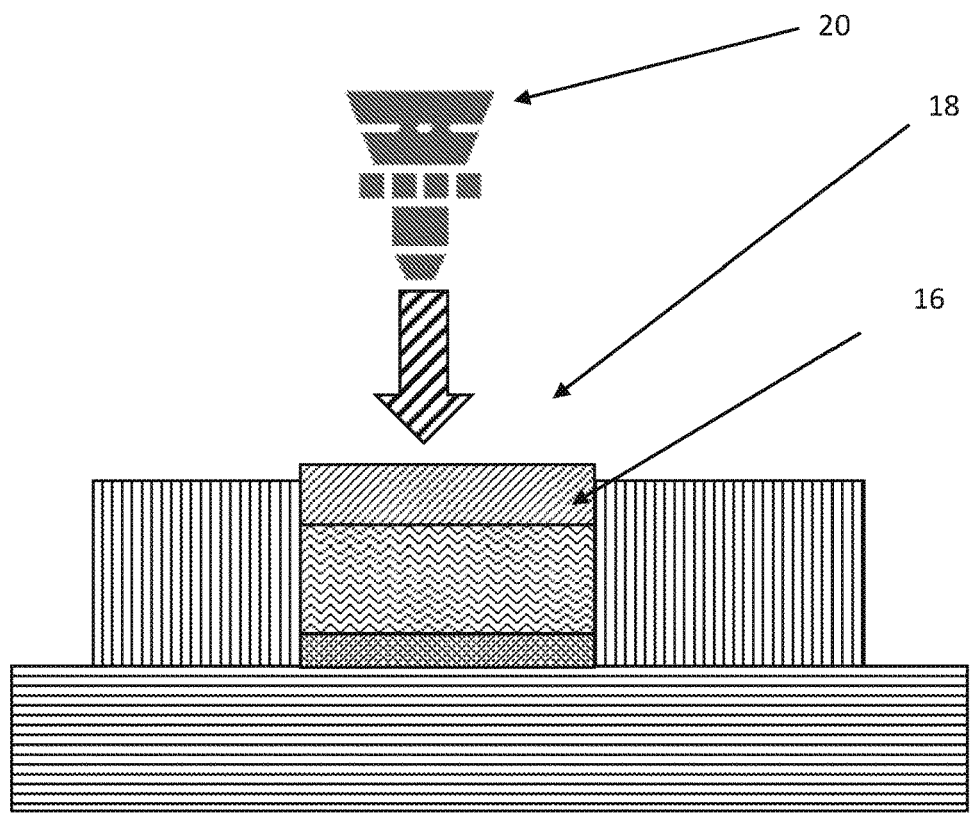

In a second stage, a laser 20 with wavelength B is now tuned on the disorganised, amorphous material region 18 above the carbon foam region 16, as shown in FIG. 4. This can be a $CO_2$ laser with a 10.6 m wavelength.

Figure 5:
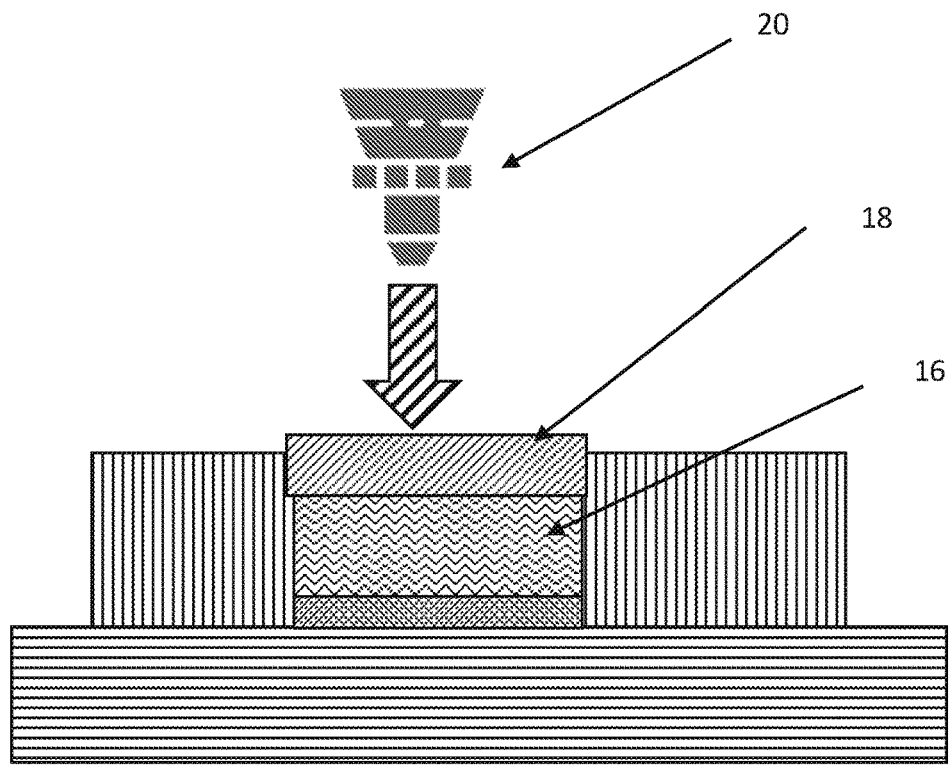

This laser 20 with wavelength B, as shown in FIG. 5, ablates some or all of the region 18 above the carbon foam region 16, exposing at least some of the underlying carbon foam region 16.

Figure 6:
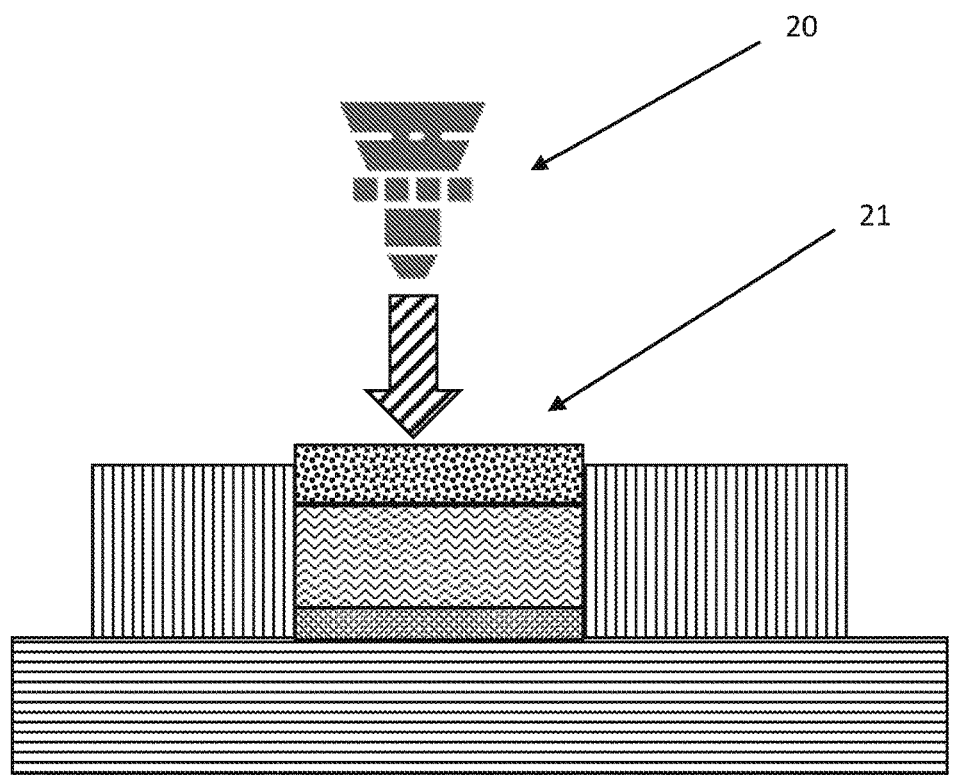

The laser 20 with wavelength B also gives the underlying carbon foam region a unique surface morphology 21, as shown in FIG. 6.

We refer to the process described in FIGS. 1-6 as a 'Dual Laser process'.

Figure 7:
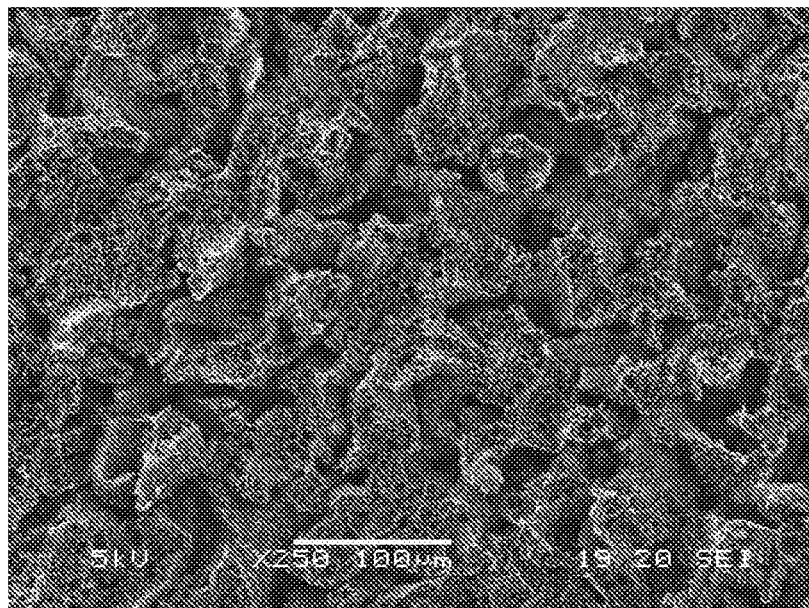
FIG. 7 is a scanning electron image showing the unique surface morphology of the carbon foam achieved using the Dual Laser method (×250).

FIG. 7 is a scanning electron image showing the unique surface morphology achieved using the Dual Laser method (×250). In this case, the carbon source was irradiated first with IR radiation of a wavelength of 1064 nm from a pulsed IR laser, with the radiation focussed into the carbon source and at progressive depths within the carbon source, and then the carbon source was irradiated with a laser beam at wavelength of 10.6 m from a $CO_2$ laser. The approximate thickness of the carbon foam layer in this image is 220 m.

Figure 8:
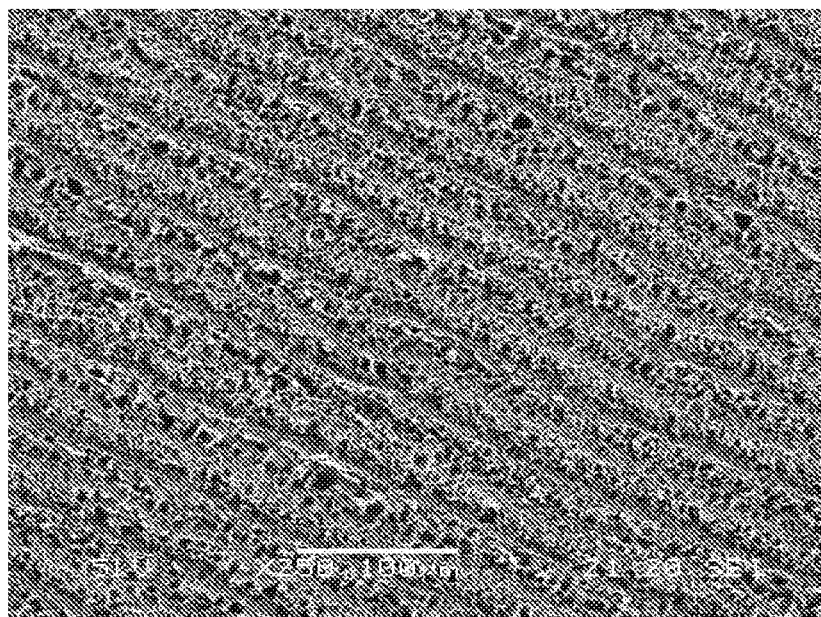
FIG. 8 is a scanning electron image showing the surface of conventional laser induced graphene.

The contrast with the surface morphology achieved using a conventional LIG method (×250), shown in FIG. 8, is clear: there are clear raster lines, and the folding is less convoluted. The thickness of this layer of carbon foam is less than 50 m.

From the FIG. 7 images, we may infer that the material created using the Dual Laser process does not have a surface morphology similar to conventional graphene foam; whilst it appears to be a turbostratic twisted multilayer 3D carbon-based material with a foam like structure, it is not necessarily what one would normally describe as 'graphene', in the conventional sense. Further details are in Feature R below.

In the preceding walk-through (FIGS. 1-6), we looked at the Dual Laser process when the carbon pre-cursor material (the polyimide film) is mounted on a substrate. In the following FIGS. 9-14, we will look at the Dual Laser process when the polyimide film is not mounted on a substrate. The manufacturing processes we describe in detail later for the two implementations called Gii-Cap (a supercapacitor) and Gii-Sens (a sensor) use a standard 220 mm×180 mm sheet of polyimide film that is not mounted on a substrate; this size can be accommodated in a standard laser scanning device, of the sort typically used for laser engraving, laser cutting and laser plotting that traces out a path defined by a standard CAD program. The manufacturing processes also uses a standard flatbed screen printing device, and a standard conveyor dryer, again readily compatible with different sizes of thin PI film. Other sizes of polyimide sheet can be accommodated.

Figure 9:
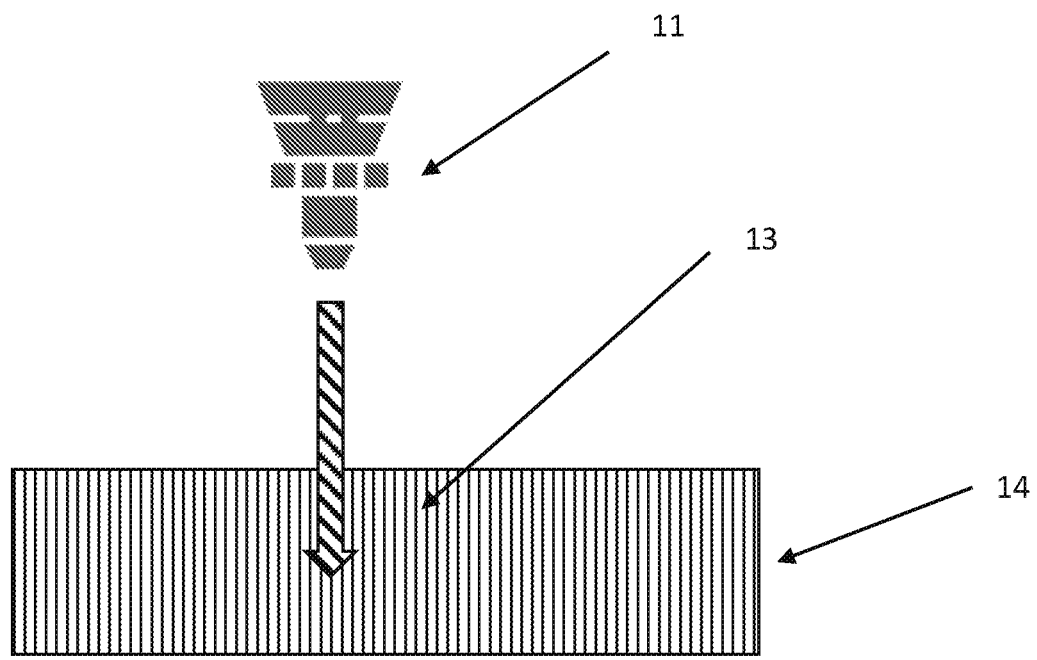
FIGS. 9-14B schematically show the Dual Laser process used to create carbon foam when a PI film, acting as the carbon pre-cursor, is not positioned on a substrate.

As described previously, laser 11 with wavelength A (e.g. IR laser) irradiates the interior 13 of PI film 14; the film 14 is now not mounted on a substrate, as shown in FIG. 9. It can be a sheet that is supported at its edges, or rests temporarily upon a surface, or forms part of a reel of PI film when a continuous manufacturing (e.g. reel to reel or reel to sheet) system is used (see Feature P below).

Figure 10:
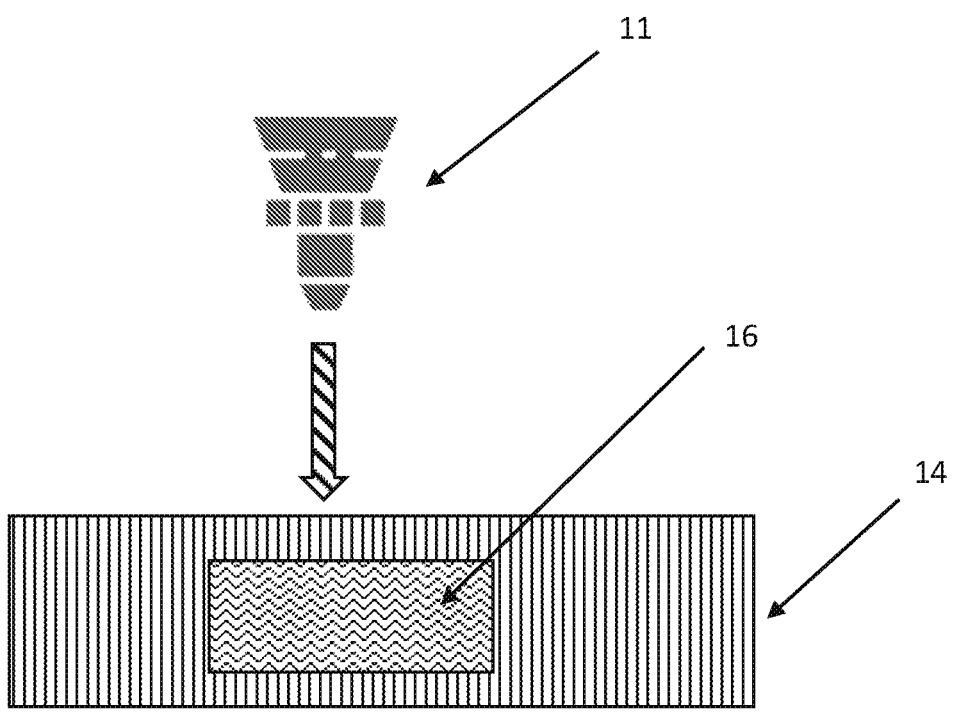

The laser 11 with wavelength A is tuned so that a sub-surface region 16 is converted to carbon foam, as shown in FIG. 10. The focus moves progressively through the film 14 to create the entire carbon foam region 16. The carbon foam region 16 can be approximately 50 μm or greater in height—far deeper or taller than is possible with other methods.

There is no 3D graphene created on the exposed surface of the polymer film at any time. The region above the carbon foam is not converted to 3D graphene.

Figure 11:
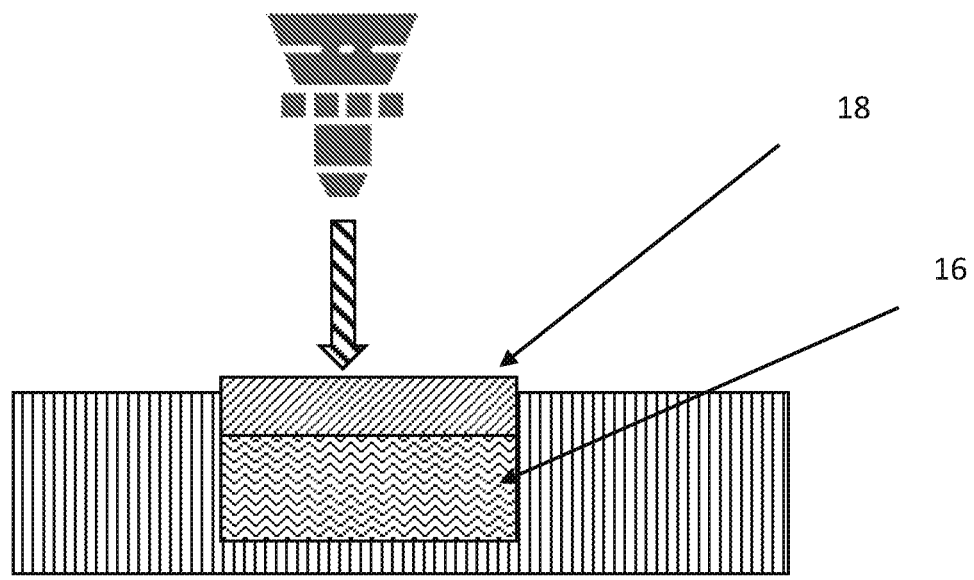

As shown in FIG. 11, there is a physical expansion of the region 18 above the internal carbon foam zone 16 due to trapped gasses. This region is not 3D graphene, nor a polymer; it is a disorganised, amorphous material.

Figure 12:
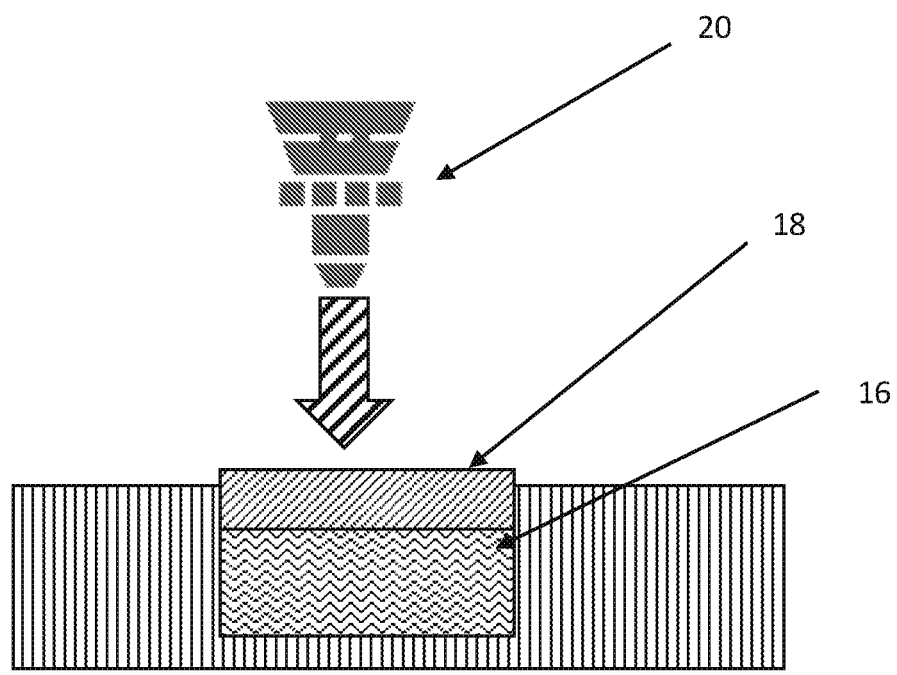
Figure 13:
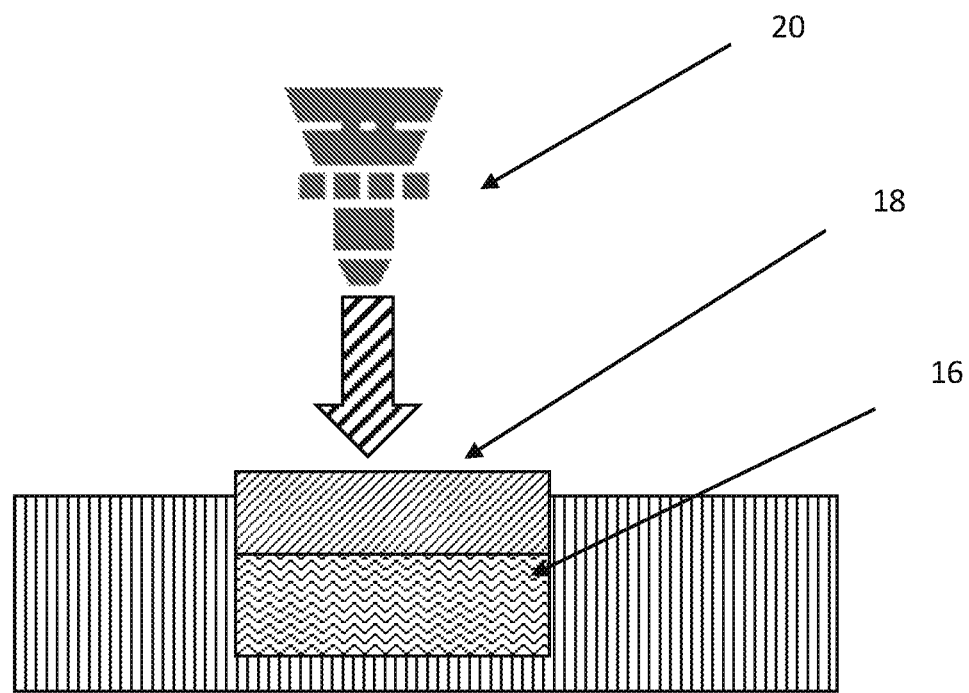

A laser 20 with wavelength B (e.g. $CO_2$) is now tuned on the region 18 above the carbon foam, as shown in FIG. 12. The laser 20 with wavelength B ablates the region 18 above the carbon foam region 16, exposing at least some of the underlying carbon foam 16, as shown in FIG. 13.

Figure 14A:
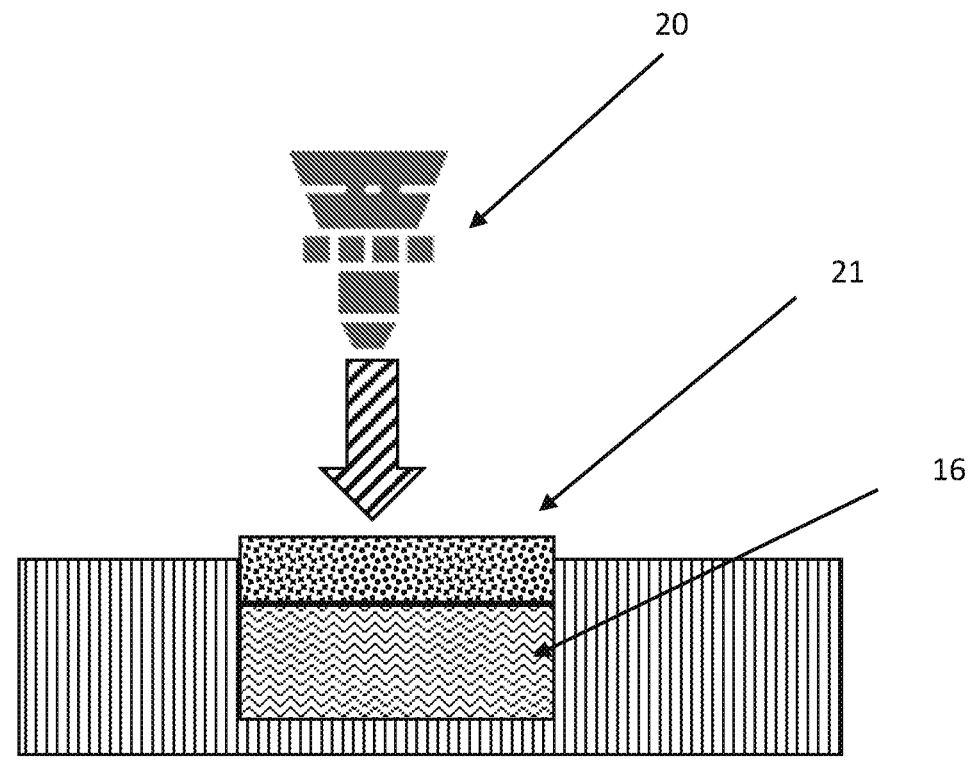
Figure 14B:
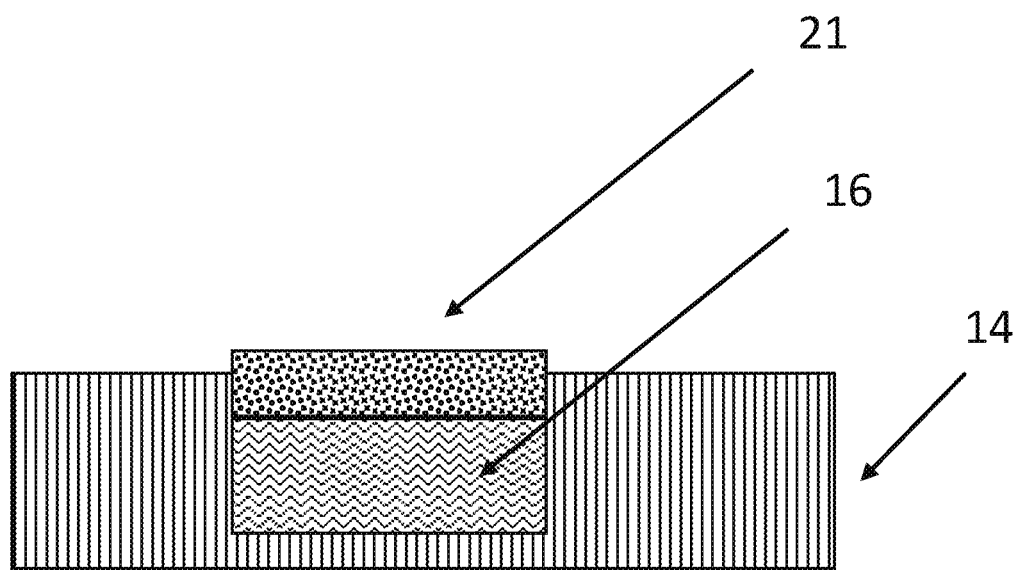

Just as when the polyimide film 14 is mounted on a substrate, the laser 20 with wavelength B also gives the underlying carbon foam 16 a unique surface morphology 21, as shown in FIG. 14.

Some implementation specifics for this Dual Laser approach to carbon foam production now follow: in one example, a Nd:YAG solid state laser is the wavelength A laser and is positioned so that the IR laser radiation beam (wavelength of 1064 nm) produced by the solid-state laser impacts the polyimide layer perpendicular to the layer. Optics focus the IR laser radiation laser beam to a volume of minimum beam convergence within the polyimide layer.

In an encapsulated or sub-surface region or locus around the minimum beam convergence the interaction of the laser light and the polyimide results in carbonization of the carbon source. This carbonization results in the production of carbon foam, such as a twisted or turbostratic multilayer carbon foam, in the encapsulated or sub-surface region and results in the production of a layer of a disorganised, amorphous non-graphene substance at the surface of the polyimide film.

While maintaining the laser beam focused at a particular depth within the polyimide layer, the laser is scanned laterally over the polyimide layer. In this way a path, wholly within the polyimide carbon source, is tracked and is converted to carbon foam. The polyimide is hence carbonized to a carbon foam in a pattern which corresponds to the path tracked by the scanned, focused IR laser beam.

In one set-up, the Nd:YAG IR laser was pulsed at a frequency of 80 kHz and the laser beam was scanned across the surface at a speed of 9.4 cm/s. Other embodiments utilised different parameters. For example, a pulse frequency of 50 kHz and a scan speed of 35.5 cm/s were also utilised to successfully produce carbon foam. The laser power is within a typical working range of 8-20 watts, with 12 W optimum; the laser focal distance is within a typical working range of 50 mm-400 mm.

Once a predetermined area within the polyimide layer has been irradiated in the above manner by the focused IR laser beam, the depth of the encapsulated or sub-surface region or locus in the polyimide is changed and the IR laser beam is again scanned over an area, in this case over the same predetermined area. A standard computer-controlled laser scanning system can be used that controls the X-Y position of a laser over the polyimide film. It may be necessary to pass the focussed IR laser radiation over the same area more than once to produce carbon foam. In this implementation, the focussed IR laser also irradiates adjacent, but not substantially overlapping, areas. This process of irradiating the carbon source with the focussed IR laser radiation at different focus depths is repeated until the desired depth of the polyimide layer has been exposed to the IR laser radiation and carbon foam has been formed in the encapsulated or sub-surface region. The surface layer is however a disorganised, amorphous, non-graphene substance.

In the second step, the polyimide layer is exposed to radiation from a CO2 laser to perform the ablation step, to expose at least some of the underlying carbon foam and to give the exposed carbon foam a particular surface morphology. The radiation from the CO2 laser is scanned across the surface of the treated carbon source at a speed of 19 cm/s to match the pattern or area which had been irradiated with the IR laser. Other embodiments utilised different parameters. For example, a pulse frequency of 50 kHz and a scan speed of 35.5 cm/s were also utilised to successfully reveal the underlying carbon foam. The laser power is within a typical working range of 8-20 watts, with 12 W optimum; the laser focal distance is within a typical working range of 50 mm-400 mm.

As noted above, the $CO_2$ laser ablates the surface layer disorganised, amorphous, non-graphene substance, exposing the underlying carbon foam and altering the surface morphology of that carbon foam to generate an exposed, carbon foam with a greater number of defects compared to standard laser induced graphene; this gives the carbon foam exceptionally useful properties that are superior to standard laser induced graphene, as noted earlier.

Varying the laser parameters for either or both of the lasers (e.g. IR and the CO2 lasers), such as power, focus, wavelength, scanning speed, varies the carbon foam material properties, enabling carbon foam to be produced with properties that are optimised for different applications.

One useful property of the exposed carbon foam made by the Dual Laser process is a high degree of wettability: the contact angle can be less than 20°, making this carbon foam hydrophilic, in contrast with conventional graphene foam, which has a contact angle between 70° and 150°, making it hydrophobic. The hydrophilic property of the carbon foam produced by the Dual Laser process is highly relevant for two key applications, biosensors (an implementation is called Gii-Sens) and supercapacitors (an implementation is called Gii-Cap). For biosensors, high wettability leads to the liquid being tested (e.g. the liquid analyte) spreading rapidly and uniformly over the entire working electrode, leading to greater sensitivity, consistency and speed. For supercapacitors, high wettability means the electrolyte wets the supercapacitor electrodes better, leading to higher performance. Conventional graphene foam can be processed to make it more wettable, but no such additional processing step is needed with this carbon foam implementation.

Another useful property of the exposed carbon foam made by the Dual Laser process is a high degree of antifouling: this could lead to enhanced sensitivity and extended life for biosensors. The carbon foam could be useful in applications where the build-up of contaminants or residues can harm the performance or lifetime of an element (e.g. filters, heating elements in electronic cigarettes; electrodes); the exposed carbon foam made by the Dual Laser process element can be used for the element, leading to an enhanced performance or lifetime.

Figure 15:
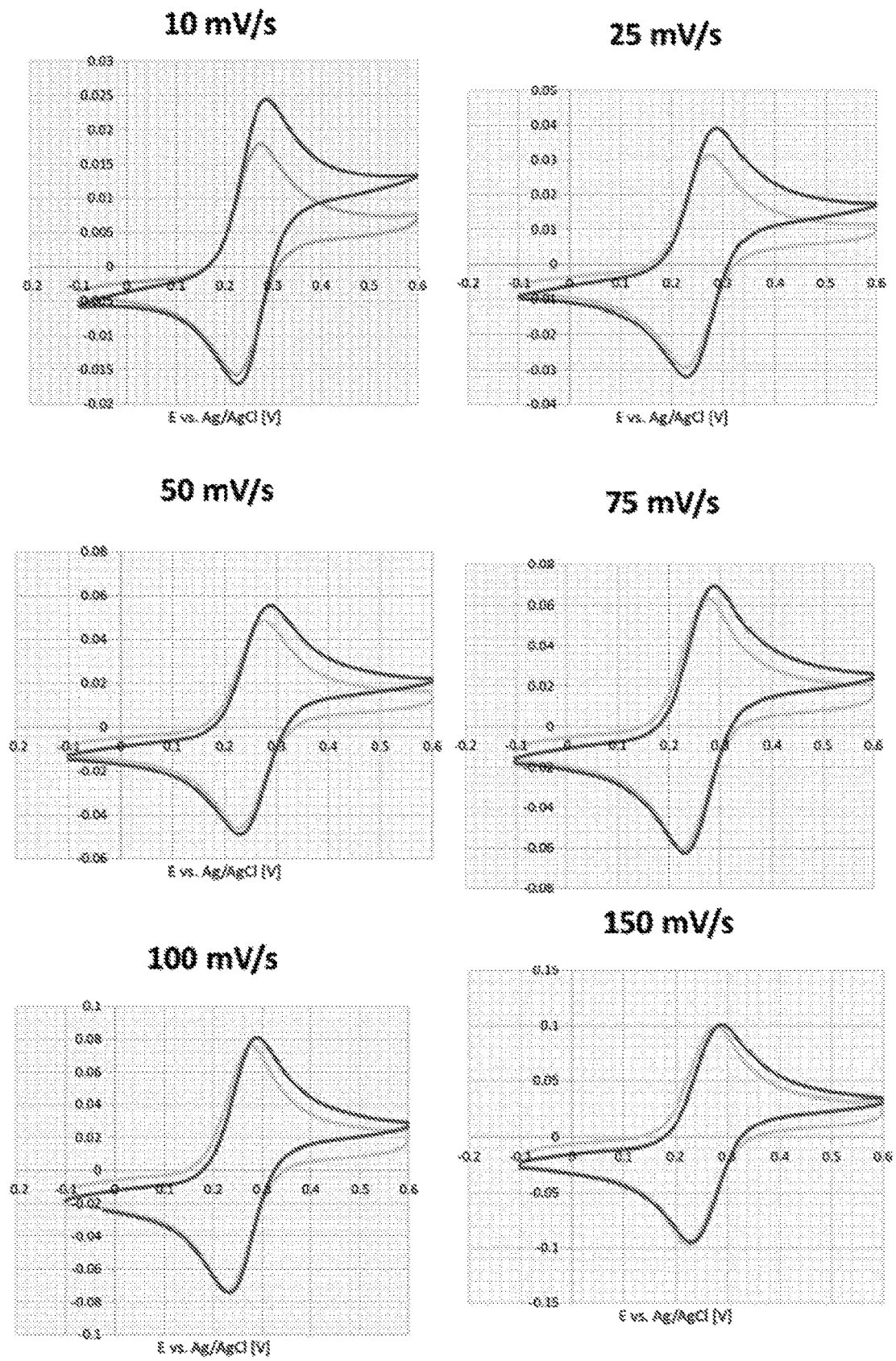
FIG. 15 are cyclic voltammography (CV) graphs for carbon foam electrodes produced using the Dual Laser method.

The performance of carbon foam electrodes produced using this Dual Laser method has been explored by cyclic voltammography (CV), shown in FIG. 15. Cyclic voltametric plots of the well characterised ferricyanide/ferrocyanide redox reaction were carried out with electrodes prepared using the method described above and with electrodes prepared using the known, conventional method of CO2 laser irradiation. FIG. 15 shows the resulting CV plots taken at scan rates of 10 mV/s, 25 mV/s, 50 mV/s, 75 mV/s, 100 mV/s and 150 mV/s. Each plot shows data recorded with carbon foam electrodes produced using the present Dual Laser method (light line) and with 3D graphene electrodes produced using the known method of irradiation with CO2 laser light (dark line). The peak in the negative current direction at around 0.22 V corresponds to the reduction of ferricyanide to ferrocyanide; and the peak in the positive current direction at around 0.28 V corresponds to the oxidation of ferrocyanide to ferricyanide.

Away from the prominent redox peaks, it is qualitatively apparent from these graphs that the CV plots recorded using carbon foam electrodes produced using the Dual Laser method disclosed in this specification have an appearance which is more rectangular than for plots recorded using 3D graphene electrodes produced by the known method. This is most apparent at the top of the voltage range (around 0.6 V) and for higher scan rates (see for example 100 mV/s). This increased rectangular appearance is indicative of an increased capacitive behaviour for electrodes prepared using the present Dual Laser method, reflecting the very high surface area of the twisted or turbostratic multilayer carbon foam produced by this method.

Figure 16A:
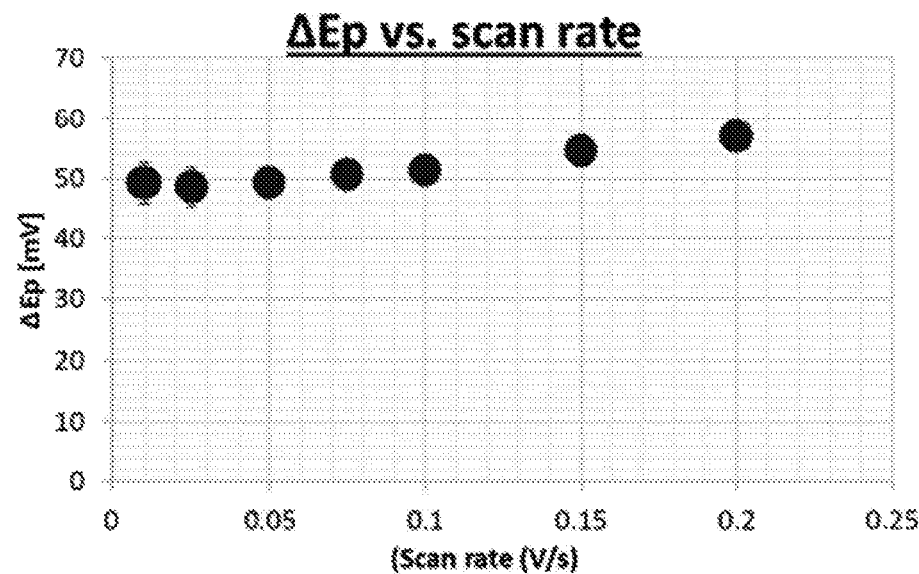
FIG. 16A is a graph showing the peak separation $\Delta Ep$ as a function of scan rate for carbon foam electrodes produced using the Dual Laser method.
Figure 16B:
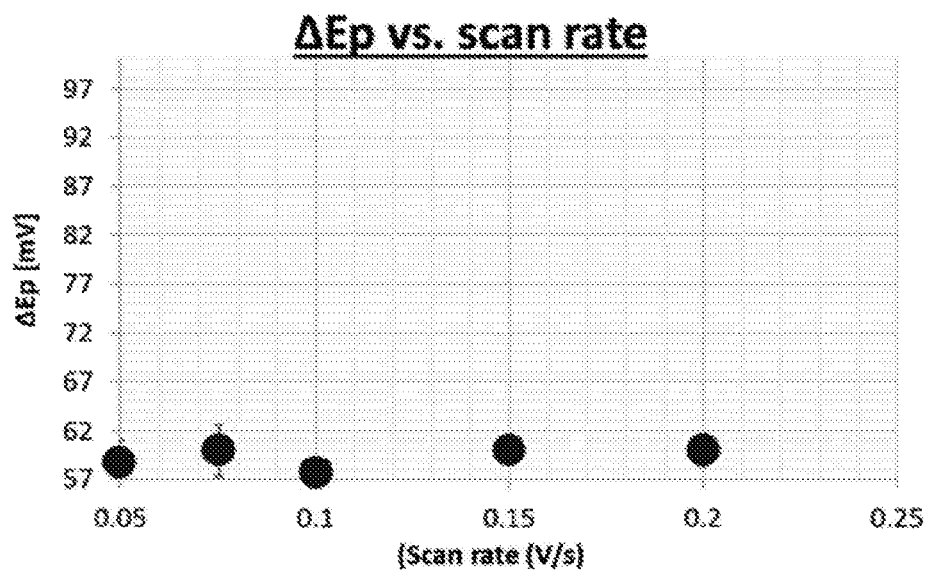
FIG. 16B is a graph showing the peak separation $\Delta Ep$ as a function of scan rate for conventionally manufactured graphene electrodes.

It is also apparent from the CV plots that the voltage separating the oxidation and the reduction peaks is consistently less for measurements performed using carbon foam electrodes produced by the Dual Laser method, compared to those measurements performed using 3D graphene electrodes produced by a conventional, known method. The peak separation $\Delta E_p$ as a function of scan rate for CV measurements taken using a carbon foam electrode produced according to the presently disclosed method is plotted in FIG. 16(a), and for CV measurements taken using a 3D graphene electrode produced according to a known method in FIG. 16(b).

This data shows the narrowing of $\Delta E_p$ when the electrodes are prepared according to the Dual Laser method. The theoretical peak separation parameter for a reversible system such as the ferricyanide/ferrocyanide reversible redox reaction is 57 mV, but in practice this is sensitive to the effect that the electrode structure has on the electrochemistry. It is apparent that the voltage separation of the oxidation and reduction peaks in the cyclic voltametric plots is close to the theoretical value. This evidences the quality of the electrodes produced by both the known method and the Dual Laser method. Furthermore, the reduced separation demonstrated by the results recorded with carbon foam electrodes produced by the Dual Laser method shows that the porosity of the electrode produced in this way is improved over those produced by the conventional method.

Figure 17:
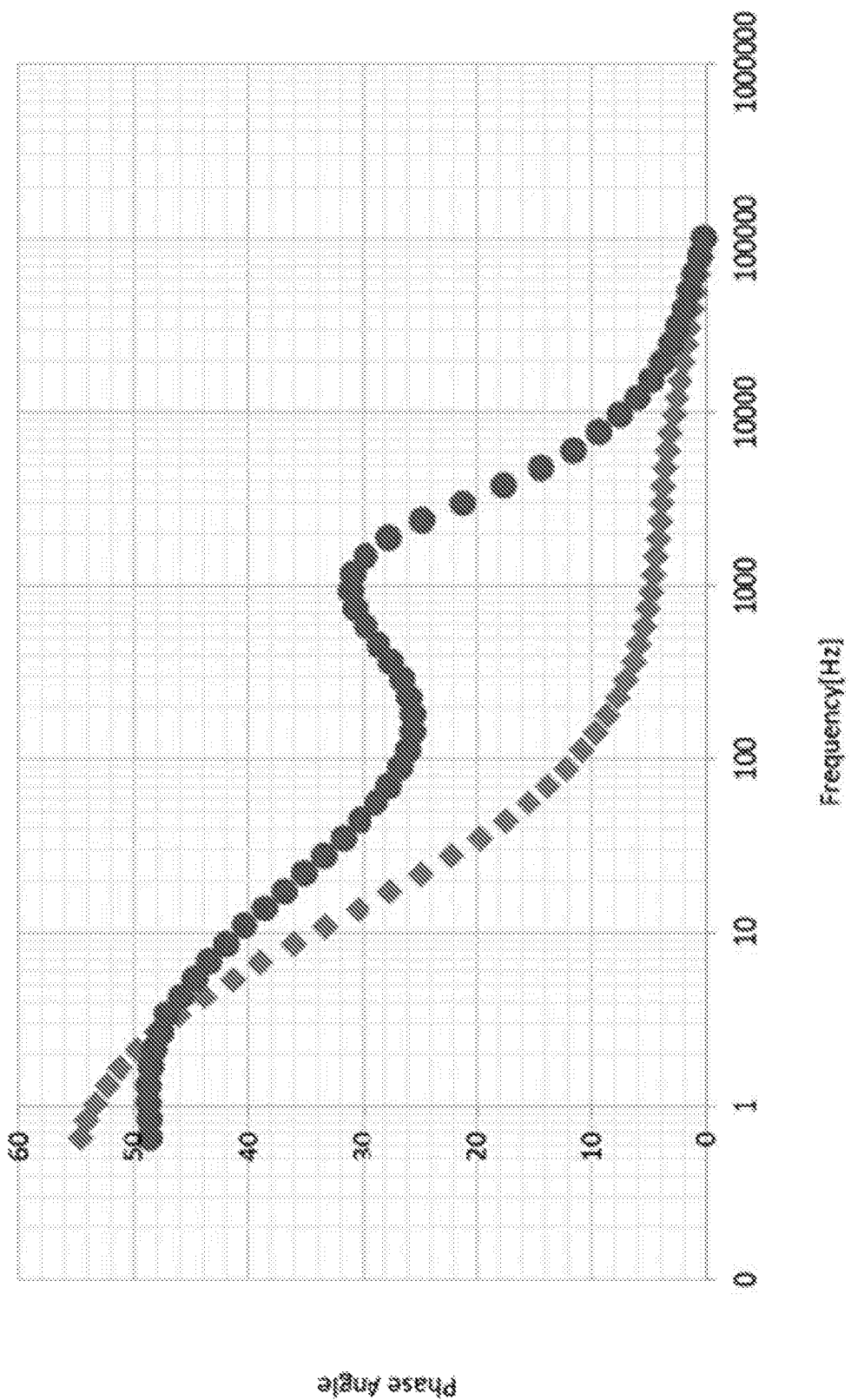
FIG. 17 is a comparison of electrochemical impedance spectroscopy results for carbon foam electrodes produced using the Dual Laser method and also conventionally manufactured graphene electrodes.

FIG. 17 shows a comparison of electrochemical impedance spectroscopy results of a system comprising carbon foam electrodes produced using the Dual Laser method (squares) and of a system comprising 3D graphene electrodes produced using a known method (circles). The Bode plot shows the variation in the phase angle as a function of frequency. The frequency responses of the two systems are clearly different. Specifically, measurements recorded using carbon foam electrodes produced using the Dual Laser method lack the peak in the phase angle signal observed at around 1 kHz for measurements recorded using 3D graphene electrodes produced using the conventional method. The response from the electrodes prepared using the Dual Laser method is indicative of a fast electron transfer response. The difference is a further clear demonstration that carbon foam produced by the Dual Laser method is distinct and distinguishable from 3D graphene produced by the conventional method.

Figure 18:
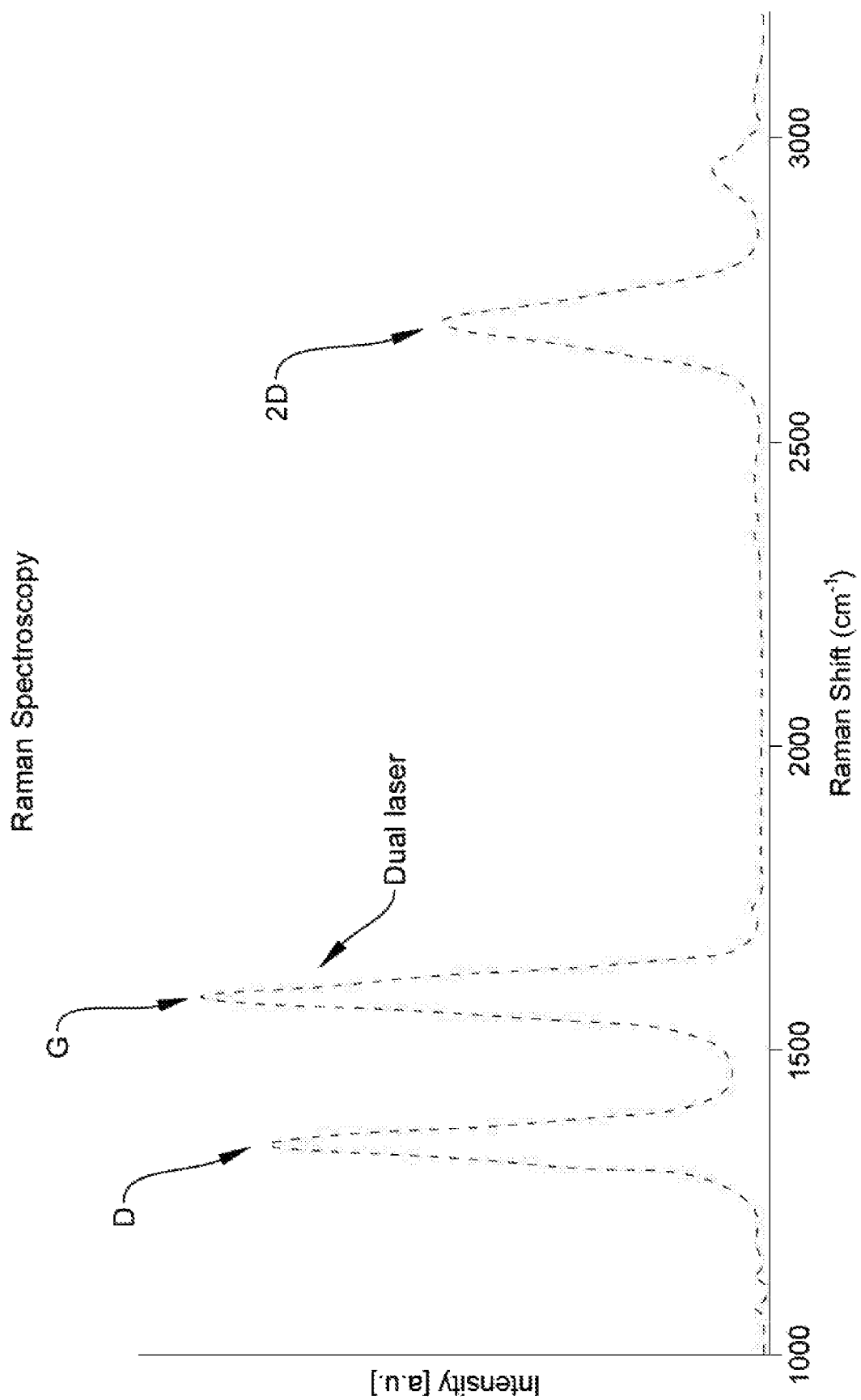
FIG. 18 is a Raman analysis of a carbon foam sample made by the Dual Laser process.

Further details are apparent from FIG. 18A. The Raman spectrum of carbon foam made by the Dual Laser process is shown in FIG. 18A has three principal peaks. In particular, the D peak at around 1344 $cm^{-1}$ is characteristic of the presence of lattice defects and the G peak at around 1577 $cm^{-1}$ is characteristic of $sp^2$ carbon hybridisation, with the presence of distorted six-fold carbon rings. The 2D peak at around 2685 $cm^{-1}$ is characteristic of second order transitions in the 3D graphene and the absence of a doublet structure here indicates a lack of planar AB stacking which would be found in multilayer 2D graphene or graphite. Fitting the 2D peak with a single Lorentzian peak (having a full width at half maximum of 67 $cm^{-1}$) centred at 2685 $cm^{-1}$ indicates that there are only one, or a few, carbon-foam-like layers present in the 3D carbon formed with the two methods. Analysis of the D/G peak ratio (0.85) for the Dual Laser process, indicates a higher defect density compared to a conventional laser-induced graphene process (0.67) that uses a single laser step, as shown in Table 1 below.

TABLE 1

| Process | D/G | 2D/G | D/D' |
|---|---|---|---|
| Dual Laser | 0.85 ± 0.1 | 0.95 ± 0.12 | 3.7 ± 1.3 |
| Conventional single laser | 0.67 ± 0.13 | 0.75 ± 0.05 | 2.6 ± 0.22 |

Figure 57:
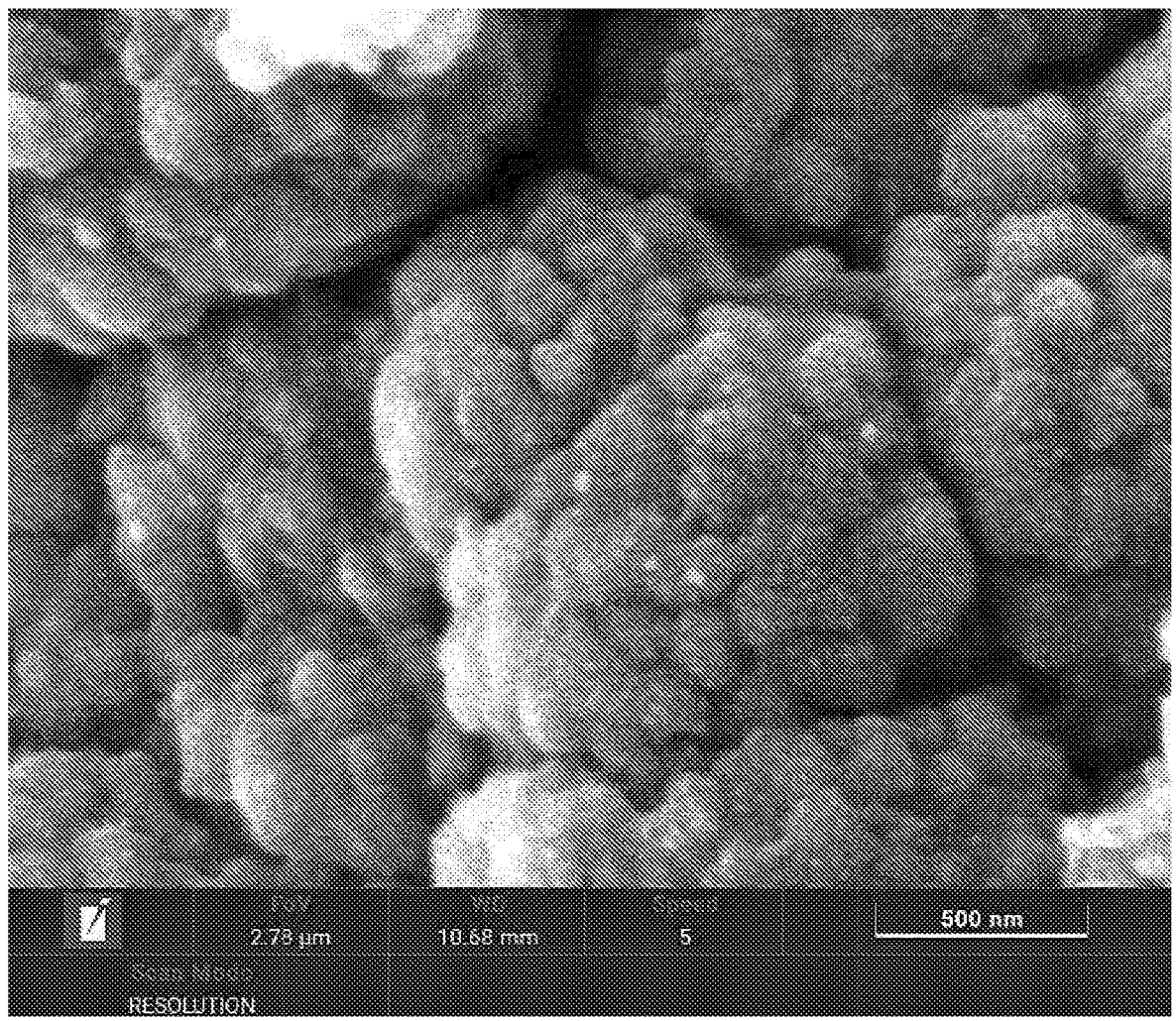
FIG. 57 is a scanning electron image of a carbon nano-onion material made using a conventional process.

As we noted earlier, Raman analysis of a typical graphene foam reveals the following signatures: absence of a D peak; the 2D peak is higher than the G peak; the peak D: peak G ratio is close to zero. The carbon foam generated in an implementation of the invention shares none of these characteristics; it is highly hydrophilic, with a contact angle below 20°; it lacks the tell-tale Raman signature of graphene: FIG. 18A shows, for the material made by the Dual Laser process: presence of a D peak; the 2D peak is lower than the G peak; the peak D: peak G ratio is above zero. FIG. 18B is another Raman analysis of a carbon foam made by the Dual Laser process, again showing the presence of a D peak; the 2D peak is lower than the G peak; the peak D: peak G ratio is above zero. FIG. 18C is a Raman analysis of carbon nano-onion material, see 'Raman spectroscopy of polyhedral carbon nano-onions'. DOI: 10.1007/s00339-015-9315-9, and the similarities with the Raman for the carbon foam made by the Dual Laser process is apparent. One reasonable interpretation is that the carbon foam made by the Dual Laser process is or includes carbon nano-onion material. See also FIG. 57A and FIG. 57B below.

Figure 19:
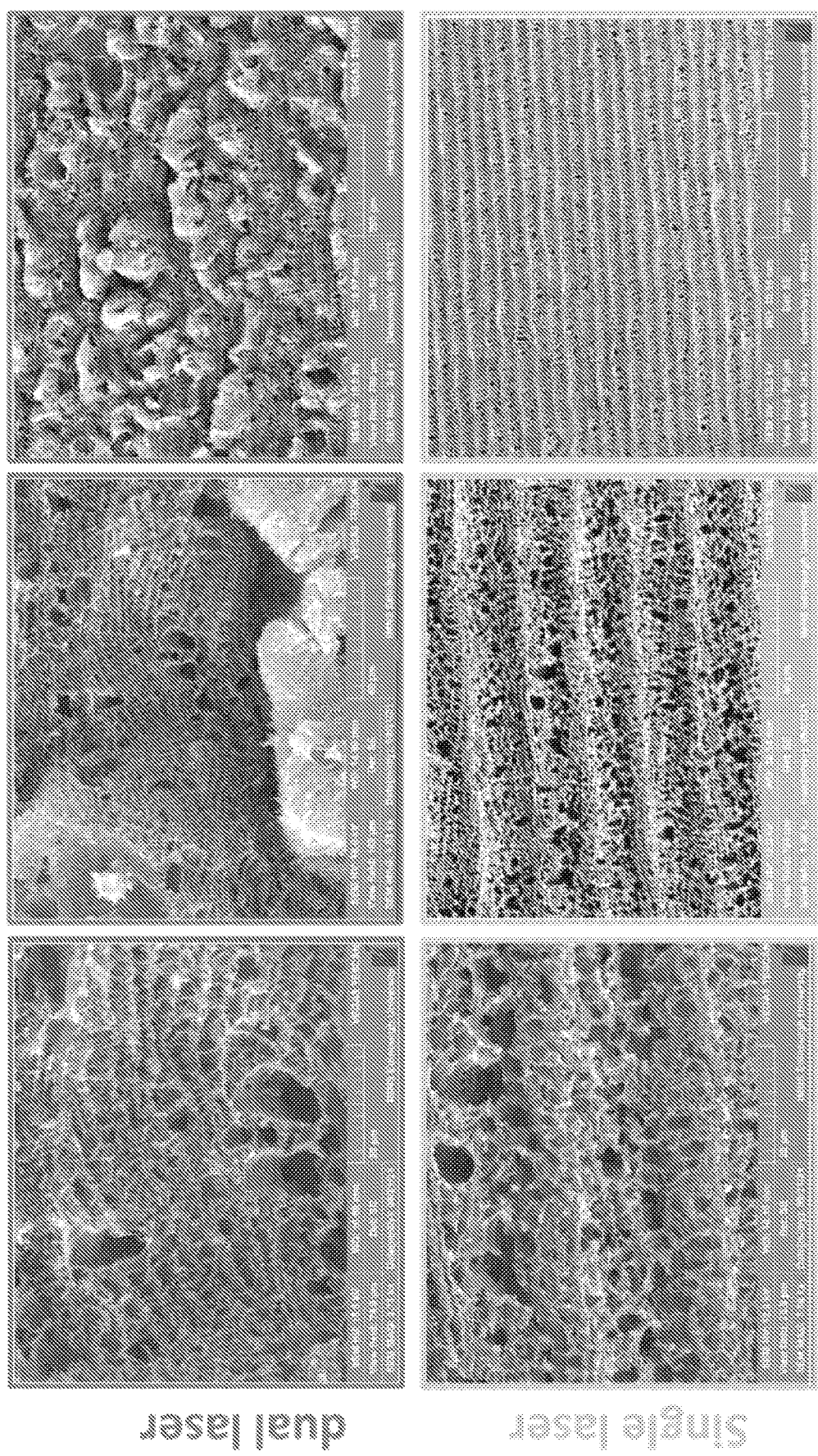
FIG. 19 are scanning electron images showing Dual Laser carbon foam and conventional graphene.

Both the Dual Laser carbon foam and a conventional graphene made by a single laser process show a microporous structure, as shown in the FIG. 19 SEM images. Low magnification images show distinct differences in the surface morphology. The single laser surface shows a smoother, striated surface with rough edges and the carbon foam made by the Dual Laser process shows a rough surface. Feature R below revisits this area.

Key Features

In this section, we outline key Features A-R of an implementation of this invention. These features define the production of carbon foam in the Dual Laser manufacturing process described earlier; this process has many advantages over conventional CVD: we can compare the production of 1 cm2 of approximately 50 µm thick carbon foam onto a plastic substrate (or indeed many other types of substrates) in Table 2:

TABLE 2

| Process | Number of Steps | Time | Temp | Pressure | Cost |
| --- | --- | --- | --- | --- | --- |
| CVD | 6 | 300 mins | 800 C. | Vacuum | $50 |
| Dual Laser Process | 1 | 2 mins | 20 C. | Ambient | sub $1 |

Features A-R define various aspects of a carbon foam manufacturing process that is highly scalable, high yield, highly reproducible and that can be easily adapted to many different applications that all use the same process. For example, the Dual Laser carbon foam is especially well suited to biosensors and electrochemical capacitors (e.g. supercapacitor and pseudo-capacitor applications).

For biosensor applications, the Dual Laser carbon foam has the following advantages over conventional graphene foam: higher electron transfer rates; greater detection sensitivity; larger electrochemically active area; greater reproducibility; lower cost; higher wettability; higher anti-fouling. One implementation of the biosensor is called Gii-Cap and we will describe this in more detail below.

For supercapacitors and other electronics applications, the carbon foam has the following advantages over conventional graphene foam: larger surface area; more porous structure; higher quality; lower sheet resistance; higher wettability; higher anti-fouling. One implementation of the supercapacitor is called Gii-Cap and we will also describe this in more detail below.

The Features A-R are organised into the following four groups:
Group 1: Sub-surface carbon foam
Group 2: Dual laser processing
Group 3: Products
Group 4: Miscellaneous
We can expand on this organisation as follows:

Group 1: Sub-Surface Carbon Foam
Feature A: Carbon foam created in a sub-surface region of a carbon pre-cursor material
Feature B: Carbon foam created in an encapsulated region of a carbon pre-cursor material
Feature C: Carbon foam created in a region of a carbon pre-cursor material, where the region has no substantial gas escape pathways
Feature D: Amorphous, non-graphene material adhering to the substrate Group 2: Dual Laser Processing
Feature E: Carbon foam created by laser ablating a sub-surface carbon foam region
Feature F: Non-graphene carbon foam created by laser ablating a sub-surface carbon foam region
Feature G: Dual lasers operating at different frequency bands
Feature H: Electrical contacts positioned in carbon foam created by laser ablating a sub-surface carbon foam region
Feature I: Printing electrical contacts on the polyimide film and then creating the exposed carbon foam
Feature J: Tall tracks made in the carbon foam
Feature K: Applying the first and second lasers in different manufacturing facilities Group 3: Products
Feature L1: Biosensors
Feature L2: Scalable, low-cost manufacture of a carbon foam biosensor using screen printing technology
Feature L3: Adding functionalised groups to the biosensor at a different manufacturing facility
Feature L4: Adding functionalised groups to the biosensor as part of the biosensor production process
Feature L5: Biosensor manufacture using PPC: Post Printing Conversion
Feature M1: Energy storage device
Feature M2: Screen printing layers of the carbon foam Supercapacitor
Feature M3: Carbon foam supercapacitor: the Common Collector
Feature M4: Carbon foam supercapacitor: the PPC manufacturing process
Feature M5: Carbon foam pseudo-capacitor: a metal oxide variant
Feature M6: Carbon foam supercapacitor: using an ionic-gel in low humidity environment
Feature N1: Electrical conductors
Feature N2: Combined Sensor and Supercapacitor
Feature N3: Combined Supercapacitor and Battery
Feature N4: The Smart Label
Feature N5: Combined Supercapacitor and Antenna
Feature N6: Combined Energy Scavenger+Supercapacitor.
Feature O1: 3D carbon foam structures: Gii-Thru for Gii-Cap
Feature O2: 3D carbon foam structures: Gii-Thru Stackable Gii-Cap/Gii-Cap+
Feature O3: 3D carbon foam structures: Gii-Thru for Gii-Sens: HISLOC
Feature O4 3D carbon foam structures: Gii-Thru for Gii-Sens: HISLOC Manufacturing process Group 4: Miscellaneous
Feature P: Scalable manufacturing of carbon foam: Gii 3
Feature Q: Various other carbon foam applications
Feature R: Non-graphene carbon foam
Turning now to Group 1:

Group 1: Sub-Surface Carbon Foam
Feature A: Carbon Foam Created in a Sub-Surface Region of a Carbon Pre-Cursor Material We have described above, in the prior art section, how earlier approaches to laser induced graphene convert a surface layer of a carbon pre-cursor to 3D graphene. The resultant 3D graphene can however be somewhat brittle, may flake off from the underlying substrate and be generally unsuited to many real-world applications; further, the 3D graphene is typically relatively thin, with a depth of less than 50 µm.

In this specification, we describe an alternative approach in which the surface of the carbon pre-cursor is not converted to graphene at all; instead, it is only a sub-surface region of the carbon pre-cursor 14 that is converted to a carbon foam 16 by a focussed laser beam 12; in one implementation, a focussed IR beam 12 generates a temperature higher than 500° C. at the sub-surface or encapsulated region inside a polyimide film 14 over a very short time, between 1 ns and 10 μs (i.e. at a rate of between around $5 \times 10^{7}$° C./s and $2 \times 10^{12}$° C./s); this brief, intense heating is sufficient to form carbon foam 16 in this sub-surface or encapsulated region. There are no substantial gas escape paths from this sub-surface or encapsulated region 16; constraining the gaseous products to within the sub-surface or encapsulated region beneficially affects the structure of the carbon foam 16 formed in that sub-surface region. Formation of carbon foam 16 solely in a sub-surface region was an unexpected discovery; it was unexpected for several reasons, including a very low absorbance (absorbance of radiation per cm (base 10) of sub 50 or as low as sub 10 of the 1064 nm IR radiation by the polyimide carbon pre-cursor material.

The surface (e.g., the interface between the carbon pre-cursor material perpendicular and facing towards the laser and the gaseous environment surrounding the carbon pre-cursor material) expands under laser irradiation and is converted from the carbon pre-cursor material to a disorganised, amorphous, non-graphene substance 18. This disorganised, amorphous, non-graphene substance 18 forms a layer that is typically at least 1% of the total thickness of the carbon pre-cursor material; for a 500 μm thick polyimide film, then typically the top 1 μm-10 μm is converted to the disorganised, amorphous, non-graphene substance 18; below this upper surface layer, in the body of the carbon pre-cursor material, we have the region that is converted to a carbon foam 16.

The thickness of this carbon foam 16 is controlled by moving the focus of the laser beam progressively through the carbon pre-cursor material; unusually thick carbon foams structures can be made using this process: 50 μm-200 μm (approx.) thick carbon foam tracks have been achieved.

If the laser illuminates a carbon film pre-cursor material, such as a polyimide film that is suspended in space as shown in FIGS. 9-14B (i.e., is not mounted on a substrate), then, after irradiation, as we progressively move through the material, we have at the upper surface, i.e., facing the laser, a disorganised, amorphous, non-graphene substance 18; we then have the carbon foam region 16. The laser beam 12 does not generally approach the lower surface of the carbon pre-cursor material, so that the carbon foam region 16 sits over carbon pre-cursor material that has not been converted to a carbon foam. If the laser approaches the lower surface of the carbon pre-cursor material, then the carbon pre-cursor close to and at the lower surface is converted to a disorganised, amorphous, non-graphene substance.

Similarly, if the laser illuminates a carbon pre-cursor film, such as a polyimide (PI) film that is mounted on a substrate, as shown in FIGS. 1-6, then we have the same sequence of materials; in addition, the laser will usually approach the lower surface of the carbon pre-cursor material that lies against the substrate: the carbon pre-cursor close to and at the lower surface is then converted to a disorganised, amorphous, non-graphene substance 17. This disorganised, amorphous, non-graphene substance 17 adheres to the substrate 15; since the carbon foam region 16 is bonded to this disorganised, amorphous, non-graphene substance 17, the result is that the carbon foam region 16 is itself not bonded directly to the substrate 15, but is nevertheless securely attached via the intermediary disorganised, amorphous, non-graphene substance 17 to the substrate 15.

This approach enables carbon foam structures that are significantly thicker than is possible with earlier approaches that limited graphene foam formation to a surface region. Further, this approach enables carbon foam structures that adhere more robustly, although not directly, to an underlying substrate. Note that with this approach, carbon foam is not produced at any surface of the carbon pre-cursor material. Instead, carbon foam is produced solely in a sub-surface region inside the carbon pre-cursor material.

We can generalise to:

A method of manufacturing carbon foam material comprising the step of irradiating a sub-surface region of a carbon pre-cursor material, parameters of the laser beam being selected to create a carbon foam in that sub-surface region.

Feature B: Carbon Foam Created in an Encapsulated Region of a Carbon Pre-Cursor Material In Feature A above, we defined the region in which the carbon foam is generated by laser irradiation as a 'sub-surface' region. Another way of describing the region is to qualify it as 'encapsulated'; this captures the 3-dimensional relationship of the carbon foam to its surroundings; the carbon foam 16 is 'encapsulated' by the original carbon precursor material and by the disorganised, amorphous, non-graphene substance 18 generated by laser irradiation at the upper surface of the carbon pre-cursor material 14.

We can generalise to:

A method of manufacturing carbon foam material comprising the step of irradiating an encapsulated region of a carbon pre-cursor material, parameters of the laser beam being selected to create a carbon foam in that encapsulated region.

Feature C: Carbon Foam Created in a Region of a Carbon Pre-Cursor Material, where the Region has No Substantial Gas Escape Pathways We have seen above that a sub-surface or encapsulated region of the carbon pre-cursor is converted to a carbon foam and there are no substantial gas escape paths from this sub-surface or encapsulated region; constraining the gaseous products to within the sub-surface or encapsulated region affects the structure of the carbon foam 16 formed in that region.

We can generalise to:

A method of manufacturing carbon foam material comprising the step of irradiating an encapsulated, sub-surface region of a carbon pre-cursor material, parameters of the laser beam being selected to create a carbon foam in that region and in which no substantial gas escape pathways to a surface of the pre-cursor material are created by the laser beam.

Feature D: Amorphous, Non-Graphene Material Adhering to the Substrate

We have seen earlier that if the laser 11 illuminates a carbon film 14 that is mounted on a substrate 15, then the laser carbonises the surface of the carbon film adjacent to the substrate 15 to form a disorganised, amorphous, non-graphene substance 17 adjacent to the substrate 15; this disorganised, amorphous, non-graphene substance 17 adheres to the substrate 15; since the internal, or sub-surface or encapsulated carbon foam region 16 is itself bonded to this disorganised, amorphous, non-graphene substance 17, the result is that the carbon foam region 16 is itself not directly attached to the substrate 15, but is nevertheless securely positioned on the substrate 15, via the intermediary disorganised, amorphous, non-graphene substance 17. The carbon foam region 16 is more securely bonded, compared to conventional laser induced graphene, and is less likely to flake off, even where the substrate is flexible, enabling for example biosensor applications where the substrate is often a thin and flexible structure.

We can generalise to:

A method of manufacturing carbon foam material comprising the step of irradiating an internal region of a carbon pre-cursor material, positioned on a substrate, parameters of the laser beam being selected to create a carbon foam in that region and to create a disorganised, amorphous, non-graphene material between the carbon foam region and the substrate; in which that disorganised, amorphous, non-graphene material is adhering or otherwise attaching directly to the substrate.

Group 2: Dual Laser Processing

Feature E: Carbon Foam Created by Laser Ablating a Sub-Surface Carbon Foam Region Previous Features A-D have covered the creation of a carbon foam in a sub-surface or encapsulated region of the carbon pre-cursor material. Because the carbon foam is not formed on an exposed surface, and many applications require the carbon foam to be exposed (e.g., to be functionalised for biomedical sensing applications or for a supercapacitor), we can perform an additional step to expose at least some of the sub-surface or encapsulated carbon foam.

We have seen earlier that the laser irradiation using IR laser 11 forms a disorganised, amorphous, non-graphene material 18 over the sub-surface or encapsulated carbon foam 16: We now use a laser, typically a long IR $CO_2$ laser 20, to ablate or otherwise treat this disorganised, amorphous, non-graphene material 18 and hence expose the underlying carbon foam 16. This second laser 20 is typically de-focused, unlike the initial laser.

As noted earlier, we use a standard 220 mm×180 mm polyimide sheet (but other sizes of polyimide sheet can be accommodated); this size that can be accommodated in a standard laser scanning device, of the sort typically used for laser engraving, laser cutting and laser plotting that traces out a path defined by a standard CAD program, and also a standard flatbed screen printing device, and a standard conveyor dryer. Other sizes of polyimide sheet can be accommodated.

We have found that this secondary laser irradiation step alters the morphology and other characteristics of the underlying carbon foam in surprising and favourable ways, to generate a twisted or turbostratic multilayer carbon foam not previously observed. Varying the CO2 laser 20 parameters can alter the carbon foam material properties, enabling carbon foam to be produced with properties that are optimised for different applications.

This newly exposed carbon foam includes one or more of the following properties:
  a readily controlled thickness or depth
  greater flexibility compared to the highly brittle graphene made using conventional laser processes.
  strong adhesion to any underlying flexible substrate
  high porosity
  high electrical conductivity
  increased capacitance or charge storage
  rapid absorption of organic solvents and water-based solutions
  higher hydrophilicity
  high EMI shielding
  enhanced electrode quality
  high wettability
  anti-fouling Note that it is possible to alter one or more of these properties, as well as the size and extent of defects, and the size (including the relative size) of the Raman D and 2D peaks, by varying the laser parameters of either or both of the laser used in the Dual Laser process. In this way, it is possible to produce a carbon foam with properties tuned or especially suitable for different applications. It was surprising that the operation of the second ablation laser could enable the creation of a useable, exposed carbon foam region, especially one with properties that could be adjusted by varying the parameters of the first and/or second lasers.

We can generalise to:

A method of manufacturing carbon foam material comprising the steps of (a) a laser beam irradiating an encapsulated or sub-surface region of a carbon pre-cursor material, to create a carbon foam in that encapsulated or sub-surface region and a disorganised, amorphous non-graphene substance above the carbon foam, and then (b) laser ablation or treatment to remove the disorganised, amorphous non-graphene substance and to expose at least some of the carbon foam.

Feature F: Carbon Foam Created by Laser Ablating a Sub-Surface Carbon Foam Region In the preceding Feature E, we described the formation of carbon foam 16 in an encapsulated or sub-surface region of the carbon pre-cursor by irradiating that region with a laser 11 (e.g. an IR laser); that irradiation causes the overlying (in the direction of the laser) carbon pre-cursor material 14 to expand into a disorganised, amorphous, non-graphene substance 18; we then expose or reveal that carbon foam 16 by ablating the overlying disorganised, amorphous, non-graphene substance 18 with a second laser 20, e.g. a CO2 laser. This second irradiation step not only ablates the overlying disorganised, amorphous non-graphene substance 18 and hence exposes the underlying carbon foam 16, but also gives this underlying carbon foam an unexpected and unusual surface morphology 21 with very desirable characteristics; this resultant carbon foam may be a twisted or turbostratic, multilayer carbon foam.

However, because this foam may have characteristics (such as extensive defects, appearance, wettability and a Raman spectrum (See Feature R below) which are not associated with a graphene foam, in this Feature F, we explicitly describe this foam as a 'non-graphene carbon foam'. The term 'non-graphene carbon foam' hence (unlike the term 'carbon foam') explicitly excludes graphene foams, including twisted or turbostratic multilayer graphene foams, but extends to cover any other 3D carbon material foam.

We can generalise to:

A method of manufacturing non-graphene carbon foam comprising the steps of
  (a) a laser beam irradiating an encapsulated or sub-surface region of a carbon pre-cursor material to create a carbon foam in that encapsulated or sub-surface region in the carbon pre-cursor material, and a disorganised, amorphous non-graphene substance above the carbon foam and then
  (b) laser ablation or treatment to remove the disorganised, amorphous non-graphene substance and expose at least some of the underlying carbon foam and transform at least some of that underlying carbon foam into a non-graphene carbon foam.

Feature G: Dual Lasers at Different Bands

We have seen in the preceding Features E and F that we may use two separate laser irradiation steps. These are usually carried out using two separate lasers: the first step, that creates the sub-surface or encapsulated carbon foam, is typically done with a focused IR laser 11; and the second step involves laser irradiation at a longer wavelength with a de-focused CO2 laser 20, but other wavelengths (e.g., UV and visible) may also be used.

The second laser 20 ablates the material 18 sitting between the carbon foam 16 and the surface (e.g., a disorganised, amorphous non-graphene material) and exposes the underlying carbon foam 16. The exposed carbon foam 16 may also be altered (e.g., in its surface morphology 21) by the second laser, i.e. the term 'exposes' should be construed broadly to include not just revealing at least some of the pre-existing carbon foam, but also transforming or altering at least some of the pre-existing carbon foam into a 3D carbon material foam with characteristics that differ from those of the pre-existing graphene foam.

We can generalise to:

A method of manufacturing a carbon foam material comprising the steps of
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam.

Feature H: Electrical Contacts Positioned in Carbon Foam Created by Laser Ablating a Sub-Surface Carbon Foam Region We have seen earlier how we create a carbon foam, which may be a twisted or turbostratic, multilayer carbon foam: because this material has exceptional electrical properties (e.g., conductivity; capacitance), we can attach or locate one or more electrical contacts (including also electrical items such as flexible electronics, microprocessors, antennas, IoT devices, electrical interfaces) into the carbon foam. For printed tracks (e.g. screen printed silver tracks), these are screen printed onto the polyimide film (or other suitable substrate) and over and into the pre-existing 3D carbon material foam, so that the tracks make good electrical contact with the foam, and any structures formed on the foam, such as a functionalisation layer (for example, see Feature L below where we describe how the carbon foam is functionalised to form a biosensor with an analyte-specific receptor layer).

We can generalise to:

A method of manufacturing carbon foam material comprising the steps of:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam; and
(c) attaching, printing or locating one or more electrical contacts into the carbon foam.

Feature I: Printing Electrical Contacts on the Polyimide Film and then Creating the Exposed Carbon Foam In Feature H, we have seen that once the Dual Laser process is completed, then electrical contacts or circuits are added to contact the pre-existing carbon foam—e.g. simple silver electrical contacts can be screen printed on to the carbon foam. In this Feature I, we describe starting the process by first screen printing the electrical contacts on to the polyimide film, and then finishing the process by creating the exposed carbon foam using the second, laser ablation step of the Dual Laser process. This has some advantages, because the screen printing process can disturb or disrupt the carbon foam. This is a process we call 'PPC', an acronym for Post Printing Conversion, in which the screen printing steps are done before the Dual Laser process to create the carbon foam. In Feature L5, below we describe a biosensor manufactured using the PPC process.

So for screen printed tracks (e.g. screen printed silver tracks), these are screen printed onto the polyimide film (or other suitable substrate) in such a way that the carbon foam is subsequently formed around one end of the printed tracks, providing a contact area with a large surface and hence very good electrical connectivity. As with the alternative process described in Feature H above, the printed tracks also make good electrical contact with any structures formed on the foam, such as a functionalisation layer (for example, see Feature L below where we describe how the carbon foam is functionalised to form a biosensor with an analyte-specific receptor layer).

An alternative sequence involves using the first laser beam to create the sub-surface carbon foam, then screen printing the electrical contacts, and then using the second laser beam to create the carbon foam in a way that makes good electrical contact with the electrical contacts.

We can generalise to:

A method of manufacturing carbon foam material comprising the steps of:
(a) screen printing electrical contacts onto or into a carbon pre-cursor material;
(b) using a laser beam operating at a first band to irradiate an encapsulated or sub-surface region of a carbon pre-cursor material below a surface of the material, to create carbon foam in that encapsulated or sub-surface region, and where steps (a) and (b) can be performed in the sequence (a) then (b) or (b) then (a); and
(c) using a laser beam operating at a second band to remove or ablate material sitting above the carbon foam, to expose at least some of the carbon foam to which the electrical contacts are connected.

Feature J: Tall Tracks Made in the Carbon Foam

We have seen earlier that the thickness of the sub-surface or encapsulated carbon foam region can far exceed the thickness of conventional graphene foams that are restricted to a surface layer: the laser focus of the first laser beam can be progressively moved down through the carbon pre-cursor material to create a deep or thick layer of sub-surface or encapsulated carbon foam. We then deploy the second laser irradiation step, ablating the material sitting between the carbon foam and the surface of the carbon pre-cursor material, resulting in an exposed region of carbon foam. The thickness or depth of this now-exposed carbon foam region can be at least 50 µm; carbon foam of 300 µm thickness has been produced. Increased thickness is beneficial because it can result in better electrical conductivity, greater capacitance, and greater mechanical integrity.

We can generalise to:

A method of manufacturing carbon foam material comprising the steps:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam;
and where the carbon foam is at least 50 µm in thickness or depth.

Feature K: Applying the First and Second Lasers in Different Manufacturing Facilities The specific properties or structure of the carbon foam that results from the second laser may be considered to be sensitive information because they define features of the final product; it may well be desirable for the first laser beam process to be carried out by a supplier of the carbon foam at that supplier's manufacturing facility, who then supplies that carbon foam to a customer, who in turn carries out the final stage, using the second laser beam, at their own manufacturing facility As we noted earlier, by varying the parameters of the first and also the second laser, it is possible to alter the carbon foam material properties, enabling carbon foam to be produced with properties that are optimised for different applications. Typical parameters that can be altered or tuned in this way include: intensity, wavelength, pulse frequency, pulse duration, pulse profile, scanning speed, focal distance, heat generated at the sub-surface or encapsulated region.

By splitting the manufacturing process in this way, the supplier is insulated from knowledge of the specific manufacturing processes used by a customer as part of the second laser, ablation process (e.g. how they vary the parameters of the second laser beam to give the exposed carbon foam the properties they require); the customer can keep the details of how they produce finished products confidential.

So the manufacturing process is a three-stage process involving the steps: (a) the first laser beam irradiating a sub-surface region of a carbon pre-cursor material at a manufacturing site to produce unfinished carbon foam product; (b) the unfinished carbon foam product being transferred to a customer-controlled manufacturing site; and (c) the laser ablation or treatment taking place at the customer-controlled manufacturing site.

In addition, this approach enables large scale manufacturing (e.g. see Feature P) of the carbon foam produced by just the first laser process, reducing the cost of this material, which can be used across a number of different applications and customers. The more specialised products generated using the second laser beam may well be manufactured at much lower quantities than the carbon foam produced by just the first laser process. So this approach enables more efficient and lower cost manufacturing of the base material, i.e. the carbon foam produced by just the first laser process.

We can generalise to:
A method of manufacturing a device comprising the steps:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam;
in which step (a) is performed at one manufacturing facility and step (b) is performed at a different facility.

For Features A-K, the following optional features are especially relevant. Note that any one or more of the following optional features may each be combined with any one or more other, compatible optional features and with any one or more of Features A-K:

We will cover the following areas:
the manufacturing processes
the first laser beam parameters and control scheme
attributes of the sub-surface or encapsulated region
the carbon pre-cursor material
the substrate supporting the carbon pre-cursor material
the carbonisation at the surface that the laser beam is incident on
the ablation laser beam or second laser beam
the carbon foam Note that any one or more of the following optional features may each be combined with any one or more other, compatible optional features and with any one or more of the other 'Features' listed in this specification (e.g., Features A-R).

The laser-based manufacturing process described above has many advantages over a conventional CVD process; we can list these as the following optional features:
is a room temperature process.
is an ambient pressure process.
can be performed on a plastic substrate (compatible with any manufacturing process, not just silicon chip fabrication).
can be done without a catalyst.
takes approximately 2 minutes or less to manufacture 1 $cm^2$ of approximately 50 μm thick carbon foam onto a plastic substrate.
enables a 3D carbon foam to be created on a flexible substrate
requires no graphene or graphene oxide precursor.
creates carbon foam material solely in the encapsulated or sub-surface region of the carbon pre-cursor material and not at any surface of the carbon pre-cursor material.
uses a combination of industry standard, low cost and scalable (i) screen printing technology and (ii) computer-controlled laser scanning technology.
can be adapted for high-speed, high volume reel-to-reel or reel-to-sheet production.

The first laser beam parameters and control scheme are important to the production of carbon foam; we define the relevant optional features here:
parameters of the laser beam that irradiates the sub-surface or encapsulated region include one or more of: intensity, wavelength, pulse frequency, pulse duration, pulse profile, scanning speed, focal distance, heat generated at the sub-surface or encapsulated region.
varying the laser parameters alters the carbon foam material properties, enabling carbon foam to be produced with properties that are optimised for different applications.
varying the laser parameters alters one or more of the following carbon foam material properties or parameters: size of defects, distribution of defects, extent of defects, type of defects, of the Raman D and 2D peaks, relative size of the Raman D and 2D peaks, thickness or depth, flexibility, adhesion, porosity, electrical conductivity, capacitance, absorption of organic solvents and water-based solutions, hydrophilicity, EMI shielding, electrode quality, wettability, contact angle, anti-fouling.
laser beam generates a temperature higher than 500° C. in the sub-surface or encapsulated region to form carbon foam.
laser beam generates a temperature of over approximately 500° C. in the sub-surface or encapsulated region to form carbon foam.
laser pulse duration is between approximately 1 ns and 10 s, giving a heating rate of between around $5 \times 10^{7\circ}$ C./s and $2 \times 10^{12\circ}$ C./s.
laser power is within a typical working range of 8-20 watts, with 12 W optimum.
laser focal distance is within a typical working range of 50 mm-400 mm.

laser pulse frequency is between approximately 50 kHz and 500 kHz.

laser pulse frequency is between approximately 1 kHz and 2 MHz.

laser wavelength is between approximately 0.7 μm-2.5 μm.

laser is scanned at between approximately 9 cm/s and 40 cm/s.

parameters of the laser beam include focus parameters.

parameters of the laser beam include diffraction parameters.

parameters of the laser beam include interference pattern parameters.

focus of the laser beam moves through the depth of the carbon pre-cursor material to generate carbon foam in the sub-surface or encapsulated region of the carbon pre-cursor that the focus passes through.

focus of the laser beam moves at least approximately 50 μm through the depth of the carbon pre-cursor material to generate carbon foam in the sub-surface or encapsulated region of the carbon pre-cursor of at least 50 μm thickness.

focus of the laser beam moves at least approximately 100 μm through the depth of the carbon pre-cursor material to generate carbon foam in the sub-surface or encapsulated region of the carbon pre-cursor of at least 100 μm thickness.

laser beam scans (e.g., raster scans) or moves laterally across the carbon pre-cursor material to form a desired pattern.

laser beam scans or moves laterally across the carbon pre-cursor material to form a desired pattern that includes non-overlapping regions or lines.

laser beam is repeatedly scanned (e.g., raster scanned) or moved laterally across the carbon pre-cursor material with a focus or intensity maximum arranged to multiple different depths within the carbon pre-cursor material until carbon foam of the required pattern and depth has been created.

laser beam is scanned at a scan rate of between 1.7 mm/s and 3550 m/s, or more typically between 35 mm/s and 350 mm/s and the scanning may be such that the number of pulses per inch (PPI) is between 100 and 10000 (relevant to the production of individual approximately polyimide sheets of size 220 mm×180 mm).

laser beam has a wavelength with substantially no absorbance by the carbon pre-cursor material.

laser beam has a wavelength with very low absorbance by the carbon pre-cursor material, where the radiation absorbance per cm (base 10) is below 50, or below 20 or below 10.

laser beam is an IR laser.

laser beam is an IR laser with wavelength of between approximately 0.7 μm-2.5 μm.

laser beam is an IR laser with wavelength of between approximately 0.75 μm-1.40 μm.

The attributes of the sub-surface or encapsulated region in which carbon foam is created can be defined by the following optional features:

unlike conventional graphene foams, the sub-surface or encapsulated region can be over approximately 50 μm in thickness.

a desired depth of the sub-surface or encapsulated region in the carbon pre-cursor material is achieved by moving the focus of the first laser beam through that depth.

the sub-surface or encapsulated region can be at different depths below the surface of the carbon pre-cursor material facing the incident laser; the exact depth at which the sub-surface or encapsulated region is a function of various factors, such as laser intensity, the choice of carbon pre-cursor material used etc. For example, the sub-surface or encapsulated region can be at least approximately 10 μm, 20 μm, 30 μm, 40 μm, 50 μm or more below the surface of the carbon pre-cursor material.

the sub-surface or encapsulated region can have a thickness of between approximately 10 μm and 200 μm.

the sub-surface or encapsulated region is at a distance below the surface of the carbon pre-cursor material that is a function of various factors, such as laser intensity, other laser parameters, the choice of carbon pre-cursor material used etc. For example, the top of the sub-surface or encapsulated region can be below the surface by at least 1%, 10%, 20%, 30%, 40% of the total thickness of the carbon pre-cursor material.

the sub-surface or encapsulated region is a volume of space centred at the mid-point of the minimum cross-section of the first laser beam and the volume is within 500 or 100 microns, or 1 micron of this mid-point.

The carbon pre-cursor material can be defined by the following optional features:

the carbon pre-cursor material is made substantially of thermo-setting material.

the carbon pre-cursor material is made substantially of non-thermo-plastic material.

the carbon pre-cursor material is a thermo-setting film.

the thermo-setting film is a polyimide film.

carbon pre-cursor is a polyimide film.

carbon pre-cursor is a polyimide polyimide film, the wavelength of the first laser is within the range of 0.7 μm to 2.5 μm.

carbon pre-cursor is at least 50% carbon by mass, or at least 75% carbon by mass, or at least 90% carbon by mass.

carbon pre-cursor is a film or sheet.

the carbon pre-cursor material is flexible.

the carbon pre-cursor material is a printed layer, such as a screen-printed layer.

the carbon pre-cursor material has a thickness greater than 5 μm, or between 5 μm and 120 μm, or greater than 120 μm.

the carbon pre-cursor material is substantially planar or flat and is oriented perpendicular to the first laser beam.

the carbon pre-cursor material is homogeneous.

the carbon pre-cursor material is heterogenous and comprises several different materials.

carbon pre-cursor is supported on a substrate that is not made of a carbon pre-cursor.

the absorption coefficient of the carbon pre-cursor material at the first laser beam wavelength is low.

the absorption coefficient of the carbon pre-cursor material for the first laser beam is below 50 $cm^{-1}$, or below 20 $cm^{-1}$, or below 10 $cm^{-1}$ the absorption coefficient of the carbon pre-cursor material for the second or ablation laser beam (see Group 3 Features below) is below 300 $cm^{-1}$ the absorption coefficient of the carbon pre-cursor material for the second or ablation laser beam is 300±50 $cm^{-1}$ the carbon pre-cursor material has a thermal conductivity of less than 1.0 W/mK (using a method according to ASTM D5470).

the carbon pre-cursor material has a thermal conductivity of less than 0.5 W/mK (using a method according to ASTM D5470).

carbon pre-cursor material is mounted on a substrate that is substantially optically transparent at the wavelength or wavelengths of the first and/or second laser beams.

the carbon pre-cursor material carbon source comprises or is formed from one or more polymers.

the carbon pre-cursor material comprises one or more of the following materials: polyimides (for example, poly (4,4'-oxydiphenylene-pyromellitimide), otherwise known as polyimide), polyetherimides (PEI), poly(methyl methacrylate) (PMMA) (e.g. spray-coated PMMA), polyurethanes (PU), polyesters, vinyl polymers, carbonized polymers, photoresist polymers, alkyds, urea-formaldehyde.

the carbon pre-cursor comprises one or more of the following materials: poly(amic acids) (for example an aryl-containing poly (amic acid)) (for example poly (pyromellitic dianhydride-co-4,4'-oxydianiline), amic acid—otherwise known as polyamic acid); dianhydrides (for example aryl dianhydrides) (for example pyromellitic dianhydride); derivatives of said poly (amic acids); derivatives of said dianhydrides (e.g., derivates of pyromellitic dianhydride).

the carbon pre-cursor comprises one or more of the following materials: aromatic materials (e.g., aromatic polymers); heteroaromatic materials (e.g., heteroaromatic polymers); polymers containing aromatic moieties; cyclic materials (e.g., polymers containing cyclic moieties); heterocyclic materials (e.g., polymers containing heterocyclic moieties); heteroaromatic materials (e.g., polymers containing heteroaromatic moieties).

the carbon pre-cursor comprises material: containing one or more of aromatic bonds, or heteroaromatic bonds or hetero bonds (e.g., imide bonds).

A substrate can be thought of as a material that presents a surface on which the carbon pre-cursor is positioned; the specific materials, thickness and properties of the substrate are determined by the application: for example, for some sensors, the substrate could be a thin flexible plastic membrane; for other applications, the substrate could be a rigid polyimide board on which electronic circuitry can be mounted. The IR laser can irradiate the carbon source directly; alternatively, radiation from the IR laser may first pass through a substrate before reaching the carbon source, in which case there are two alternative scenarios: first, the substrate is substantially transparent to the IR radiation and the mechanism of carbon foam formation is as described above. But in a second scenario, the substrate is substantially non-transparent to the IR radiation: then, rapid thermal transfer from the substrate into the carbon pre-cursor material first produces a disorganised, amorphous non-graphene layer at the interface layer with the substrate, and carbon foam is then formed in a sub-surface or encapsulated region inside the carbon pre-cursor material.

The substrate on which the carbon pre-cursor material may be positioned and supported can be defined by the following optional features:

the substrate is a plastic body, film, or foil.

the substrate is flexible.

the substrate is a polyimide circuit board.

the substrate has very low absorbance of the first laser beam.

the substrate is substantially optically transparent at the wavelength or wavelengths of the first laser beam.

the substrate has a high absorbance of the first laser beam, absorbing greater than 60% of the first laser beam the substrate has a high absorbance of the first laser beam, absorbing greater than 60% of the first laser beam and has a thermal conductivity of at least 10 W/mK.

the surface of the carbon pre-cursor material is converted to a disorganised, amorphous, non-graphene substance by the laser beam and that disorganised, amorphous, non-graphene substance adheres or bonds to the substrate and hence indirectly attaches the 3D carbon material foam to the substrate.

the substrate is formed from one or more of the following: silicon (Si), silicon dioxide (SiO2), gallium nitride (GaN), gallium arsenide (GaAs), zinc oxide (ZnO).

the substrate is silicon wafer.

the substrate is a silicon dioxide wafer.

the substrate is a wafer comprising both silicon and silicon dioxide.

the substrate is a carbon source.

the substrate is not a carbon source, e.g. is a metal, dielectric material, a screen-printed dielectric material.

the carbon pre-cursor is positioned 'above' the substrate (e.g. the carbon pre-cursor is positioned closer to the laser sources than the substrate).

the carbon pre-cursor is positioned 'below' the substrate (e.g. the carbon pre-cursor is positioned further from the laser sources than the substrate).

The carbonisation at the surface that the laser beam is incident on can be defined by the following optional features:

the surface of the carbon pre-cursor material is converted to a disorganised, amorphous, non-graphene substance by the first laser beam.

the disorganised, amorphous, non-graphene substance occupies a thickness below the surface of the adjacent carbon pre-cursor material that is approximately 1%, or less than approximately 1%, or less than approximately 5%, or less than approximately 10%, of the total thickness of the carbon pre-cursor material.

the disorganised, amorphous, non-graphene substance extends to a distance below the surface of the carbon pre-cursor material that is at least 10 μm.

the disorganised, amorphous, non-graphene substance extends from the outer surface into the body of the carbon pre-cursor material to a depth of 10 μm or less, or to a depth of 20 μm or less, or to a depth of 30 μm or less, or to a depth of 40 μm or less, or to a depth of 50 μm or less, or to a depth of 100 μm or less.

The ablation laser beam or second laser beam can be defined by the following optional features:

parameters of the laser beam include one or more of: intensity, wavelength, pulse duration, pulse profile, scanning speed, heat generated at the sub-surface or encapsulated region.

varying the laser parameters alters the carbon foam material properties, enabling carbon foam to be produced with properties that are optimised for different applications.

varying the laser parameters alters one or more of the following carbon foam material properties or parameters: type of carbon nanostructures present (e.g. carbon nano-onion etc), size of defects, distribution of defects, extent of defects, type of defects, of the Raman D and 2D peaks, relative size of the Raman D and 2D peaks, thickness or depth, flexibility, adhesion, porosity, electrical conductivity, capacitance, absorption of organic solvents and water-based solutions, hydrophilicity, EMI shielding, electrode quality, wettability, contact angle, anti-fouling.

laser beam that ablates the amorphous, non-graphene substance that is formed above the encapsulated or sub-surface region in the carbon pre-cursor (the 'second laser beam') is a CO2 laser.

the second laser beam alters the carbon foam as part of the process of exposing it.

the second laser beam alters the morphology of the carbon foam as part of the process of exposing it.

The second laser beam is automatically controlled to be scanned (e.g., raster scanned) across the same regions, and/or overlapping regions and/or non-overlapping regions.

wavelength of the laser beam that ablates the amorphous, non-graphene substance is between 8 μm-15 μm.

the second laser beam is a long IR laser, or a UV laser or a visible light laser.

the second laser beam has a pulse frequency of between 50 kHz and 500 kHz and a scan speed of between 9 cm/s and 40 cm/s.

the absorption coefficient of the carbon pre-cursor material is above 100 $cm^{-1}$ for the second laser beam, or above 200 $cm^{-1}$ for the second laser beam.

the absorption coefficient of the carbon pre-cursor material is 300±50 $cm^{-1}$ for the second laser beam.

laser power is within a typical working range of 8-20 watts, with 12 W optimum.

laser focal distance is within a typical working range of 50 mm-400 mm.

the second laser beam is scanned in a pattern that includes non-overlapping regions or lines.

the second laser beam is scanned in a pattern that matches the scan pattern of the first laser beam.

the second laser beam is de-focussed.

the manufacturing process is a three-stage process involving the steps: (a) the first laser beam irradiating a sub-surface region of a carbon pre-cursor material at a manufacturing site to produce unfinished carbon foam product; (b) the unfinished carbon foam product being transferred to a customer-controlled manufacturing site; and (c) the laser ablation or treatment taking place at the customer-controlled manufacturing site.

The carbon foam can be defined by the following optional features:

the carbon foam is at least 50 μm in thickness.

the carbon foam is between 50 μm to 300 μm in thickness.

the carbon foam is or includes a twisted or turbostratic multilayer foam.

the carbon foam is or includes a carbon foam with a spatial distribution of defects leading to high electrochemical reactivity.

the carbon foam is or includes a carbon foam with vacancy position basal plane defects leading to high electrochemical reactivity.

the carbon foam has a Carbon: Oxygen ratio of between 25:1 and 50:1.

the carbon foam has a fast electron transfer constant.

the carbon foam has one or more of the following properties
   a readily controlled thickness or depth
   greater flexibility compared to the highly brittle graphene made using conventional laser processes.
   strong adhesion to an underlying flexible substrate
   high porosity
   high electrical conductivity
   increased capacitance or charge storage
   rapid absorption of organic solvents and water-based solutions
   higher hydrophilicity
   high EMI shielding
   enhanced electrode quality
   a contact angle of approximately 20° or less the properties of the carbon foam are selected by choosing specific laser parameters to generate carbon foam material with one or more of the following desired properties or parameters: size of defects, distribution of defects, extent of defects, type of defects, of the Raman D and 2D peaks, relative size of the Raman D and 2D peaks, thickness or depth, flexibility, adhesion, porosity, electrical conductivity, capacitance, absorption of organic solvents and water-based solutions, hydrophilicity, EMI shielding, electrode quality, wettability, contact angle, anti-fouling.

Group 3: Products

Feature L1: Biosensor

The carbon foam made by the Dual Laser method described above, has broad applications across many different types of sensors. For simplicity, we will use the phrase 'carbon foam' in this Feature L to refer to any carbon foam or 3D carbon material foam made by the methods described in this specification. Appendix 1 includes more details on this area, describing in more detail a biosensor that includes carbon foam that has been functionalised by adding a receptor that is specific to a target or analyte, and a linker that enables the receptor to attach indirectly to the carbon foam; (some receptors cannot be attached directly to the carbon foam because of poor stability when in contact with surfaces; instead a linker has to be used as an intermediary between the carbon foam and the receptor. During manufacture, the linker is first added to the carbon foam, and then the receptor is added to the linker.)

For biosensor applications, the functionalised carbon foam has the following advantages over conventional graphene foam: higher electron transfer rates; greater detection sensitivity; larger electrochemically active area; greater reproducibility; lower cost; enhanced wettability, with a contact angle of approximately 200 or less.

At a high level, functionalised carbon foam is useful in a sensor because of its ability to generate a detectable change in state; its high sensitivity is a function of its large surface area. It can be used to detect specific chemicals, specific gases, mechanical stress, and temperature, as well as other variables. We will look briefly at each category.

First, chemical sensors: chemical detection systems rely on detecting the electrical response of the carbon foam when in the presence of the target chemical; many different detection principles can be used, such as changes in capacitance, electrical resistance, voltammetry, redox potentials, and charge transfer resistance.

For example, when a specific analyte or target binds to the carbon foam, that binding can be detected because it modifies the surface of the carbon foam. Biomolecules are added to the carbon foam, such as specific antibodies or aptamers (aptamers are short, single-stranded DNA or RNA molecules that can selectively bind to a specific target, including proteins, peptides, carbohydrates, small molecules, toxins, and live cells). When the target is present and binds to the aptamer, then the morphology of the aptamer is altered (e.g., reducing the surface area) and the capacitance of the combined carbon foam and aptamer system measurably reduces.

Highly sensitive and highly selective sensors can be built using this principle; since there is a quantitative reduction in a measurable variable (e.g. capacitance), it is possible to build a LOC (laboratory on chip) that includes not just the carbon foam and aptamer biosensor, but also a power source on the LOC, such as a supercapacitor or other energy store using the carbon foam as its electrodes, and circuitry to measure the variable, compute a biosensor output and to display on a screen of the LOC that output (e.g. presence or absence of the target; concentration of the target); Feature O3 (Gii-Thru for Gii-Sens: HISLOC) describes this further.

Carbon foam sensors can also measure the redox potential of the target; for example, a current peak could be detected where the oxidation of the target chemical is catalysed by specific catalysts added to the carbon foam; quantitative measurement of the target concentration is possible since the current is typically a function of concentration of the target chemical.

Other techniques that have been applied to conventional graphene sensors, such as thermal conductivity measurement to detect specific chemicals, electrical resistance measurement to infer temperature, physical morphing, or transformation in the presence of specific chemicals, piezoresistive deformation to detect motion, can all be applied to carbon foam sensors made by the Dual Laser method described above.

An important application that makes use of the very large electrochemically active area and fast electron transfer rates of the carbon foam produced by the Dual Laser method is an electroanalytical sensing electrode (an implementation is called 'Gii-Sens') that is optimised for biosensing.

It can, for example, be used in point of care diagnostic devices; the sensing electrode has very high sensitivity, reliability, purity, wettability and conductivity.

Figure 20A:
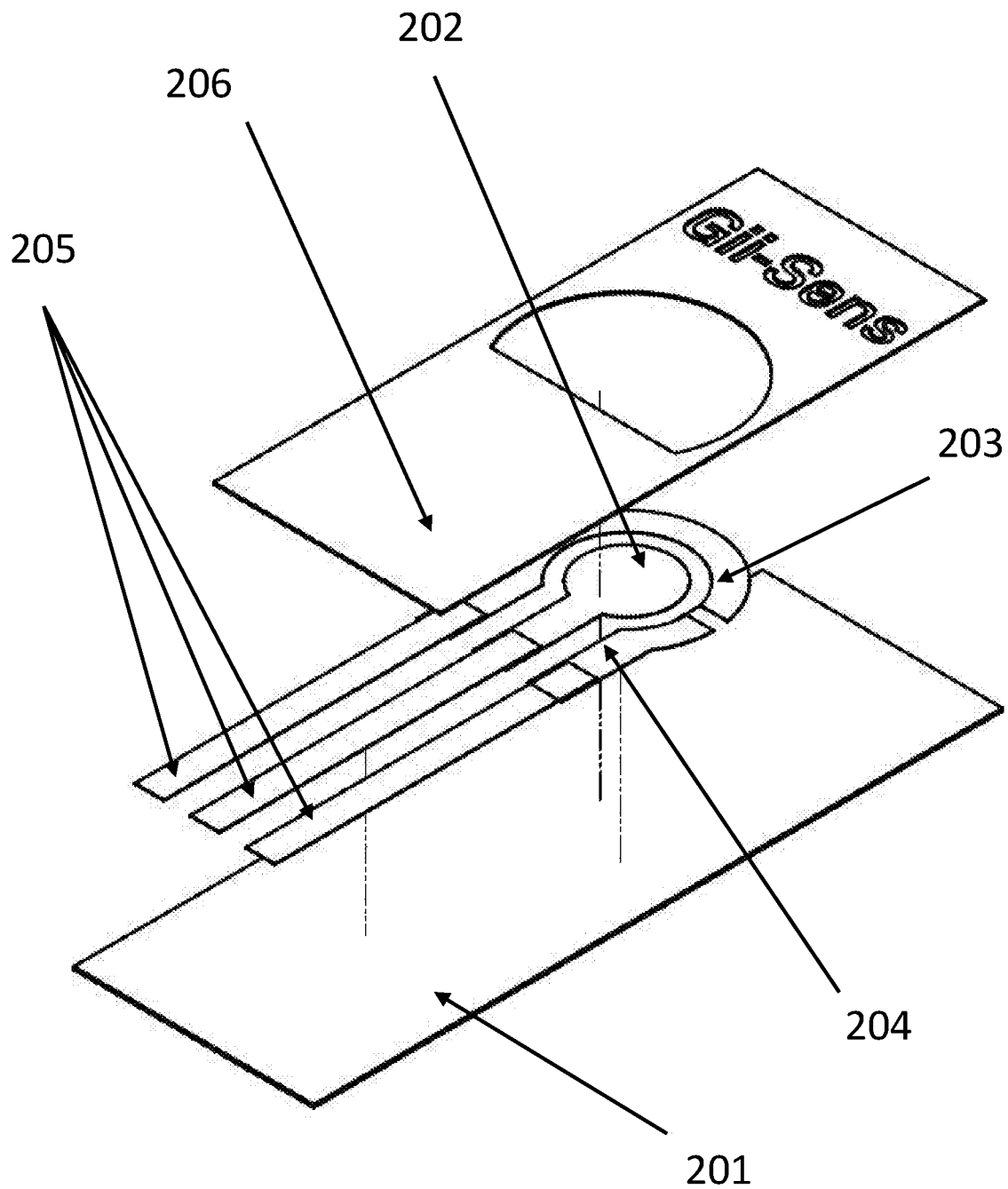
FIGS. 20A-20H are schematic images of biosensors including Dual Laser carbon foam (this implementation of the carbon foam is called Gii-Sens).

FIG. 20A is a perspective view of a biosensor called Gii-Sens. The assembly is made up of a polyimide substrate 201; a working electrode 202 made of Gii carbon foam; a counter electrode 203, made of Gii carbon foam; a reference electrode 204, made of a screen printed silver-silver chloride; three screen printed silver connection tracks 205; and a screen printed dielectric layer 206.

Figures 20B, 20C:
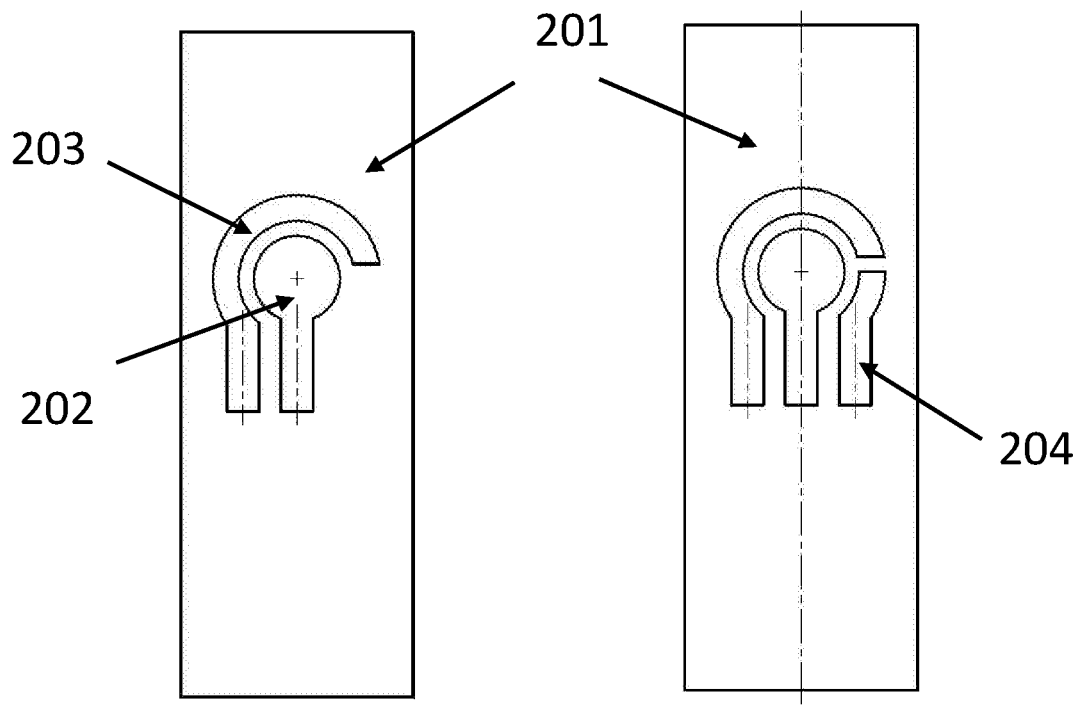
Figures 20D, 20E:
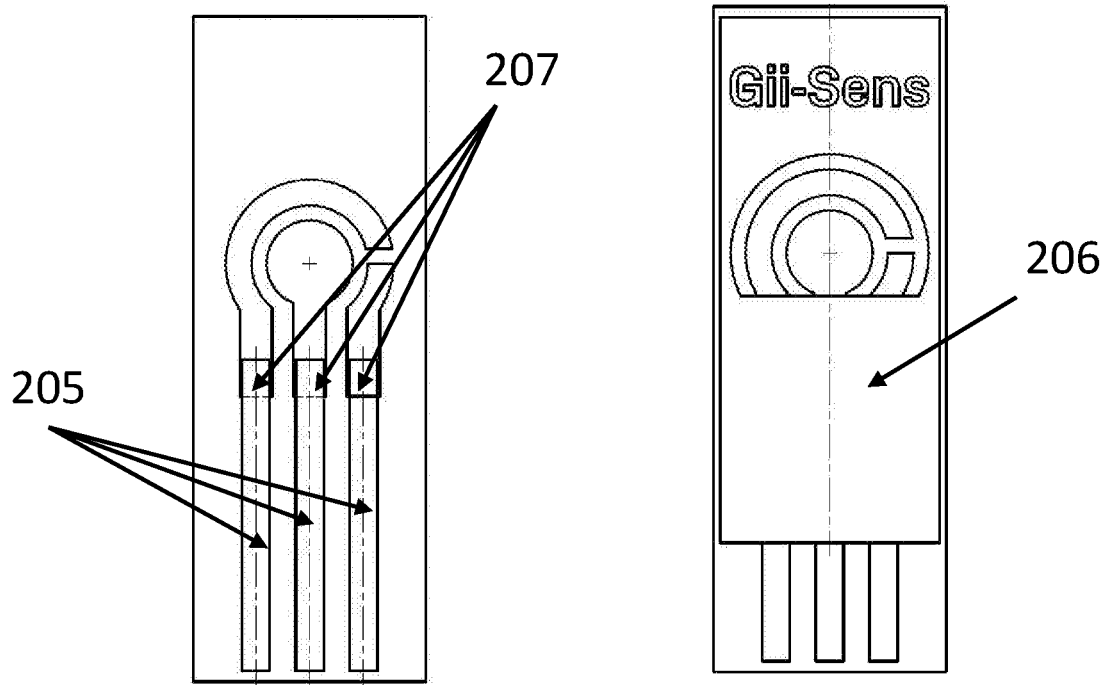

FIGS. 20B-20D) show the four main manufacturing stages. FIG. 20B shows Step 1, in which the Dual Laser process creates the Gii carbon foam working electrode 202 (area is 18.94 $mm^2$) and the counter electrode 203 (area is 20.84 $mm^2$) using the polyimide substrate 201 as the precursor.

FIG. 20C shows Step 2, in which the silver-silver chloride reference electrode 204 (area is 8.99 $mm^2$) is screen printed onto the polyimide substrate 201.

FIG. 20D shows Step 3, in which silver connection tracks 205 are screen printed onto the polyimide substrate 201; these overlap carbon foam electrodes at electrical contact region 207. The silver track area is 1×18.85 $mm^2$ and for three, it is 3×56.55 $mm^2$. The area of overlap with an underlying carbon foam electrode is 1×2.21 $mm^2$ and for three, it is 3×6.63 $mm^2$.

Figure 20F:
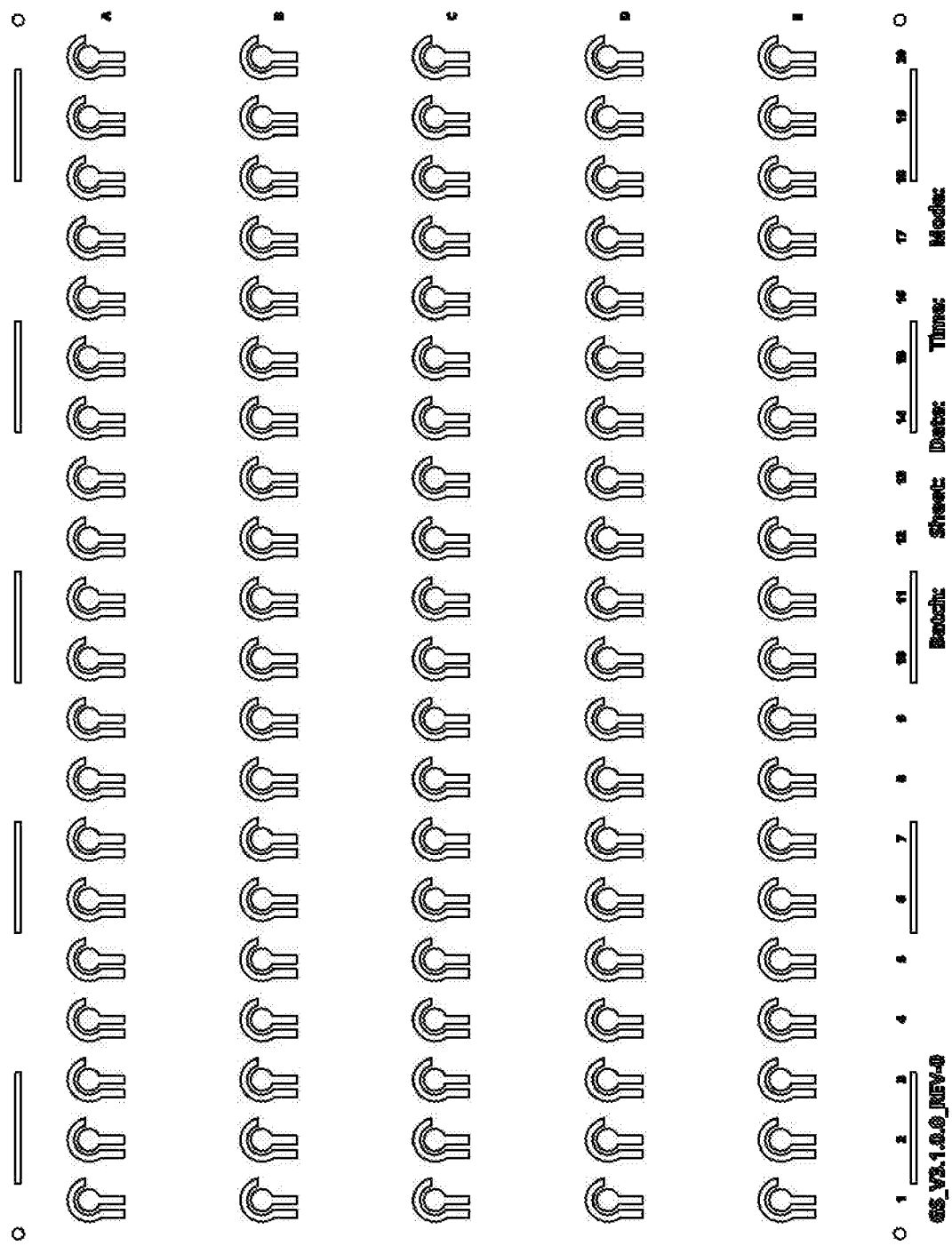

FIG. 20E shows Step 4, in which dielectric layer 206 is screen printed over the carbon foam electrodes 202, 203, 204 and the silver connection tracks 205. The active areas for the electrodes are as follows: working electrode 202: 12.64 $mm^2$; counter electrode 203: 14.18 $mm^2$; reference electrode 204: 2.59 $mm^2$. The exposed area of the silver connection tracks 205 are 1×7.15 $mm^2$ and 2×21.45 $mm^2$, FIG. 20F shows a single polyimide sheet on which an array of 100 carbon foam working electrodes and counter electrodes have been created using the Step 1 Dual Laser process described above. The sheet is a standard type of polyimide sheet, 220 mm×180 mm, to enable handling with standard screen printing and laser scanning equipment; it can be A5 size or any other suitable size.

Figure 20G:
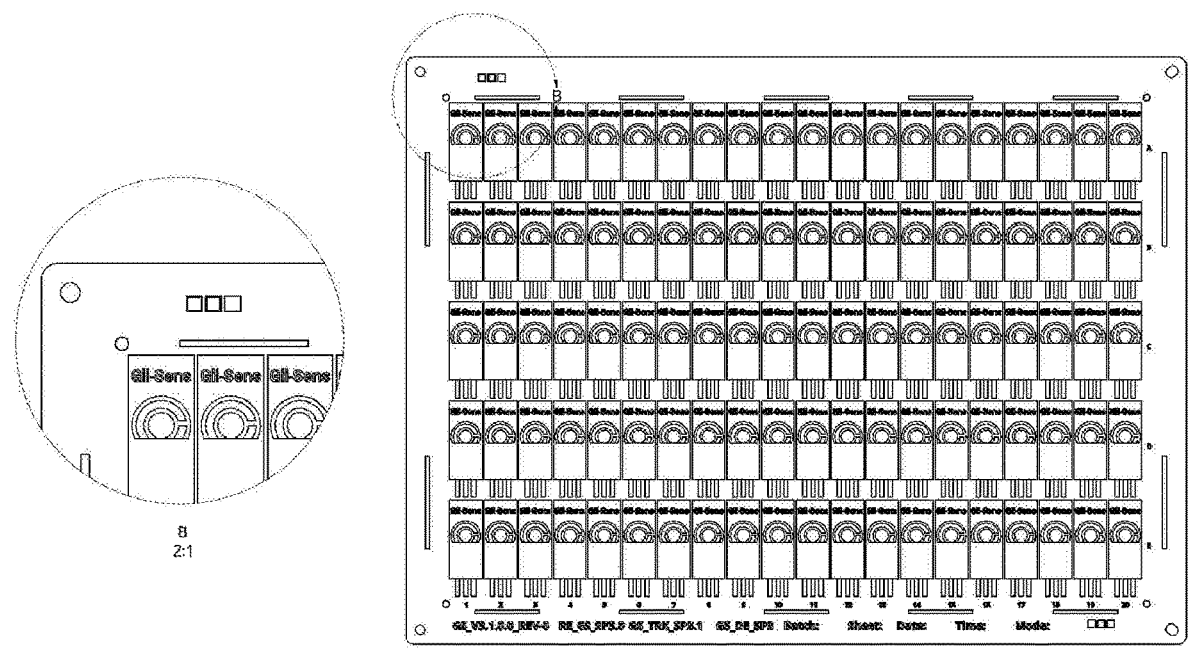
Figure 20H:
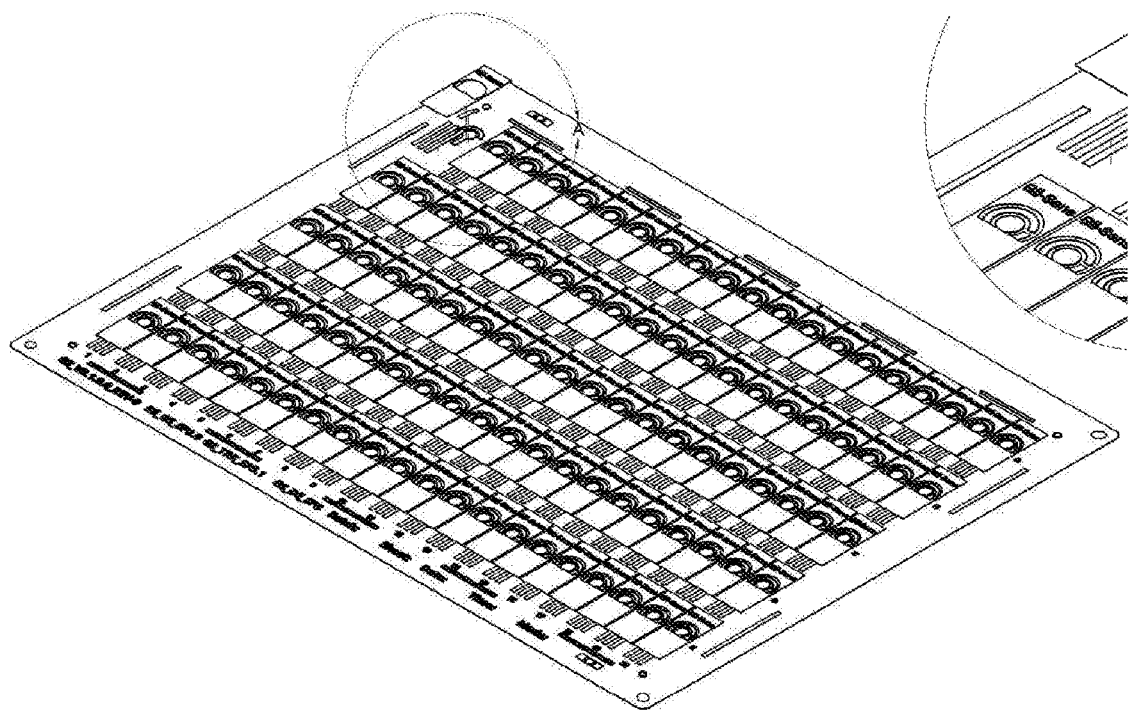

FIGS. 20G and 20H shows the final form of the sheet, after Step 4 has been completed. The 100 individual units can be cut and assembled into 100 finished Gii-Sens biosensors.

One specific use case for Gii-Sens sensing electrodes is in a reversible polymer displacement sensor mechanism for electrochemical glucose monitoring. Graphene sensors for this use case have been proposed: see 'Polymer indicator displacement assay: electrochemical glucose monitoring based on boronic acid receptors and graphene foam competitively binding with poly-nordihydroguaiaretic acid' Wikeley et al. DOI: 10.1039/dlan01991k. This paper describes a pyrene-derivatised boronic acid chemo-receptor for glucose is adsorbed onto a graphene foam electrode. Spontaneous oxidative polymerisation of nordihydroguaiaretic acid (NHG) onto the graphene foam electrode leads to a redox active film (poly-NHG) covalently attached to the boronic acid receptors. Oxidation of poly-NHG frees the boronic acid receptors to interact with glucose from the solution phase, which is detected due to competitive binding when reduced poly-NHG re-binds to the boronic acid functional groups. The sensor shows the anticipated boronic acid selectivity of fructose glucose. The ratio of charges under the voltammetric peaks for poly-NHG unbound and bound is employed for glucose sensing with an approximately linear analytical range from 1 to 50 nM glucose in aqueous pH 7 buffer.

The Gii-Sens sensing electrode implementation has many advantages over current sensing electrodes, such as graphene sensors:

- lowers limits of detection using amplification-free, enzyme-free, label-free electrochemical biosensing
- enhanced reproducibility
- optimises useful dynamic range
- minimises background noise
- reduces protocol times and operations
- scalable for low-cost manufacturing
- high sensitivity and selectivity
- gives quantitative digital result
- can be printed into specific patterns, e.g., interdigitated patterns, enabling miniaturised, integrated devices
- can translate existing biorecognition and test formats (e.g., ELISA, PCR, RT-PCR) to electrochemical microfluidics POC without compromising performance quality
- impedance based measurements can be made with very high sensitivity, reliability, and very low background signal interference,
- replaces costly large scale laboratory testing and low sensitivity lateral flow testing
- can be implemented in microfluidic assays (single or multi-target) and Lab-on-a-chip (LOC) devices
- can be used in any sensor application where the user aims to immobilise (bio)molecules of interest (e.g., carboxyl/n-hydroxysuccinimide moieties can be added to the sensor surface to provide a platform for subsequent immobilisation conjugation chemistry reactions)
- can be used across a wide range of diagnostics: POC (point of care) human and animal health, food safety, in-situ environmental health and safety, agricultural health and safety—all with enhanced sensitivity, selectivity, and reproducibility for biosensing because of its pure and high specific surface area.
- enhanced wettability (e.g. contact angle below approximately 20°)
- enhanced anti-fouling properties We can generalise to:

A method of manufacturing a biosensor including a sensing electrode comprising carbon foam made, at least in part, by the method defined in any of Features A-K above.

Figure 21:
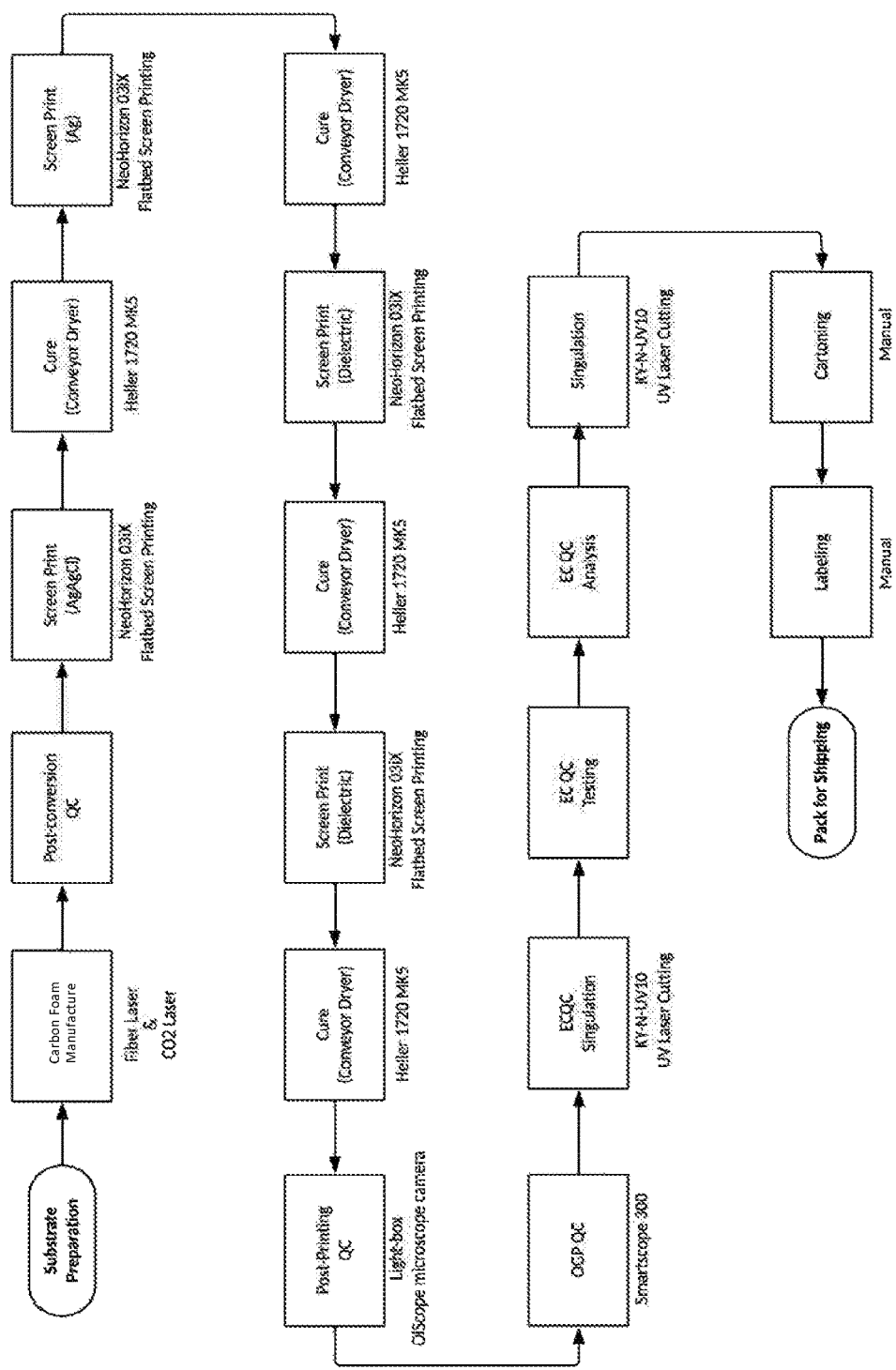
FIGS. 21-23 are detailed processing flow charts for Dual Laser carbon foam (referred to as Gii-Sens, Gii-Sens+ and PPC Gii-Sens variants).

L2: Scalable, Low-Cost Manufacture of a Carbon Foam Biosensor Using Screen Printing Technology We have seen above how screen printing is used extensively in the manufacturing process: this is a well-known, scalable, predictable and low-cost technology. The detailed manufacturing process for the Gii-Sens carbon foam biosensor is shown in FIG. 21.

We can generalise to the following:

A method of manufacturing a biosensor including sensor electrodes, such as a working electrode, a counter electrode, each comprising carbon foam made, at least in part, by the method defined in any of Features A-K above, and the method includes screen printing electrical connection tracks over each electrode and at least partly covering the electrodes and connection tracks with a screen printed dielectric.

Optional features include the following:
the method defined above in which in a Step 1, the Dual Laser process creates a carbon foam working electrode and a counter electrode using a PI substrate as the pre-cursor.
the method defined above in which in a Step 2, a reference electrode, such as a silver-silver chloride electrode, is screen printed onto the PI substrate.
the method defined above in which in a Step 3, connection tracks, such as silver tracks, are screen printed onto the PI substrate to overlap the carbon foam electrodes. NB the order of Step 2 and 3 can be reversed.
the method defined above in which in a Step 4, a dielectric layer is screen printed over at least some of the carbon foam electrodes and the silver connection tracks.

Other aspects are:

A biosensor including sensor electrodes, such as a working electrode, and a counter electrode, each comprising carbon foam made, at least in part, by the method defined in any of Features A-K above, and each electrically connected to screen printed tracks and also at least partly covered by a screen printed dielectric.

A point of care diagnostics device including a biosensor as defined above.

L3: Adding Functionalised Groups to the Biosensor at a Different Manufacturing Facility For Gii-Sens biosensors, the biosensor is manufactured in one facility, but the customer adds the functionalised groups to which biomolecules can attach in a different facility, typically their own facility, hence speeding up the development and testing of these functionalised groups and also protecting their trade secrets and know-how in these functionalised groups and the final design of the biosensor.

We can generalise to:

A method of manufacturing, in one manufacturing facility, a biosensor including sensor electrodes, such as a working electrode, a counter electrode, each comprising carbon foam made, at least in part, by the method defined in any of Features A-K above, and the method includes the further step of adding, at a different manufacturing facility, functionalised groups to the working electrode.

Figure 22:
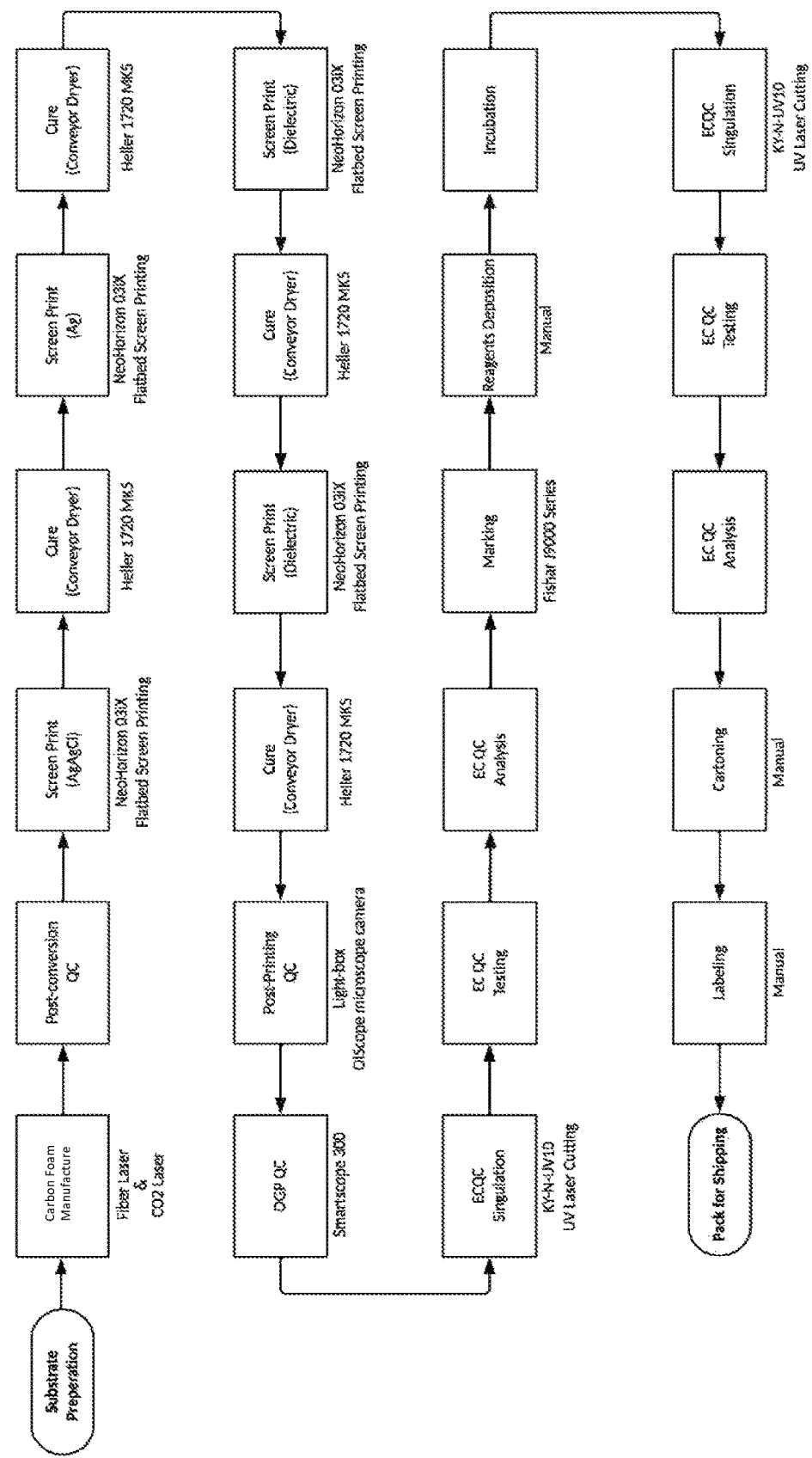

L4: Adding Functionalised Groups to the Biosensor as Part of the Biosensor Production Process For Gii-Sens+ biosensors, the manufacturing process includes adding functionalised groups. FIG. 22 shows the detailed manufacturing process for Gii-Sens+.

We can generalise to:

A method of manufacturing in one manufacturing facility a biosensor including sensor electrodes, such as a working electrode, a counter electrode, each comprising carbon foam made, at least in part, by the method defined in any of Features A-K above, and the method includes the further step of adding, at that manufacturing facility, functionalised groups to the working electrode.

L5: Biosensor Manufacture Using PPC: Post Printing Conversion

Figure 23:
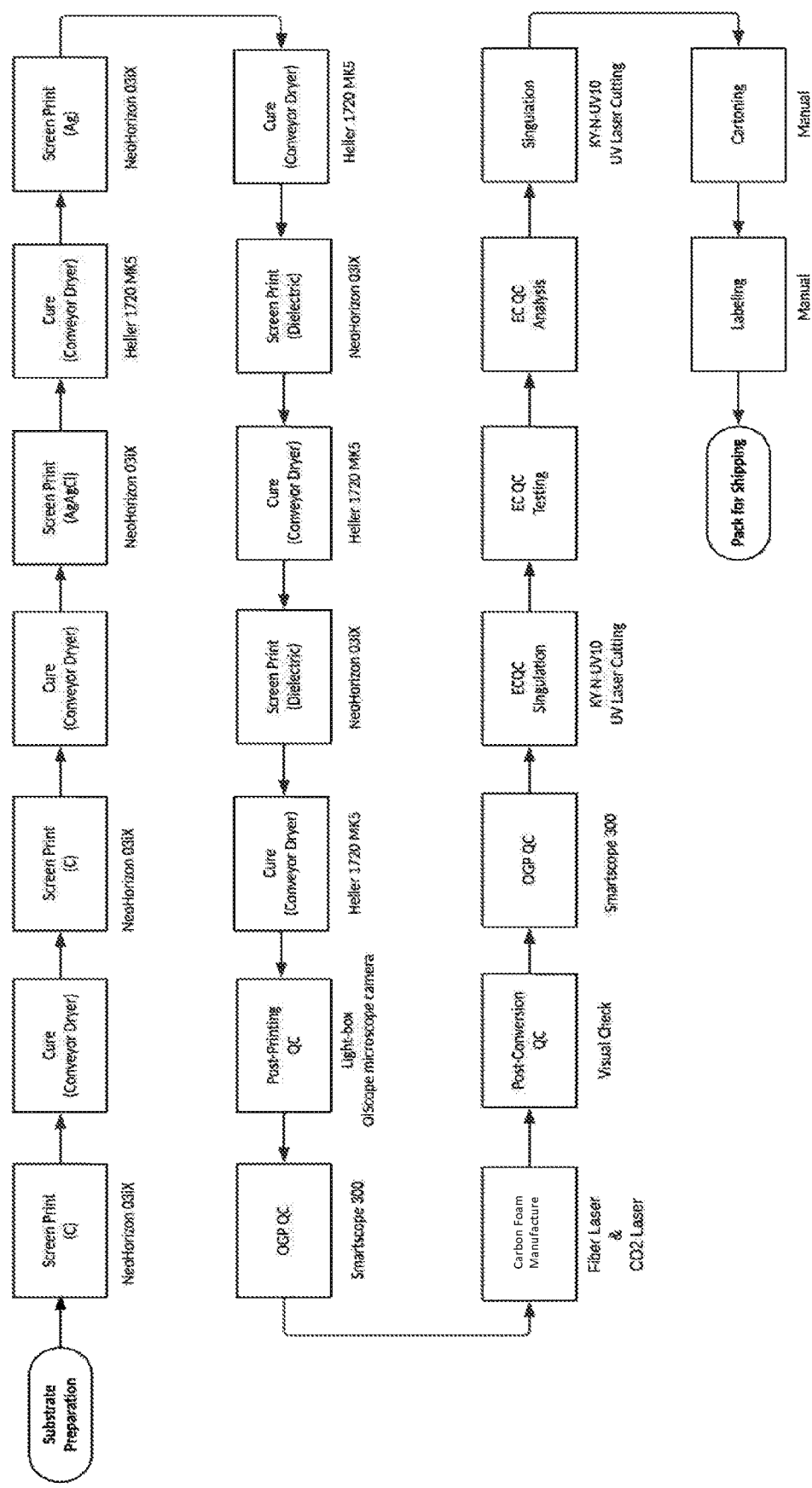

A PPC variant of the Gii-Sens manufacturing process is shown in FIG. 23. PPC is an acronym for Post Printing Conversion, in which the screen printing steps are done before the Dual Laser process to create the carbon foam. The specific steps are as follows:
1. Screen print carbon layer on to a substrate (e.g. polyimide,)
2. Screen print Ag/AgCl reference electrode
3. Screen print Ag electrical connection tracks
4. Screen print dielectric
4. Create carbon foam in the substrate using the Dual Laser process All screen printing steps (1-3) could be done using a reel to reel or reel-to-sheet process, and then the carbon foam is created using the Dual Laser process and the material then kept flat and stacked.

Also, only the first laser process (sub-surface foam creation) could be done in the factory, which then ships the sheets to a customer and the customer does the second stage of the Dual Laser process (laser ablation); the customer can add functionalised groups at their own manufacturing facility, different from the facility where the first laser process step (or both laser process steps) in the Dual Laser process is carried out. Alternatively, functionalisation can take place at the facility where the Dual Laser process is carried out.

Screen printing before creating the carbon foam has advantages: because we are not drying the carbon foam, it is not as hydrophobic. The carbon layer acts as a bridge between the carbon foam formed in the polyimide (e.g. carbon foam and the non-graphene disorganised amorphous foam) and the silver connections.

We can generalise to:

A method of manufacturing a biosensor including sensor electrodes, such as a working electrode, and a counter electrode, each comprising carbon foam made, at least in part, by the method defined in any of Features A-K above, and the method includes the steps of (a) screen printing a carbon layer on the substrate; (b) screen printing electrical connection tracks and a reference electrode; (c) screen printing a dielectric layer over the carbon and the electrical connection tracks and the reference electrode; and then (d) creating carbon foam sensor electrodes using a process defined in any of Features A-K above.

Feature M1: Energy Storage Device: The Supercapacitor

Because the carbon foam manufactured using any of the Features A-K has a very large electrochemically active area and fast electron transfer rates, it is an ideal material for capacitor or supercapacitor or pseudo-capacitor electrodes.

An important application is a supercapacitor (an implementation is called 'Gii-Cap') or other energy storage device (e.g., Li-ion batteries). For supercapacitors and other electronics applications, the carbon foam has the following advantages over conventional graphene foam: larger surface area; more porous structure; higher quality; lower sheet resistance; higher wettability.

The carbon foam can be treated with a metal oxide or other pseudo-capacitive material, a variant we call Gii- Cap+, (e.g. to create a metal oxide layer or film) for pseudo-capacitance, and that metal oxide film has an exceptionally large surface area and a fast surface Faradic mechanism.

Note that when we use the term Gii-Cap, we include the Gii-Cap+ variant, unless the context makes it explicitly clear that we are specifically excluding the Gii-Cap+ variant. Note also that we use the term 'supercapacitor' to include both (i) an electric double-layer (EDLC) capacitor, where charge is stored electrostatically with no interaction between the electrode and electrolyte ions, and also (ii) a pseudo-capacitor, where there is electron charge transfer between the electrode and the electrolyte and any energy storage device which uses a combination of electric double-layer capacitance and pseudo-capacitance. Note finally that the term 'supercapacitor' should be expansively construed to cover any electrochemical capacitor, including EDLC supercapacitors, pseudo-capacitors, and hybrids of these. The Gii-Cap+ variant is predominantly a pseudo-capacitor, but we nevertheless refer to it as a 'supercapacitor'.

The carbon foam electrodes in the Gii-Cap supercapacitor enhance both the electrostatic double-layer capacitance and the electrochemical pseudocapacitance, compared with conventional supercapacitors. Appendix 2 provides more detail on the supercapacitor, and describes an implementation where a hydrogel electrolyte (e.g. a high molarity salt) envelops interdigitated carbon foam electrodes in an active area to produce an enhanced operational voltage window.

The EDLC supercapacitor Gii-Cap and pseudo-capacitor Gii-Cap+ implementations have many advantages over conventional rechargeable batteries:
- fast charging
- high power
- recyclable
- non-explosive
- flexible form and shape
- can use a solid gel electrolyte or a polymeric electrolyte (e.g. an ionic gel or a hydrogel) that is solid at room temperature, having a high transition temperature far in excess of normal use temperatures (e.g. 90° C.); this greatly minimises the risk of electrolyte leakage.

It can be used across a very broad range of devices and power storage requirements, such as Lab-on-a-chip (LOC), IoT devices, e-mobility, UAV, EV applications.

We can generalise to:

An energy storage device, such as a supercapacitor, in which the energy storage electrodes comprise carbon foam material made, at least in part, by the method defined in any of Features A-K above.

Feature M2: Screen Printing Layers of the Carbon Foam Supercapacitor

Figure 24:
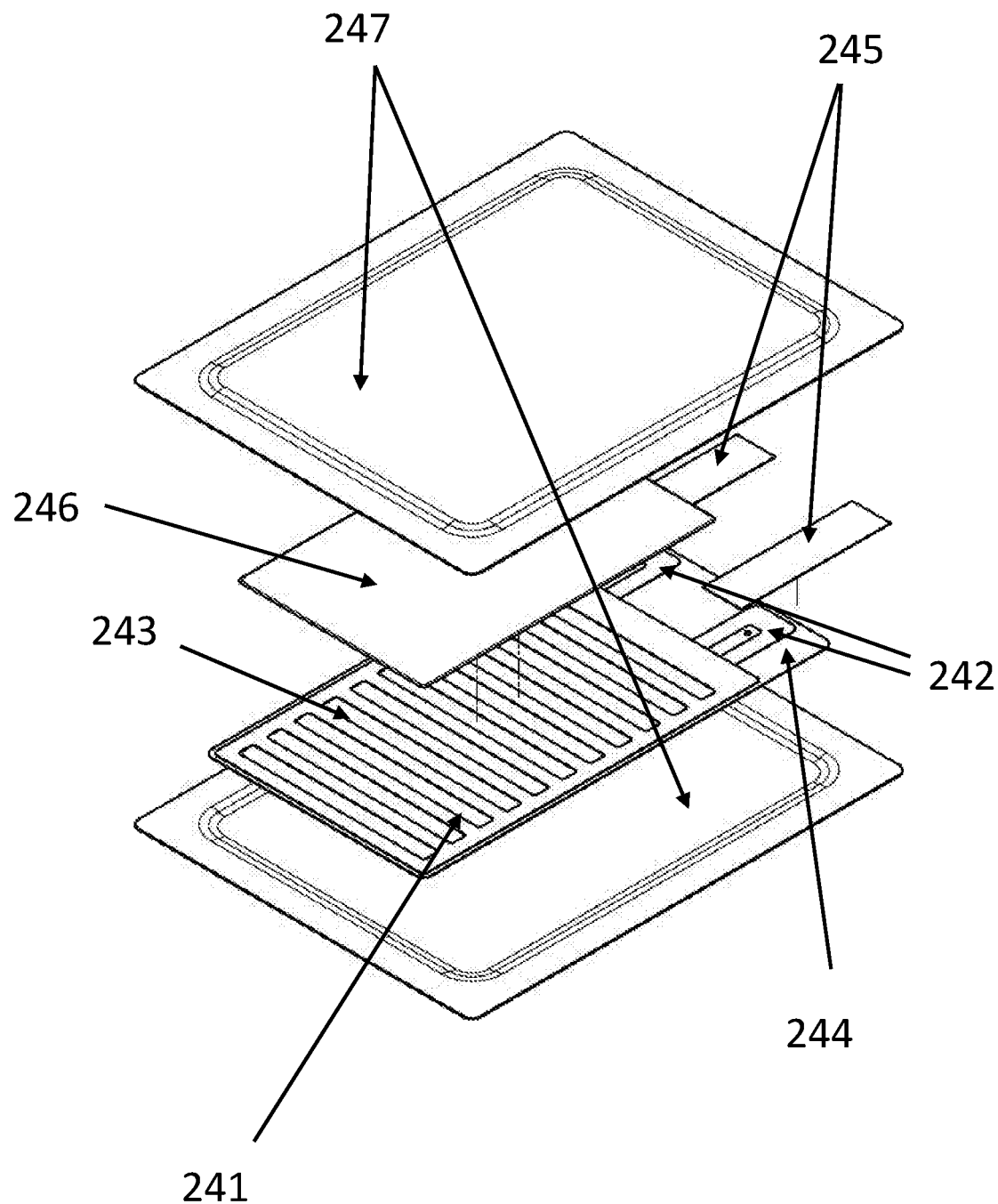
FIGS. 24-27 are schematic images of supercapacitor including Dual Laser carbon foam (this implementation of the carbon foam is called Gii-Cap).

FIG. 24 is an exploded perspective view of the Gii-Cap supercapacitor. It is made up of an array of carbon foam electrodes 241, connected to a pair of screen printed silver connectors 242, made using the Dual Laser process described above. A dielectric layer 243 is screen printed over the carbon foam electrodes 241 and the screen printed silver connectors 242. Carbon foam electrodes 241 are formed on a polyimide base layer 244. A pair of copper connection tabs 245 connect to the pair of screen printed silver connectors 242. An electrolyte layer 246 covers the carbon foam electrodes 241 (e.g. an ion gel electrolyte such as a polymeric hydrogel electrolyte that is a gel or semi-solid at room temperature to minimise leakage risks, and reversibly liquifies at over 90 C, and so can be applied as a liquid during manufacture). The assembly is sealed within an aluminium-laminate heat-seal pouch 247.

Figure 25:
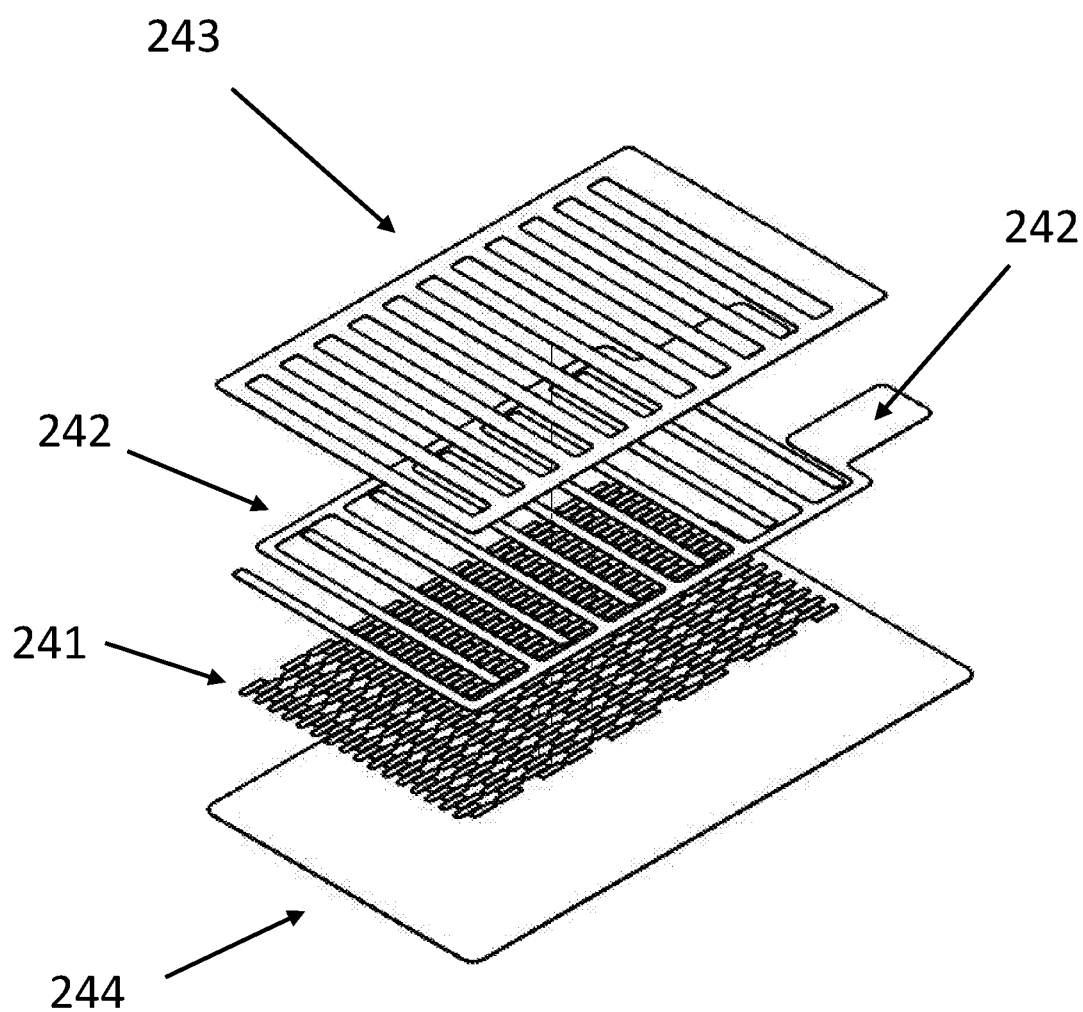

FIG. 25 is an exploded perspective view of the supercapacitor assembly: it is made up of an interdigitated array of carbon foam electrodes 241 that form the supercapacitor; screen printed silver connector tracks 242 provide electrical current to the carbon foam electrodes 241 and are covered by electrically insulating dielectric layer 243. A polyimide sheet 244 forms the base of the assembly.

Figure 26A:
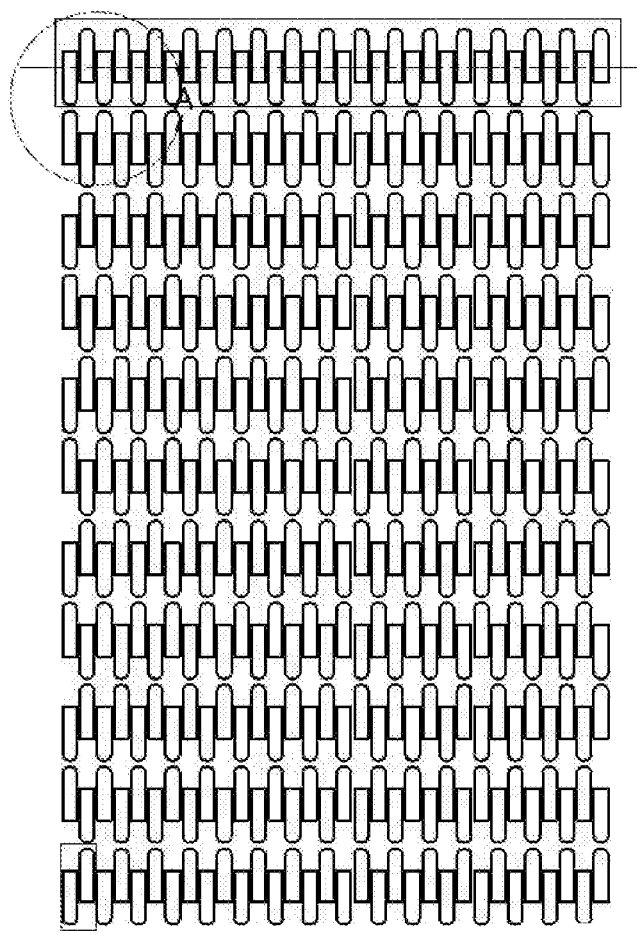
Figure 26B:
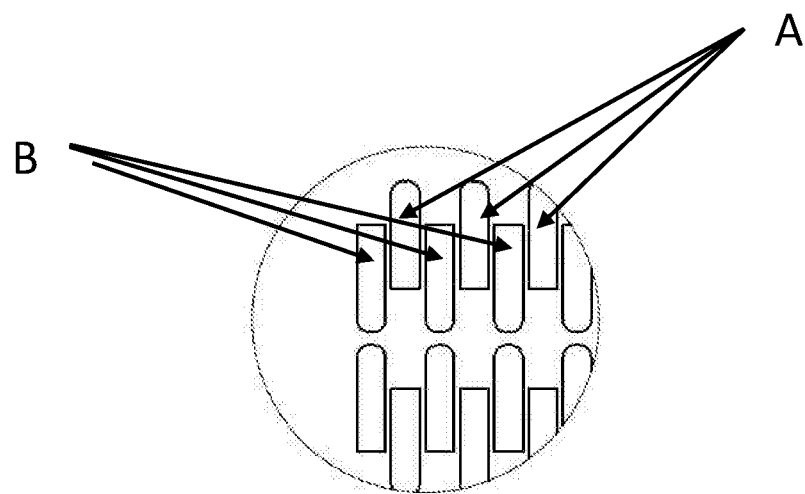

FIGS. 26A-H shows the manufacturing sequence. FIG. 26A shows step 1, the creation of the interdigitated carbon foam electrodes using the Dual Laser process. The enlarged area in FIG. 26B shows the interdigitated carbon foam electrodes in more detail; the Group A electrodes form one set of electrodes, and the Group B electrodes form the other set of electrodes; capacitive coupling between the two groups of electrodes stores energy. The approximate thickness of the carbon foam electrodes is 20-30 μm.

FIG. 26C shows step 2, screen printing the silver collectors. One silver connector A' provides current to the Group A electrodes, and silver connector B' provides current to the Group 13 electrodes. The approximate thickness of a silver layer is 20-40 μm and several layers may be applied.

We use a 'common collector' layout: a typical interdigitated supercapacitor has two long silver collectors, with graphene digits extending from one side of each of the long silver collectors. The long silver collectors present a significant resistance because of their length and use a significant amount of silver. Also, printing the curved parts of the collectors is difficult. In the 'common collector' approach shown in FIG. 26D, we have carbon foam digits C extending from both sides of a shared collector 242: this maximises space utilisation of the digits and hence capacitance, reduces the amount of collector material needed and eliminates difficult curved collector parts.

The region 250 of the carbon foam digits that connect to a common collector have rounded edges; these reduce the chance of stress fractures forming and increases the reliability of the electrical connection.

Figure 26F:
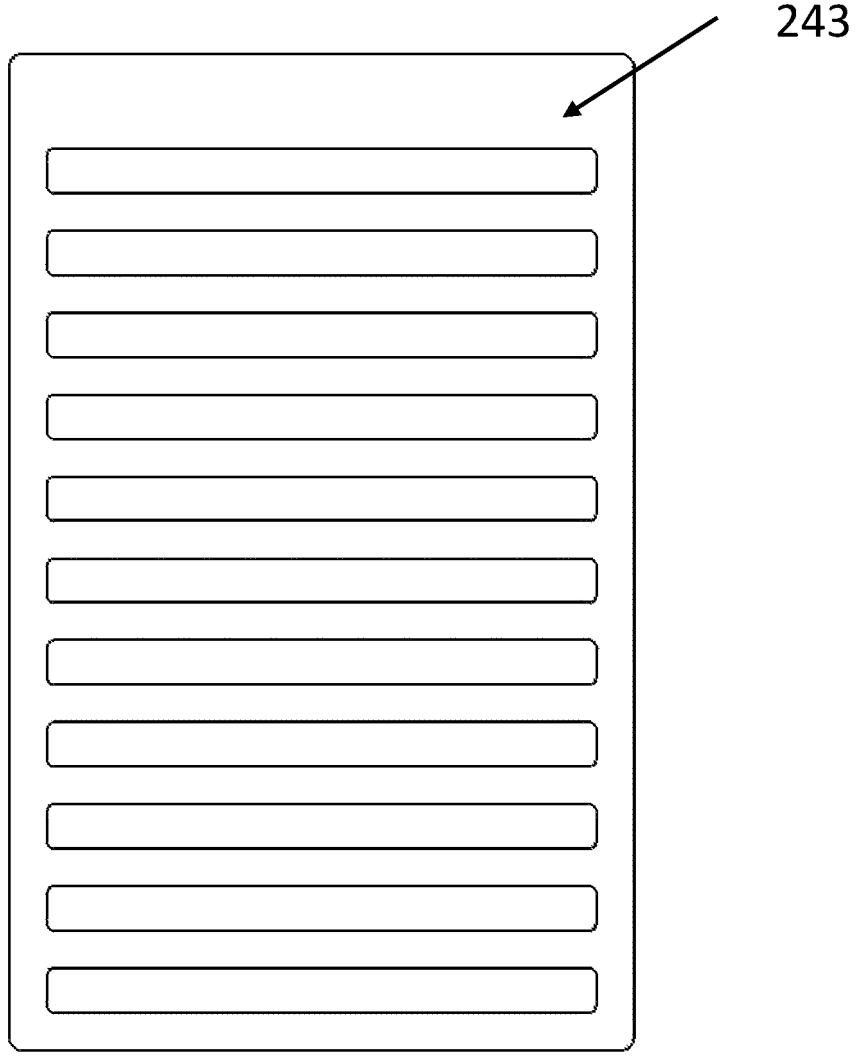

FIG. 26F shows Step 3, screen printing the dielectric layer 243 over the silver collectors to electrically insulate them; the approximate thickness is 10-30 μm.

Figure 26G:
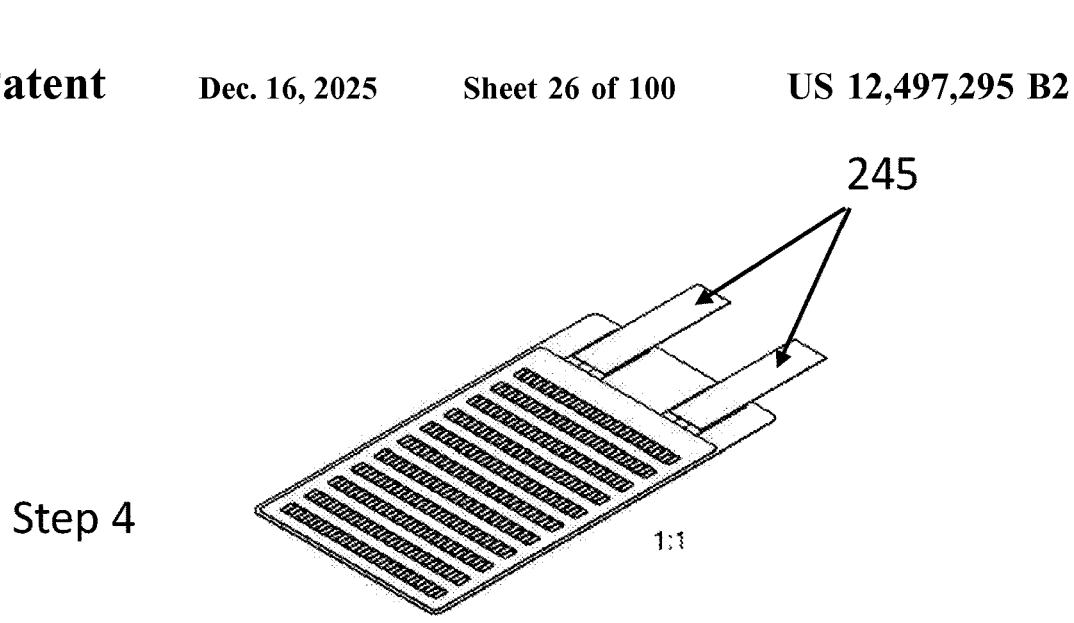
Figure 26H:
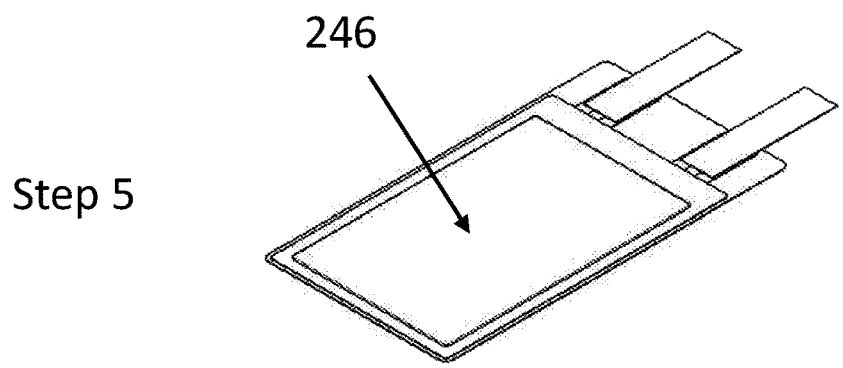
Figure 26I:
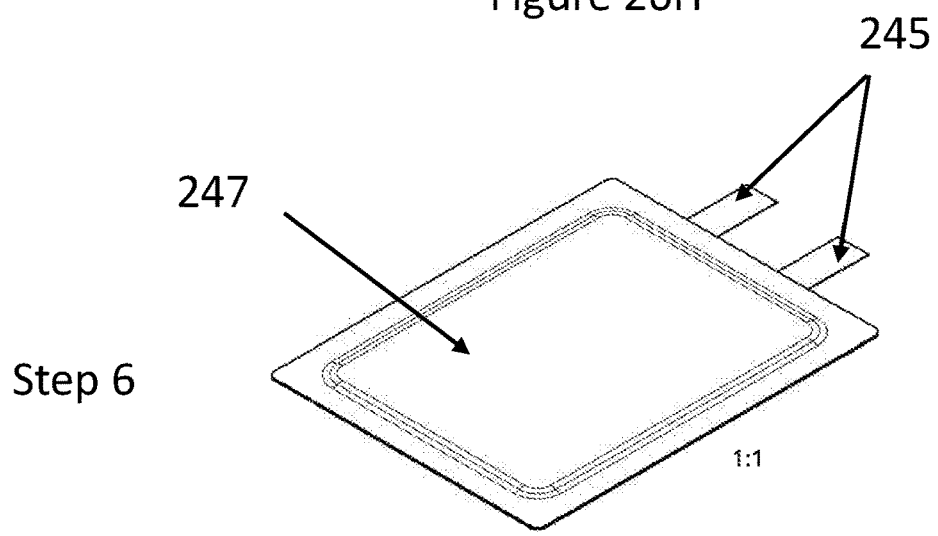

FIG. 26G shows Step 4, adding copper connection tabs 245 (made from conductive metallic tape) to connect to the silver collectors 242. FIG. 26H shows Step 5, depositing electrolyte layer 246 over the interdigitated carbon foam digits. The electrolyte could be a hydrogel and salt combination (see Appendix 2). FIG. 26I shows Step 6, packaging the entire assembly into aluminium-laminate heat-seal pouch 247, leaving just copper connection tabs 245 exposed. Note also that Step 4, adding the copper connection tabs 245, could be done before Step 2 (screen printing the silver collector) as well as after Step 5, depositing electrolyte layer 246 over the interdigitated carbon foam digits.

Figure 27:
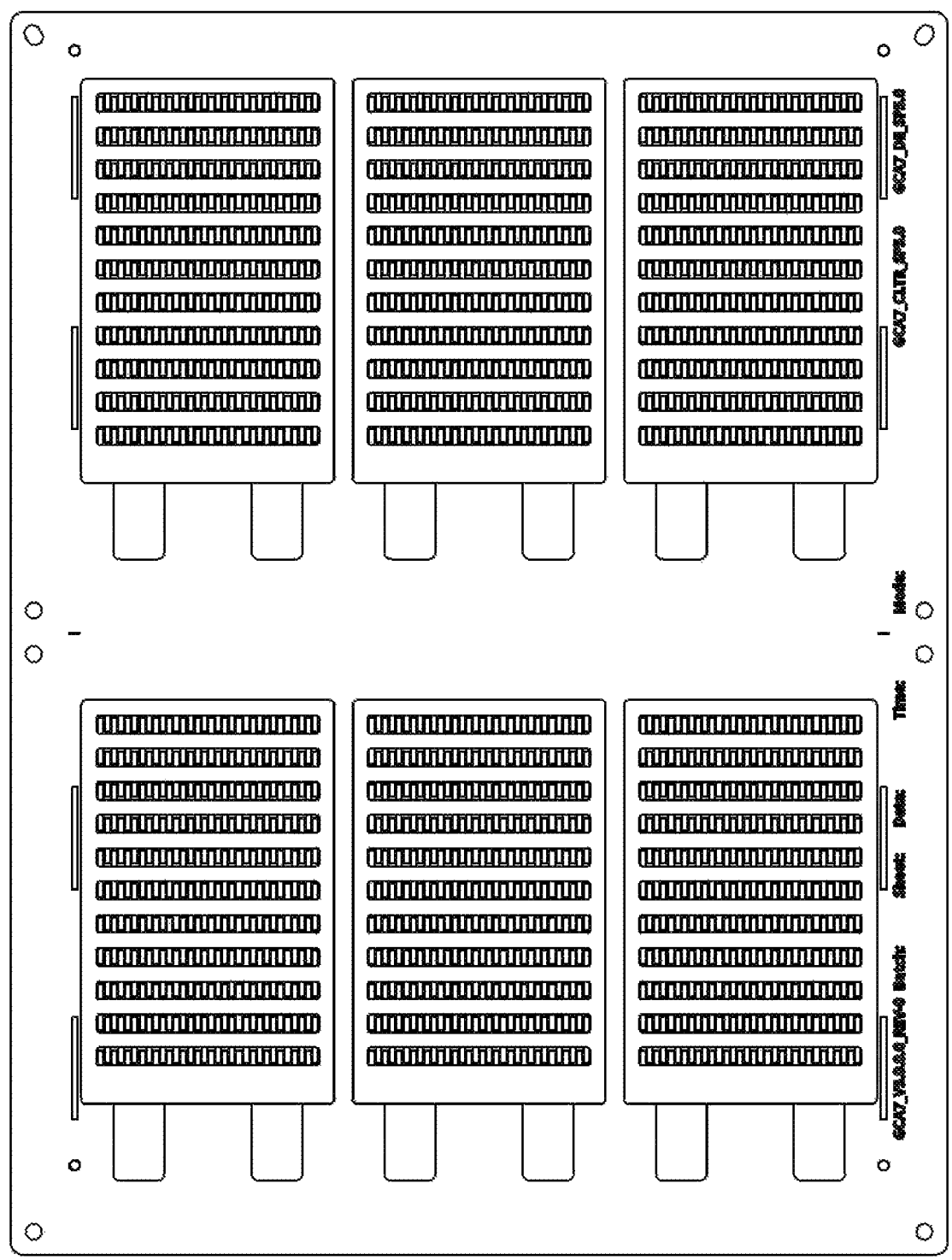

FIG. 27 shows how a single polyimide sheet will accommodate 6 of these Gii-Cap assemblies of 220 mm×180 mm size; other sizes (e.g. A4, A5, A6 or different from A-series standard sizes) are also possible.

Figure 28:
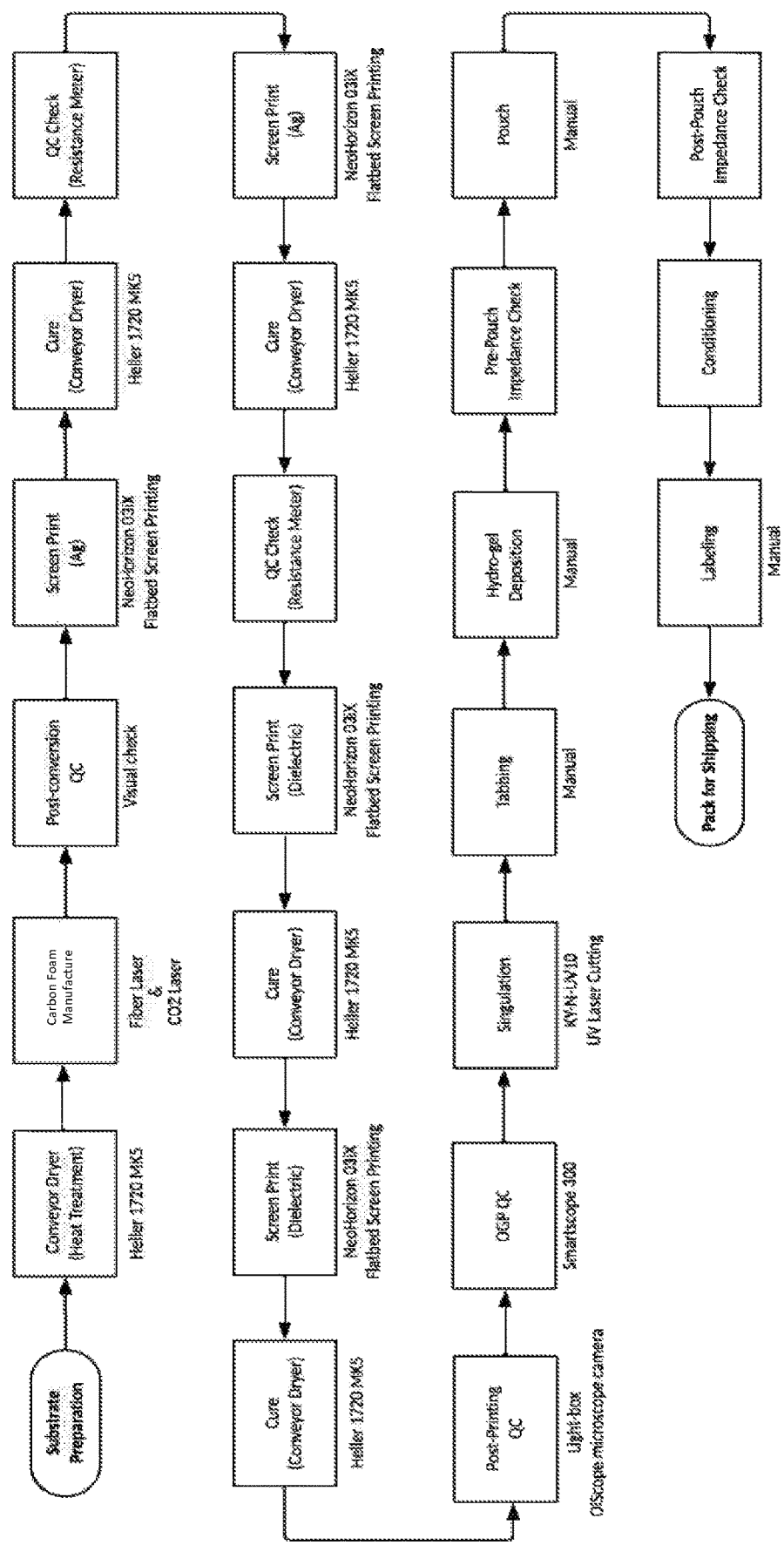
FIGS. 28-29 are detailed processing flow charts for Dual Laser carbon foam (referred to as the Gii-Cap and Gii-Cap+ variants).

The detailed Gii-Cap manufacturing process is shown in FIG. 28.

The specifications for one production run of Gii-Cap supercapacitors is shown in Table 3 below, using a hydrogel electrolyte.

TABLE 3

| Description | EDL supercapacitor |
| --- | --- |
| Format | A7 V4 |

TABLE 3-continued

| | |
|---|---|
| Voltage Window | 2.5 V |
| Capacitance | 4.06 ± 0.10 mF (measured at 65 mA) |
| Equivalent series resistance | 0.77 ± 0.04 Ohm |
| Time Constant | 0.016 ± 0.001 s |
| Energy | 0.0033 ± 0.0001 mWh (measured at 65 mA) |
| Power | 355.77 ± 9.11 mW (measured at 390 mA) |
| Peak Power | 2.03 W |
| N | 6 |

We can generalise to:

An energy storage device, such as a supercapacitor in which energy storage electrodes comprise carbon foam material made, at least in part, by the method defined in any of Features A-K above;

and in which screen printed electrical connection tracks are formed over at least a part of each electrode and a screen printed dielectric layer at least partly covers the electrodes and connection tracks.

Feature M3: Carbon Foam Supercapacitor: The Common Collector

We have seen above how a 'common collector' is used.

We can generalise to:

An energy storage device, such as a supercapacitor, in which energy storage electrodes comprise carbon foam material made, at least in part, by the method defined in any of Features A-K above and are arranged in an interdigitated pattern;

and in which screen printed electrical connection tracks are formed over at least a part of each electrode, and in which a single electrical connection track connects to underlying digits that extend perpendicularly from both sides of the electrical connection track.

Feature M4: Carbon Foam Supercapacitor: The PPC Manufacturing Process

Figure 29:
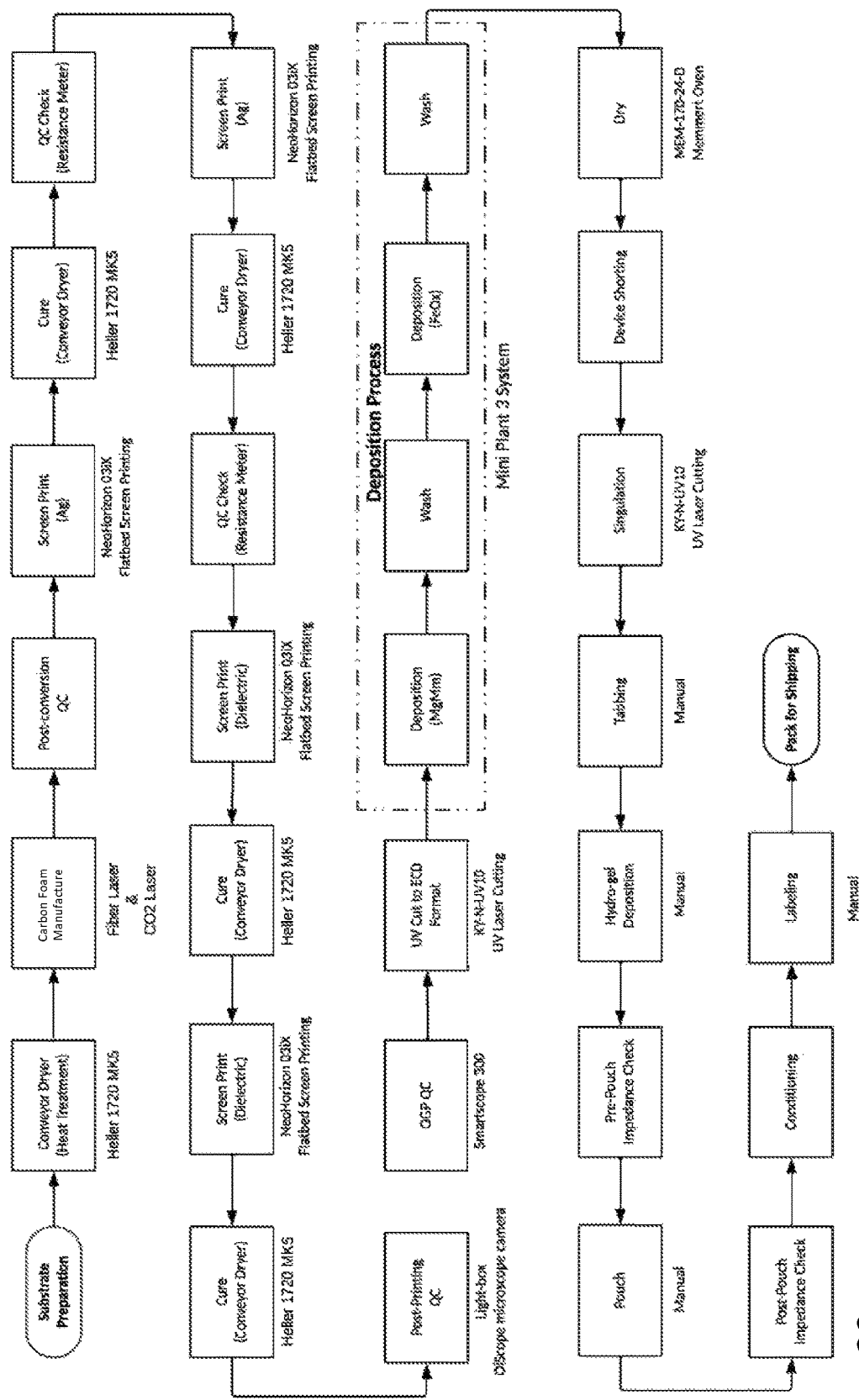

The PPC (Post Printing Conversion) is shown in FIG. 29. The steps are:

1. Silver collectors screen printed on to a substrate (e.g. polyimide).
2. Screen print carbon over silver collectors and then dry.
3. Screen print dielectric over carbon layer and then dry.
4. Create carbon foam in the carbon layer using the Dual Laser process; the carbon foam is attached to the underlying polyimide substrate via a non-graphene intermediary layer.
5. Dispense electrolyte.
6. Add copper/aluminium etc tabs to contact the silver collectors (could also be step 1).
7. Add lid/pouch.

All screen printing steps (1-3) could be done using a reel to reel process, and then the carbon foam is created using the Dual Laser process and the material then kept flat and stacked. Also, only the first laser process (sub-surface carbon material foam creation) could be done in the factory, which then ships the sheets to a customer and the customer does the second stage of the Dual Laser process (laser ablation) and steps 5-7.

Screen printing before creating the carbon foam has advantages: if the carbon foam is made first, it can have sharp edges; a silver screen printed layer applied over these sharp edges can crack at these sharp edges. But by screen printing before creating the carbon foam, we do not have this problem. Also, because we are not drying the carbon foam, it is not hydrophobic.

We can generalise to:

A method of manufacturing an energy storage device, such as a supercapacitor or pseudo-capacitor;

and the method includes the step of (a) screen printing electrical connectors on to a substrate; (b) screen printing a carbon layer over the electrical collectors; (c) screen printing a dielectric over at least some of the carbon layer; then (d) creating carbon foam energy storage electrodes at least in part by the method defined in any of Features A-K above.

Feature M5: Carbon Foam Pseudo-Capacitor: A Metal Oxide Variant

A metal oxide electrochemical deposition process (e.g. MnOx for +ve; FexOx for −ve) is used to create the Gii-Cap+ variant; this much higher capacitance compared to the standard Gii-Cap device (see Table 4).

TABLE 4

| | |
|---|---|
| Description | Pseudocapacitor |
| Format | A7 V4 |
| Voltage Window | 2 V |
| Capacitance | 856 ± 120 mF (measured at 65 mA) |
| Equivalent series resistance | 0.81 ± 0.03 Ohm |
| Time Constant | 4.0 ± 0.8 s |
| Energy | 0.48 ± 0.07 mWh (measured at 65 mA) |
| Power | 277.91 ± 13.94 mW (measured at 390 mA) |
| Peak Power | 1.23 W |
| N | 12 |

This metal oxide electrochemical deposition process can be applied to the Gii-Cap Supercap manufacturing process and also the PPC process and hence all Gii-Cap products can also be Gii-Cap+ products. A detailed process flow chart is at FIG. 29.

We can generalise to:

A method of manufacturing an energy storage device, such as a supercapacitor or pseudo-capacitor, in which energy storage electrodes comprise carbon foam material made, at least in part, by the method defined in any of Features A-K above:

and the method includes the step of applying an electrochemical deposition process of a pseudo-capacitive material, such as a metal oxide, to the energy storage electrodes.

Feature M6: Carbon Foam Supercapacitor: Using an Ionic-Gel in Low Humidity Environment We use an ionic gel (ionic liquid with fumed silica $SiO_2$) that gives 3V-6V voltage. It is solid below 90° C. and so will not leak during shipment and normal use and hence is especially useful in smart labels and IoT devices; above 90° C. it liquifies and hence can be printed where the electrochemical printing process is done at over 90° C. Ion-gel is usually made with ionic liquid (e.g. 1-ethyl-3-methylimidazolium tetrafluoroborate (EMIMBF4) plus a gel-forming agent (e.g. fumed silica SiO2).

Normally, manufacturing is done in an inert (e.g. Argon) atmosphere because the presence of $O_2$ and $H_2O$ can lead to reduced voltages and stability.

The optimal sweet spot of $O_2$ and $H_2O$ levels where we get the optimal balance between increased capacitance and decreased voltage as described in more detail in Appendix 3 ("GiiCap Iongel").

We can generalise to:

A method of manufacturing an energy storage device, such as a supercapacitor, in which energy storage electrodes comprise carbon foam material made, at least in part, by the method defined in any of Features A-K above;

and the method includes the step of applying an ionic gel in a low humidity but non-inert environment, in which the levels of $O_2$ and $H_2O$ in the environment and measured and controlled to optimise the capacitance of the energy storage device.

In the preceding sections covering Features M1-M6, we have looked at some general features of the Gii-Cap carbon foam supercapacitor. In the following sections, covering Features N—S, we look at some more specific products that implement Gii-Cap.

Feature N1: Electrical Conductor

For devices like the biosensor described above, it is possible and desirable to fabricate the electrical conductors that provide the measurement signal connection from carbon foam material made by the Dual Laser method: because these electrical conductors are very low resistance, the sensitivity is maximised. Electrodes (e.g. the biosensor working electrodes that are functionalised, as well as the reference electrode that is described above as being screen-printed; the capacitor plate electrodes) are examples of electrical conductors covered by this Feature N1. Also, electrodes whose primary function is to merely carry signals and current are also covered by this Feature N1—e.g. to replace conventional silver connection tracks, such as the screen printed Ag electrical connection tracks we describe above that are in biosensors.

We can generalise to:

A method of manufacturing an electrical conductor, in which the electrical conductor comprises carbon foam made, at least in part, by the method defined in any of Features A-K above.

An electrical conductor including carbon foam made, at least in part, by the method defined in any of Features A-K above.

Feature N2: Combined Sensor and Supercapacitor

Features L1-L4 above describes the biosensor that uses the carbon foam made by the Dual Laser method in its sensor electrode; Features M1-M6 describe a supercapacitor and a pseudo-capacitor that uses the carbon foam made by the Dual Laser method in its electrodes.

Highly sensitive and highly selective biosensors can be built that combine both this biosensor and this supercapacitor into a single, integrated device that also includes electronic circuitry to measure the variable being detected or measured, compute a biosensor output, and send that output to a POC diagnostics device or display that output on a display screen of the device (e.g., presence or absence of the target; concentration of the target).

Figure 30:
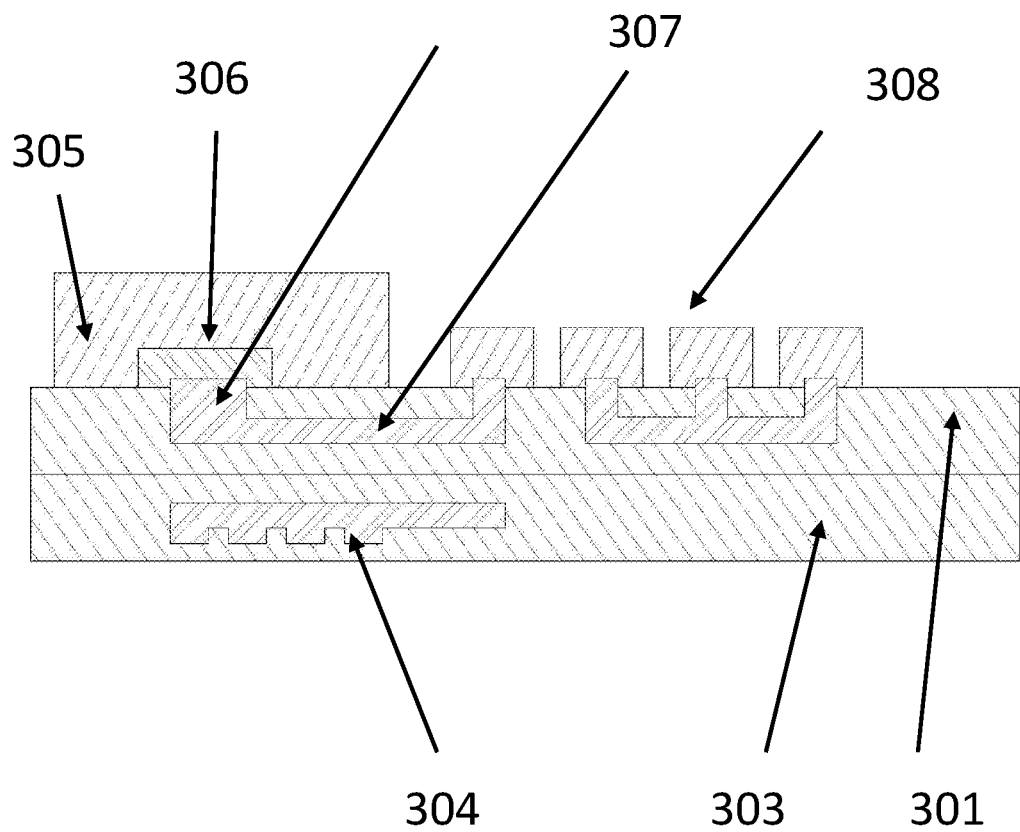
FIG. 30 is a schematic cross section through an integrated lab-on-chip (LoC) device that includes a biosensor and supercapacitor made using Dual Laser carbon foam.

FIG. 30 is a schematic cross section through this integrated LOC device: there are two separate polyimide film layers, an upper layer 301 including a functionalised carbon foam biosensor (Gii-Sens) 302 as described in Feature L and the lower one 303 including a supercapacitor 304 (Gii-Cap) as described in Feature M. Although back-to-back polyimide layers are shown, they could be side-by-side; there could be a single polyimide film that integrates the biosensor 302, and the supercapacitor 304 together onto a single item.

A plastic piece 305 with microchannels 306 provides the microfluidics system that distributes the test fluid over the biosensor 302; sub-surface carbon foam electrodes or conventional connector tracks 307 as described in Feature O lead from the biosensor to the flexible electronics 308 (e.g. a microcontroller that measures the change in electro-chemical properties of the biosensor in the presence of the target analyte; a display panel to show diagnostics results; a power management system that controls the power from the supercapacitor 304 to the electronics 308). The supercapacitor 304 (Gii-Cap) is charged with power (e.g. through a wireless inductive process (not shown) controlled by the microcontroller) and powers up the biosensor measurement process and an integrated display on which quantitative measurements are shown. Alternatively, a rechargeable secondary battery (not shown) or a non-rechargeable primary battery (not shown) could charge the supercapacitor 304, and the supercapacitor 304 then powers the biosensor measurement process. Another variant is for a rechargeable secondary battery (not shown) or a non-rechargeable primary battery (not shown) to charge the supercapacitor 304, and also power the biosensor measurement process. The supercapacitor 304 is then reserved for powering up a high-power process, such as a wireless data transmission, so that the LOC becomes a self-contained LOC device that can both perform a diagnostic process and also wirelessly transmit results data, without the need for a user to approach the LOC, as would be required if the LOC used conventional NFC (near-field communications). The electrical connector tracks from the supercapacitor 304 to the flexible electronics 308 are not shown.

Figure 31:
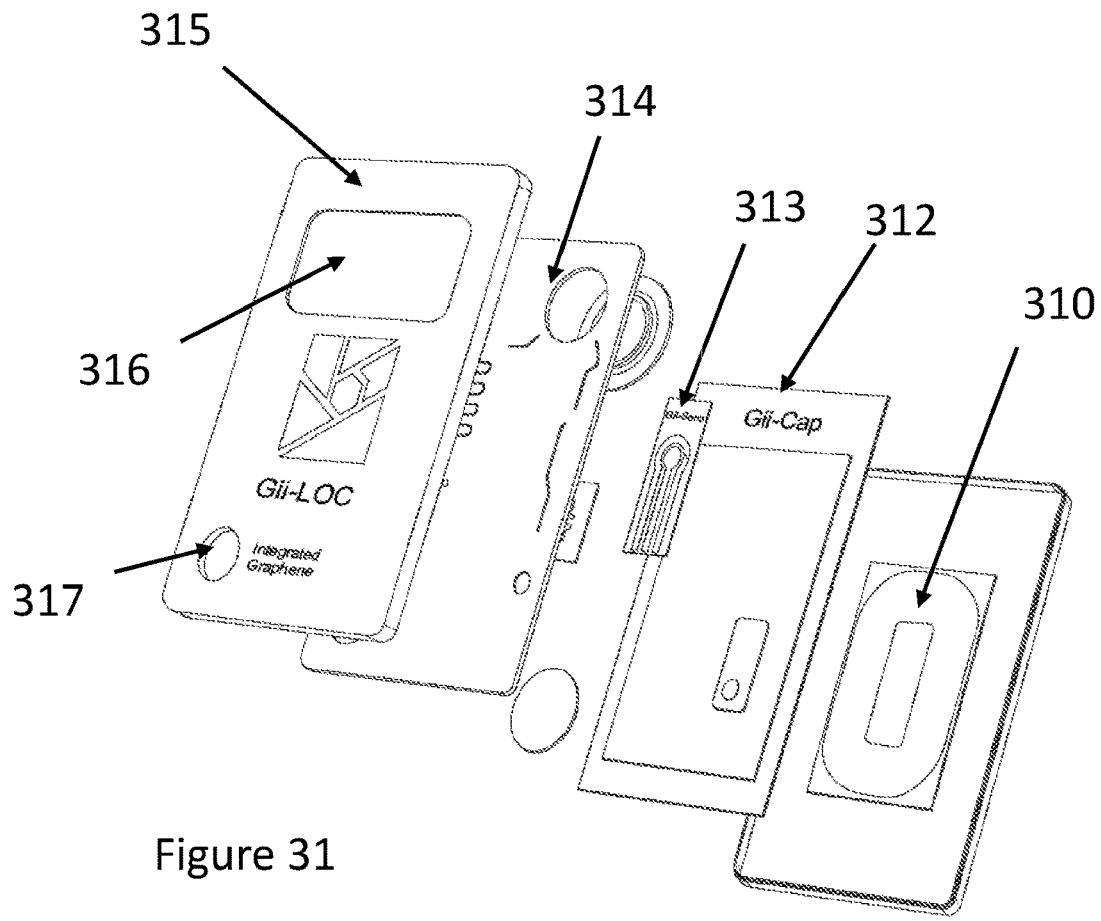
FIG. 31 is an exploded view of a fully integrated LoC device.

An exploded view of a fully integrated LoC device is show in FIG. 31. Moving up from the lowest layer, we have (i) an inductive power loop 310; (ii) the Gii-Cap supercapacitor 312 wirelessly powered by the inductive loop 310; (iii) the Gii-Sens biosensor 313; (iv) a layer 314 with the electronics for the biosensor that are powered by the supercapacitor 312 and microfluidics channels; (v) a top panel 315 that includes a display 316, again powered by the supercapacitor, and also the circular well 317 into which the sample is delivered.

Figure 32:
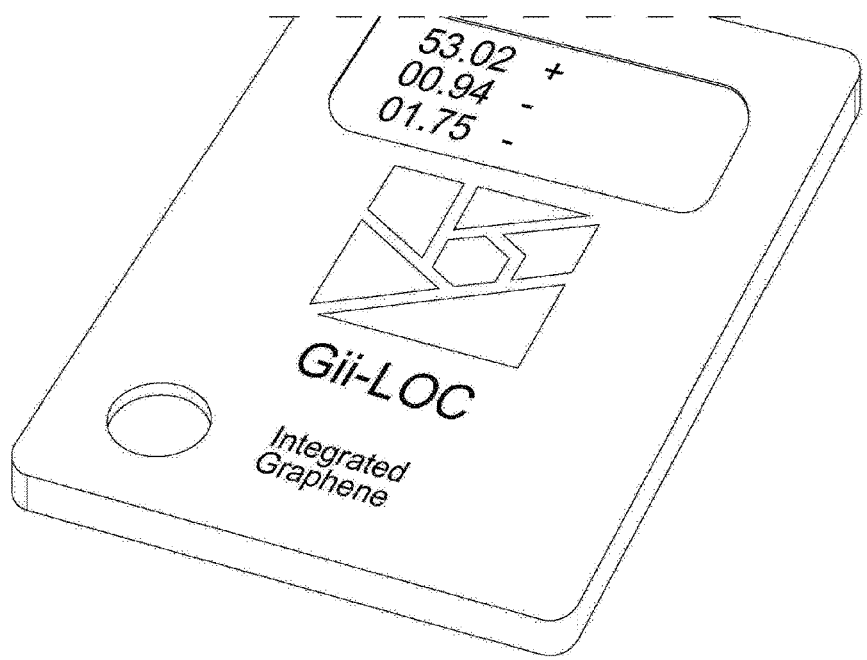
FIG. 32 shows the LoC device displaying quantitative results on its display.

FIG. 32 shows the LOC displaying quantitative results on its display.

Figure 33:
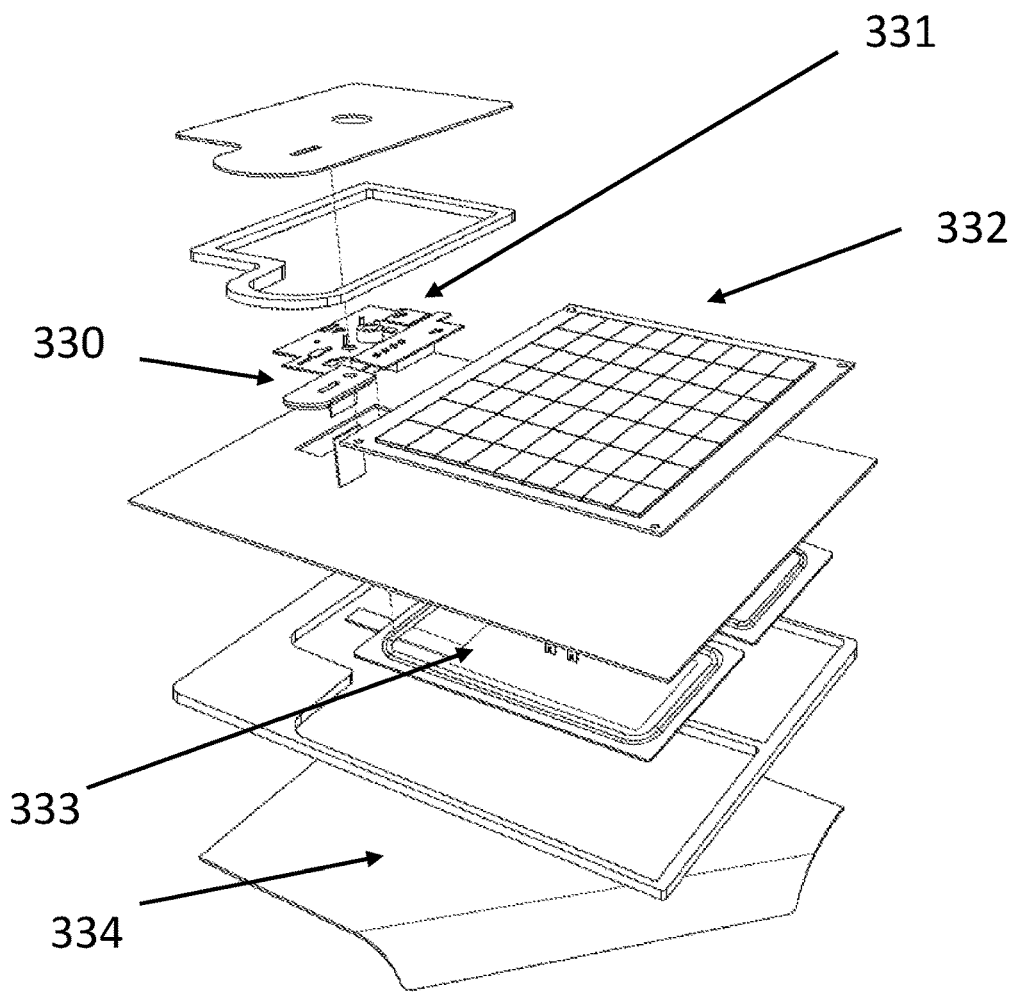
FIG. 33 is an exploded view of an environmental monitoring device that includes a Gii-Sens sensor.
Figure 34:
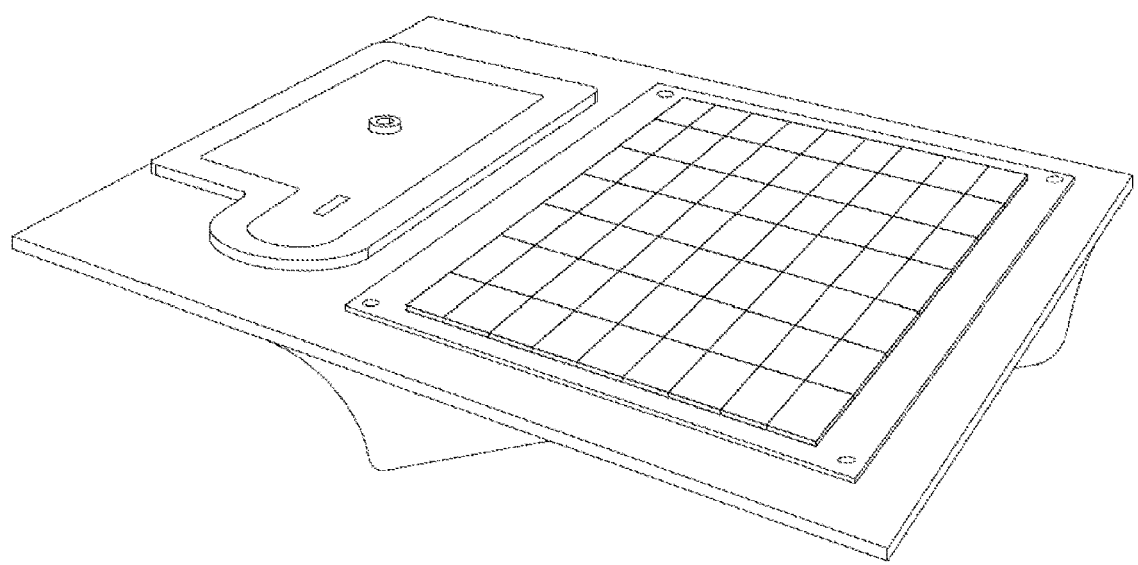
FIG. 34 is a view of the assembled environmental monitoring device

FIG. 33 shows an exploded view of an environmental monitoring device that includes a Gii-Sens sensor 330 configured to detect environmental parameters, such as CO2 level, volatile organic compounds and other atmospheric pollutants. Gii-Sens is not limited to being a biosensor but can detect any molecules that the carbon foam sensor electrodes can be functionalised to detect. The environmental monitoring device includes a Gii-Sens sensor 330 and related control and wireless transmission (e.g. LoRaWAN) electronics 331, and a PV solar cell 332 and a Gii-Cap supercapacitor 333. A secondary or primary battery (which could be a printed battery) is included in electronics 331, and, working together with PV solar cell 332, powers those electronics and charges the Gii-Cap supercapacitor 333. The Gii-Sens sensor can also be configured to measure temperature, humidity and pressure. The device has a back 334 that can be peeled away to reveal a sticky surface, so that the device can be stuck on a wall etc. The PV solar cell, in conjunction with the secondary or primary battery on electronics 331, provides power to charge the Gii-Cap supercapacitor 333 and the supercapacitor 333 in turn provides the peak bursts of power needed for data transmissions. The device can be permanently installed and remain in situ for many years, requiring no battery changes at all, unlike current environmental monitoring devices. It can detect atmospheric pollutants with a signal to noise ratio that is better than conventional devices. The assembled device is shown in FIG. 34.

Many other types of devices can be implemented with a combined carbon foam sensor and carbon foam supercapacitor; for example:
  any biosensor that would benefit from being able to transmit data e.g. wirelessly, where the data transmission is powered by the supercapacitor, for example, wearable health monitoring devices, such as continuous glucose monitors, other wearable monitors sensing levels of electrolytes, potassium, sodium, lactose.

any sensor device (i.e. not necessarily a biosensor) that would benefit from being able to transmit data e.g. wirelessly, where the data transmission is powered by the supercapacitor.

any IoT device that would benefit from being able to transmit data e.g. wirelessly, where the data transmission is powered by the supercapacitor.

the device may include electronics that are powered by the supercapacitor.

the device may include a battery to charge the energy storage device and/or power device electronics.

the device may include a PV cell to charge the energy storage device and/or a secondary battery in the device and/or power device electronics.

We can generalise to:

A method of manufacturing a device that includes both a sensor, and an energy storage device, such as a supercapacitor, in which both the sensor and the energy storage device comprise a carbon foam material made, at least in part, by the method defined in any of Feature A-K above.

A sensor device, such as a biosensor, including (a) a sensing electrode comprising carbon foam material made, at least in part, by the method defined in any of Features A-K above and (b) an energy storage device, such as a supercapacitor, in which the energy storage device comprises carbon foam material made, at least in part, by the method defined in any of Features A-K above.

A point of care diagnostics device including (a) a sensing electrode comprising carbon foam material made, at least in part, by the method defined in any of Features A-K above and (b) an energy storage device, such as a supercapacitor, in which the energy storage device comprise carbon foam material made, at least in part, by the method defined in any of Features A-K above.

Feature N3: Combined Supercapacitor and Battery

In this example, we combine two different power sources into a single device to form a consolidated or hybrid power source: the device has a battery (e.g. a printed battery or a conventional battery) and a supercapacitor that uses the carbon foam made by the Dual Laser method in its electrodes; they work together in a complimentary manner. The battery can be a use-once, non-rechargeable battery (a 'primary' battery) or it can be a rechargeable battery (a 'secondary' battery).

The power sources have complimentary roles: the battery can provide a slow, long-term charge to the supercapacitor or power for electronics that consume relatively low levels of power; the supercapacitor can provide a fast, high-power discharge and power functions that need much higher levels of power (e.g. a wireless data connection function and a data payload transmission function). Note that the supercapacitor can be an EDL supercapacitor or a pseudo-capacitor, or any other form of energy storage device. The device could be used where you need occasional high power (e.g., to power a transmitter to connect to a data network and send a data payload), but the device needs to be self-contained and to last many months or years in the field: the device could be a high value asset tracking label, which only occasionally needs to broadcast its information, but needs to do so at higher power than a conventional printed battery can supply.

Figure 35:
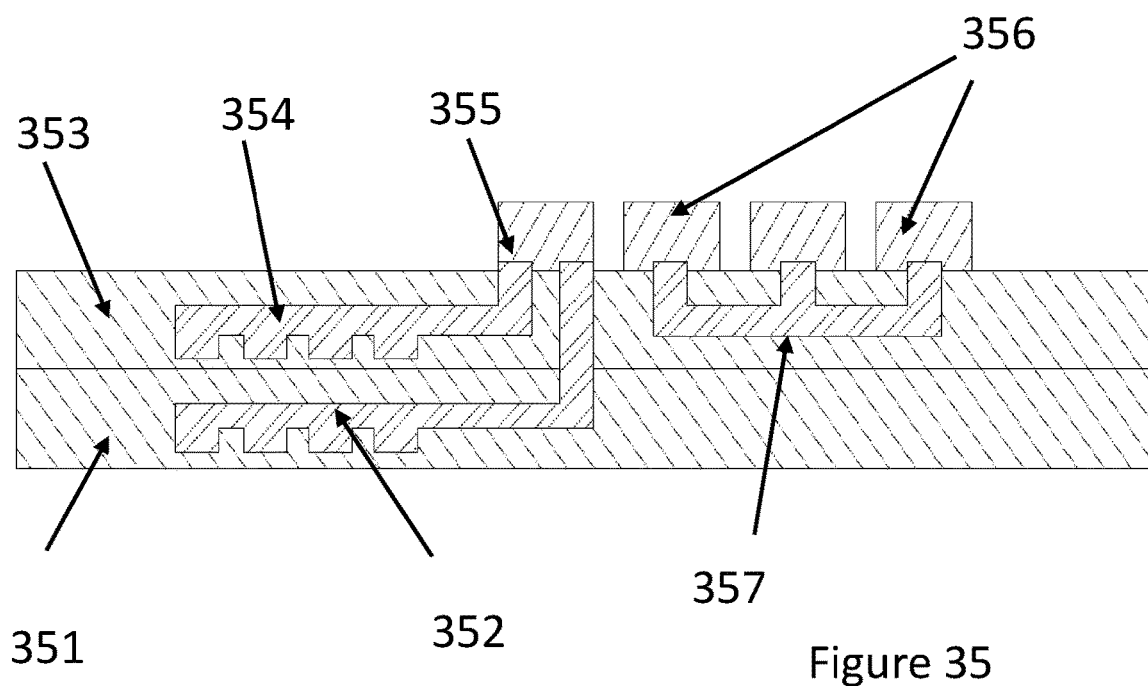
FIG. 35 is a schematic cross section through a device that has a battery (e.g. a printed battery or a conventional battery) and also a Gii-Cap supercapacitor.

A schematic is shown in FIG. 35. There are two separate polyimide film layers, one layer 351 including a supercapacitor (Gii-Cap) 352 as described in Feature M and one layer 353 including a battery 354, such as a printed battery; this may include electrodes made using the Dual Laser process fabricated carbon foam or a conventional process. It is possible also to fabricate the printed battery 354 and the supercapacitor 352 on the same piece of polyimide, although yield may suffer since any defect in either the printed flexible battery or the supercapacitor will lead to a rejected device.

Sub-surface carbon foam electrodes as described above (or conventional printed electrodes) lead from the supercapacitor (Gii-Cap) 352 and also the printed battery 354 to a BMS (battery management system) 355; the BMS 355 provides power to flexible electronics 356; sub-surface carbon foam electrodes or conventional connector tracks 357 connect different parts of the flexible electronics 356. The BMS 355 controls the flow of power from the battery 354 to the electronics 356; the battery 354 may trickle charge the supercapacitor 352. (The supercapacitor may also be a primary power source, designed to be charged once at the factory and not subsequently re-charged.)

The battery 354 could be a printed battery, and can be a re-chargeable secondary printed battery or a single-use non-rechargeable primary battery; the battery 354 can trickle charge the supercapacitor 352 and provide power for the sensors or other device electronics 356; the supercapacitor 352 then provides power (e.g. transient peak power) for a circuit with short demands for relatively high bursts of power, such as a data transmitter. As noted above, the printed battery, supercapacitor, electronics can all be part of a single, integrated device—e.g. all on a single substrate, or on separate but attached substrates.

Although back-to-back polyimide layers are shown, they could be side-by-side; also, there could be a single polyimide film that integrates the battery 354, and the supercapacitor 352 together onto a single item.

The battery 354, supercapacitor 352, electronics 356 could all be formed on the substrate or substrates as part of a continuous or batch manufacturing process (e.g. you do not take a previously manufactured battery and combine it with the supercapacitor). This enables interconnects to be constructed as an integral part of the manufacturing process, leading to lower cost, faster manufacturing and greater performance (e.g. where the interconnects are shorter).

The device can be used for a smart label (see below), or IoT environmental monitoring device (e.g. temperature or humidity sensor), train seat occupancy sensor, medical monitoring device (e.g. continuous blood glucose monitor). More generally, the device may include electronics that are powered by the battery; the device may include electronics that are powered by the supercapacitor; the device may include a data transmitter that is powered by the supercapacitor; the battery may be a printed battery; the battery may be a primary battery or a secondary battery.

We can generalise to:

A method of manufacturing an integrated device including a battery and a supercapacitor, the battery providing long term power and the supercapacitor providing short term power at a higher level than the battery, in which the supercapacitor comprises a carbon foam material made, at least in part, by the method defined in any of Features A-K above.

An integrated device including a battery and a supercapacitor, the battery providing long term power and the supercapacitor providing short term power at a higher level than the battery, in which the supercapacitor comprises carbon foam material made, at least in part, by the method defined in any of Features A-K above.

Feature N4: The Smart Label

Figure 36:
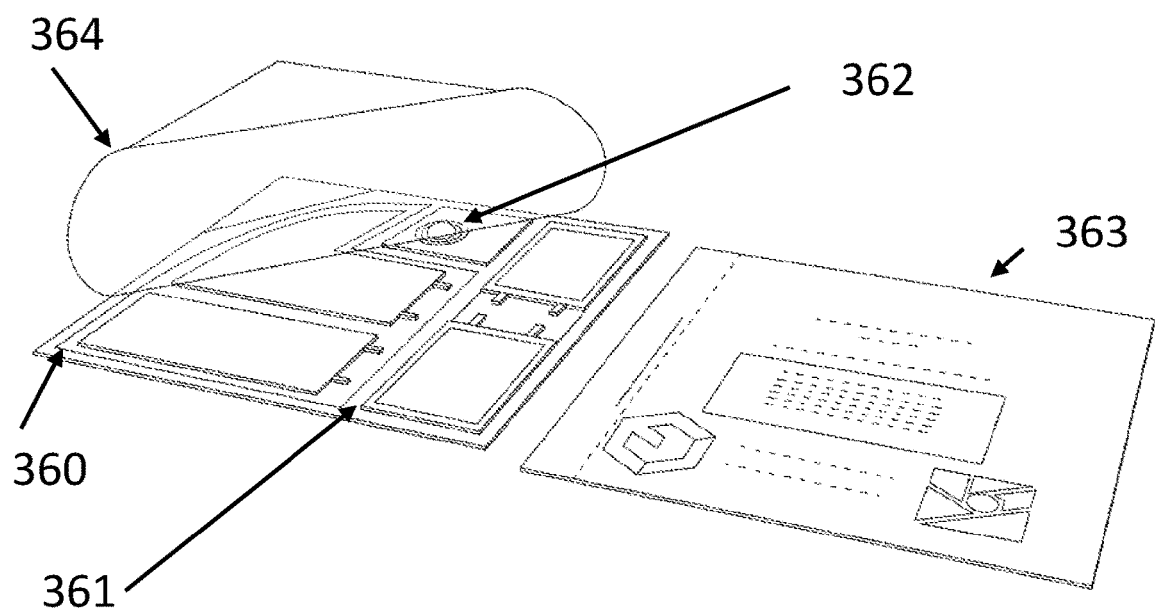
FIG. 36 is a schematic view of a smart label; this has a battery (e.g. a printed battery or a conventional battery) and also a Gii-Cap supercapacitor.

One important application is the smart label, shown in FIG. 36, with the bottom surface shown on the left side and the exposed label surface 363 with human readable text shown on the right; the label includes an adhesive release liner 364 so that the bottom surface can be attached to a package, component etc. The label includes a thin, flexible, battery 360 that is printed onto a polyimide film and then the Gii-cap supercapacitor 361 is formed on the same polyimide layer, (or a different polyimide layer that is joined to the printed battery polyimide film). The thin, flexible, battery may be a non-rechargeable, primary battery or a rechargeable secondary battery. The supercapacitor powers the data transmitter; the printed battery powers the smart label electronics, including sensor, and the power management electronics. The smart label includes human readable, printed information 363 on one surface; the reverse side The smart label includes an electronics module 362 with power management, sensors (e.g. solid-state vibration, temperature, pressure, GPS etc sensors) and data transmit electronics such as an LTE transmitter, or, for ultra-low cost, a LoRaWan transmitter. The supercapacitor 361 provides enough peak power to send useful data packages once a data connection has been established, so there is no need to simply include this data in an 'advertising' signal; instead, the smart label can establish a data connection with a data receiver and then send the data payload once the connection has been established; it can hence be reasonably assured that its data has been received. More generally, the device may include electronics that are powered by the battery; the device may include electronics that are powered by the supercapacitor; the device may include a data transmitter that is powered by the supercapacitor; the battery may be a printed battery; the battery may be a primary battery or a secondary battery.

For scalable manufacturing (e.g. producing millions of smart labels at low cost), reel to sheet manufacturing of the smart label is desirable (See Feature P: Gii 3 below).

We can generalise to:

A smart label including a battery and a supercapacitor, the battery providing long term power and the supercapacitor providing short term power at a higher level than the battery, in which the supercapacitor comprises carbon foam material made, at least in part, by the method defined in any of Features A-K above;

and the smart label includes electronics, such as sensor electronics, powered by the battery and a data transmitter powered by the supercapacitor.

Feature N5: Combined Supercapacitor and Antenna

The supercapacitor from the preceding example in Feature M could power an antenna, but not be integrated with a battery: for example, it could be powered from solar cells or extracting power from local WiFi or from a wireless charger (e.g., Qi standard).

We can generalise to:

A method of manufacturing an integrated device including an antenna and a supercapacitor, in which the supercapacitor powers the antenna and comprises carbon foam material made, at least in part, by the method defined in any of Features A-K above.

An integrated device including an antenna and a supercapacitor, in which the supercapacitor powers the antenna and comprises carbon foam material made, at least in part, by the method defined in any of Features A-K above.

Feature N6: Combined Energy Scavenger+Supercap

One useful feature is to combine an energy scavenger with the carbon foam supercapacitor into a device. The energy scavenger could be a solid state energy harvester, such as a solar cell, or vibration energy harvester (e.g. piezoelectric fibre based), or thermoelectric generator (e.g. Seebeck generator). The supercapacitor can provide power (e.g. transient power) for a circuit with short demands for relatively high bursts of power, such as a data transmitter and antenna. The device may also include a primary battery (e.g. a non-rechargeable printed battery) or a secondary, rechargeable battery.

The energy scavenger can be on the same substrate as the supercapacitor or on separate but joined substrates; the supercapacitor can be on the same side of the substrate as the energy scavenger or on the opposite side.

Where a battery is included in the device (e.g. a printed rechargeable secondary battery), the energy harvester charges the battery, and the battery provides power to low power sub-systems (e.g. a sensor) and also charges the supercapacitor; the supercapacitor provides the transient high power for data transmission. Alternatively, the energy harvester can directly charge the supercapacitor.

This approach can be used for a smart label, or IoT environmental monitoring device (e.g. temperature or humidity sensor), train seat occupancy sensor, wearables, medical monitoring device (e.g. continuous blood glucose monitor). This approach is especially useful where there is a need to continuously (or with high regularity) power a device—for example, where continuous monitoring of environmental or personal health conditions is required.

The device can include a LoRaWan or other ultra-low power transmitter. The supercapacitor can provide enough peak power to send useful data packages once a data connection has been established, so there is no need to simply include this data in an advertising signal; instead, the smart label can establish a data connection with a data receiver and hence be assured that its data has been received.

More generally, the energy scavenger may be a solid state energy harvester, such as a solar cell, or vibration energy harvester (e.g. piezoelectric fibre based), or thermoelectric generator (e.g. Seebeck generator); the device may include one or more sensors powered by the energy scavenge; the energy scavenger may charge the supercapacitor; the device may include a primary or secondary battery; the device may be a smart label, or IoT environmental monitoring device (e.g. temperature or humidity sensor), train seat occupancy sensor, wearable, or medical monitoring device We can generalise to:

A data logging device including an energy scavenger system and a supercapacitor, in which the supercapacitor powers an antenna and comprises carbon foam material made, at least in part, by the method defined in any of Features A-K above.

Feature O1: 3D Carbon Foam Structures: Gii-Thru for Gii-Cap

In earlier sections, the carbon foam in the Gii-Cap supercapacitor is formed into a single, planar layer of interdigitated digits. In this section, we describe a three-dimensional structure of the carbon foam which enable the carbon foam supercapacitor electrodes to be formed as a 3D structure of parallel plates—the energy storage is potentially larger than a mono-layer of interdigitated graphene foam digits.

Figure 37:
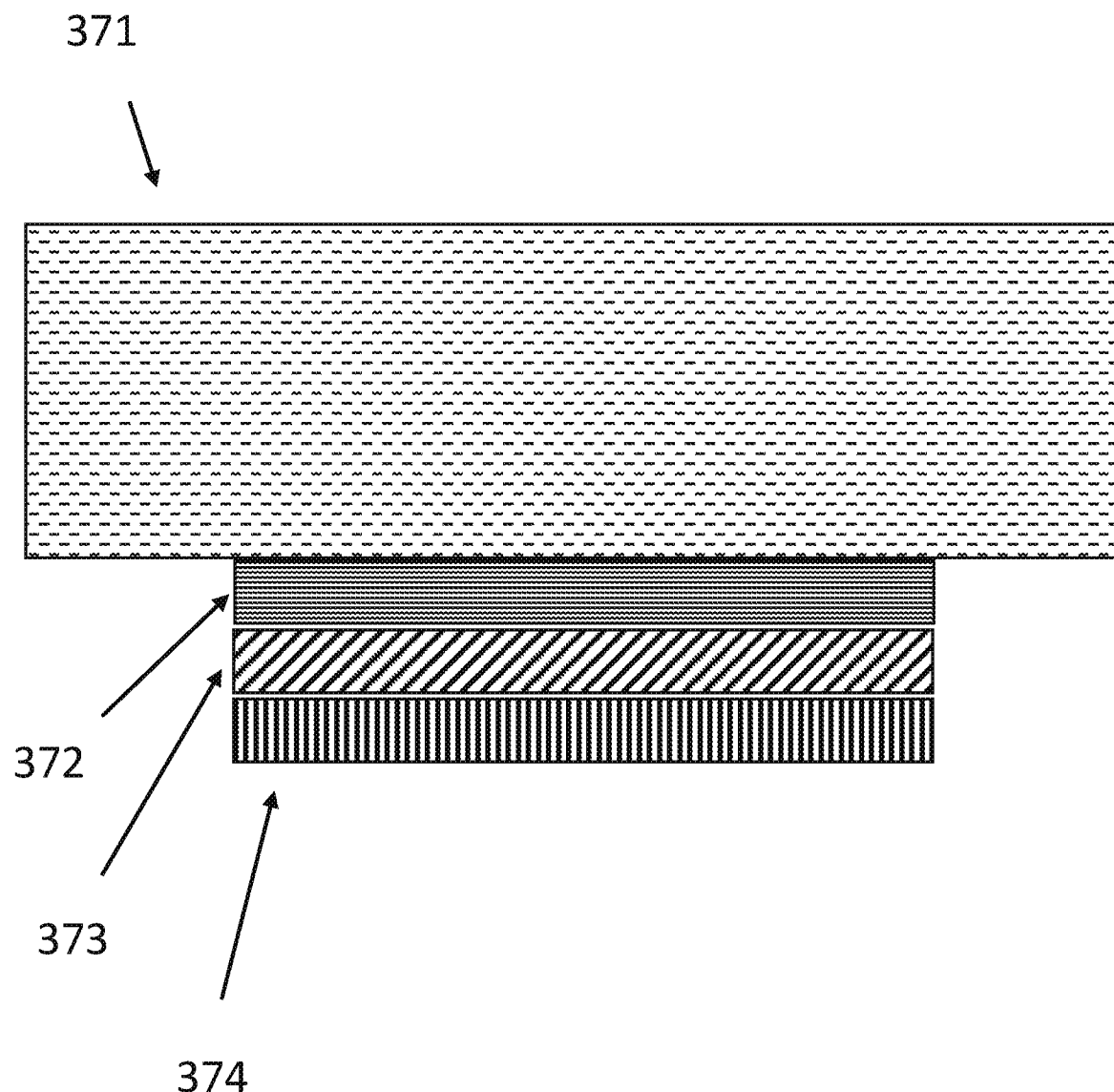
FIG. 37 a schematic cross section showing the basic layering of different materials in the Gii-Thru variant, which is a three-dimensional structure of the carbon foam.

FIG. 37 shows the basic layering of different materials in the core structure. Multiple screen printing steps are performed on a sheet of PI polyimide film 371. First, a conductor, such as a carbon ink or carbon paste layer 372, is screen printed on to the lower surface of the polyimide film 371. Then, a collector 373, e.g. a screen printed silver collector, is screen printed over the carbon layer 372. And then, a dielectric layer 374 is screen printed over the collector.

Figure 38:
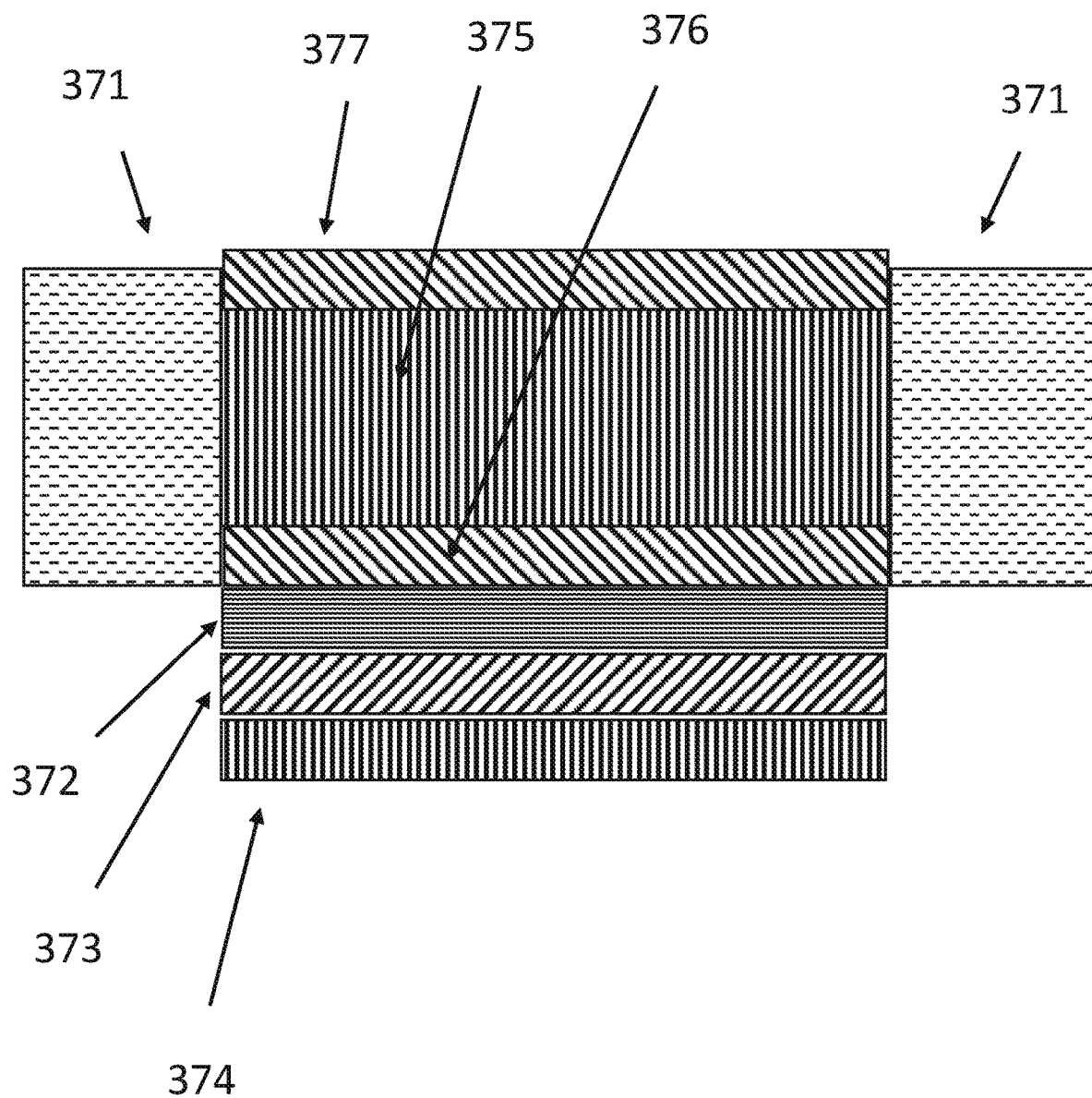
FIGS. 38-42 are schematic views through various Gii-Thru Gii-Cap/Gii-Cap+ three-dimensional supercapacitor devices.

FIG. 38 shows a carbon foam layer formed in the polyimide film 371 using the Dual Laser process described above: more specifically, an IR laser forms an encapsulated carbon foam layer 375 in the PI film 371; below this carbon foam layer is a disorganised, amorphous non-graphene layer 376 that forms at the lower surface of the PI film 371. A C02 ablation laser exposes the previously encapsulated carbon foam layer 370, giving the exposed surface layer 377 a unique morphology.

This structure provides an electrically conductive pathway from the collector layer 373, through the conductive ink or paste layer 372, through the disorganised, amorphous non-graphene layer 376 and then to the carbon foam layer 375. In this way, the electric potential of a large area of carbon foam 375 can be raised, enabling it to function as a capacitive plate; the structure forms part of a half-cell.

Typical thicknesses are as follows: polyimide film 371: 127 µm; carbon ink layer: 20 µm; silver collector layer 373: 30 µm; dielectric layer: 40 µm; carbon foam layer 375 and disorganised, amorphous non-graphene layer 376: 127 µm; unique surface morphology layer 377: 25 µm.

Note that the Gii-Cap+ (the variant that uses a metal oxide electrochemical deposition process (e.g. MnOx for +ve; FexOx for −ve—see Feature M2 above) and that delivers much higher capacitance compared to the standard Gii-Cap device can be used in Gii-Thru.

We can generalise to

An energy storage device, such as a supercapacitor, including:
(i) a carbon pre-cursor film;
(ii) a screen printed conductive paste or ink layer, on the surface of the carbon pre-cursor film;
(iii) a screen printed collector layer over the screen printed conductive paste or ink layer;
(iv) a screen printed dielectric layer over the collector layer;
(v) energy storage electrodes that comprise carbon foam material made from the carbon pre-cursor film at least in part by the method defined in any of Features A-K above, and in which an electrically conductive path is formed from the carbon foam material to the collector layer, via the conductive paste or ink layer.

Feature O2: 3D Carbon Foam Structures: Gii-Thru Stackable Gii-Cap/Gii-Cap+

It is possible to stack a number of the structures described in FIG. 38 on top of one another; since the surface area of the carbon foam layer can be large (significantly larger than the surface area of the digits in the planar interdigitated supercapacitor described earlier) this enables high performance supercapacitors to be produced.

Figure 39:
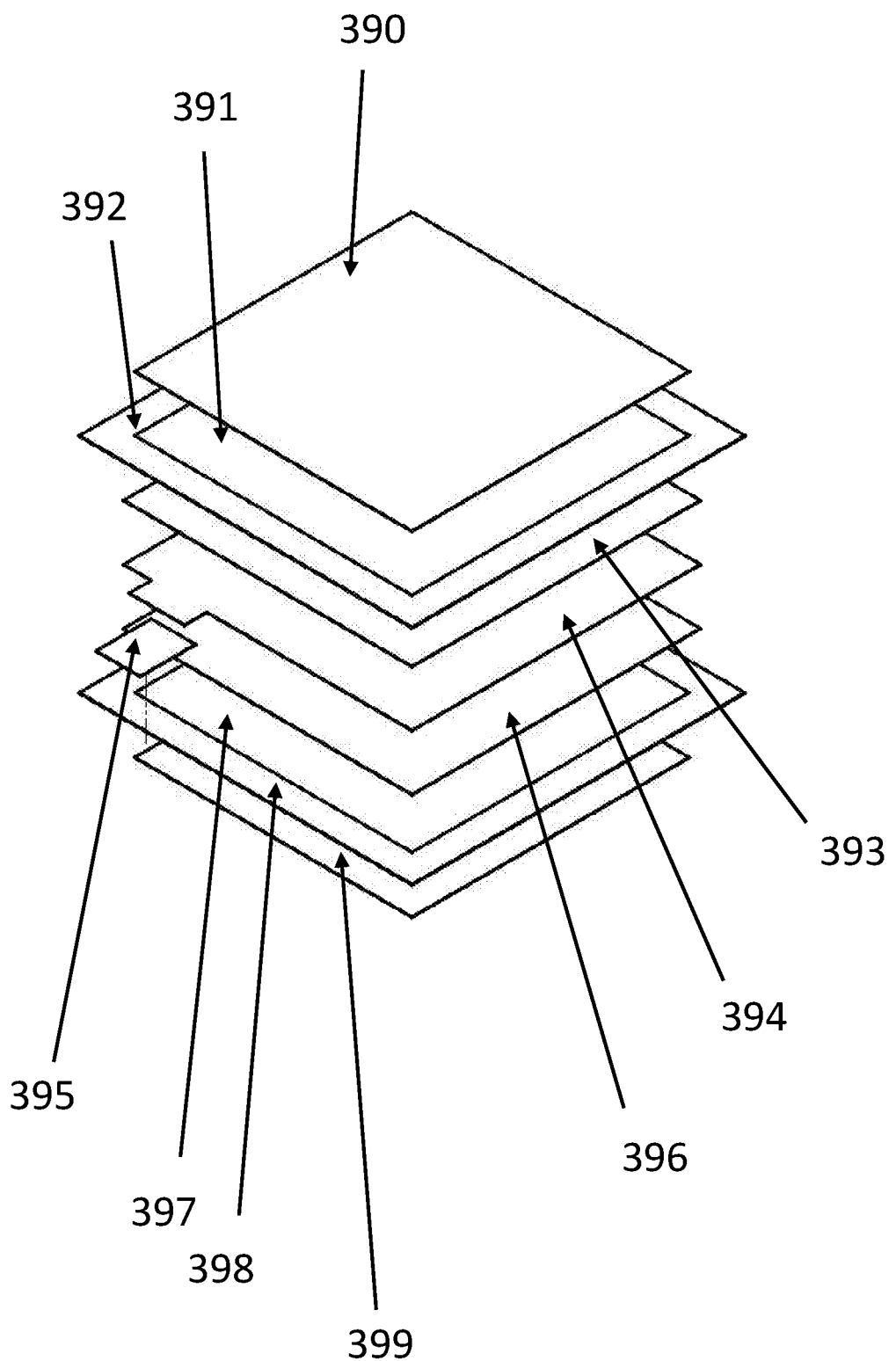
Figure 40A:
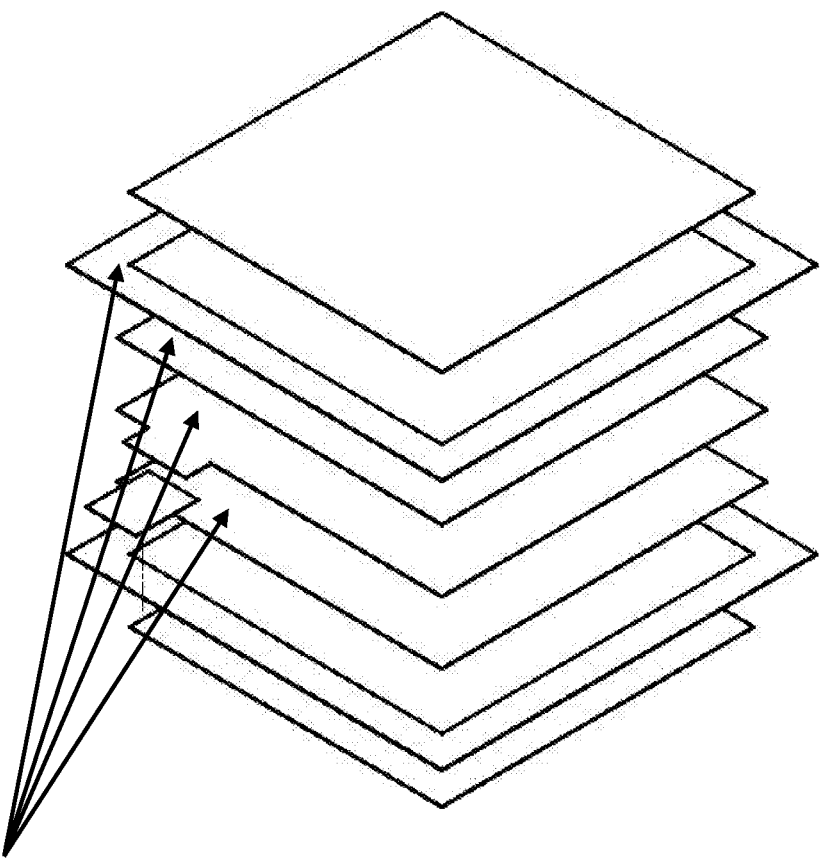
Figure 40B:
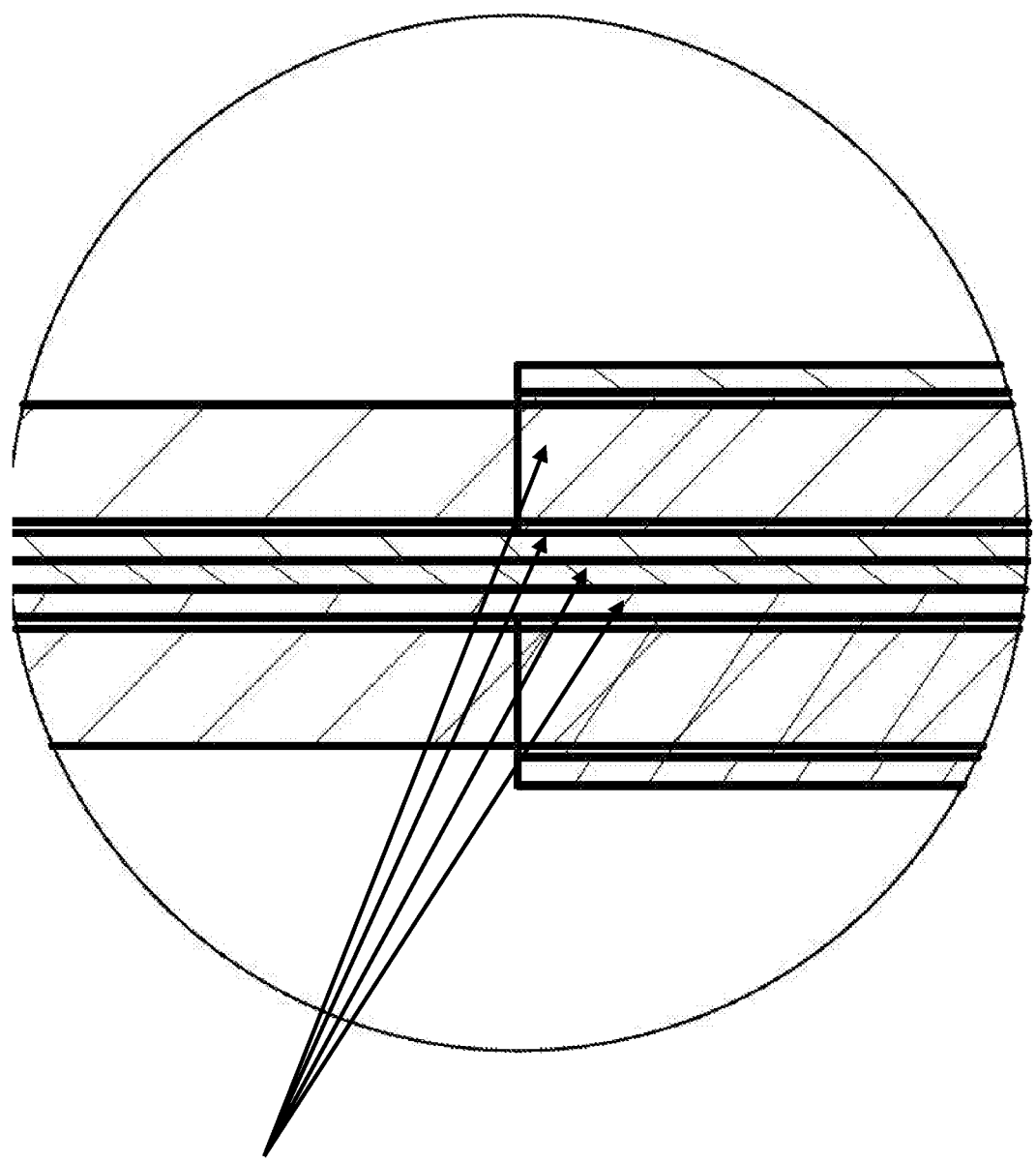
Figure 40C:
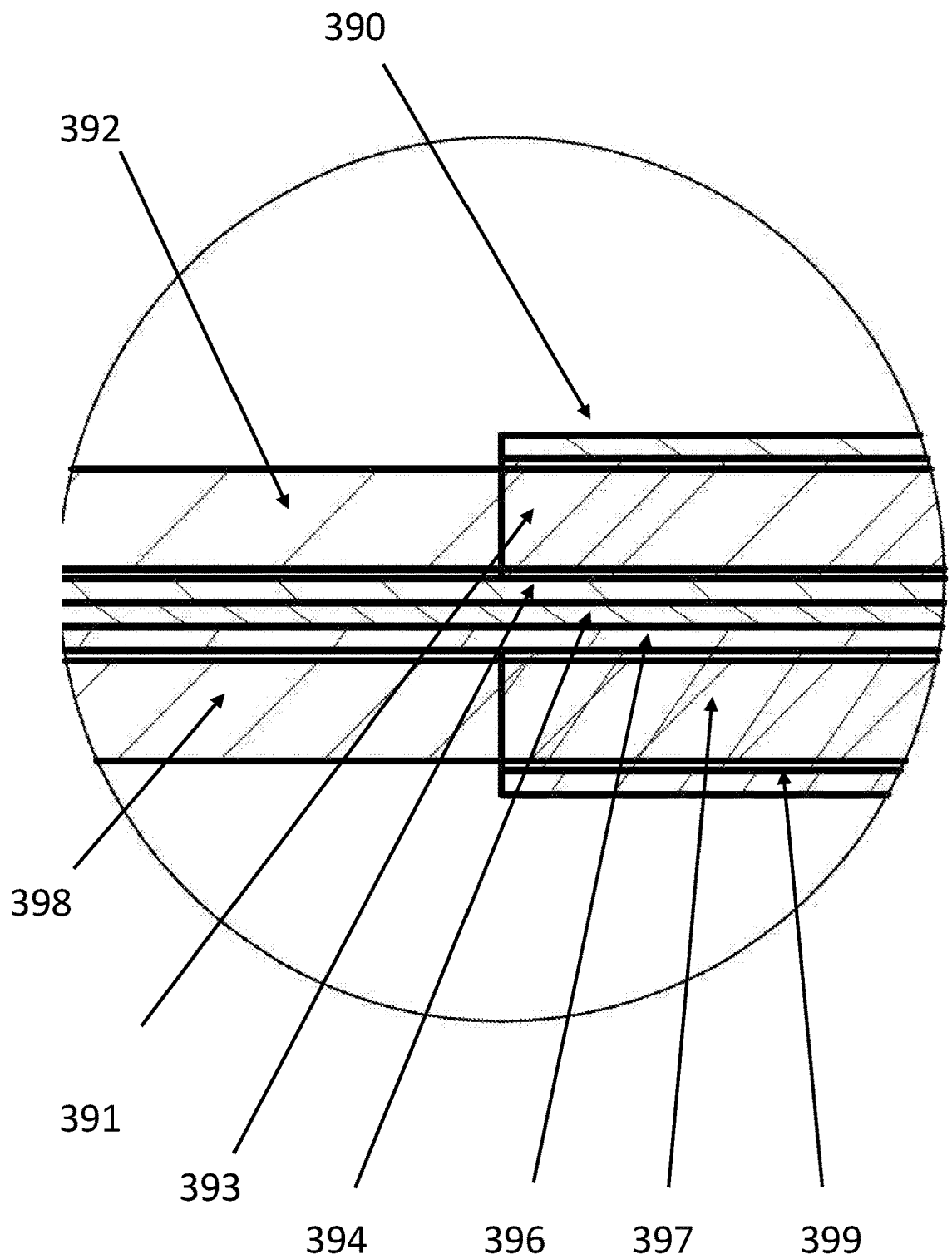

A half-cell is shown in FIG. 39. It includes (moving progressively down through the structure) a hydrogel electrolyte layer 390, carbon foam layer with unique surface morphology 391 in a PI film 392; screen printed carbon paste layer 393; screen printed silver connector layer 394 with external copper tab 395 connection point; screen printed dielectric isolation layer 396; a second carbon foam layer with unique surface morphology 397 in a PI film 398, and at the base of the stack a hydrogel electrolyte layer 399. It may help to relate this structure to the FIG. 38 schematic: in FIG. 40A, we group together at A the four main layers shown in FIG. 38, i.e. moving down through the stack, the carbon foam layer, then the carbon ink layer, then the silver collector layer, and then the dielectric layer. FIG. 40B is a cross-section through the FIG. 40A structure, showing the group A features. FIG. 40B is the same cross-section, but this time labelling all of the FIG. 39 elements.

Figure 41A:
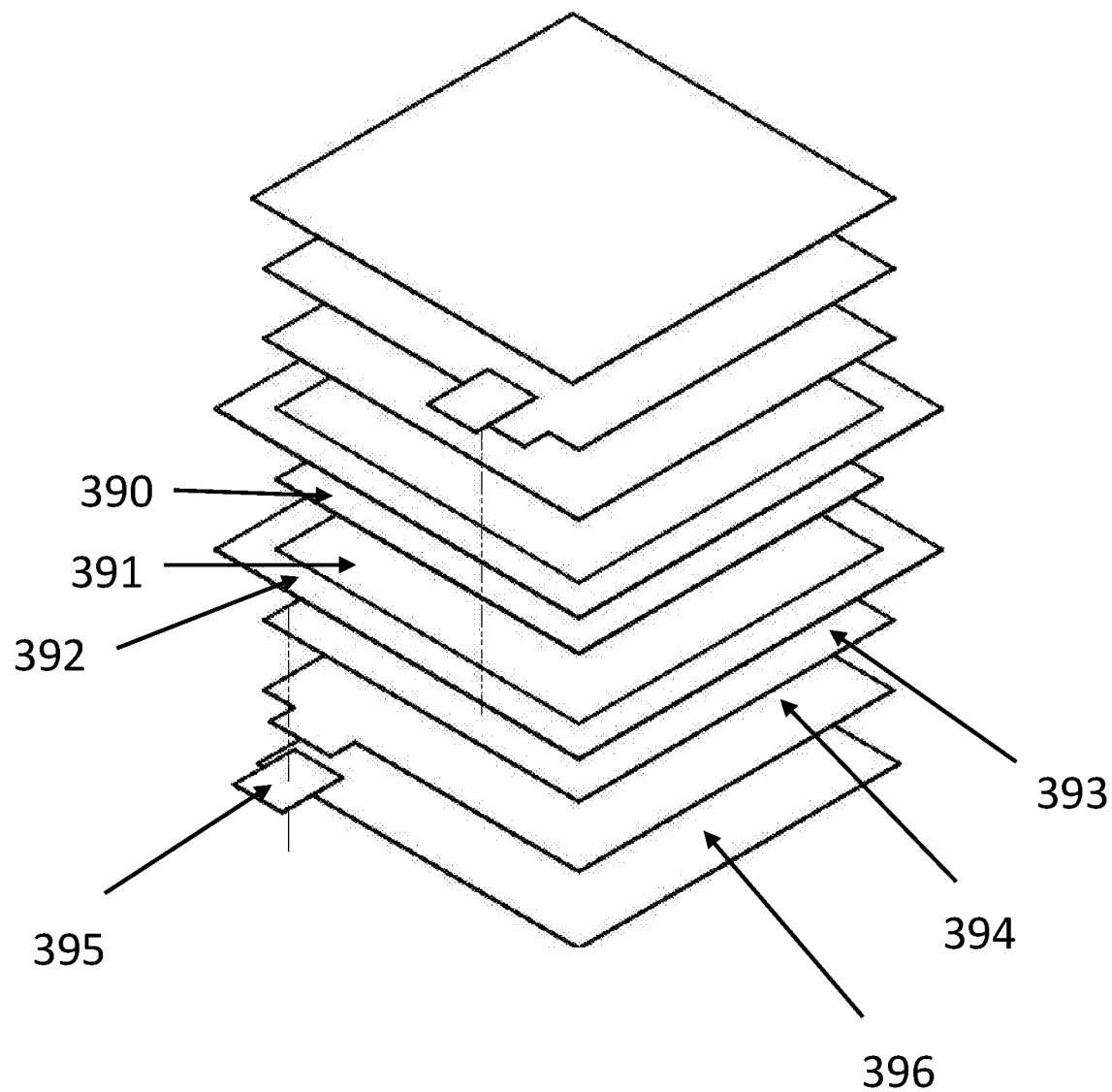
Figure 41B:
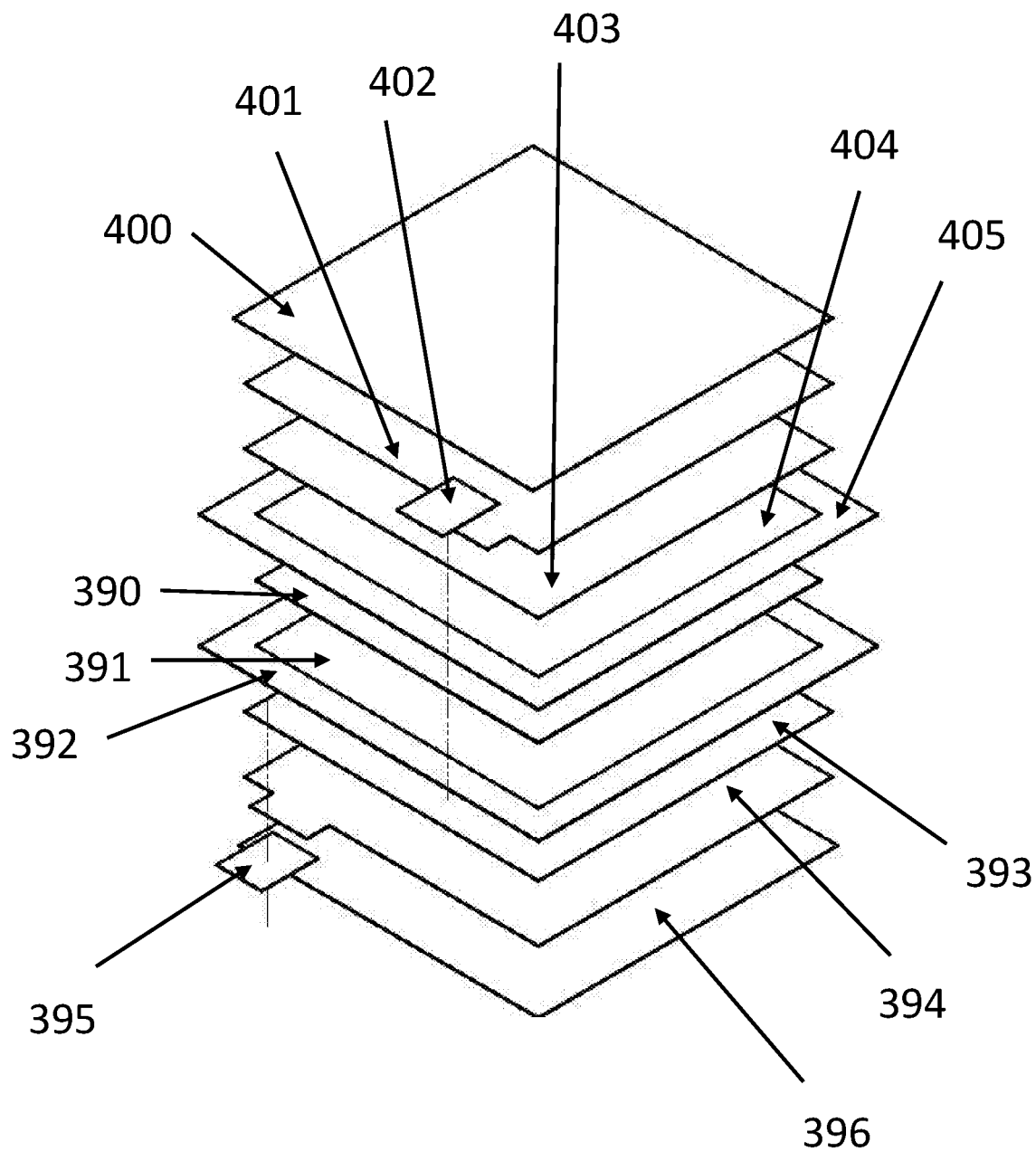

A full cell is shown in FIGS. 41A and 41B. In FIG. 41A we only label the features that are also present in FIG. 39 (using the same numbering). So it includes a hydrogel electrolyte layer 390, carbon foam layer with unique surface morphology 391 in a PI film 392; screen printed carbon paste layer 393; screen printed silver connector layer 394 with external copper tab 395 connection point; and a screen printed dielectric isolation layer 396.

In FIG. 41B, we now add in the additional layers; moving progressively down through the structure, we have a screen printed dielectric isolation layer 400, then screen printed silver collector layer 401 with copper tab 402, then screen printed carbon paste layer 403, and then carbon foam layer with unique surface morphology 404 in a PI film 405.

Figure 41C:
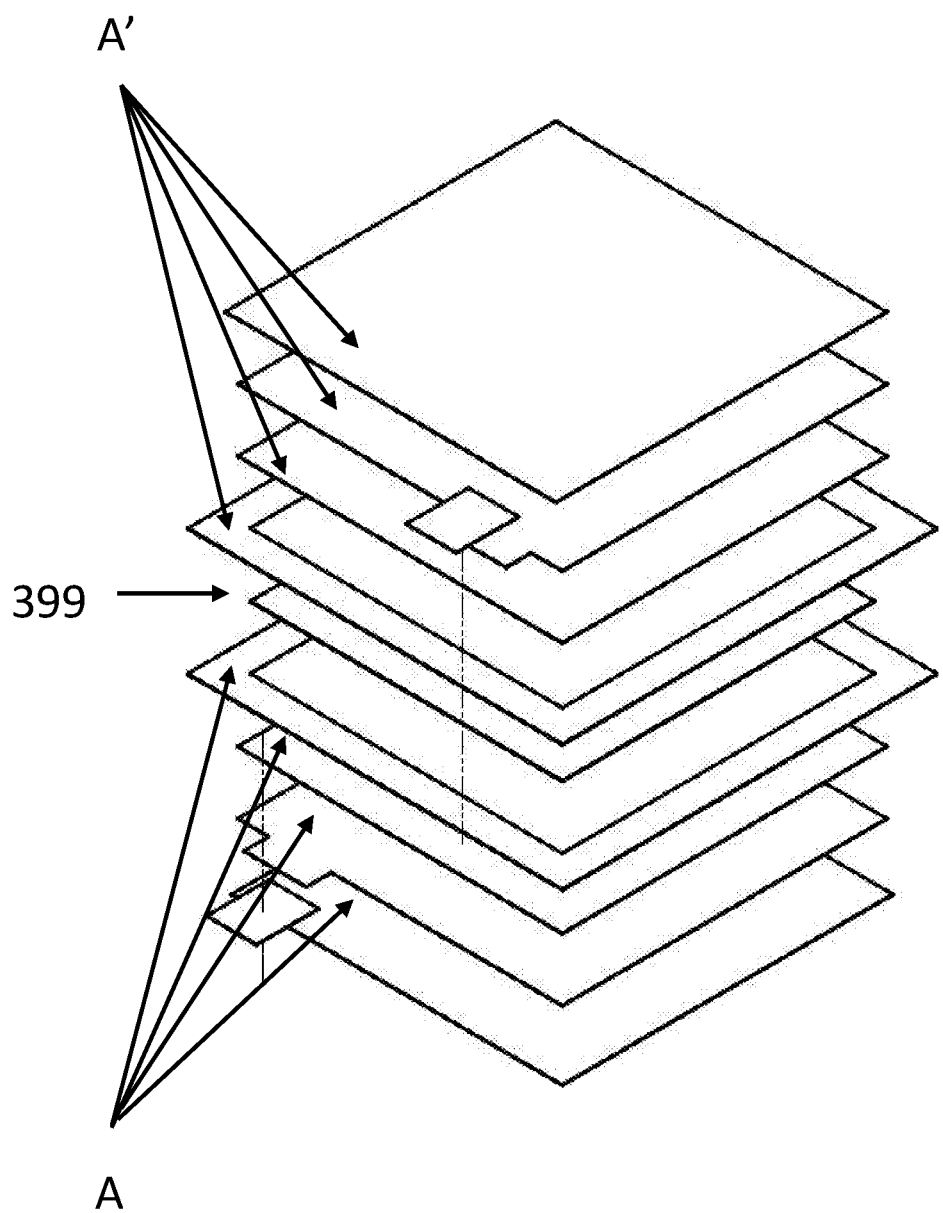

In FIG. 41C, we group together at A the four main layers shown in FIG. 38; the four top layers are in the inverse order, and we group these together at B. Group A and Group B are separated by a hydrogel (e.g. polymeric hydrogel) electrolyte layer 399, dispensed using a conventional electrolyte dispensing system.

Figure 41D:
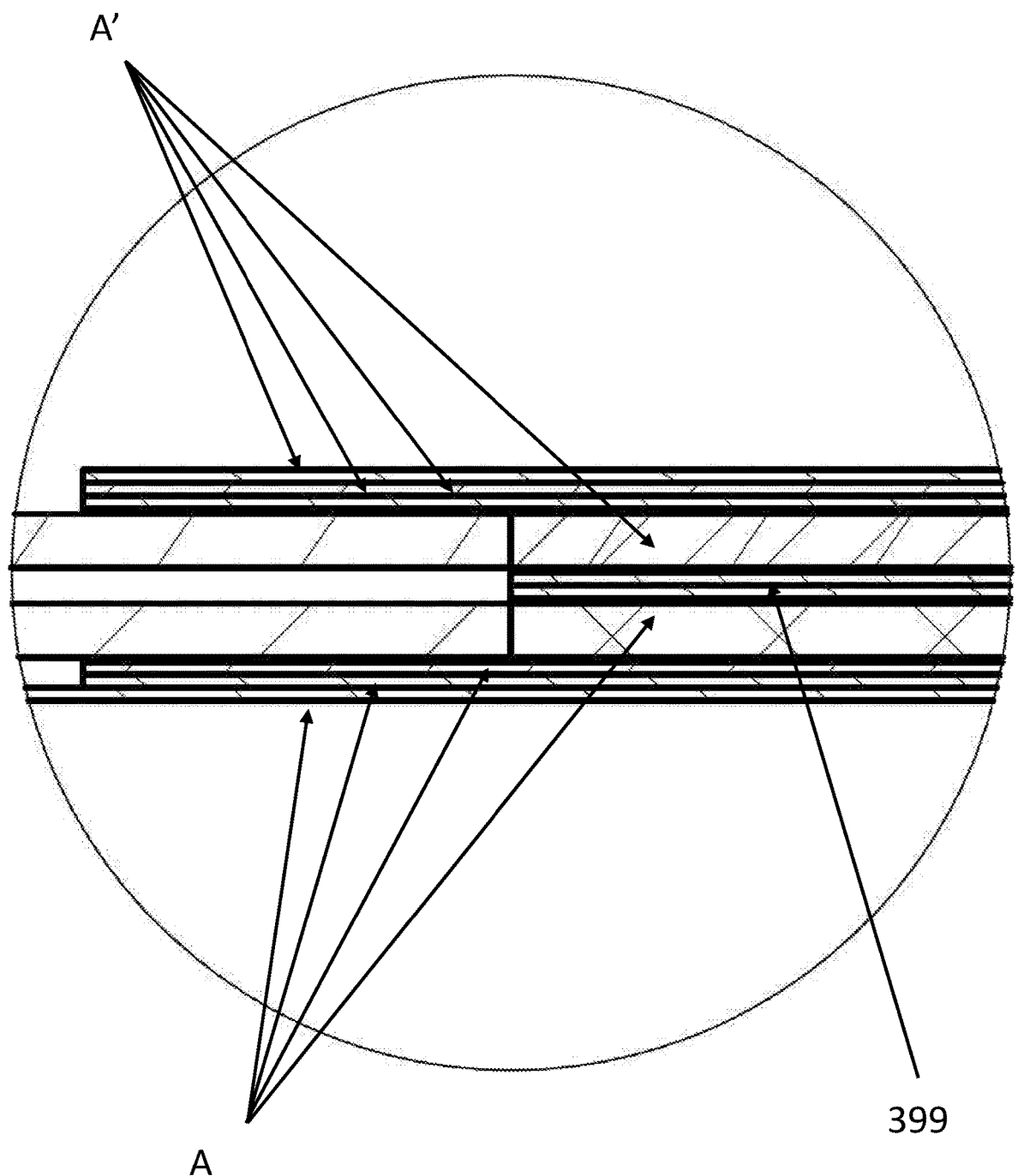
Figure 41E:
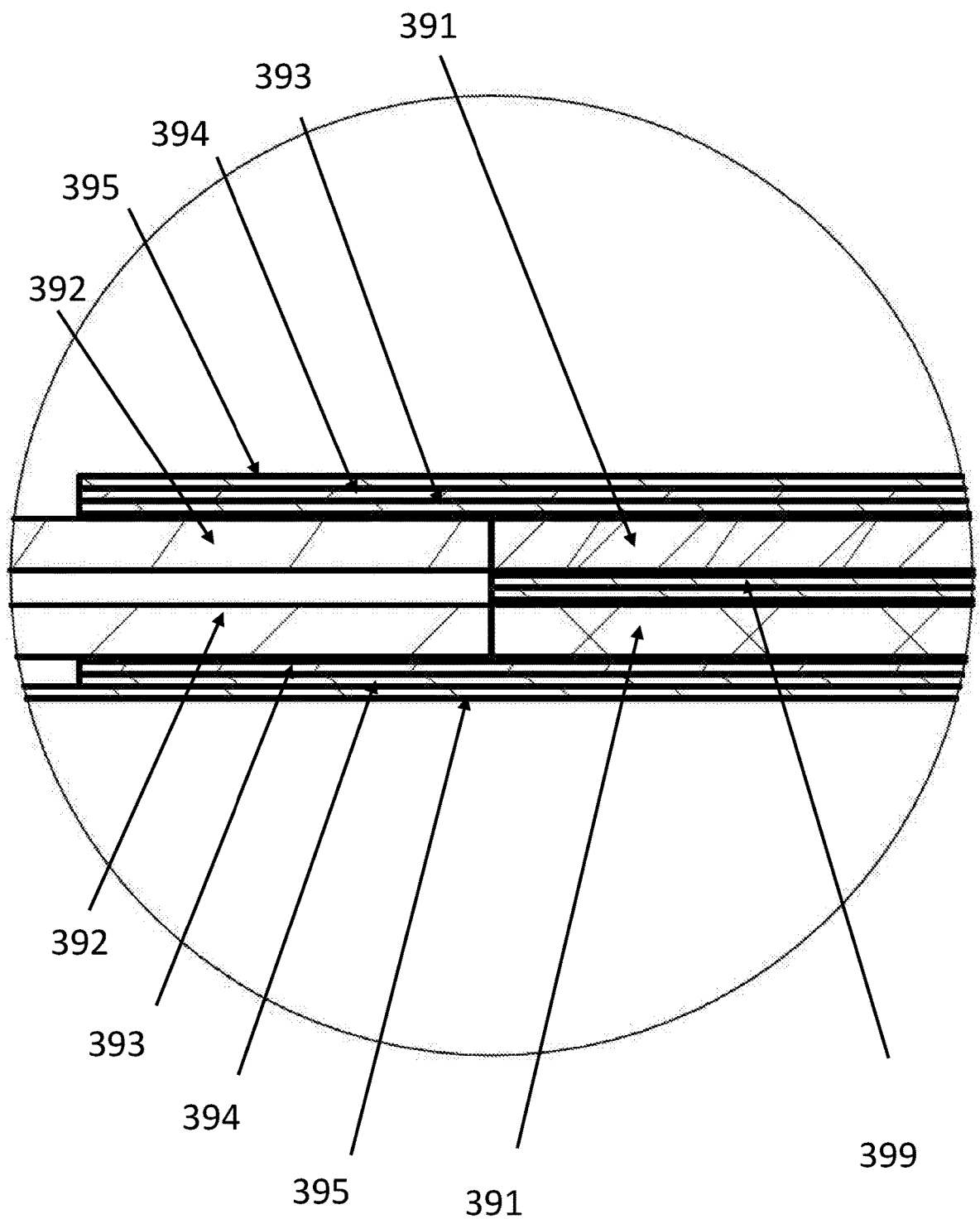

FIG. 41D is a cross section through this structure, showing Group A and Group B layers, separated by the hydrogel (e.g. polymeric hydrogel) electrolyte layer 399. FIG. 41E is the same cross-section, but this time with the individual layers numbered as per the schematic of FIG. 38.

Figure 41F:
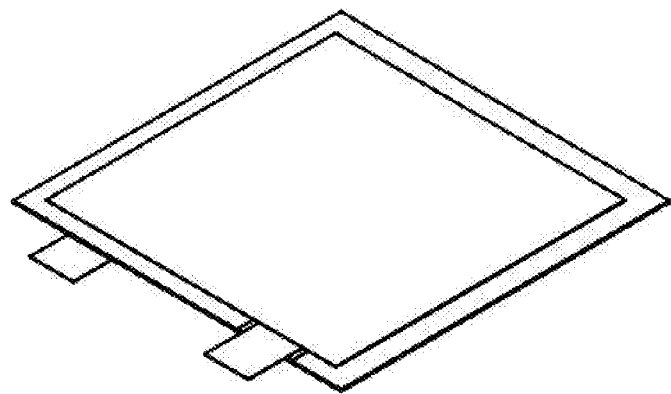

FIG. 41F is a perspective view of the assembled supercapacitor.

Figure 42:
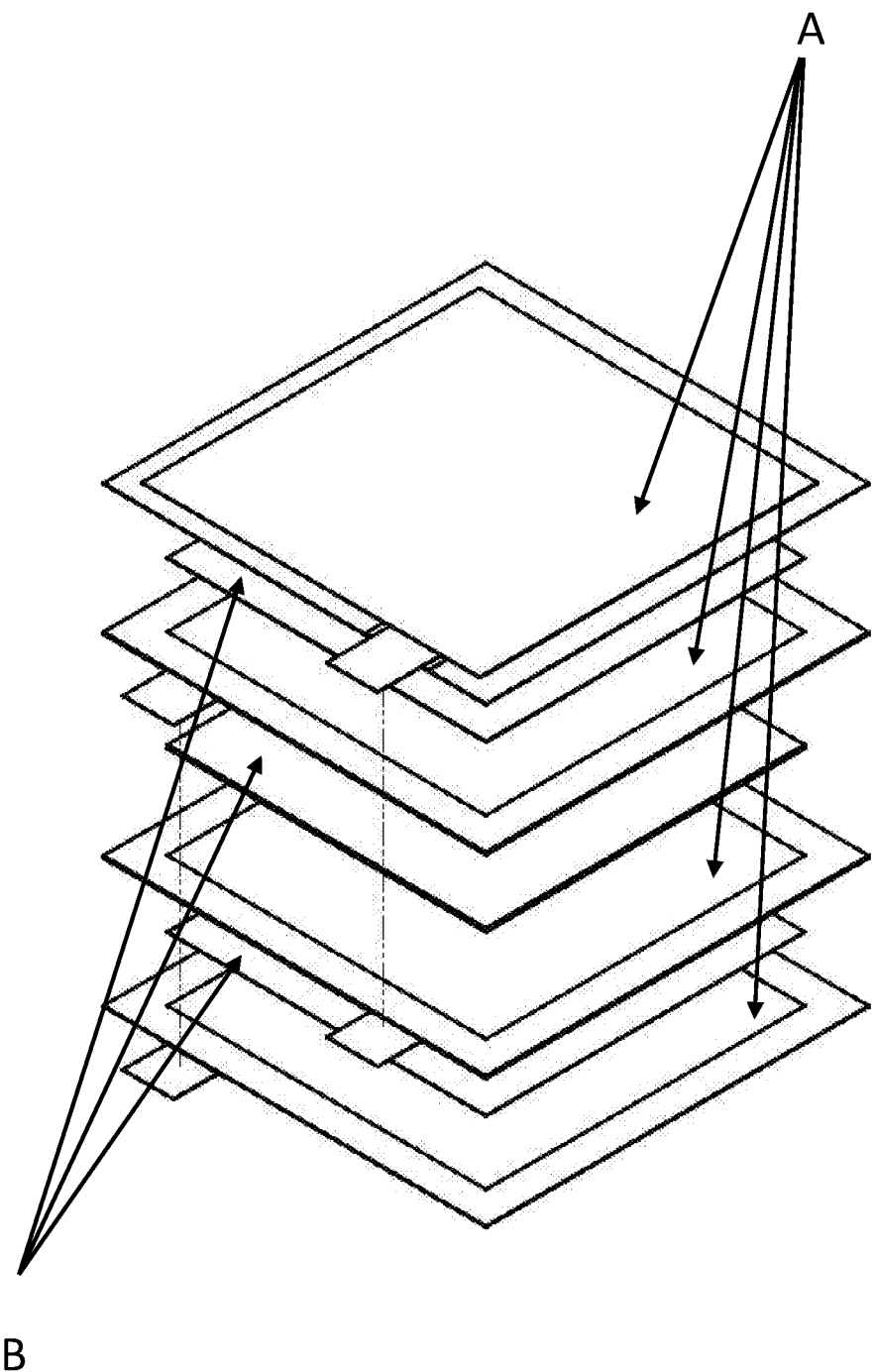

FIG. 42 shows a 4 stack of full cell supercapacitors; the carbon foam layers are shown at A, and the polymeric hydrogel electrolyte is shown at B. Additional cells can be added to the stack to give the require performance.

Figure 43A:
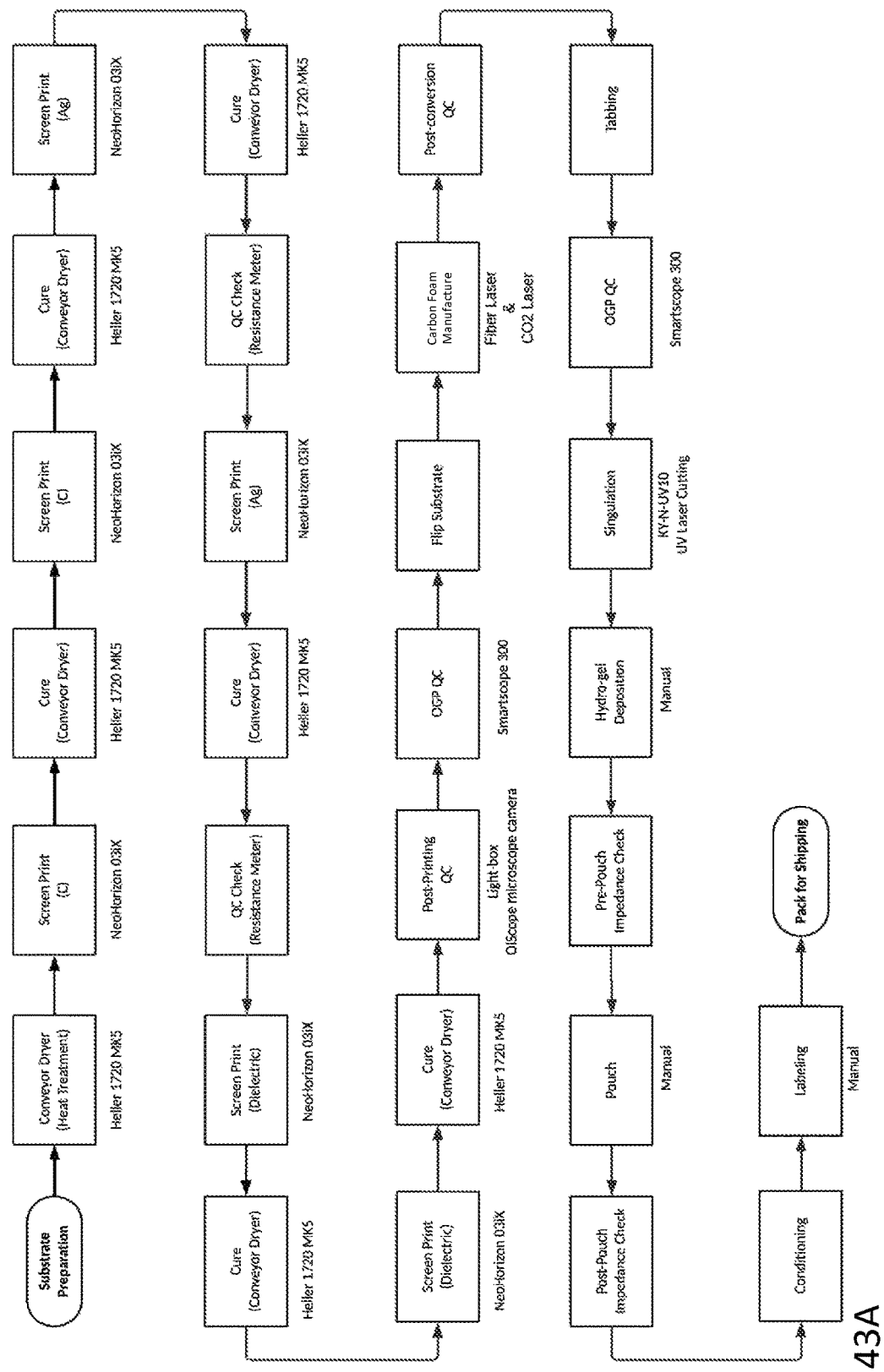
FIGS. 43A and 43B are detailed processing flow charts for Dual Laser carbon foam Gii-Thru Cap three-dimensional supercapacitor devices.
Figure 43B:
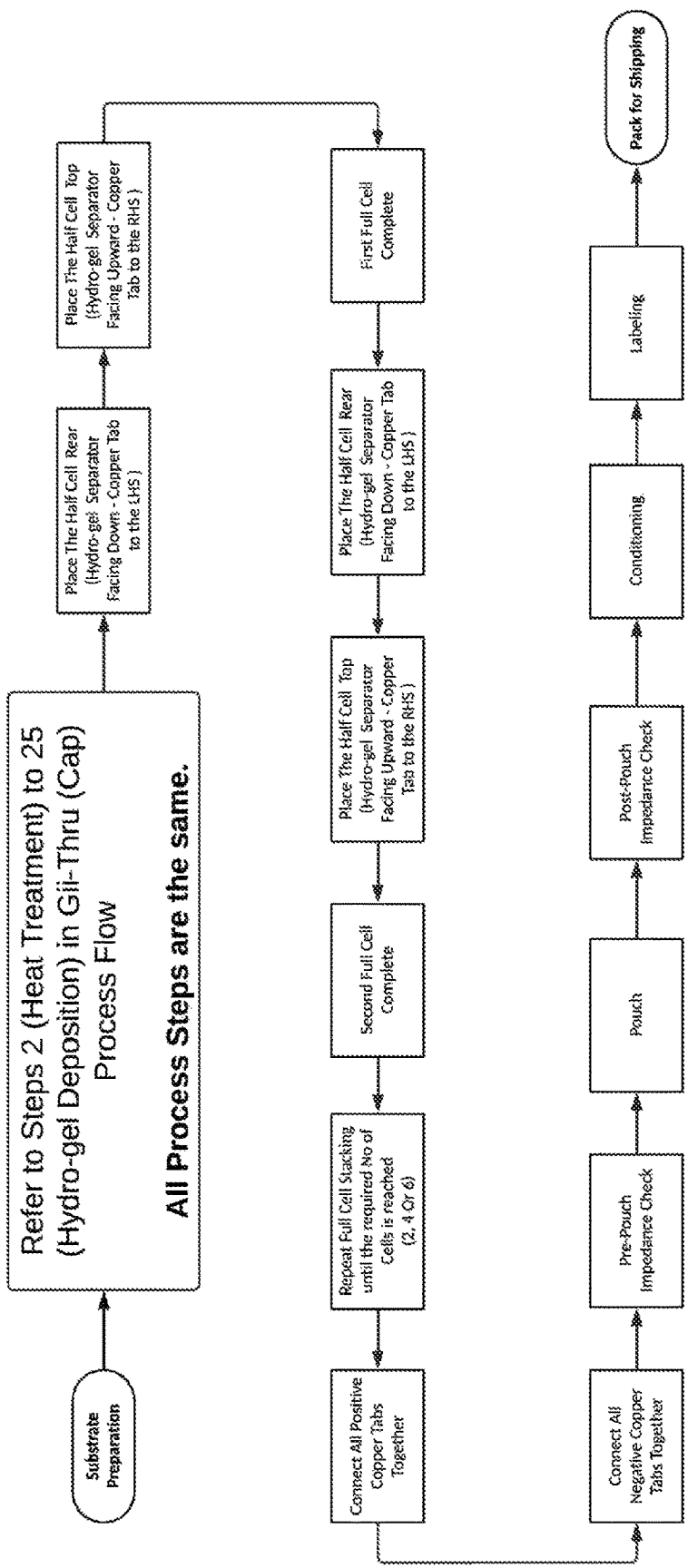

FIG. 43A shows the detailed manufacturing flow for the Gii-Thru supercapacitor and FIG. 43B shows the detailed manufacturing flow for the Gii-Thru Multi-stack supercapacitor.

We can generalise to:

An energy storage device, such as a supercapacitor, including a sub-assembly comprising:
(i) a carbon pre-cursor film;
(ii) a screen printed conductive paste or ink layer, on the surface of the carbon pre-cursor film;
(iii) a screen printed collector layer over the screen printed conductive paste or ink layer;
(iv) a screen printed dielectric layer over the collector layer;
(v) energy storage electrodes that comprise carbon foam material made, at least in part, from the carbon pre-cursor film by the method defined in any of Features A-K above, and in which an electrically conductive path is formed from the carbon foam material to the collector layer, via the conductive paste or ink layer; and in which multiple sub-assemblies are formed into a stack and in which adjacent energy storage electrodes are separated by an ionic gel electrolyte.

Feature O3: 3D Carbon Foam Structures: Gii-Thru for Gii-Sens: HISLOC

The Gii-Thru structure described in FIG. 38 can be used not just for a supercapacitor, but also for a Gii-Sens sensor, such as a biosensor.

For microfluidics, the Gii-Thru HISLOC (High Sensitivity Low Cost) platform approach enables the liquids and the carbon foam sensors to be on the upper face of the biosensor device and for the electrical connections that connect to the carbon foam sensors to be on the lower face of the biosensor device. Microfluidics conventionally use functionalised gold electrodes where the electrical connectors that connect to the functionalised gold electrodes are all co-planar; the Gii-Thru biosensor has cost, yield and performance advantages over these functionalised gold electrodes. And moving the electrical connections to the bottom or base of the biosensor enables greater miniaturisation and compatibility with POC (point-of-care) systems.

Figure 44A:
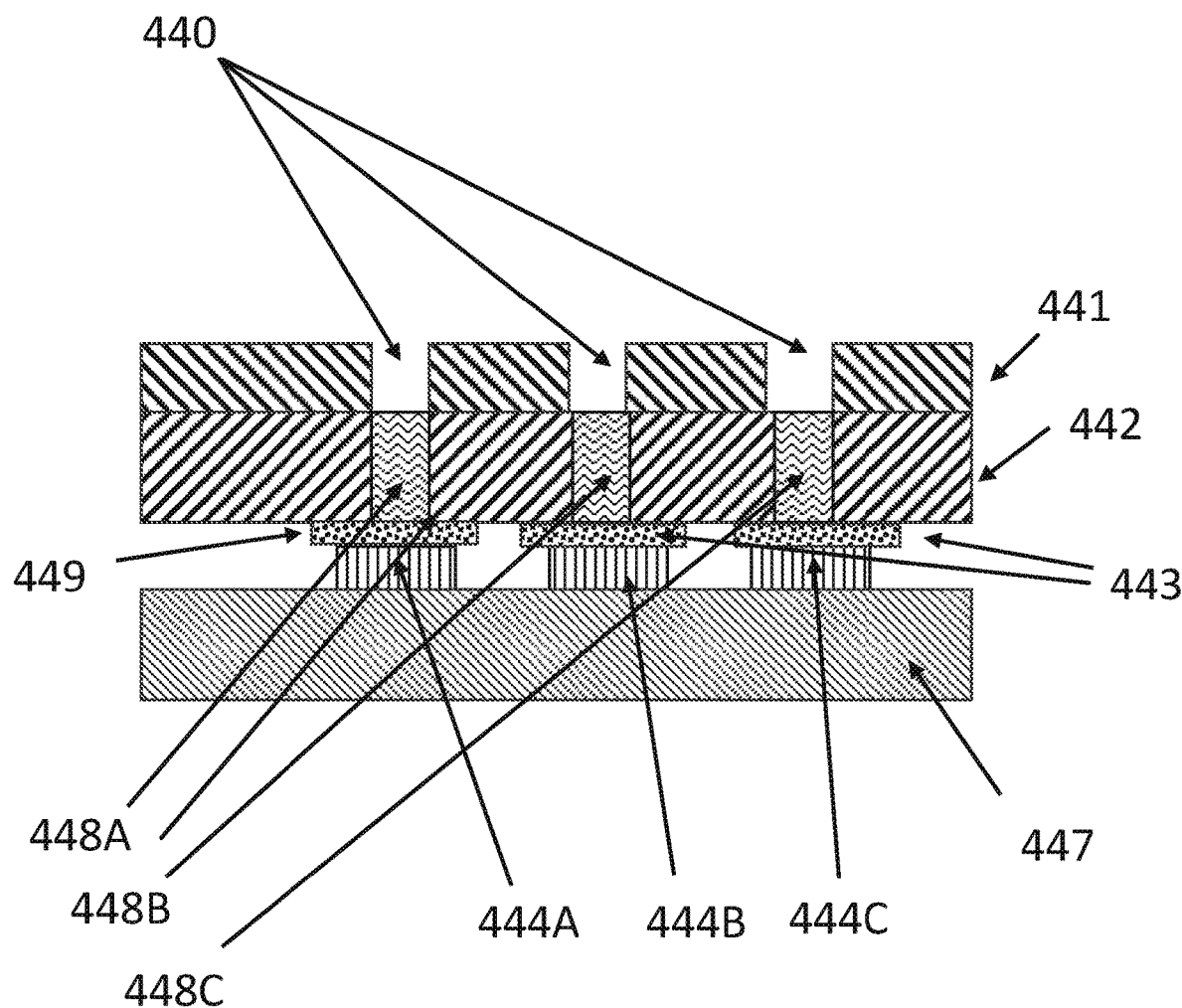
FIGS. 44A and 44B are schematic views of a Gii-Thru sensor used in a three-sample array microfluidic diagnostic device.

FIG. 44A is a cross-sectional schematic view through a Gii-Thru sensor used in a three sample array microfluidic diagnostic device. At the top level are three sample wells 440; the fluid to be analysed flows into each of these wells 440. The wells 440 are formed as small, apertures in a laminated well spacer layer 441, that sits over a polyimide film layer 442.

In the polyimide film layer 442 are formed three functionalised carbon foam regions that form the reference electrode 448A, working electrode 448B, and counter electrode 448C; the upper surface of each electrode 448A-448C is exposed to the analyte fluid present in the well 440.

The base of the reference electrode 448A may include an Ag—AgCl layer (or screen printed carbon layer) 449; at the base of the working electrode 448B is a screen printed conductive carbon layer 443; at the base of the counter electrode 448C is another screen printed conductive carbon layer 443. In this way, reference electrode 448A is in electrical contact with reference electrode connection 444A; the working electrode 448B is in electrical contact with working electrode connection 444B; and the counter electrode 448C is in electrical contact with counter electrode connection 444C.

A screen printed dielectric layer 447 forms the base of the structure.

So what is interesting about this structure is that the electrode connections 444A-C are not co-planar with the functionalised carbon foam electrodes 448A-C, as they would be with conventional screen printed sensors. Instead, they are in a plane below the functionalised carbon foam electrodes 448A-C, on the opposite side to the wells 440. This structure enables greater miniaturisation and compatibility with POC (point-of-care) systems.

Figure 44B:
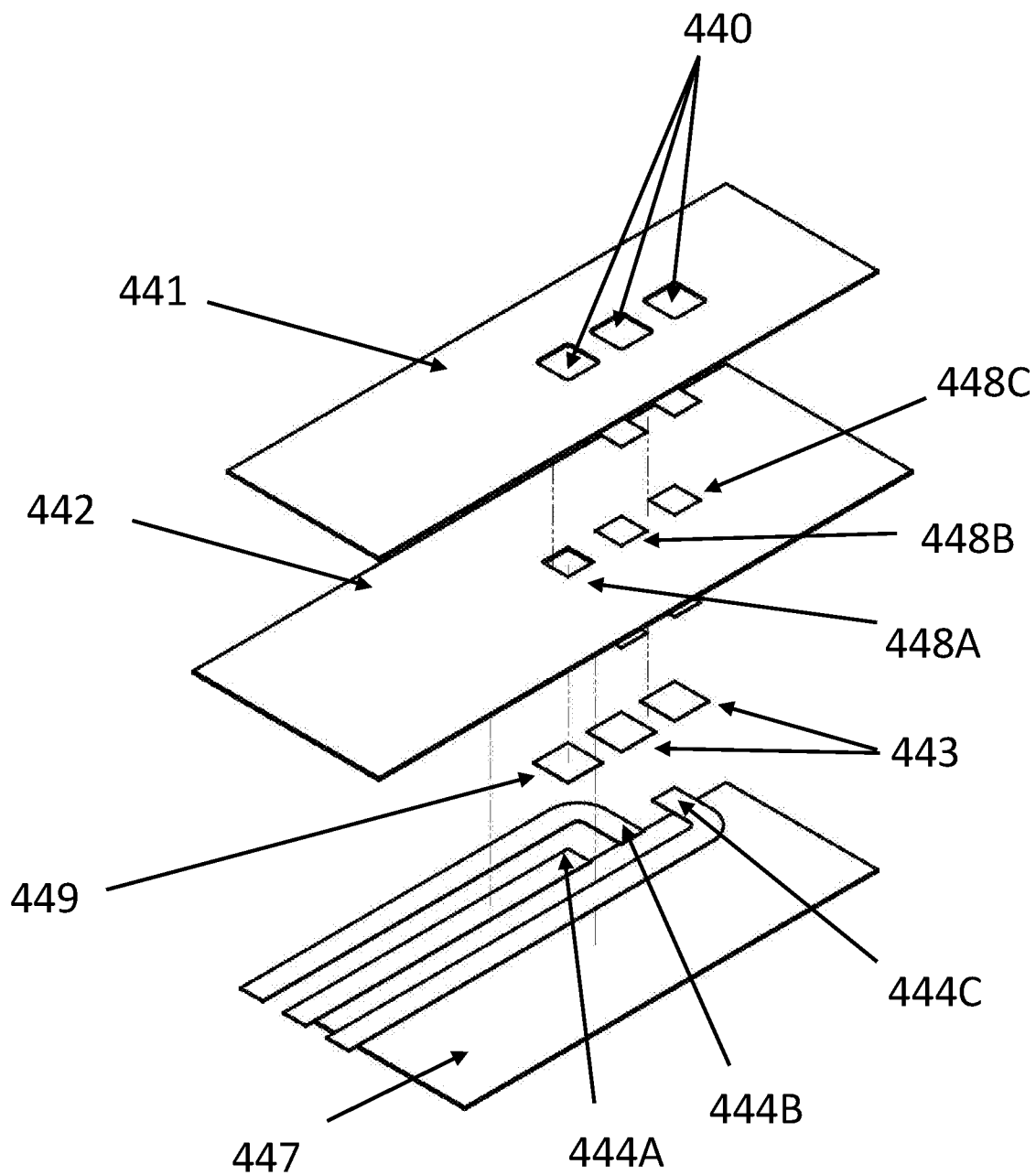

FIG. 44B shows an isometric exploded view of the FIG. 44A microfluidic diagnostic device. The three sample wells 440 sit in laminated well spacer layer 441, which sits over the polyimide film layer 442. The reference electrode 448A, working electrode 448B and counter electrode 448C are shown; the end of reference electrode 448A is covered by Ag—AgCl layer or screen printed carbon layer 449; the working electrode 448B and counter electrode 448C are covered by screen printed conductive carbon layer 443. As noted above, reference electrode 448A is in electrical contact with reference electrode connection 444A; the working electrode 448B is in electrical contact with working electrode connection 444B; and the counter electrode 448C is in electrical contact with counter electrode connection 444C.

Note that the three functionalised carbon foam regions 448A-C are shown as planar squares lying at different planes; this is however just an artefact of the CAD used to create the figure and the carbon foam regions 448A-C are better represented in FIG. 44A. Screen printed dielectric layer 447 forms the base of the structure.

Figure 45A:
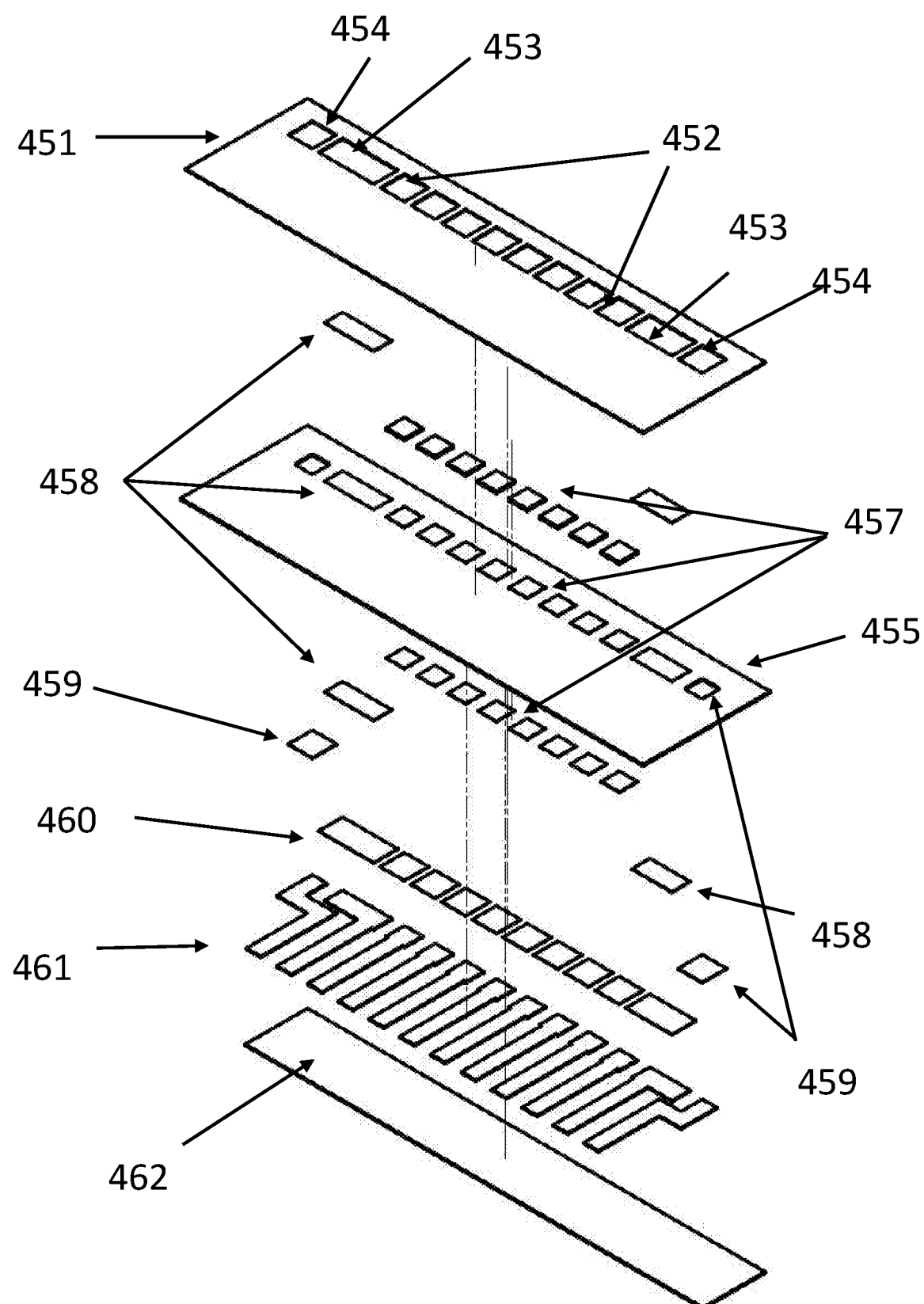
FIGS. 45A and 45B are schematic views of a Gii-Thru sensor used in an eight-sample array microfluidic diagnostic device.
Figure 45B:
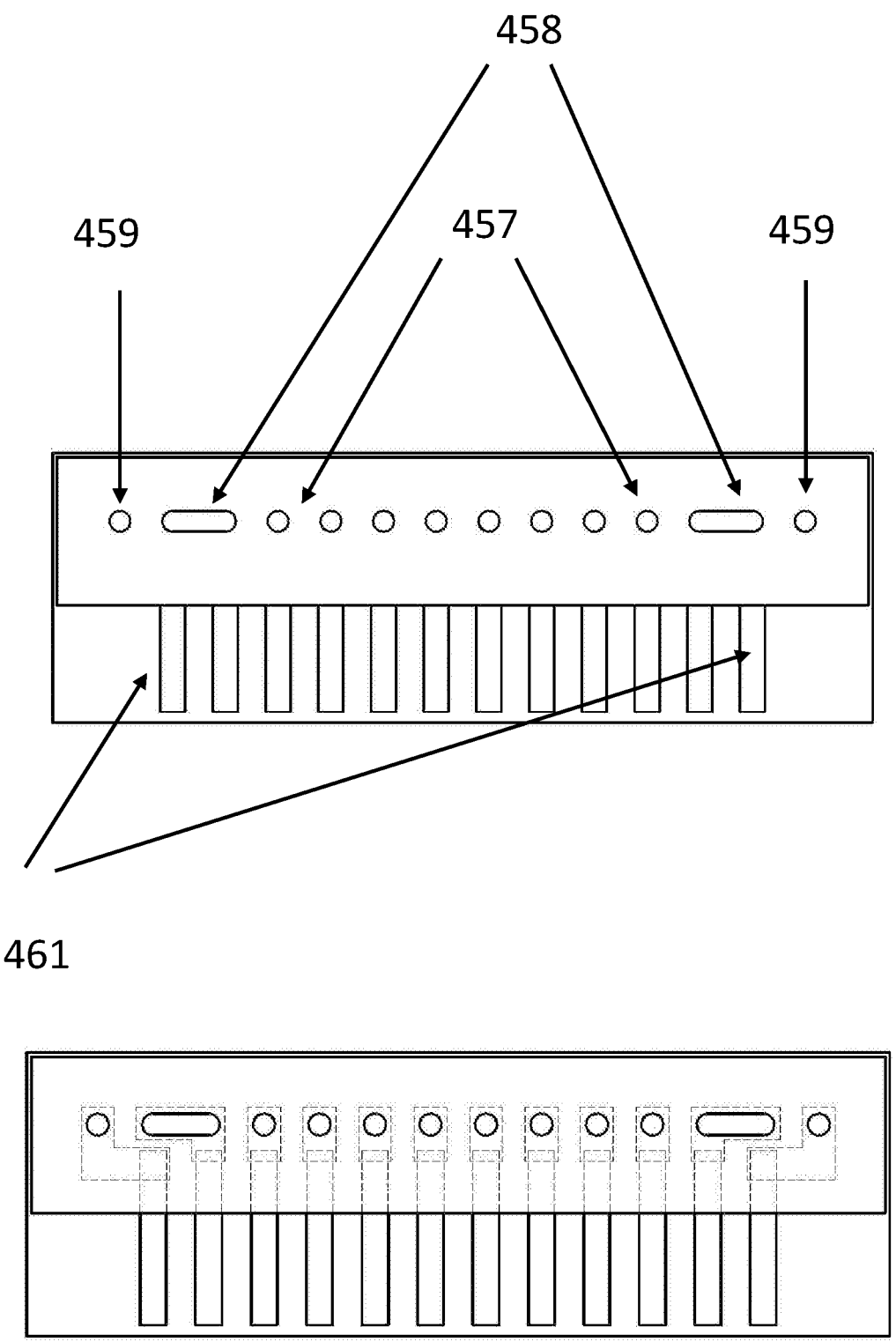

FIGS. 44A and 44B above show a three-spot array microfluidic diagnostic device. In FIG. 45A and FIG. 45B, we show an eight-spot array microfluidic diagnostic device. In isometric FIG. 45A, a laminated well spacer 451 includes an array of eight analyte wells 452 for the working electrodes, plus wells 453 for a counter electrode and wells 454 for a reference electrode; laminated well spacer 451 sits over the polyimide layer 455. Gii carbon foam in polyimide layer 456 forms the eight working electrodes 457 and the counter electrode 458 and are made using the Dual Laser process. Note also that the carbon foam electrodes 457, 458 are shown as planar squares lying at three different planes; this is however just an artefact of the CAD and the carbon foam form a continuous region in polyimide layer 455.

A reference electrode 459 is covered with a thin screen printed Ag—AgCl layer. A thin screen printed carbon connection interface layer 460 sits under the working electrodes 457 and the counter electrodes 458; screen printed silver connection tracks 461 form an electrical connection to all electrodes 457, 458 and 459. A screen printed dielectric layer 462 then forms the case of the device. FIG. 45B is a pair of top down views of the FIG. 45A device; the lower view shows the underlying connection track paths.

Figure 46A:
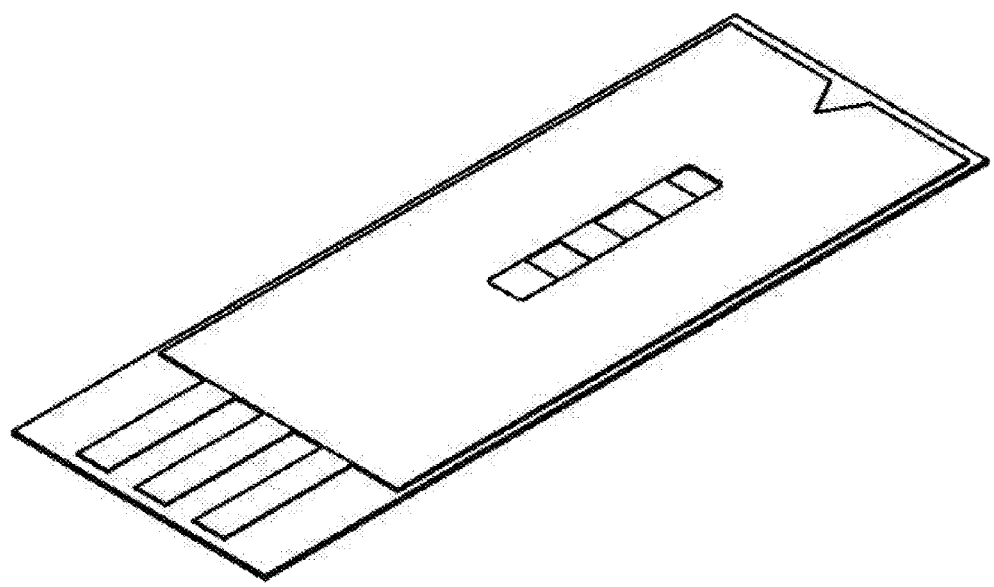
FIG. 46A shows a perspective view of a fully assembled multi sample array microfluidic diagnostic device.
Figure 46B:
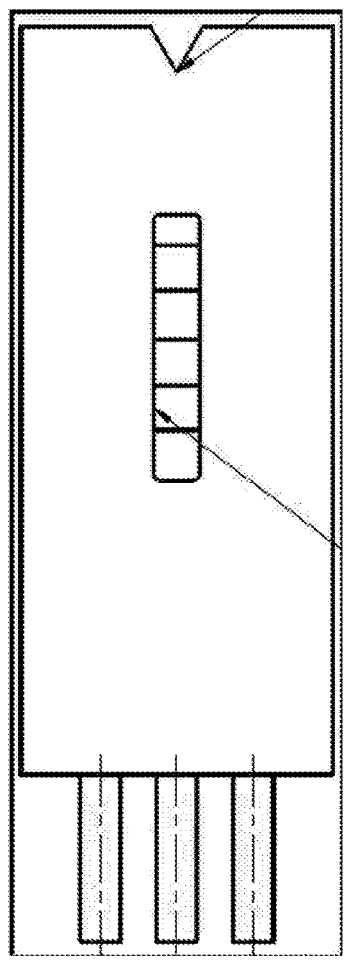
FIG. 46B is a top-down view of the multi sample array microfluidic diagnostic device.

FIG. 46A shows a perspective view of a fully assembled multi sample array microfluidic diagnostic device; FIG. 46B is a top down view.

We can generalise to

A microfluidic diagnostic device including sample wells positioned on an upper face of the device, reference, working and counter electrodes, made from a carbon pre-cursor film at least in part by the method defined in any of Features A-K above, are in a layer below the sample wells, and reference, working and counter electrode connections are in layer below the reference, working and counter electrodes.

Figure 47A:
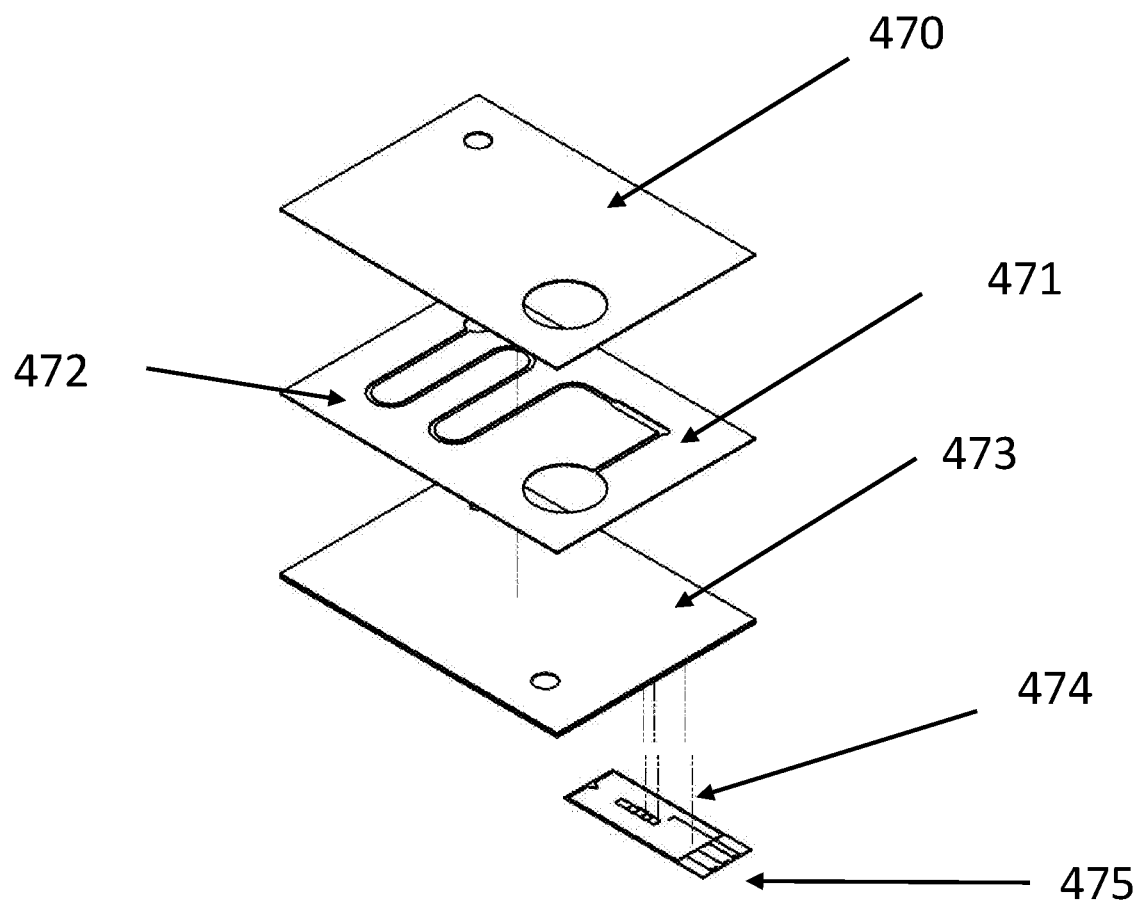
FIGS. 47A-47B and 48A-48B are views of a microfluidic diagnostic device.
Figure 47B:
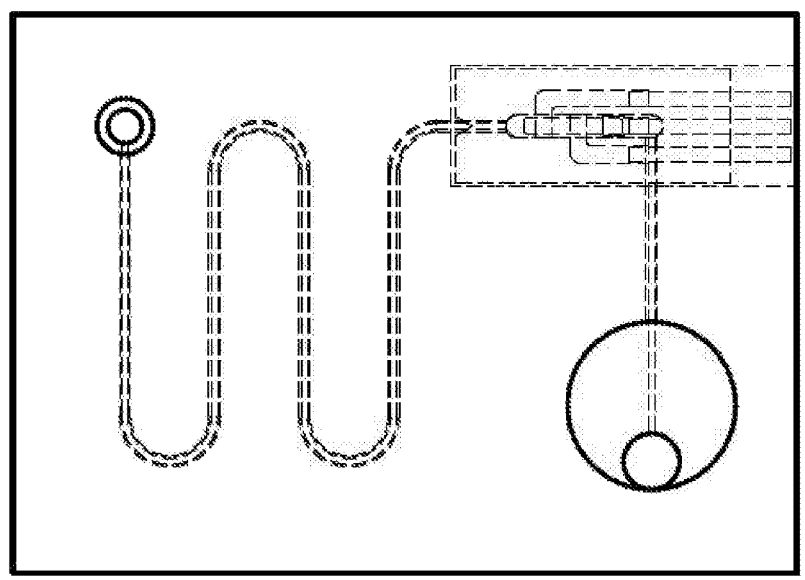

FIG. 47A shows an exploded view of a microfluidic diagnostic device comprised of multiple laminate layers; it includes a three-spot array (3SA) microfluidic biosensor that implements Gii-Thru, as shown in FIG. 44A. The top layer 470 of the device is a microfluidic foil; the middle layer 471 is a microfluidic foil with adhesive, and includes a printed or moulded microfluidic fluid channel 472, and the bottom layer 473 is a microfluidic foil with adhesive. The Gii-Thru sensor 474 is a three-spot array (3SA) biosensor and includes connectors 475. FIG. 47B is a top down view showing the internal structure. The Gii-Thru sensor 473 can be replaced with a different biosensor (e.g. an 8SA) for greater flexibility.

Figures 48A, 48B:
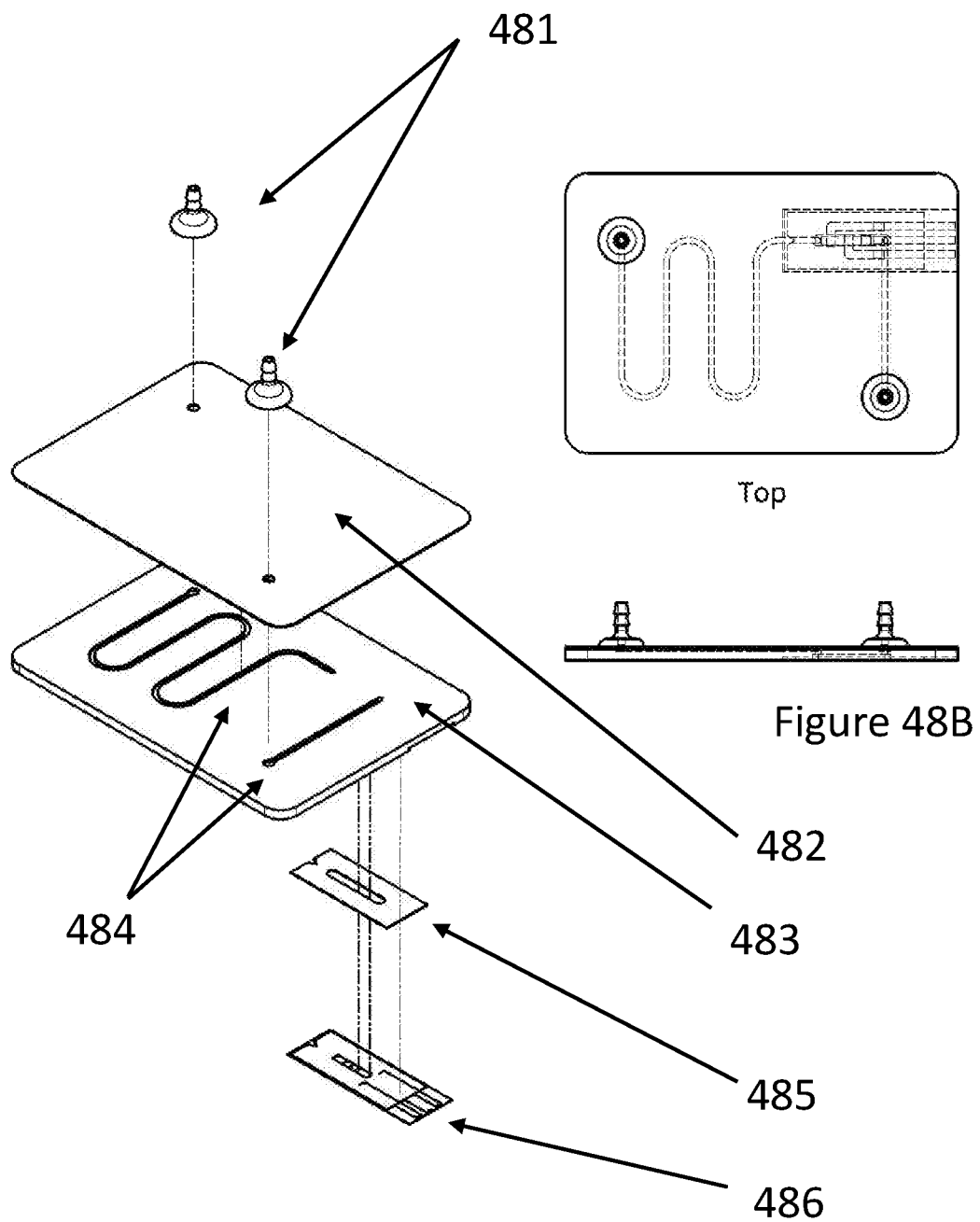

FIG. 48B shows an exploded view of a microfluidic diagnostic device comprised of a printed or moulded microfluidic card and it includes a three-spot array (3SA) microfluidic biosensor that implements Gii-Thru, as shown in FIG. 44A. This device includes clear resin barb connectors 481, a top foil 482, a clear resin moulded microfluidic card 483 with microfluidic channels 484, a well unit 485 made of microfluidic foil with adhesive and the Gii-Thru sensor 486. Again, the Gii-Thru sensor 486 can be replaced with a different biosensor (e.g. an 8SA) for greater flexibility and the moulded microfluidic card 483 can be replaced with different designs of microfluidic features to allow for different assay platforms.

FIG. 45B is a top down and side view.

Feature O4: 3D Carbon Foam Structures: Gii-Thru for Gii-Sens: HISLOC Manufacturing Process The HISLOC manufacturing process can be summarised as follows:
1. Screen print carbon layer on the underside of the polyimide film.
2. Screen print silver connections.
3. Screen print silver/silver chloride reference electrodes (steps 3 and 4 can be re-ordered as 4 then 3).
4. Screen print dielectric.
5. Create Gii carbon foam sensor electrodes in the polyimide film using the Dual Laser process.

Figure 49:
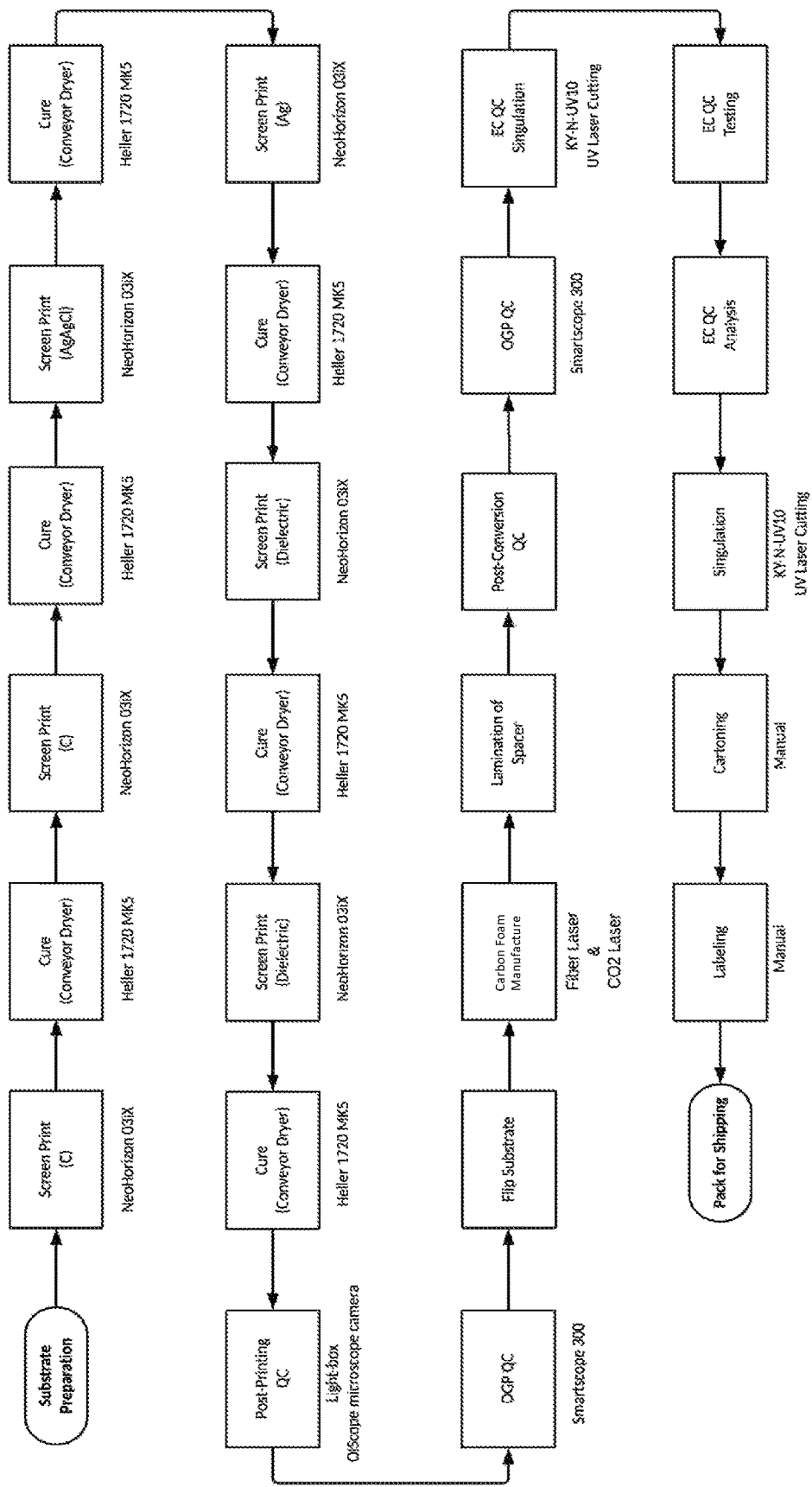
FIG. 49 is a detailed manufacturing process flow for the High Sensitivity Low Cost Gii-Thru variant.

Detailed manufacturing process flows are shown in FIG. 49

We can generalise to:

A lab-on-chip device, including a sub-assembly comprising:
- (i) a carbon pre-cursor film;
- (ii) a screen printed conductive paste or ink layer, on the surface of the carbon pre-cursor film;
- (iii) a screen printed conductive layer over the screen printed conductive paste or ink layer;
- (iv) a screen printed reference electrode;
- (v)) a screen printed dielectric layer over the collector layer;
- (vi) sensor electrodes that comprise carbon foam material made from the carbon pre-cursor film at least in part by the method defined in any of Features A-K above, and in which an electrically conductive path is formed from the carbon foam material to the conductive layer, via the conductive paste or ink layer.

Group 4
Feature P: Scalable Manufacturing: G-ii 3

Gii-3 is a scalable manufacturing plant with reel-to-reel or reel-to-sheet production of all of the Gii-based materials described above. A key commercially advantage is that Gii 3 manufacturing does not need bespoke equipment—it uses off the shelf computer controlled lasers for the Dual Laser carbon foam manufacturing and conventional screen printing and drying technology: these are well known, well understood manufacturing processing steps and equipment, leading to repeatability and reliability.

Figure 50:
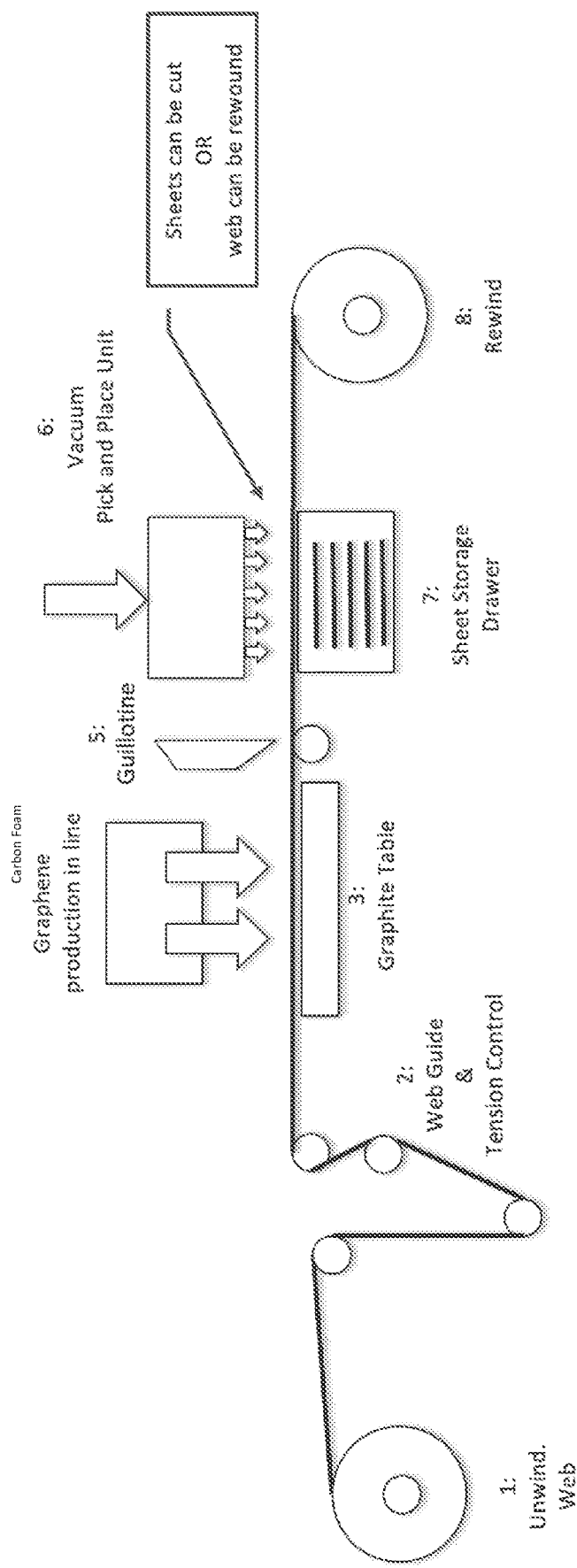
FIG. 50 is a schematic of a high-speed reel to reel or reel to sheet manufacturing system for Gii carbon foam.
Figure 51:
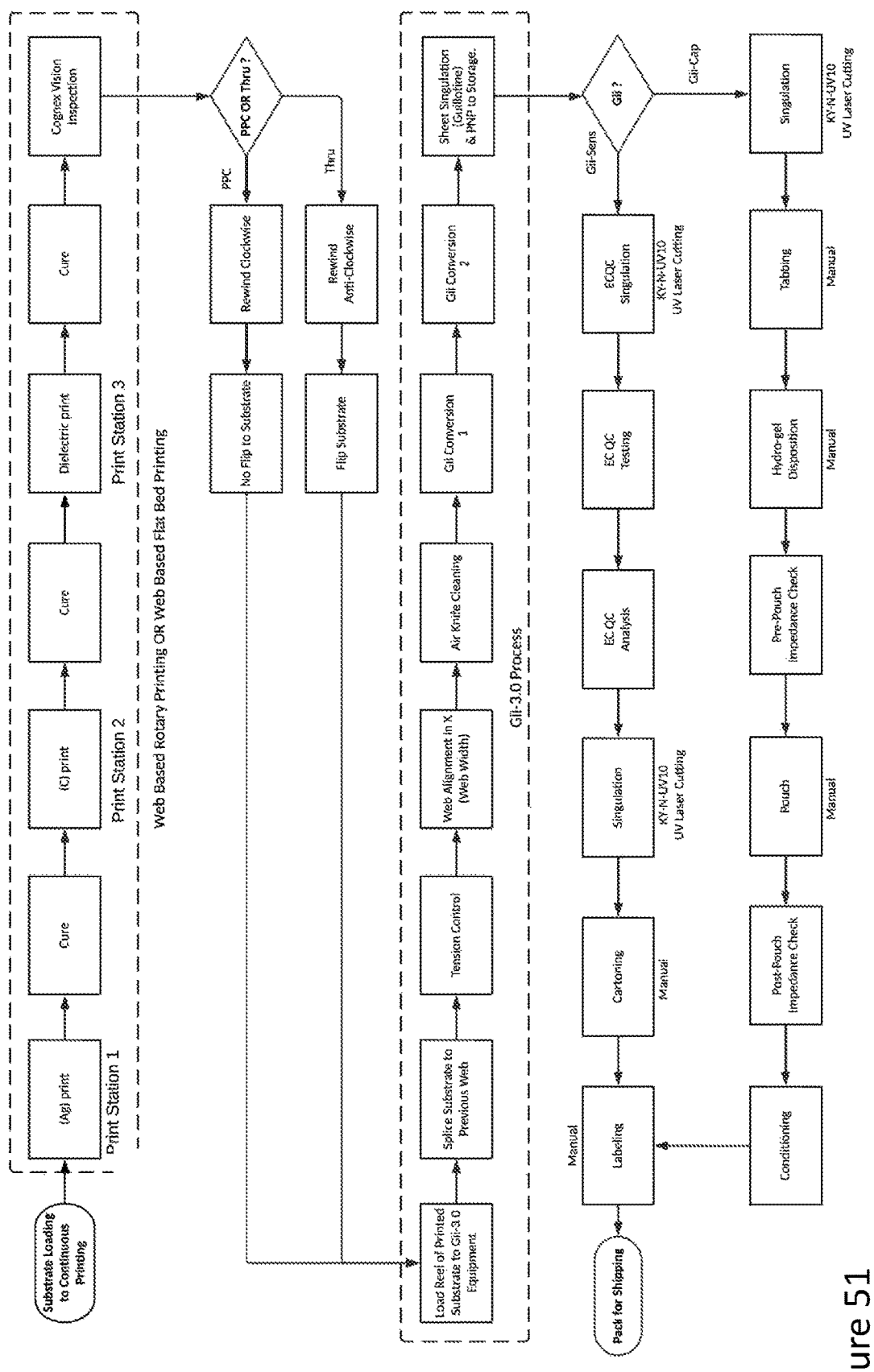
FIG. 51 shows the detailed process flow for the FIG. 50 system.
Figure 52:
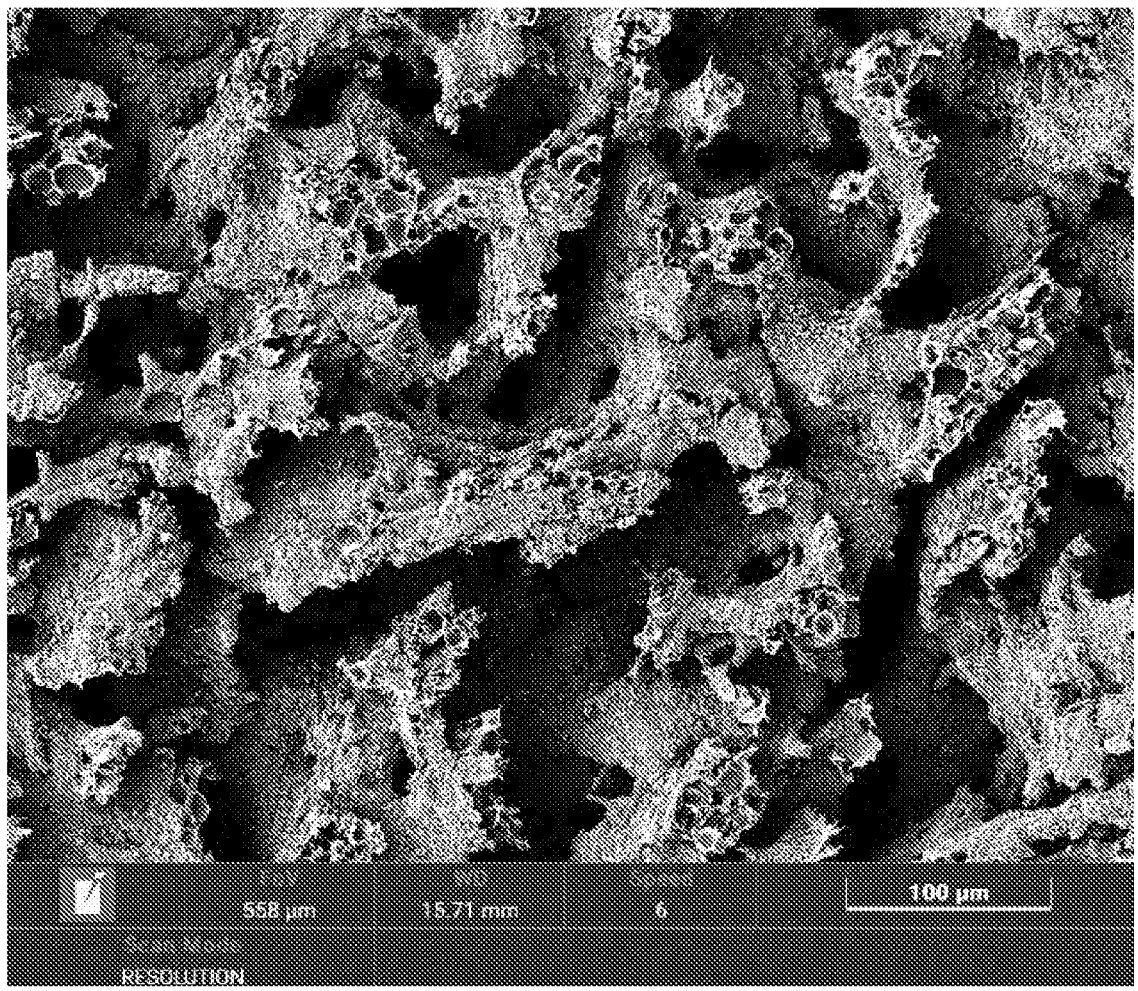
FIGS. 52-56 are scanning electron images showing Dual Laser carbon foam at various magnifications.
Figure 53:
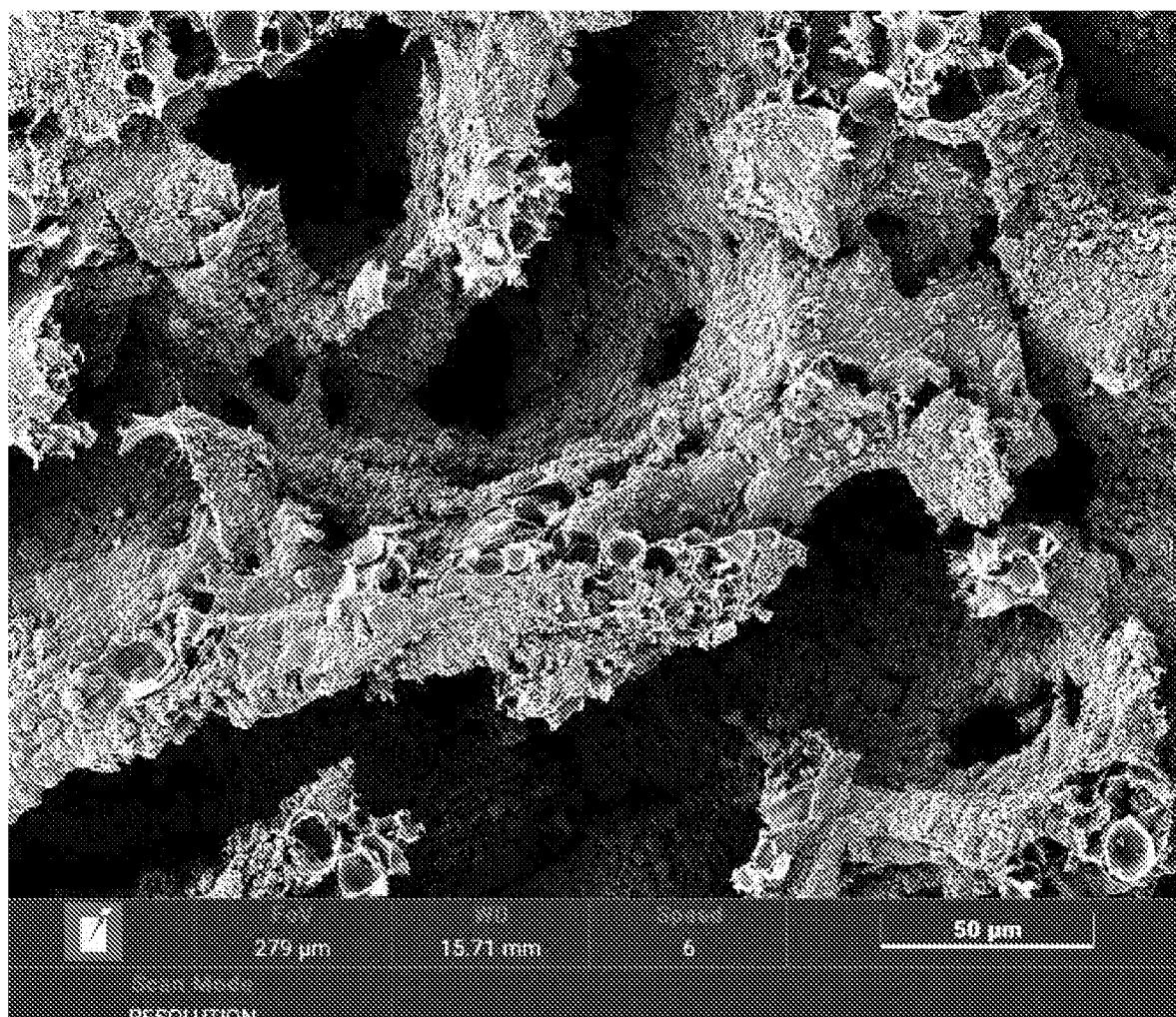
Figure 54:
Figure 55:
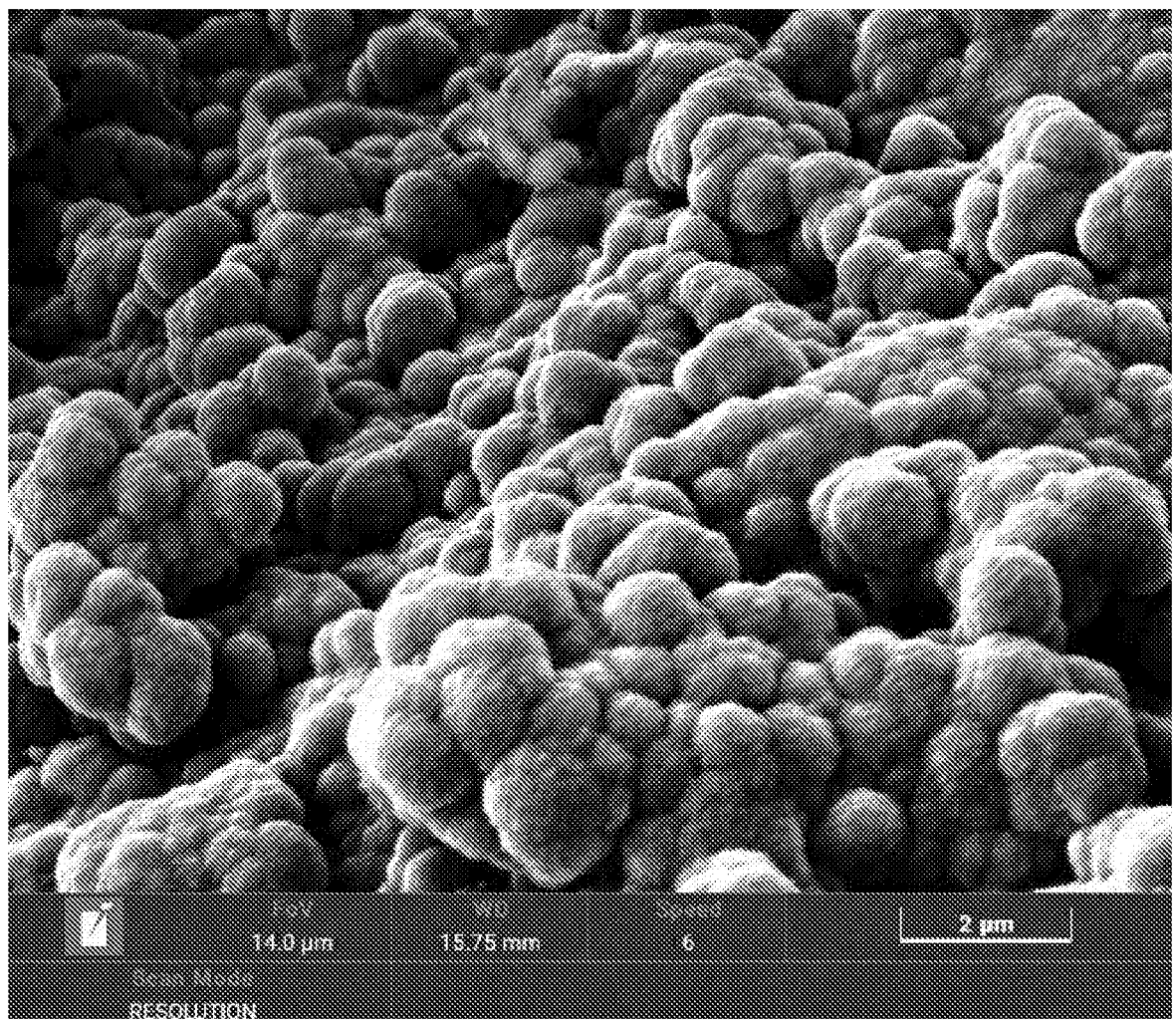
Figure 56:
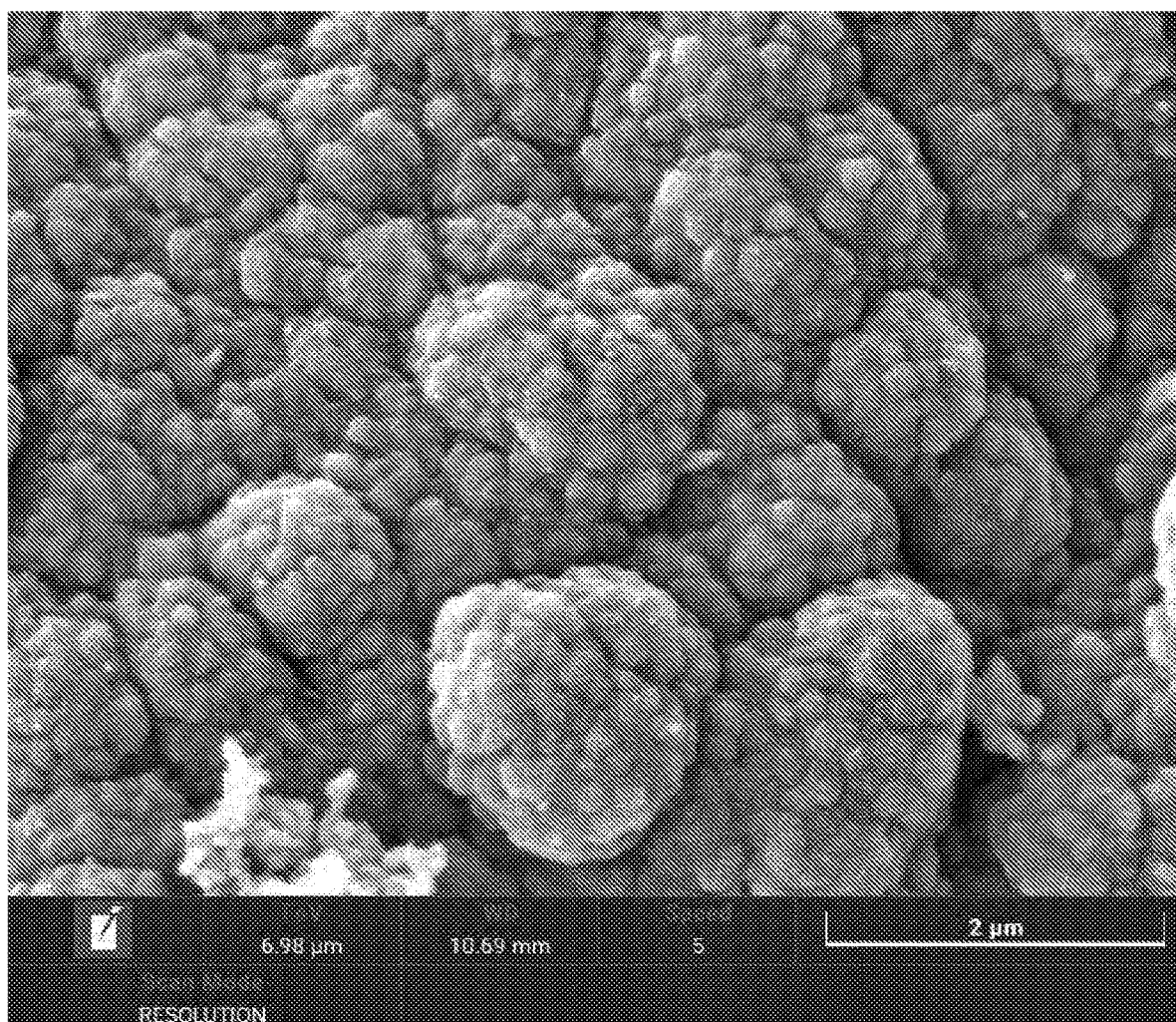

FIG. 50 is a schematic of the overall manufacturing process and FIG. 51 shows the detailed process flow.

We can generalise to:

A method of manufacturing a device including one or more electrodes, each comprising carbon foam material;
in which the method includes passing a continuous reel of a carbon pre-cursor film through a sequence of operations required to manufacture the carbon foam material made, at least in part, by the method defined in any of Features A-K above.

Feature Q: Various Other Gii Applications

The Gii carbon foam described in this specification can be used in a wide variety of applications, including many applications for which conventional graphene foam has been considered to be suitable.

We can generalise to:

A device including a carbon foam material made, at least in part, by the method defined in any of Feature A-K above, where the device is one of the following types of devices:

Hall effect sensor: the carbon foam shows a response to magnetic fields.

Tactile sensor for e.g. robotics; prototype sensors using Gii carbon foam with polydimethylsiloxane (PDMS) embedded into and over the structure, as an active layer in piezoresistive based pressure sensors for use in robotic touch sensing applications have been shown: a few layers of carbon foam is able to present sensitivity to pressures with sensitivity of 0.0418 mV/&Pa over a range of 0 to >50 kPa. See DOI:10.4028/p-oy94hj. and DOI: 1109/CDE52135.2021.9455738. The contents of these are incorporated by reference to the fullest extent permissible.

Infectious diseases sensor.

Biosensor where the Gii carbon foam is subject to π-π non-covalent functionalization with pyrene carboxylic acid (PCA) for interleukin 10 impedimetric detection, See DOI:10.1016/j.bios.2022.114954, the contents which is incorporated by reference to the fullest extent permissible.

Constant monitoring chemical sensor.

Glucose monitoring sensor: A reversible polymer displacement sensor mechanism for electrochemical glucose monitoring has been shown; a pyrene-derivatised boronic acid chemo-receptor for glucose is adsorbed onto a carbon foam electrode, competitively binding with poly-nordihydroguaiaretic acid. See DOI: 10.1039/D1AN01991K, the contents which is incorporated by reference to the fullest extent permissible.

Lactic acid sensor: Synthetic organic receptor molecules are employed based on boronic acids attached to carbon foam to provide functionality and selectivity in competitive analyte binding, using surface redox polymer indicator displacement. See DOI:10.1016/j.snb2022.133089, the contents which is incorporated by reference to the fullest extent permissible.

Gas detection sensor, such as hydrogen peroxide and oxygen detection using Gii carbon foam immersed in a phosphate buffer solution of pH 7 nanoparticulate polymer of intrinsic microporosity (PIM-1). See DOI: 10.1016/j.elecom.2022.107394, the contents which is incorporated by reference to the fullest extent permissible.

Optical detector.

Self-charging hybrid energy generation device.

Green gas conversion into useful chemical.

Fuel cell, e.g. hydrogen fuel cell.

Filters, including gas permeable filter.

Heating device.

Feature R: Non-Graphene Carbon Material Foam

Conventional graphene foam appears, under a scanning electron microscope, to have large, open ring-like structures, typically 500 µm in size. The carbon foam generated using the Dual Laser process looks very different; FIGS. 52-57A are SEM images of this Gii carbon foam.

FIG. 57B is a SEM of a carbon nano-onion, see 'Raman spectroscopy of polyhedral carbon nano-onions'. DOI: 10.1007/s00339-015-9315-9 and also 'Carbon nano-onions: unique carbon nano-structures with fascinating properties and their potential applications'. DOI:10.1016/j.ica.2017.07.021. The similarities to the Gii carbon foam are apparent.

Figure 58:
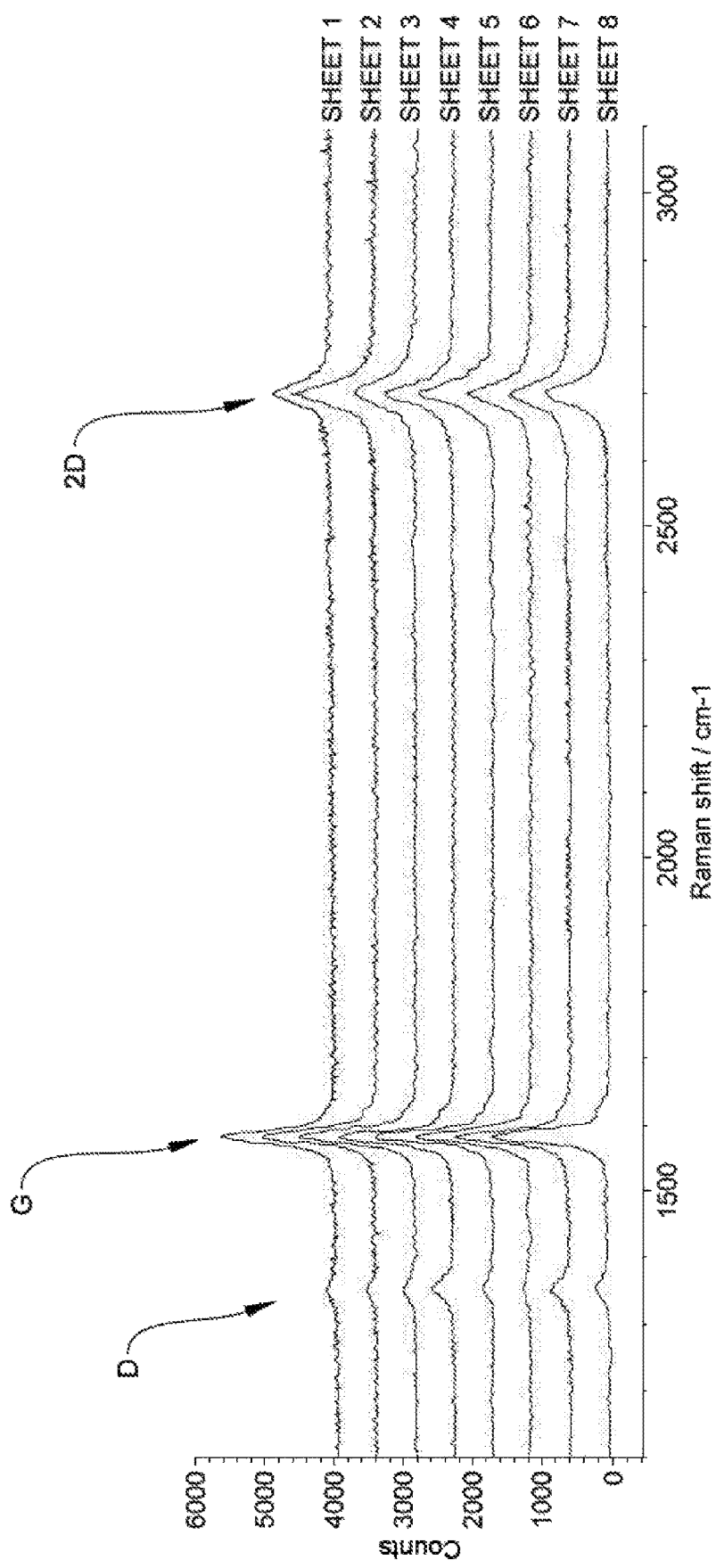
FIG. 58 shows the Raman shifts for eight sheets of carbon foam made using the Dual Laser process.

As noted earlier, graphene foam has a number of characteristics: it is hydrophobic, with low wettability. Raman analysis of a typical graphene foam reveals the following signatures: absence of a D peak; the 2D peak is higher than the G peak; the peak D: peak G ratio is close to zero. Yet the carbon foam generated using the Dual Laser process shares none of these characteristics; it is hydrophilic, with a contact angle below 20°; it lacks the tell-tale Raman spectrum signature of graphene: it shows a significant D peak; the 2D peak is significantly less than the G peak; the peak D: peak G ratio is significantly above zero. FIG. 58 shows the Raman shifts for eight sheets of carbon foam made using the Dual Laser process, showing the consistency of the Raman signature. It also shows a significant D peak; the 2D peak is less than the G peak; the peak D: peak G ratio is above zero. As we noted earlier, this Raman spectrum has much in common with carbon nano-onions. see also FIG. 18C, also from 'Raman spectroscopy of polyhedral carbon nano-onions'. DOI: 10.1007/s00339-015-9315-9. The specific Dual Laser parameters used to create this low electrical resistance carbon nano-onion variant of Gii carbon foam are in Table 5 below:

TABLE 5

|  | First Laser | Second laser |
| --- | --- | --- |
| Laser machine | S300 | S300 |
| Laser wavelength (nm) | Flexx - IR 1064 nm | CO2 10600 nm |
| Power (Watts) | 11 | 36 |
| Speed (mm/s) | 810.11 | 188.15 |
| PPI (pulses per inch) | n/a | 1000 |
| Frequency (Hz) | 80000 | n/a |
| DPI (Dot/inch) | 1000 | 1000 |
| Offset (mm) | 0 | 15 |
| Passes | 1 | 1 |

We can generalise to the following:

A carbon foam material made, at least in part, by the method defined in any of Features A-K above and that is hydrophilic, with a contact angle below 20°.

A carbon foam material made, at least in part, by the method defined in any of Features A-K above and with a Raman spectrum exhibiting a significant D peak; the 2D peak is less than the G peak; the peak D: peak G ratio is above zero.

A carbon nano-onion material made, at least in part, by the method defined in any of Features A-K above.

Note that any of the devices described earlier, e.g. sensors, pressure sensors, biosensors, Hall Effect sensors, supercapacitors, hydrogen fuel cells, filters, may be characterised by their use of these materials and so we can generalise to the following:

A device including a carbon foam material made, at least in part, by the method defined in any of Features A-K above and that is hydrophilic, with a contact angle below 20°.

A device including a carbon foam material made, at least in part, by the method defined in any of Features A-K above and with a Raman spectrum exhibiting a significant D peak; the 2D peak is less than the G peak; the peak D: peak G ratio is above zero.

A device including a carbon nano-onion material, made, at least in part, by the method defined in any of Features A-K above.

Appendix 1 A Supercapacitor implementation with a hydrogel electrolyte

Appendix 2 Gii-Cap+ Hydrogel

Appendix 3 GiiCap Iongel

Appendix 4 3-month Gii-Sens® Assay Feasibility Proposal

Appendix 5 Sensor implementations where a receptor is bonded to a 3D carbon foam material through a linker Appendix 6 Benchmark experimental conditions:

Appendix 7 Optimisation of the surface immobilization of anti-human procalcitonin (cAb)

Note that Appendices 1-7 describe specific implementations of Gii carbon foam.

Appendix 8 Consolidated list of Features and Optional Features

Appendix 1 A Supercapacitor Implementation with a Hydrogel Electrolyte Background A supercapacitor is a device which stores electrical charge. In terms of its make-up and function, a supercapacitor lies between an electrolytic capacitor and a rechargeable battery.

The properties of a supercapacitor make it superior over a rechargeable battery in applications where short charging times are required and also in applications where numerous charge/discharge cycles are used. Shortcomings of a supercapacitor over a battery include a lesser capacity to store energy over a long period of time.

Operational limitations of a supercapacitor are imposed by the material properties of the components. In particular, the maximum voltage at which a supercapacitor can operate, i.e. to which it can be charged, is dependent on the stability of the electrolyte and/or the electrodes. The maximum voltage of a capacitor is an important parameter, particularly so as the amount of energy stored by a capacitor is proportional to the square of the voltage. A supercapacitor with an organic electrolyte generally supports a higher voltage than one with an aqueous electrolyte. By utilising an organic electrolyte, the supercapacitor designer may produce a device with a working range of 2.5 to 2.7 V. In contrast, aqueous electrolytes, although often preferable for reasons of reduced cost and reduced toxicity, generally produce a device with a lower working voltage range. Known symmetric aqueous supercapacitors are generally unable to support voltages higher than 1.3-1.5 V. If electrodes of different materials are used, this voltage limit may reach 1.8-2.0 V. The limitation for an aqueous based supercapacitor is due to the electrolysis of water which in principle occurs when it is exposed to a potential difference of 1.23 V. In practice however in order to overcome the effect of overpotential a larger potential difference is required before electrolysis occurs.

Electrodes based on carbon have been associated with supercapacitors since the early days of their development. Initially carbon was of interest as an electrode material because it provided the possibility to manufacture electrodes with large surface areas. It was only later in the development of supercapacitor devices that the importance of the so-called double layer at the electrode surfaces was realised. This complex and often ill-understood phenomenon, which is linked to the use of carbon as an electrode material, is at the heart of the high capacitance values associated with supercapacitors. Supercapacitor devices which comprise carbon-based electrodes are considered to involve a double layer at the electrode surface, and the energy is stored electrostatically. Such supercapacitors are referred to as electrostatic double-layer capacitors, or EDLCs.

Other categories of supercapacitor exist. Electrochemical pseudocapacitors utilise metal oxide electrodes or conducting polymer electrodes. In contrast to the electrostatic charge storage mechanism of EDLCs, the charge storage in a pseudocapacitor is largely electrochemical. A third type of supercapacitor is the hybrid capacitor. A hybrid capacitor has asymmetric electrodes. One electrode is typically of carbon and has an electrostatic charge storage character; the other electrode is typically a lithium containing or a lithium doped material, which exhibits mainly electrochemical charge storage character.

Conventionally a supercapacitor can be thought of and is modelled as a series connection of two capacitors, one associated with each electrode. Each capacitor is positioned at the interface between electrode and the electrolyte, and is formed from the supercapacitor electrode, a dielectric layer formed from solvent molecules present in the electrolyte (called the inner Helmholtz plane), and a layer of charge carriers supplied by the electrolyte as counter-charges to charge on the electrode (called the outer Helmholtz plane). This triple structure of electrode, inner Helmholtz plane and outer Helmholtz plane forming a capacitive system at each electrode is referred to as the double layer, or electrical double layer.

Summary of this Appendix 1 Feature

A first aspect of the feature provides a symmetric supercapacitor device comprising: two electrodes, wherein each electrode comprises carbon foam as described in this specification (see for example Features A-K in Appendix 8); and an ion gel or hydrogel electrolyte enveloping the electrodes in an active area.

We have found that a symmetric supercapacitor device according to the above combination of features produces an enhanced operational voltage window. Referring to the device as symmetric means that the electrodes comprise, and may be composed of, the same material.

The operational voltage window, or window of operation, of a supercapacitor is a key parameter of such a device and is determined by the breakdown voltage of the electrolyte. For an aqueous electrolyte-based supercapacitor, the breakdown of water is generally responsible for limiting the operational voltage window.

Although the reasons for the unexpectedly large operational window observed with the presently disclosed device are not understood in detail, and without any constraint to theory, it is apparent that the exceptional properties are a consequence of the combination of carbon foam electrodes and the electrolyte, and in particular a consequence of the interface between these elements.

The large operational window of the present device equates in electrochemical terms to an unexpectedly large overpotential at the electrode. The overpotential is the potential difference beyond the thermodynamic redox potential for a particular reduction/oxidation reaction which is required for that reaction to occur. Overpotential is generally an ill-understood phenomenon, partly because there are many factors which contribute to it. For example, the overpotential is dependent on the electrode material, on the electrode morphology, and on the nature of the electrolyte. In the present feature, the large surface area presented to the electrolyte by the carbon foam electrodes is thought likely to play a role in the device performance. How ions diffuse to the electrode surface from the bulk of the electrolyte and the associated depletion of charge carriers at the electrode surface is known to have an effect on overpotential. This may play a role in the present device. Diffusion rates of charge carriers in the electrolyte may be affected by the presence of hydrated ions which are larger in size than un-hydrated ions. There may also be effects on the overpotential arising from the interaction between the charge carriers and the morphology of the carbon foam electrodes. The presence of the ion gel or hydrogel polymer is thought also to have an effect, possibly steric and related to the carbon foam morphology, on the diffusion of charge carriers to the electrode surface.

A hydrogel is a gel in which the liquid constituent is water, and which may be formed from a network of polymer chains. A supercapacitor in which the dielectric is formed by a hydrogel electrolyte would be expected to have the performance characteristics associated with an aqueous electrolyte-based supercapacitor. Against this expectation however, the present inventors have found that the performance of a supercapacitor according to the first aspect, i.e. a symmetric device, wherein the electrodes are of the same material, these electrodes comprising carbon foam and being enveloped in a hydrogel electrolyte, outstrips that expected of an aqueous based device. The operational voltage window of the device is unexpectedly enhanced over an aqueous electrolyte-based device. The window of operation is more akin to an organic solvent-based supercapacitor.

Polyvinyl alcohol (PVA), polyvinylpyrrolidone (PVP), sodium polyacrylate, acrylate polymers and copolymers with an abundance of hydrophilic groups are examples of polymers which may be utilised in hydrogels. Fluorinated hydrogels may be used. The combination of a hydrogel and ionic charge carriers helps to achieve the surprisingly large window of operation achieved by the present system.

The electrodes of the device presently disclosed are situated on the substrate and the electrolyte is present on top of the electrodes in a manner which seals at least part of the electrode structure, thus forming an active area. The active area of the supercapacitor is an area of the supercapacitor comprising electrolyte and electrodes in which charge is stored.

The electrodes of the device may have an interdigitated geometry, i.e. they may be interdigitated. An interdigitated electrode geometry helps to maximize the capacitance of the supercapacitor. An interdigitated electrode geometry additionally enables a device without a separator. Supercapacitors normally include a separator between oppositely facing electrodes to prevent short circuiting between the electrodes. The absence of a separator eases construction of a supercapacitor device. A separator may also have negative effects on device performance, for example by inhibiting charge flow leading to lowered charge/discharge rates. The absence of a separator avoids these negative performance effects.

An interdigitated electrode geometry is well suited to a symmetric device. It is clearly more complicated to construct an interdigitated electrode geometry structure if the materials of the opposing electrodes are different than if the electrodes are of the same material. If the electrodes are of the same material, then the electrodes can be manufactured, possibly in situ, in one method step. If different electrode materials are used, then a plurality of manufacture steps are required, greatly complicating the process of manufacture.

The absence of a separator additionally removes any negative effects that a separator may have on device performance, for example inhibition of charge flow leading to lowered charge/discharge rates.

The hydrogel electrolyte may comprise a concentration of charge carriers which is sufficiently high to produce said enhanced operational voltage window.

It may be that the enhanced operational voltage window is dependent on the concentration of charge carriers.

The charge carriers may have a redox potential supporting the enhanced operational voltage window.

The charge carriers may be provided by an aqueous solution of an acid, by an aqueous solution of an alkali, or by an aqueous solution of a salt. Acids which may be used include sulphuric acid. Alkalis which may be used include potassium hydroxide.

The hydrogel electrolyte may comprise a mixture of a hydrogel and a salt. The electrolyte may be composed of a hydrogel, whose hydrogeling polymer may be for example PVA or PVP. The salt may be, for example, $NaClO_4$ or $NaNO_3$ or $Mg(ClO_4)_2$. The molarity of the salt may be for example 0.5M or greater, for example 1M or greater, for example 2M or greater, for example 2.5M or greater, for example 3M or greater, for example approximately 5M. The molarity of the salt may be for example between 1M and 10M, or it may be for example between 2.5M and 7.5M.

Salts which may be used include phosphonium salts, perchlorate salts, nitrate salts and arsenate salts. Examples of salts include sodium sulphate, sodium disulphate, sodium persulphate, sodium perchlorate, lithium perchlorate, magnesium perchlorate, sodium nitrate, lithium hexafluoride arsenate. Aqueous solutions of these salts may be used in the electrolyte to provide ionic carriers.

The charge carriers may be ions. The charge carriers may be hydrated ions.

A hydrated ion is an ion in an aqueous environment. Polar water molecules arrange themselves around the ion forming a hydration sphere centred on the ion. The details of the mechanism behind the surprisingly wide enhanced operational voltage window observed with the present feature are ill understood and the inventors do not wish to be constrained by theory. Nevertheless, the surprising advantageous properties of the present device are the result of a synergy between the electrode and the dielectric materials. The enhanced performance is an expression of a lack of water splitting under voltage conditions where the person skilled in the art would expect electrolysis to occur. It is expected that the interface between the electrode and the electrolyte lies at the origin of its performance. It is possible that there is a synergetic interaction between the size of the charge carriers, possibly hydrated, and the size of pores present in the electrodes. A hydrogel comprises a network of polymer chains and this chain network of the hydrogel may also have a physical (steric) effect which limits the exposure of water molecules to potential difference which can cause their splitting.

The increased size of hydrated ions is thought to combine with the porous structure of the carbon foam electrode to hinder diffusion close to the electrode surface, with the consequence that the overpotential is increased.

The electrodes of the symmetric supercapacitor device may comprise porous carbon foam. Optionally the electrodes may comprise no additional binder material.

Porous carbon foam electrodes are believed to combine with the charge carriers in the electrolyte to increase the overpotential and thereby enhance the operational window of the supercapacitor.

Carbon foam consists of one or more 2D carbon sheets (each sheet being a layer of sp2 bonded carbon) folded back on one another to form a three-dimensional structure rather than a planar sheet. Carbon foam lacks the regular AB stacking of planar carbon sheets found in graphite or multilayer 2D carbon. A carbon foam material is typically porous. Carbon foam has a high surface area. The porosity of the carbon foam and as a result the surface area of the foam can be controlled by varying parameters of the growth method. This has the advantage that the porosity of the electrodes of the device can be controlled during a manufacturing process of the electrodes.

The carbon foam electrodes may be on a substrate. The carbon foam electrodes may be on a polyimide substrate. The polyimide substrate may be polyimide. The substrate may form a substrate of the supercapacitor device. The substrate may be sufficiently thin so as to be flexible, resulting in a supercapacitor device which is flexible. It may be that the substrate comprises (e.g. is formed from) one or more of the following materials: polyimides (for example, poly(4,4'-oxydiphenylene-pyromellitimide), otherwise known as polyimide), polyetherimides (PEI), poly(methyl methacrylate) (PMMA) (e.g. spray-coated PMMA), polyurethanes (PU), polyesters, vinyl polymers, carbonized polymers, photoresist polymers, alkyds, urea-formaldehyde.

These substrate materials can be utilised as a source of carbon which is transformed to carbon foam using the Dual Laser process described above. Production of carbon foam in this way can be achieved by irradiating a polyimide substrate (for example) with radiation, for example laser radiation. This produces carbon foam which is chemically fixed indirectly to the substrate via an intermediary layer of an amorphous non-graphene substance which is directly attached to the substrate (see earlier in this specification), resulting in a robust structure. The electrodes are thus produced in situ by using part of the substrate as a carbon source, i.e. as a reagent for producing carbon foam. The structure can at the same time as being robust be flexible. A flexible device is advantageous in many respects. A device which is flexible can be advantageously packaged, for example by rolling it up. A device which is flexible can also be attached to surfaces of curved structures, for example.

The substrate may be substantially planar. The substrate may be a film, for example a thin film. The substrate may have a thickness of greater than 5 m. The substrate may have a thickness of less than 120 m. The substrate may have a thickness of between 5 m and 120 m. The thickness of the substrate may be substantially uniform across the surface of the substrate. The substrate may be flexible. The substrate may be pliable.

The substrate may be a polyimide tape (e.g. a polyimide tape) having a first surface and a second surface.

The electrodes may be mass balanced to optimise the operational voltage window.

A supercapacitor can be considered as two capacitors connected together in series. To maximise the capacity of the supercapacitor, the capacity of the two constituent capacitors should be equal. This can be engineered by adjusting the surface area of the individual electrodes, thus compensating for other factors contributing to the capacity, such as the nature of the solvated ions. This process of adjusting the individual electrodes is called mass balancing. Mass balancing of the electrodes has the advantage that the capacity of the superconductor device can be maximised, and the lifetime of the supercapacitor can be extended.

In a second aspect, there is a method of manufacturing a symmetric supercapacitor device according to the first aspect, whereby:
  the electrodes are formed on a substrate;
  an electrolyte precursor comprising charge carriers and a hydrogel is applied to the electrodes;
  the electrolyte is formed from the precursor, causing the electrodes to be embedded in the electrolyte in an active area.

Electrodes of carbon foam may be made by converting part of the substrate (if said substrate is or comprises a carbon source) to carbon foam, or by using chemical or physical deposition methods, such as physical vapour deposition (PVD), chemical vapour deposition (CVD), molecular beam epitaxy (MBE), sputtering, laser induced growth, pulsed laser deposition, cathodic arc deposition, spin coating, dip coating or sol-gel methods. In this way, the electrodes are produced on the substrate in situ.

The electrolyte precursor may be prepared by preparing an aqueous solution of charge carriers and by mixing this aqueous solution with a hydrogel. The electrodes may be formed using laser radiation.

When preparing the electrolyte precursor the undesirability of precipitation or crystallisation of the salt in the electrolyte should be kept in mind. Precipitation of salt, or any solid, from the electrolyte may lead to cracking of the device, or to other defects of the device, or defects in the performance of the device. This places an upper limit on the concentration of the salt solution. It may be advantageous to avoid using a supersaturated solution of salt. The precise upper concentration limit may depend on the particulars of the chemicals present. For sodium perchlorate, the inventors have found that a concentration of 5M produces an electrolyte which avoids precipitation or crystallisation of the salt and also, in combination with the other features, gives a supercapacitor device with an operational window beyond that which would be expected from a consideration of the individual components. The electrolyte may comprise a salt solution with a concentration of greater than 4M. The electrolyte may comprise a salt solution with a concentration of greater than 3M, or greater than 2M, or greater than 1M, or greater than 0.5M.

At higher concentrations, salt was observed to readily precipitate from the electrolyte gel, and too quickly for a viable device. This precipitation may be caused by evaporation of water. Water loss through hydrolysis may be another cause. In any case, the inventors found that although an electrolyte gel could be formed using concentrations of sodium perchlorate up to 16.5 M, the problem of precipitation was observed at all concentrations upwards of 10 M.

When manufacturing the hydrogel electrolyte, a high molar solution of salt may be used.

Smaller concentrations of salt solution are generally advantageous for cost reasons.

The carbon foam layer may be between 10 m and 100 m thick. This facilitates a flexibility in the device. The device may be rolled up to become more compact.

A gap of between 100 m and 1000 m may separate the electrodes from each other. The capacity of the device has a dependency on the gap between the electrodes and consequently regulation of this gap affects the amount of charge which can be stored.

The operational window of the present device may be greater than 1.5 V, or it may be greater than 2 V, or it may be greater than 2.5 V.

Optional and preferred features of any one aspect of the system may be features of any other aspect of the system.

Appendix 1 Description of the Drawings

We reference the following Figures in which:

FIG. 59 presents carbon foam cyclic voltammograms for positive voltages measured at 25 mV/s.

FIG. 60 presents carbon foam cyclic voltammograms for negative voltages measured at 25 mV/s.

FIG. 61 presents carbon foam galvanostatic charge discharge (GCD) curves measured at 0.5 mA/cm$^2$ for positive voltage windows.

FIG. 62 presents carbon foam galvanostatic charge discharge (GCD) curves measured at 0.5 mA/cm$^2$ for negative voltage windows.

FIG. 63 presents carbon foam galvanostatic charge discharge (GCD) data taken from five two-electrode devices.

Figure 64B:
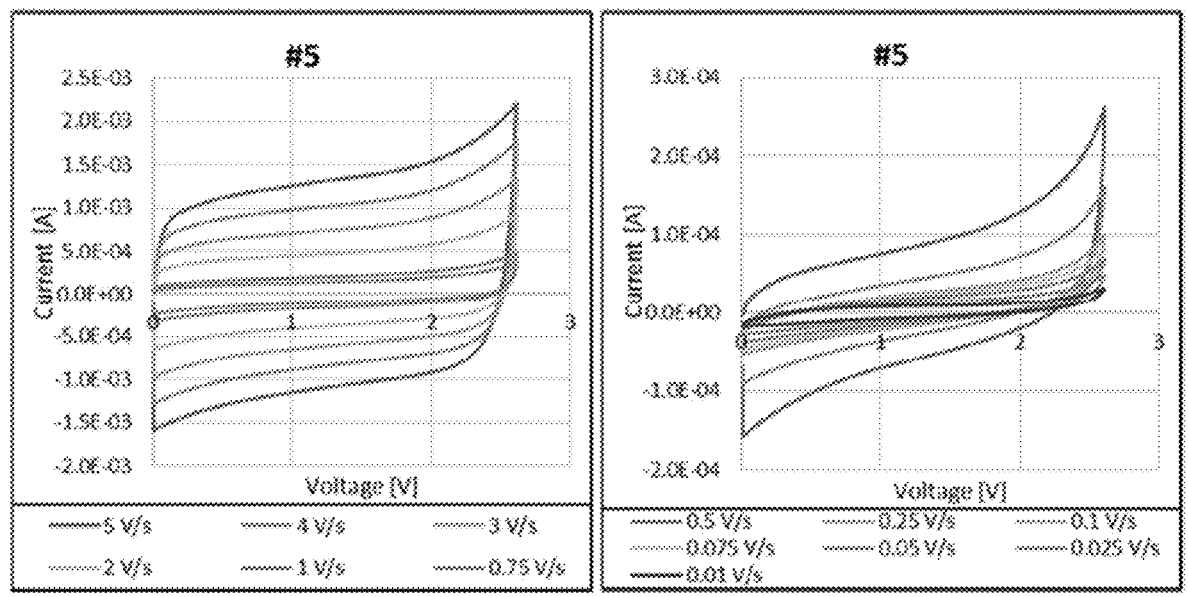

FIG. 64 presents carbon foam cyclic voltammograms recorded from five different two-electrode devices at high (left) and low (right) scan rates.

FIG. 65 presents carbon foam cyclic voltammogram data for five additional systems, differing through the nature of the hydrogel electrolyte: (a) 3M NaClO$_4$ and PVA; (b) 1M NaClO$_4$ and PVA; (c) 2.5M NaNO$_3$ and PVA; (d) 3M Mg(ClO$_4$)$_2$ and PVA; and (e) 5M NaClO$_4$ and PVP.

Appendix 1 Detailed Description

Two-Electrode Supercapacitor

A typical carbon foam supercapacitor device according to this feature has interdigitated carbon foam electrodes, as shown in FIG. 26. To re-cap, a polyimide substrate supports the supercapacitor electrodes which are composed in this example of carbon foam and which are arranged in an interdigitated comb geometry, and which form an interdigitated electrode structure. A silver current collector runs down each side of the device serving to electrically unify each opposing electrode. The non-substrate sides of the interdigitated electrode structure is enveloped in a hydrogel. It is possible to add a polyimide lid to contain the hydrogel, or otherwise package the device in a suitable manner.

As explained earlier, the carbon foam electrodes may be formed on the polyimide substrate. By exposing a suitable substrate, being one which provides a source of carbon, in this example a polyimide substrate, to a laser beam, carbon foam is created over the substrate. Carbon foam produced in this way grows out of the substrate and is adhered indirectly to the substrate. The substrate and a carbon foam electrode formed in situ in this manner form one body.

The carbon foam electrodes were produced using an infrared CO2 laser under ambient conditions. The substrate was commercial polyimide film with a nominal thickness of 127 microns. One example has eleven parallel strips of carbon foam for each electrode. This number can clearly be varied. The carbon foam strips for the positive electrode are offset from the carbon foam strips for the second electrode, thus forming the interdigitated structure.

The electrode dimensions are as set out in Table 6:

TABLE 6

| | |
|---|---|
| Mass balance ratio | 1.18 |
| Positive half-cell 'electrode fingers' | |
| Length (cm) | 0.4 |
| Width (cm) | 0.0472 |
| Thickness (cm) | 0.005 |
| Number of fingers | 11 |
| Total Area exposed (cm$^2$) | 0.20768 |
| Negative half-cell 'electrode fingers' | |
| Length (cm) | 0.4 |
| Width (cm) | 0.04 |
| Thickness (cm) | 0.005 |
| Number of fingers | 11 |
| Total Area exposed (cm$^2$) | 0.176 |
| Distance between fingers (cm) | 0.04 |
| Total active electrode surface area (cm$^2$) | 0.38368 |
| Total active electrode volume (cm$^3$) | 0.0019184 |

Three-Electrode Device

In addition to the two-electrode supercapacitor device, a three-electrode test device additionally comprising a reference electrode has also been fabricated. The three-electrode device comprises a working electrode, a counter electrode and an Ag/AgCl reference electrode. Each of the working electrode and the counter electrode is made from carbon foam, produced in this particular embodiment by the Dual Laser illumination of a polyimide substrate, as described earlier. This device is used to determine the voltage range within which the NaClO4 hydrogel electrolyte is stable. The three-electrode device was left to stabilise for at least one hour following fabrication before any measurements were performed.

Preparation of the Hydrogel Electrolyte

Each of the two-electrode and the three-electrode devices disclosed is based on a 5M solution of sodium perchlorate and the electrolyte was prepared in the manner now described. A 5M solution of sodium perchlorate was prepared by dissolving sodium perchlorate (98% purity from Sigma-Aldrich) in deionised water (quantities used: 3.061 g of NaClO4 was dissolved in 5 ml deionised H2O). The sodium perchlorate solution was then stirred with a magnetic stirrer on a hot plate at 120° C. while polyvinyl alcohol (PVA, 99% hydrolyzed, Sigma-Aldrich) was added. For every 10 mL of solution, 1.5 g of PVA was dissolved. The mixture of sodium perchlorate solution and PVA was removed from the hot plate and allowed to cool, whereupon it forms a white opaque gel-like solution. The gel solution is then heated to 120° C., until it liquefies and turns clear. It is then deposited onto the graphene electrodes. After deposition on the electrode surfaces, the liquified hydrogel electrolyte material solidifies in approximately 5 minutes at room temperature. The quantity of electrolyte which is deposited on the electrodes depends on the surface area to be covered. For the test device, 150 µL of electrolyte was deposited.

Experimental Results from the Three-Electrode Device

The performance which is obtainable from a supercapacitor is ultimately limited by the stability of the electrolyte.

To test the electrolyte stability in the present system, several experiments were run using the three-electrode device herein described. Differential pulse voltammetry (DPV) was initially used to select which voltage windows were investigated by cyclic voltammetry (CV) and galvanostatic charge discharge (GCD) measurements.

i Cyclic Voltammetry

Cyclic voltammetric measurements were carried out to determine the stability of the electrolyte. In a standard three electrode measurement the potential between the working and reference electrodes was swept at a constant rate from an open circuit potential (OCP; nominal 0 V) to a predetermined upper limit, before being swept down again. The current response at the working electrode was monitored during this time.

Results of these measurements are shown in FIG. 59 and FIG. 60. FIG. 59 shows results in which the voltage is scanned from OCP in a positive direction.

The upper set of results shows four voltammograms of maximum potential 1 V, 1.2 V, 1.3 V and 1.4 V. The lower set of results additionally includes a voltammogram of maximum potential 1.6 V. As the upper voltage limit increases beyond 1.2 V the shape of the cyclic voltammogram becomes less "square-like". The tail which becomes increasingly prominent as the end scan voltage becomes larger is indicative of electrolyte degradation, probably due to electrolysis of water. These voltammograms indicate that the electrolyte is stable up to +1.2V.

FIG. 60 shows a similar set of results but taken for negative voltages. These data suggest that the electrolyte is stable to −1.4 V.

Taken together, the data in FIGS. 59 and 60 give a working window for the device of 2.6 V. This is considerably higher than anything expected from using a water-based electrolyte.

ii Galvanostatic Charge Discharge (GCD) Data

Galvanostatic charge discharge (GCD) measurements were performed to determine coulombic efficiency from charge and discharge times. In these measurements a current is applied between the counter and working electrodes, and the voltage response of the working electrode (with reference to the reference electrode) is measured. GCD curves measured using a discharge current of 2×10−5 A (0.5 mA/cm2) for selected voltage windows are shown in FIG. 61 for positive voltages. The curves plateau beyond 1.2 V which indicates electrolyte degradation. GCD curves for selected negative voltage windows are shown in FIG. 62.

Significant plateauing is seen for voltage windows up to −1.6 V and −1.8 V, indicating electrolyte degradation. A voltage window of −1.4 V has a triangular shaped GCD curve and indicating stability.

Results from the cyclic voltammetry measurements and from the galvanostatic charge discharge measurements on the three-electrode system are summarised in the following tables.

The first table, Table 7, summarises average coulombic efficiency, areal discharge capacitance and discharge energy data for positive voltage windows.

TABLE 7

| EW [V] | Average Coulombic efficiency [%] | stdev [%] | Average Discharge areal Cap. [mF/cm²] | stdev [mF/cm²]] | Discharge Energy from GCD [J] |
|---|---|---|---|---|---|
| 1 | 93.9 | 0.91 | 1.59 | 5.66E−02 | 3.12E−05 |
| 1.1 | 91.7 | 1.32 | 1.69 | 6.23E−02 | 4.02E−05 |
| 1.2 | 87.8 | 1.30 | 1.82 | 7.53E−02 | 5.17E−05 |
| 1.4 | 54.9 | 7.04 | 2.95 | 3.56E−01 | 1.14E−04 |
| 1.6 | 25.3 | 2.71 | 9.60 | 1.32E+00 | 4.05E−04 |

The second table, Table 8, summarises average coulombic efficiency, areal discharge capacitance and discharge energy data for negative voltage windows.

TABLE 8

| EW [V] | Average Coulombic efficiency [%] | Stdev | Average Disch. Areal Cap. [mF/cm²] | stdev | Discharge Energy from GCD [J] |
|---|---|---|---|---|---|
| −1 | 87.86 | 9.911 | 1.2970 | 0.311 | 2.65E−05 |
| −1.2 | 87.98 | 7.354 | 1.5103 | 0.577 | 3.84E−05 |
| −1.4 | 87.04 | 5.636 | 1.8482 | 1.012 | 5.72E−05 |
| −1.6 | 82.21 | 5.419 | 3.1486 | 2.598 | 1.30E−04 |
| −1.8 | 67.16 | 17.728 | 5.3844 | 4.637 | 2.88E−04 |

In these summary tables, the coulombic efficiency is the ratio of the stored and delivered energy measured in the second GCD cycle; the areal capacitance in mF/cm2 is calculated by the following formula:

$$\text{Areal Capacitane}\left[\frac{mF}{cm^2}\right] = \frac{2 * E_{(dis)charge}[J]}{A_{geometric}[cm^2] * (EW)^2[V^2]} * 1000$$

and the discharge energy is the integral over time of the charge and discharge portions of the GCD curve.

The GCD curves indicate that +1.2 V and −1.4 V are realistic positive and negative voltage limits.

These values of voltage limits and areal capacitances allow a mass balance to be calculated according to the following formula:

$$\frac{m^+}{m^-} = \frac{C^- \Delta E^-}{C^+ \Delta E^+}$$

where $m^+$=mass of positive electrode, $m^-$=mass of negative electrode, $C^+$=capacitance (F) of positive electrode, $C^-$=capacitance (F) of negative electrode, $\Delta E^+$=positive voltage window limit, $\Delta E^-$=negative voltage window limit.

Experimental Results from the Two-Electrode Device— Supercapacitor Performance

Galvanostatic charge discharge (GCD) data were collected for the two-electrode supercapacitor device for a range of applied current densities from 0.25 mA/cm² to 30 mA/cm². FIG. 63 plots GCD results taken from five different devices (CH1-CH5). A voltage window of 2.6 V is utilised to collect these data, with greater electrolyte stability being observed at higher current densities. Further performance data for the two-electrode supercapacitor are presented in FIG. 64, showing cyclic voltammograms recorded from five different devices (devices #1 to #5) according to the present implementation at scan rates from 0.01 V/s to 5 V/s.

The cyclic voltammograms in the right hand column were recorded at low scan rates (0.01 V/s, 0.025 V/s, 0.05 V/s, 0.075 V/s, 0.1 V/s, 0.25 V/s and 0.5 V/s) and those in the left hand column at high scan rates (0.75 V/s, 1 V/s, 2 V/s, 3 V/s, 4 V/s and 5 V/s). The trend shown in these data is to higher electrolyte stability at higher scan rates. In each set of cyclic voltammograms shown in FIG. 64, faster scan voltages result in larger differences in the current response between ramping the voltage up and ramping the voltage down.

In addition to the above disclosed devices, devices were constructed in a similar way but with the hydrogel electrolyte comprising (a) 3M $NaClO_4$ and PVA, (b) 1M $NaClO_4$ and PVA, (c) 2.5M $NaNO_3$ and PVA, (d) 3M $Mg(ClO_4)_2$ and PVA, and (e) 5M $NaClO_4$ and PVP.

Cyclic voltametric measurements on these additional devices are shown in Figure [.]10. For each electrolyte a cyclic voltammogram was run between 0 V and 0.7 V; between 0 V and 0.8 V; between 0 V and 0.9 V; between 0 V and 1.0 V; between 0 V and 1.2 V; between 0 V and 1.3 V; and between 0 V and 1.4 V. Similarly, for each electrolyte a cyclic voltammogram was run between 0 V and −0.7 V; between 0 V and −0.8 V; between 0 V and −0.9 V; between 0 V and −1.0 V; between 0 V and −1.2 V; between 0 V and −1.3 V; and between 0 V and −1.4 V. These data are shown in FIG. 65.

The data indicate that in each device the electrolyte is stable to the limits of −1.4 V and +1.1 V, and to +1.2 V for each of (d) 3M $Mg(ClO_4)_2$ and PVA, and (e) 5M $NaClO_4$ and PVP.

Further variations and modifications may be made within the scope of the disclosure.

Appendix 1 Concepts

1. A symmetric supercapacitor device comprising:
   two electrodes, wherein each electrode comprises carbon foam material; and
   a hydrogel electrolyte enveloping the electrodes in an active area.
2. The symmetric supercapacitor device according to concept 1, wherein said hydrogel electrolyte comprises a mixture of a hydrogel and a salt.
3. The symmetric supercapacitor device according to either concept 1 or concept 2, comprising ionic charge carriers.
4. The symmetric supercapacitor device of concept 3, wherein the ionic charge carriers are hydrated.
5. The symmetric supercapacitor device according to any one of the preceding concept, wherein said electrodes comprise carbon foam.
6. The symmetric supercapacitor device according to any one of the preceding concept, wherein said electrodes comprise carbon foam material.
7. The symmetric supercapacitor device according to any one of concepts 1, 5 and 6, wherein the carbon foam material is formed on a substrate.
8. The symmetric supercapacitor device according to concept 7, wherein the substrate is a polyimide substrate.
9. The symmetric supercapacitor device according to either concept 7 or concept 8, wherein the substrate forms a substrate of the device.
10. The symmetric supercapacitor device according to any of the preceding concept, wherein the symmetric supercapacitor device is flexible.
11. A method of manufacturing a symmetric supercapacitor device according to any of concept 1 to 10, whereby:
    the electrodes are formed on a substrate;
    an electrolyte precursor comprising charge carriers and a hydrogel is applied to the electrodes;
    the electrolyte is formed from the precursor, causing the electrodes to be embedded in the electrolyte in an active area.
12. The method of manufacturing a symmetric supercapacitor device according to concept 11, whereby the electrolyte precursor is prepared by preparing an aqueous solution of charge carriers and by mixing this aqueous solution with a hydrogel.
13. The method of manufacturing a symmetric supercapacitor device according to either concept 11 or concept 12, whereby the electrodes are formed in situ.
14. The method of manufacturing a symmetric supercapacitor device according to any one of concepts 11 to claim 13, whereby the electrodes are formed by irradiating said substrate with laser radiation.

Appendix 2: Gii-Cap+ Hydrogel

In this Appendix 2 section, we demonstrate the effectiveness of Gii carbon foam as an ideal substrate onto which pseudocapacitive materials can be deposited, yielding greatly enhanced capacitance compared to Gii carbon foam as the sole electrode material. For context, these carbon foam-only devices show full cell specific capacitances in the 0.25-0.4 mF/cm2 region.

Sample Preparation

A7-sized Gii-Caps were electrodeposited in order to cast a layer of pseudocapacitive material onto them. Both v4 and v5 designs are suitable for electrodeposition, yielding similar performance. Results for v4 samples will be detailed in this document.

Sheets containing 6 Gii-Cap devices (2 rows, 3 columns) were first cut in half, yielding two 3-device half-sheets. The two half-sheets were mounted on an in-house made jig and placed inside the electrodeposition tank, MiniPlant 3. Samples were first deposited with MnOx, rinsed with deionised water and subsequently deposited with FexOy. After FexOy deposition, they were rinsed again and dried in air at 40° C. for at least 2 hours.

The specifics of the deposition are follows. Manganese oxide precursor solution contained a mixture of manganese acetate tetrahydrate (40 mM) and a surfactant (Tween20, 0.1 wt %). Depositions were carried out by constant-current pulses. ON time was 0.5 seconds, OFF time 2 seconds. ON current applied was 744 mA (19.14 mA/cm2, based on the nominal geometric area of the electrode). OFF current was 0 mA, i.e. open circuit. MnOx was deposited for a total of 390 cycles (3.7 C/cm2 per electrode). The FexOy precursor solution comprised of a 40 mM Fe-TEA complex (TEA is triethanolamine). It contained FeCl3, TEA, and NaOH. Deposition was also carried out by constant-current pulses. ON time was Is, OFF time 2 s. ON current applied was 233 mA (6 mA/cm2), with OFF current set to 0 mA. The deposition was performed for 1,000 cycles, resulting in 6 C/cm2 per electrode.

After depositions were complete and samples dried, they were singulated into individual devices. A quasi-reference electrode (RE) comprising screen printed Ag/AgCl ink (used for monitoring individual electrode potentials during testing) was fixed along one of the device's edges, outside the working area. Electrolyte was then applied to the devices' working area and extended onto the RE. The electrolyte used was an aqueous hydrogel, containing NaClO4 as the salt and PVA (Polyvinyl alcohol) as the gelling agent. A stock batch of hydrogel contains 199.5 g NaClO4 monohydrate, 256.9 ml deionised water and 42.4 g PVA. The mixture is solid at room temperature, becoming liquid at temperatures close to water's boiling point. In order to dispense the hydrogel, it was heated to 94° C. to liquify it. It was dispensed by pipetting the liquid electrolyte onto the active area and RE, typically 3-4 ml per device. Hydrogel on the samples was then allowed to cool, resolidifying after approximately 10 minutes. Following solidification, excessive electrolyte evaporation was prevented by applying a polyimide film onto the devices. Once the lid was applied, the devices were ready for testing.

Electrochemical Testing Parameters

Samples were electrochemically tested using a Biologic VMP-3 potentiostat/galvanostat. They were subjected to an initial performance characterisation, followed by 500 charge-discharge cycles (conditioning protocol), and completed with a final characterisation. The nominal values reported are those obtained in the second characterisation step. The conditioning protocol was applied to bring the samples to a more stable and consistent performance.

During testing, voltage was controlled at the cell level (absolute difference between positive and negative electrodes), with 0 V as the minimum and 2 V as the maximum. The potential differences between each electrode and the common RE were also measured, enabling the calculation of individual electrode performance metrics.

The two characterisation steps are known as Ragone tests. They were identical and comprised of the following:
a) Cyclic voltammetry (CV). Three scan rates used: 50, 100 and 250 mV/s. Five cycles per scan rate were applied.
b) Galvanostatic Charge-Discharge (GCD). Seven current densities were tested: 1, 2.5, 5, 7.5, 10, 20 and 30 mA/cm2 (based on total device geometric area=12.96 cm2). Five cycles were performed at each current density.
c) Electrochemical Impedance Spectroscopy (EIS). Voltage-controlled, using a 1V DC applied voltage and 10 mV AC signal. Measured in 1 MHz-10 mHz region.

The conditioning step was achieved by performing 500 GCDs at 10 mA/cm2.

Nominal capacitance values were calculated from GCDs after conditioning at 5 mA/cm2. ESR (Equivalent Series Resistance) was calculated from the voltage drop at the beginning of the discharge half-cycle in GCD. Reported ESR values are also from the final GCD at 5 mA/cm2. ESR can also be calculated from the Nyquist Plot attained from EIS. Results obtained are nearly identical.

Results and Conclusions

A total of 48 devices accounted for in the averages. Samples from batches 3258 and 3259 were employed. Typical CV curves are shown in FIG. 66. The full cell response (left panel) shows a quasi-rectangular shape, indicating that the storage mechanism is not purely capacitive. This is expected, as both MnOx and FexOy are redox-active materials. Most of the capacitance of the device is concentrated at cell voltages above 0.5 V, as seen by the small envelope of the full cell curve in the region 0-0.5 V. The explanation for this smaller capacitance at low cell voltages can be seen on the half-cell curves, shown on the right panel of FIG. 66. From this graph, it can be seen that MnOx acts as the positive electrode, while FexOy is the negative electrode. MnOx is a near-ideal pseudocapacitive material, as demonstrated by the largely rectangular shape of its CV (grey trace).

Meanwhile, the FexOy electrode shows a more asymmetric response with respect to potential. Most of its capacitance is concentrated at potentials below 0 V vs Ag/AgCl. At potentials >0 V vs Ag/AgCl, FexOy displays little capacitance, as seen by the small envelope of the blue trace at these potentials. This asymmetric FexOy response therefore explains the smaller capacitance at low voltages obtained in the full cell.

FIG. 66 shows Post-conditioning CV curves from sample 3258-1#4, obtained at 100 mV/s. Left panel shows full cell CV, while right panel displays the half-cell curves obtained during the full cell measurement.

Capacitance calculations were performed using the GCD curves, as these provide more accurate values. A typical GCD curve after conditioning is shown in FIG. 67, with both full and half-cell measurements displayed. The device shows a good capacitive response with a quasi-triangular curve. The full cell presents a linear discharge from the maximum voltage down to −0.5 V, indicating near-ideal capacitive behaviour enabled by the pseudocapacitance of MnOx and FexOy. As seen in the CV curves, FexOy shows an asymmetric capacitance vs potential relationship, which explains the faster discharge at cell voltages below 0.5 V.

FIG. 67 shows post-conditioning GCD curves from sample 3258-1#4, obtained at 5 mA/cm2. Full cell and corresponding half-cell responses shown in top line, middle line and the bottom line, respectively.

In addition to different pseudocapacitive behaviour with respect to potential, the MnOx and FexOy electrodes also show different levels of capacitance. Both electrodes occupy the same geometric area in the device, however the MnOx electrode experiences a much smaller electrochemical window within the device (see differences between maximum and minimum electrode potentials in FIG. 66 and FIG. 67). The reason for the smaller MnOx window (0.65±0.06 V) is its larger specific capacitance compared to FexOy (1.35±0.06 V window). For the devices assessed in this study. The MnOx capacitance after conditioning reached 246.8±36.0 mF/cm2, while that of the FexOy electrodes was 171.4±38.4 mF/cm2. These Gii-Cap+ devices are therefore symmetric in terms of electrode dimensions but asymmetric in terms of electrode composition and potential split.

Since a full cell is effectively two capacitors (formed by the double layer between an electrode and electrolyte counterions) in series, the total cell capacitance will be lower than that of a single electrode. The average full cell capacitance after conditioning was 52.5±9.4 mF/cm2. At the same current density as used for reporting nominal capacitance (64.8 mA, 5 mA/cm2 at the cell level), the ESR calculated from the voltage drop at the beginning of discharge was 0.85±0.12Ω.

EIS measurements further confirm the good capacitive response of these devices, as seen in FIG. 68. From the Nyquist plot, it is possible to estimate ESR by locating the point at which the curve crosses the y-axis. In the case of the sample shown in FIG. 68, the ESR calculated from EIS was 0.78Ω, which matches well with the 0.73Ω calculated from GCD for the same sample. The Bode plot provides information about behaviour of the devices at different frequencies. At high frequencies, e.g. 100-10000 Hz, the devices function essentially like resistors, with a 0° phase angle. As the frequency drops, phase angle increases, indicating a larger capacitance contribution (an ideal capacitor has a −90° phase angle). When the phase angle surpasses the 45° mark, the device is considered majority capacitive in nature. Hence, the time at which the 45° phase shift occurs can be considered the characteristic time constant of the device. For the samples in this study, the average time constant was 4.48±1.18 seconds. This time constant can be understood as a cycle time threshold for effective capacitive response. At cycle times below the time constant, the device will not operate fully adequately.

FIG. 68 shows post-conditioning Nyquist (left) and Bode (right) plots from sample 3258-1#4, obtained from potentiostatic EIS at 1V DC (full cell). Inset in left panel shows a magnified view of the high frequency response.

Considering that devices utilising Gii as their sole electrode material display specific capacitances of 0.25-0.4 mF/cm2, the addition of pseudocapacitve materials has enhanced the energy storage capacity of these Gii-Caps more than 100×. Moreover, the addition of these metal oxides does not significantly increase the ESR of these devices, maintaining their usefulness in high power applications. The electrodeposition process is controllable, enabling the fabrication of cells with less deposited material, and therefore less total capacitance, if desired. The resulting devices are asymmetric in nature, with MnOx as the primary positive electrode and FexOy as its negative counterpart.

Appendix 3 GiiCap Iongel

Goal: To demonstrate the specific capacitance, and electrochemically stable window (ESW) of an electrolyte formulation, comprising room temperature molten salts 1-ethyl-3-methylimidazolium tetrafluoroborate (EMIMBF$_4$) and fumed silica, known as Iongel in conjunction with GiiCap® A7 devices at a 'low' humidity and an 'air-free' argon atmosphere environment.
Experimental Conditions:

All electrochemical tests were conducted under a '3-electrode' setup wherein a regular interdigitated A7 device was manufactured with a 'working' electrode and 'counter' electrode area ratio of 1:2, and a third quasi-reference electrode comprising screen printed AgCl ink for monitoring individual electrode potentials during testing.
Electrolyte, Iongel, was prepared and stored in an air-free environment.

Prior to application onto the A7 device for testing, the Iongel was heated to 90 C and subsequently dispensed onto the A7 by 'doctor blading' a thin and consistent layer. The electrolyte was allowed to cool before the devices were ready for testing and connection. For air-free devices, testing was conducted in the same air-free environment wherein electrolyte was stored and dispensed, where the devices were connected to the electrochemical testing instrument: Biologic VMP-3 potentiostat.

For the low humidity environment, devices were transferred to a humidity controlled chamber set to 20% relative humidity and sealed and connected to the instrument.

For each humidity, a range of maximum electrode potentials (Emax) in Volts (V) close to nominal literature values for the neat electrolyte1 were tested. They were:

Positive: 2.0, 1.9, 1.8, 1.7, 1.6, 1.5
Negative: −2.0, −1.9, −1.8, −1.7, −1.6
For each humidity and electrode potential combination, N=8 samples were made from scratch.
Electrochemical Testing Parameters:

A standard protocol was used, where the testing window was 0.0-Emax V Vs. OCV. OCV was quantified as 0.25 V Vs. AgCl Qref.

Electrochemical tests were broken down into 3 stages: a) Ragone Characterisation; b) Long-Term (LT) cycling; c) Ragone Characterisation (post).

Ragone characterisation both before and after LT cycling comprised: OCV, 1 hour; Cyclic Voltammetry (CV) at 100, 1000 mV/s with 5 cycles each; Galvanostatic Charge-Discharge (GCD) at 5, 10 mA/cm2 with 10 cycles each; Potentio-electrical impedance spectroscopy (PEIS) between 10 MHz-0.01 Hz.

LT cycling comprised: CV at 750 mV/s for 5000 cycles.

Determination of electrochemical stability was by visual post-mortem analysis of electrode damage and electrolyte discolouration; and assessment of Coulombic efficiency change over the LT cycling period. Determination of device performance was determined from Specific Capacitance by GCD after the 5000 LT cycles.
Conclusion:

ESW was determined by plotting Coulombic Efficiency of the LT CV cycles versus number of cycles. When Coulombic efficiency remained consistent throughout the 5000 cycles, it would be determined that the cycling Emax was stable for the given environmental condition. From this analysis, it was found that at 20% relative humidity air, Iongel-A7 devices were stable at negative and positive electrode potentials of −1.6 and +1.6 V respectively. While in the air-free environment, negative and positive ESW were determined to be −1.8 and +1.7 V respectively.

In terms of performance evaluation, it was found that at the positive window, 20% relative humidity and air-free devices had specific capacitances of 2.11 and 1.60 mF/cm$^2$ respectively. The negative window specific capacitances at 20% and air-free environments were 1.55 and 2.11 mF/cm$^2$.

Figure 69:
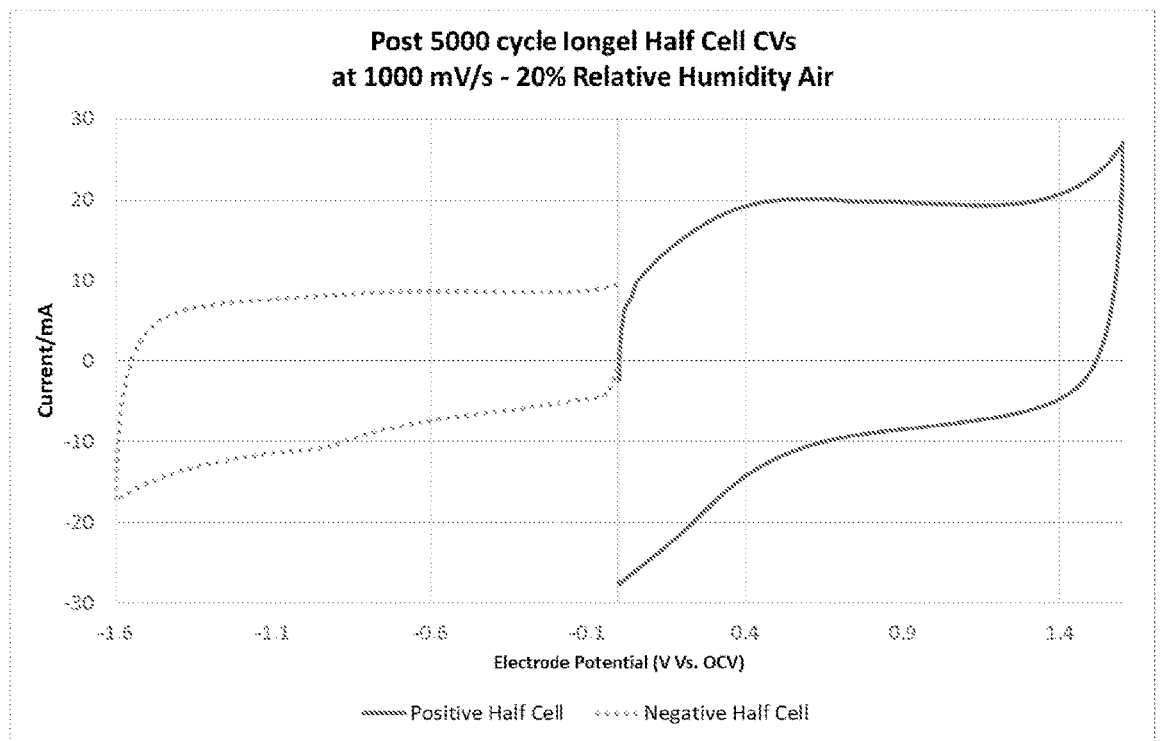
Figure 70:
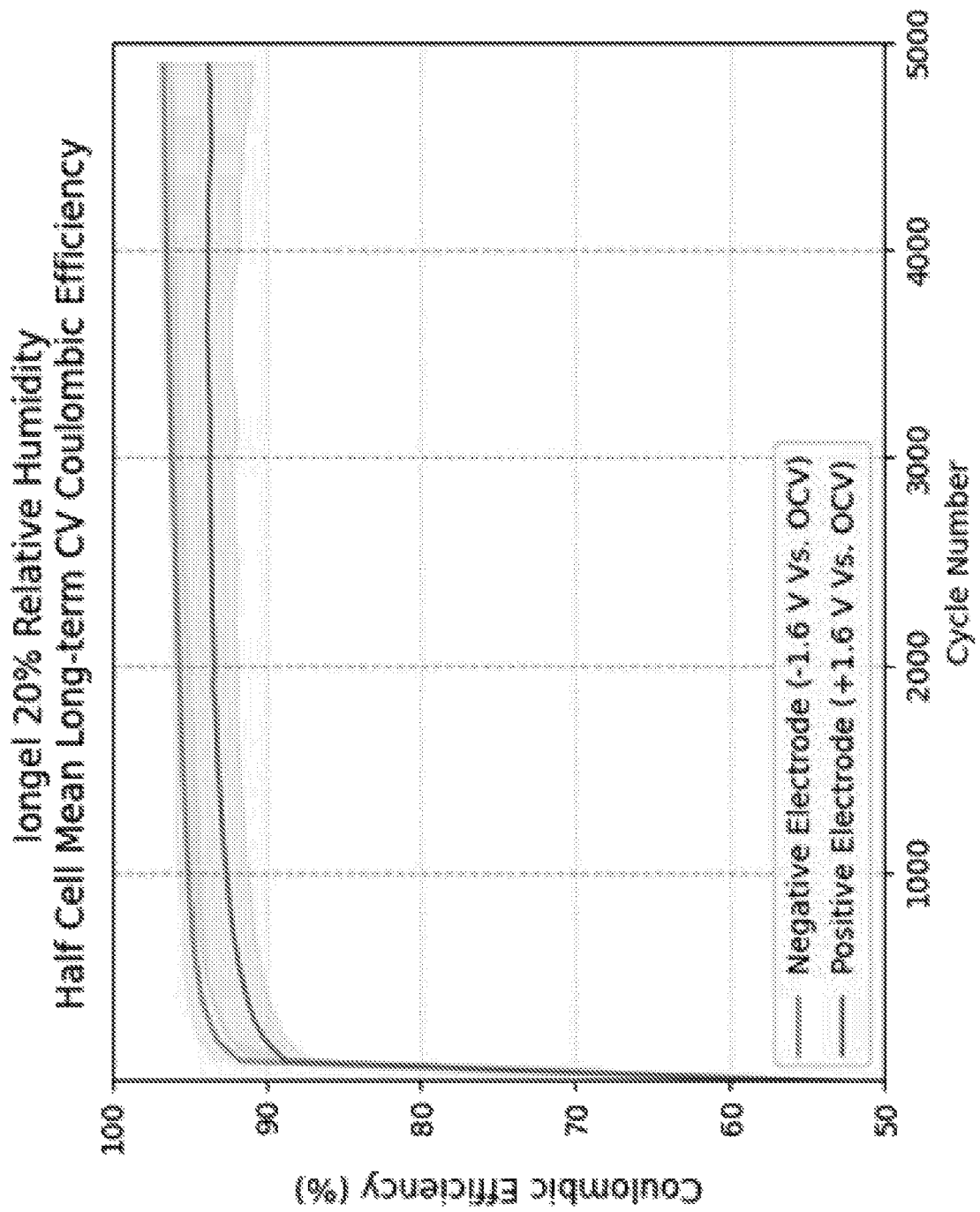
Figure 71:
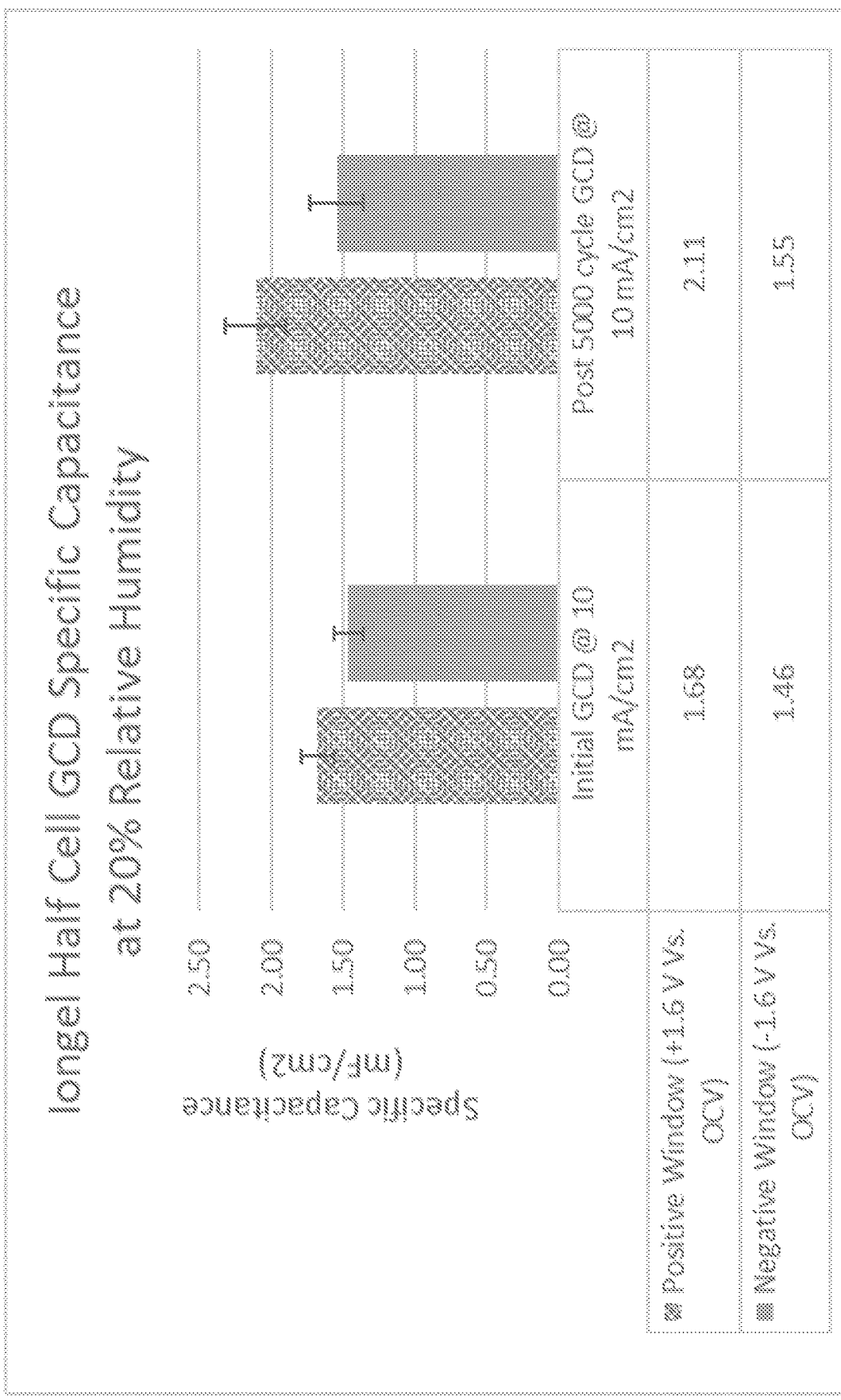
Figure 72:
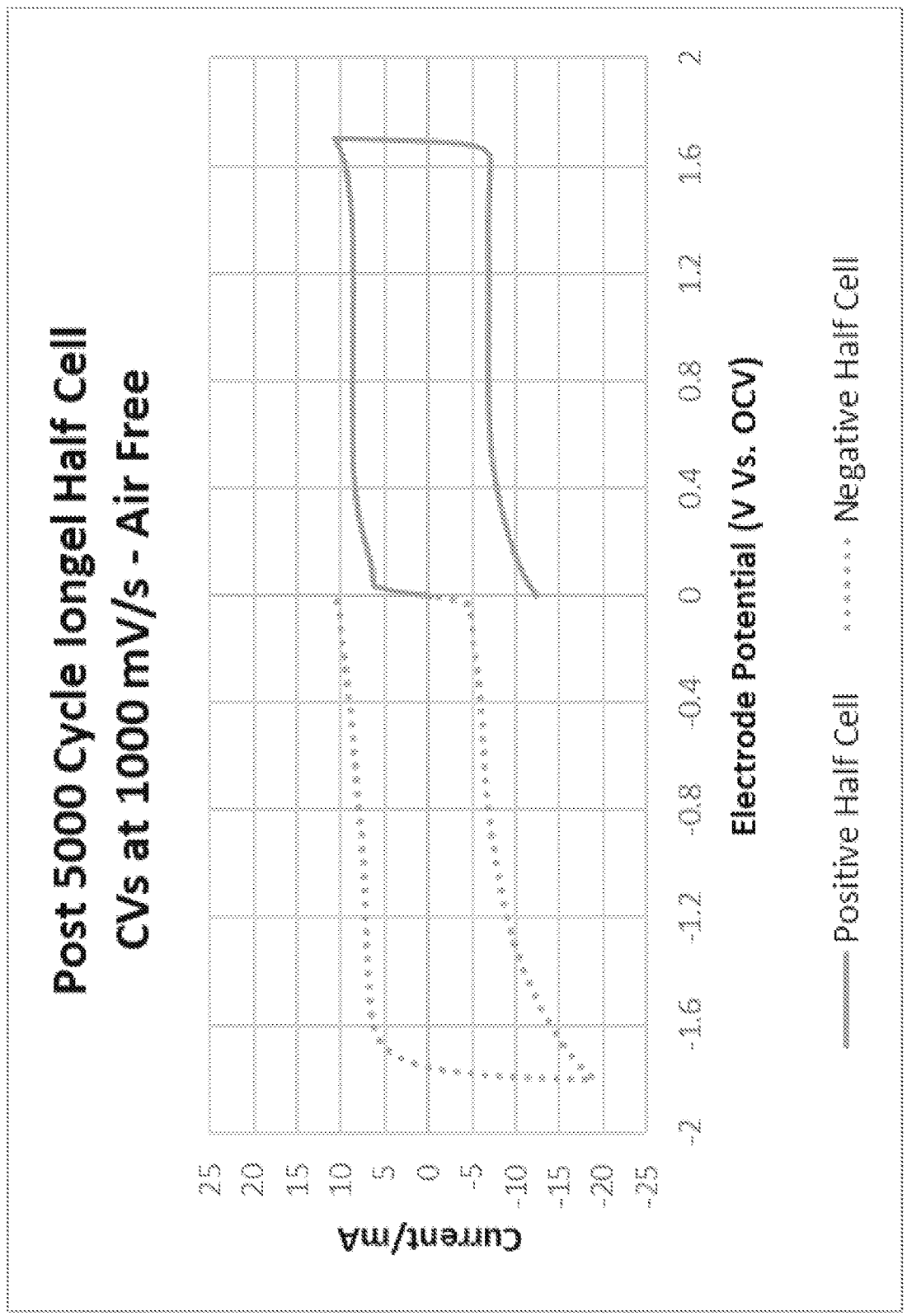
Figure 73:
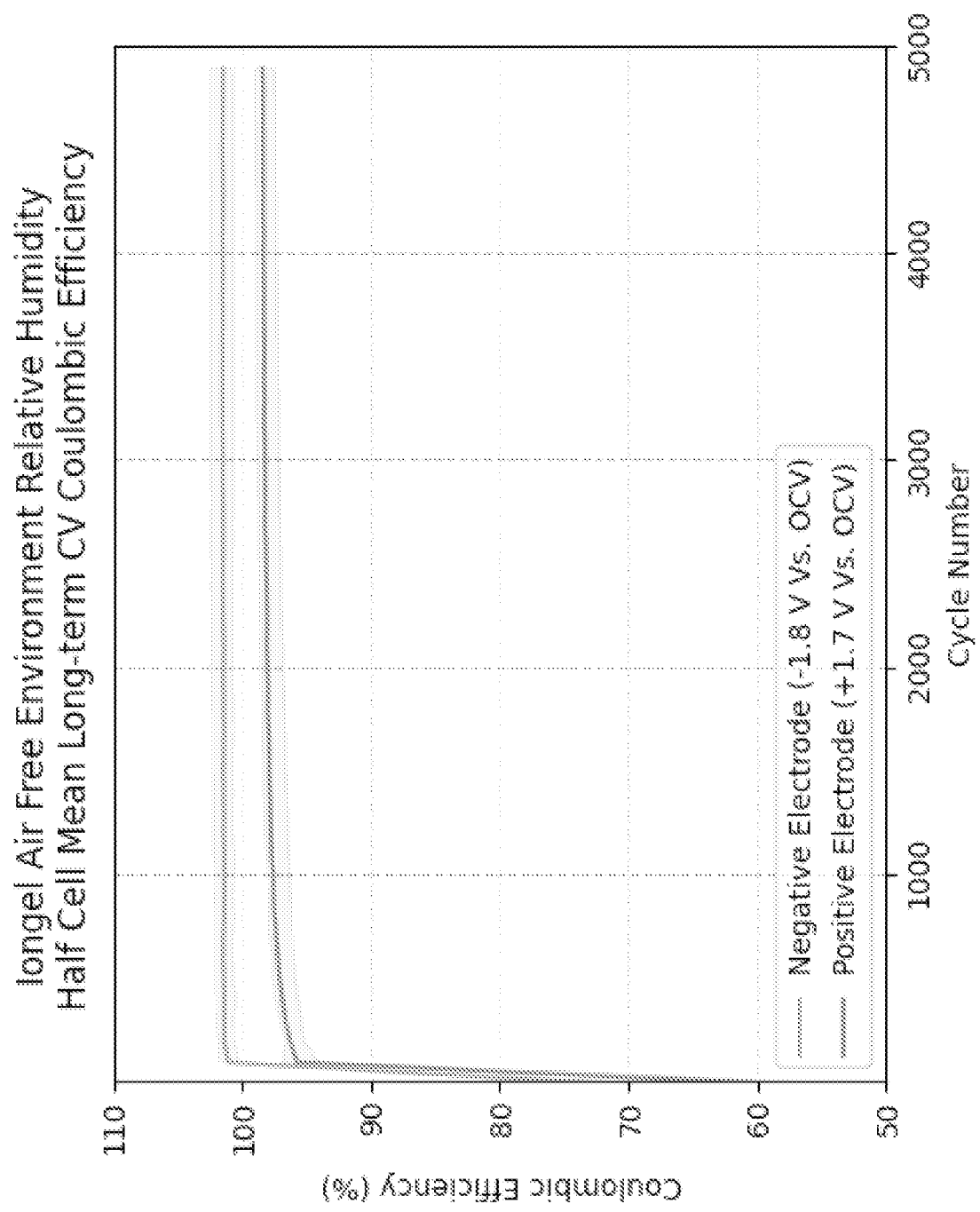
Figure 74:
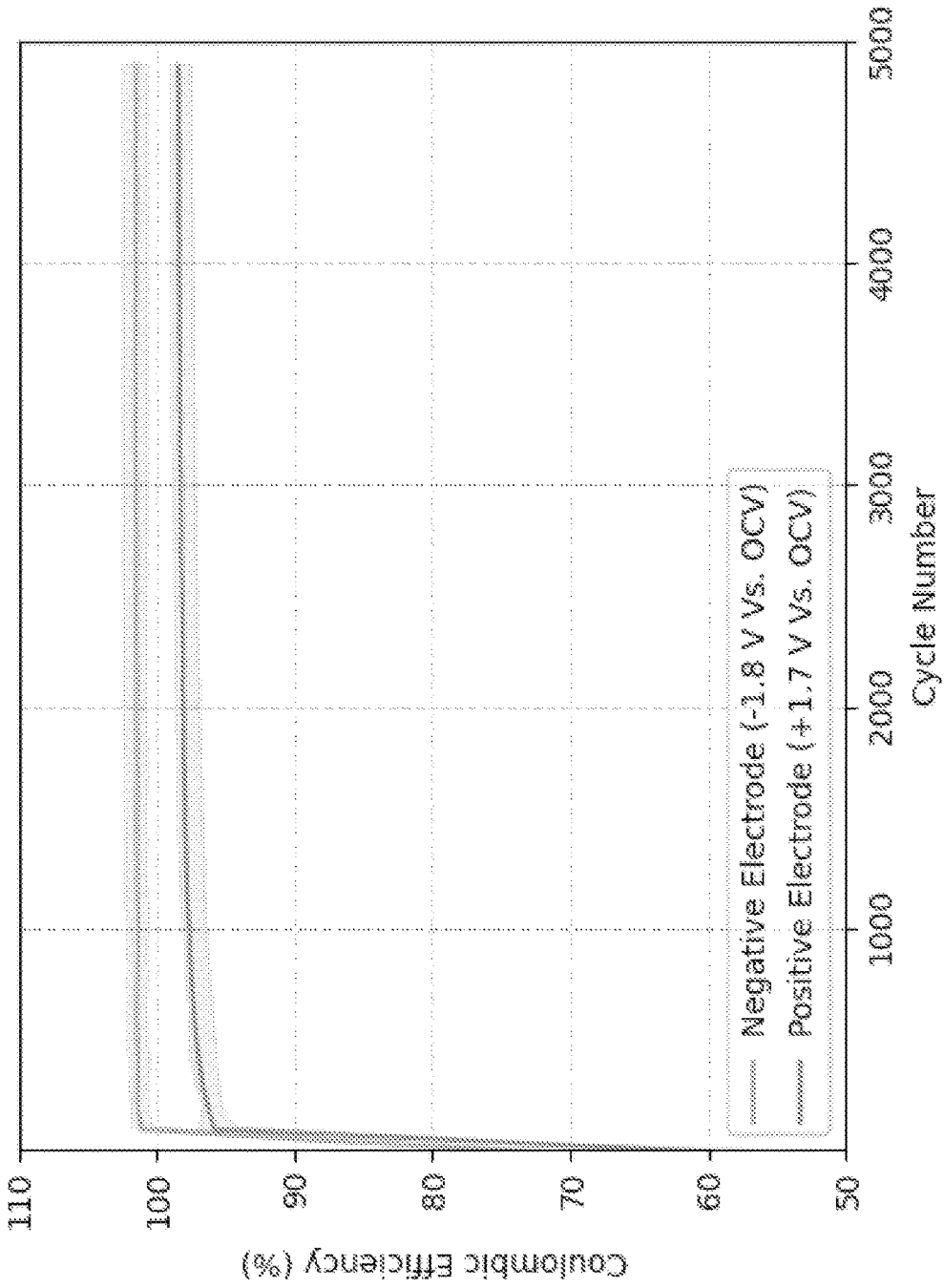
Figure 75:
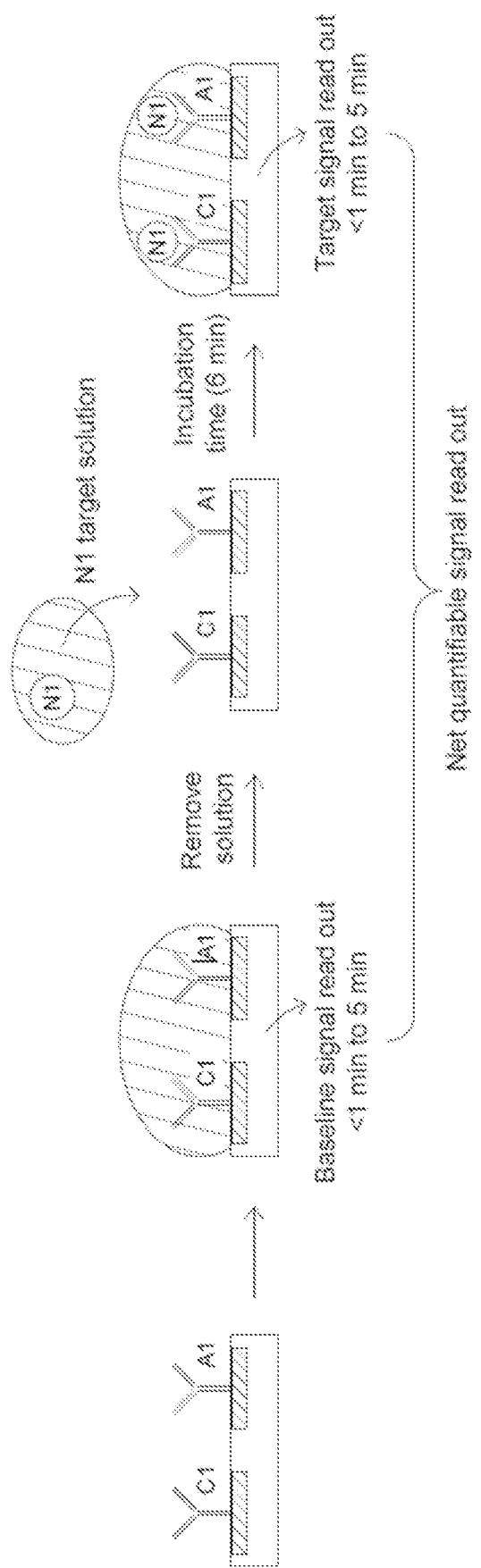
Figure 76:
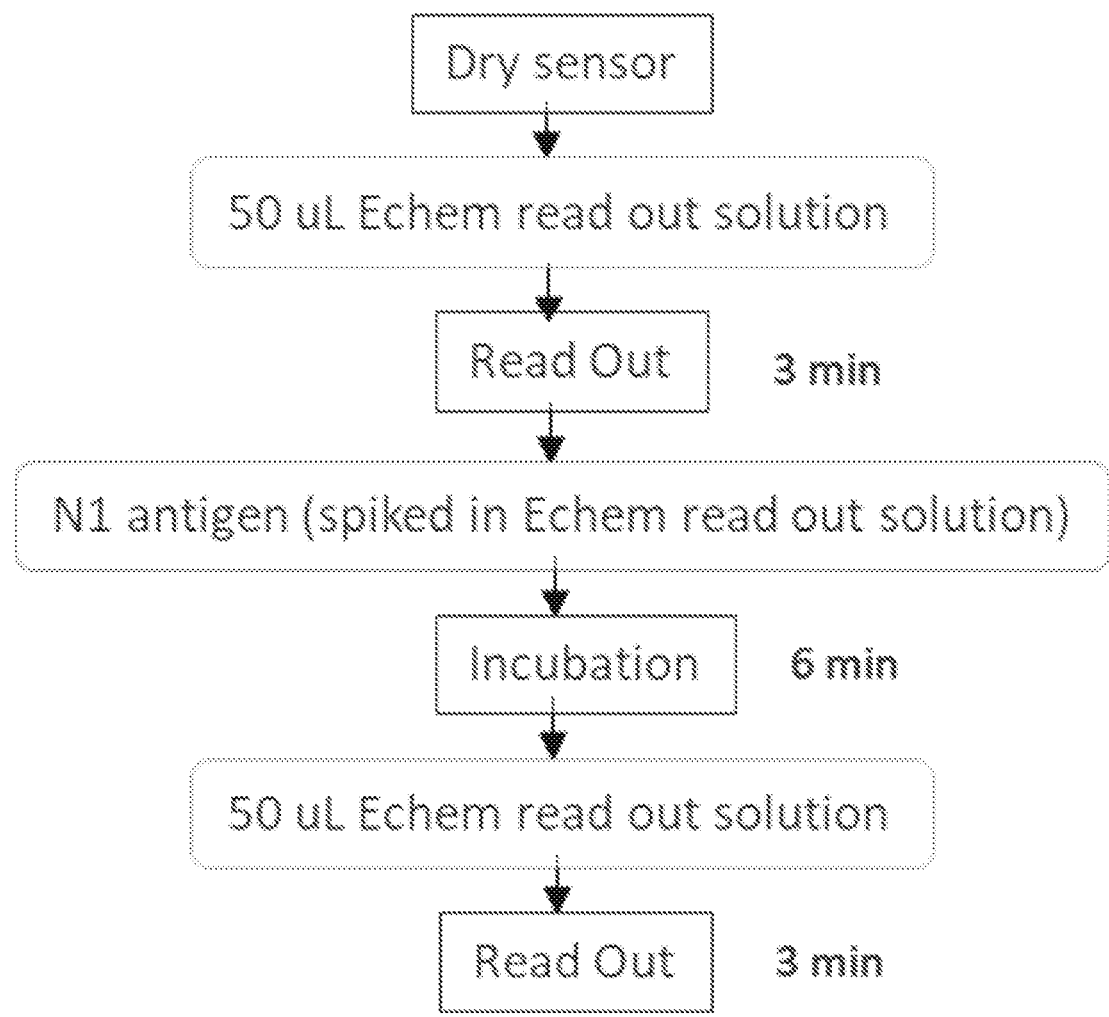
Figure 77:
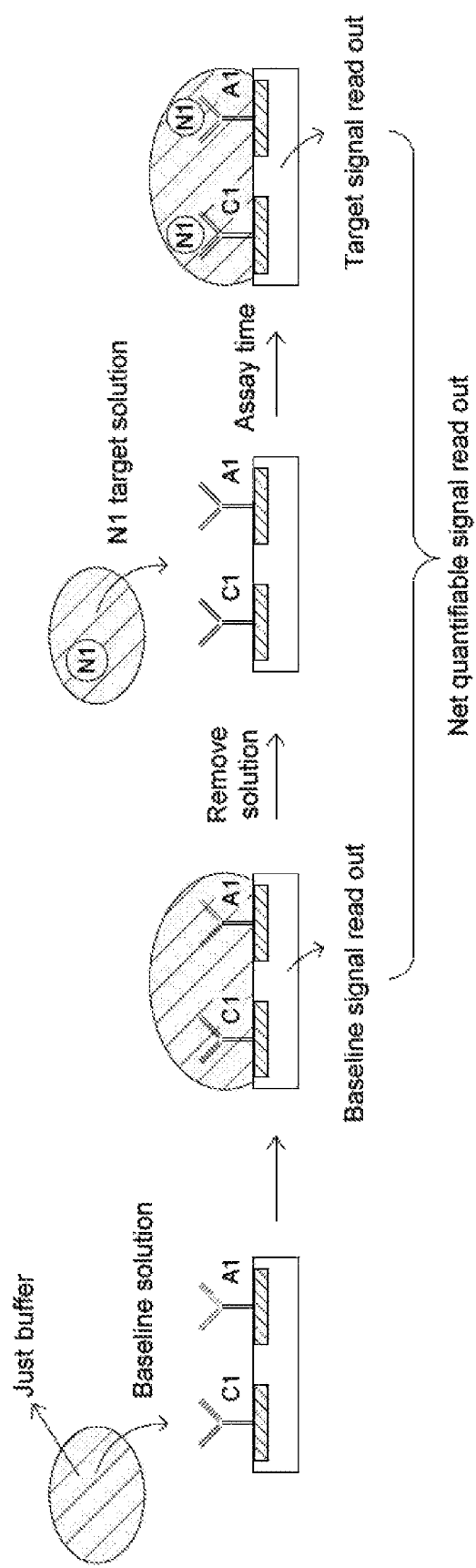
Figure 78:
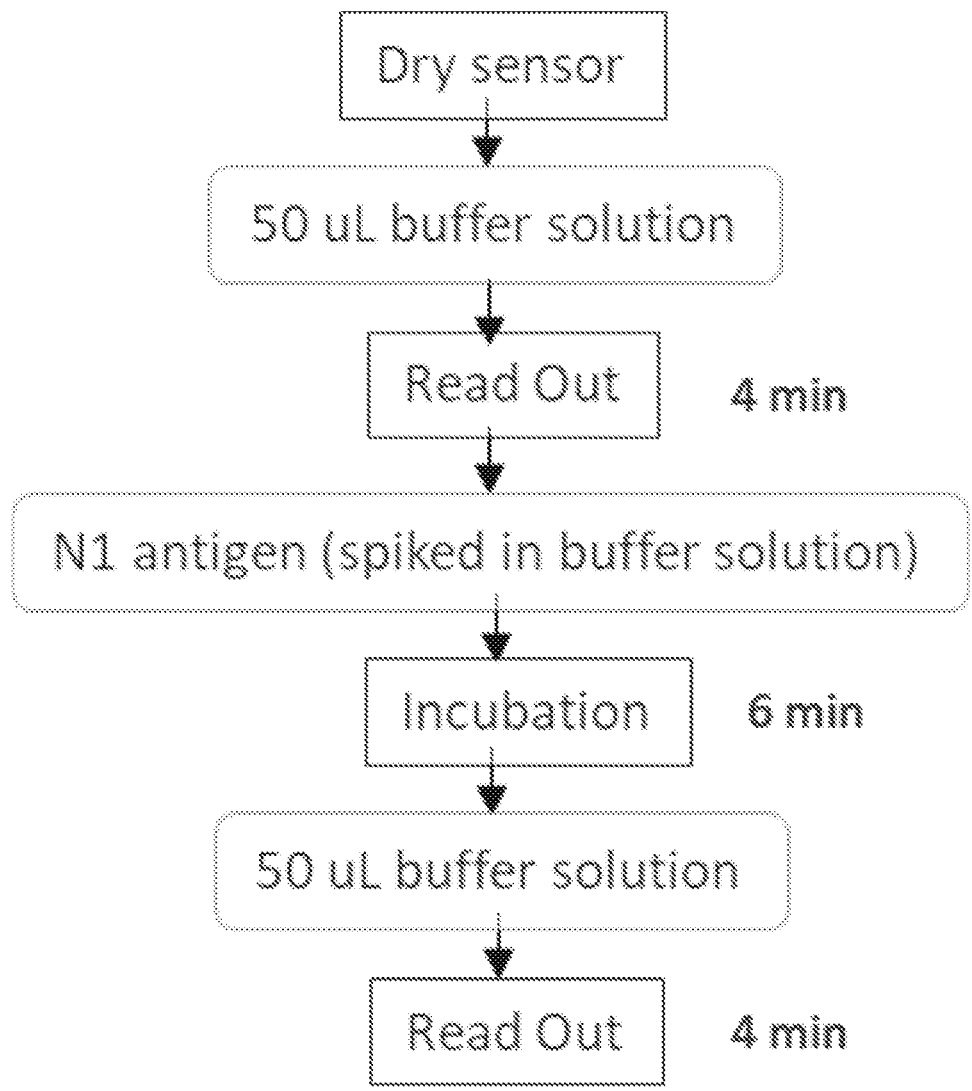

FIGS. 69, 70, and 71 are relevant results.
FIGS. 72, 73 and 74 are further relevant results.

Appendix 4 3-Month Gii-Sens Assay Feasibility Proposal

Objective:
To use critical reagents to the Gii-Sens 3D Carbon Foam assay system to deliver a proof of feasibility project.
Phase 1: Surface Immobilisation
Goal: Maximise the mAb (2) surface immobilisation. Evaluate the most convenient surface chemistry to immobilise the mAb onto the surface.
Deliverable: Data supporting the maximum surface coverage and procedure of choice.
Phase 3: Target Analyte Sensing Range and LOD
Goal: Electrochemical immunoassay procedure and results. Establish the electrochemical immunoassay steps (incubation times, concentrations, volumes) and establish the parameters yielding most sensitive analytical assay.
Deliverable: Data supporting the electroanalytical immunoassay performance.
Experimental Section
Solution Compositions
Surface Chemistry
  10 mM Pyrene butyric acid in DMF
  4 mM EDC/10 mM SulfoNHS
  PBS 0.1 M pH 7.2

Read out
 1 mM K3Fe(CN)6+1 mM K4Fe(CN)6 in 0.02 M KCl 0.02 M PBS
Sensor Modification Procedure
 10 µL PyrBuOOH onto sensor Surface incubated in wet chamber for 2 h before allowing for spontaneous solvent evaporation
 15 µL EDC/NHS for 30 min
 10 µL A1 or C1 mAb in PBS for 1 h
Electrochemical Techniques
Electrochemical Impedance
 Applied voltage=0 V
 Amplitude=0.01 VRMS
 Frequency Range—5000-0.1 Hz
Assay Procedures
 Direct assay: Labeless: See FIGS. 75 and 76.
 Direct assay: Labeless and Reagentless See FIGS. 77 and 78.
Calibration Plots
 Replicates per point, n=5 (minimum) different disposable sensors (single read out, sensors disposed)
 Each calibration plot contains data obtained in subsequent days and by different operators (inter and intra assay variability)
Phase 1: Surface Chemistry The surface chemistry of choice was Pyr-COOH modified graphene and EDC/NHS conjugation of capture mAb (A1 and C1) following the FIG. 79 scheme showing surface immobilisation reaction schematics.

The concentration of surface immobilised mAb (A1 and C1) was screened using electrochemical impedance spectroscopy. (See experimental section). See FIG. 80 (mAb A1 immobilisation on Gii-Sens® surface. Inset normalised signal) and FIG. 81 (mAb C1 immobilisation on Gii-Sens® surface. Inset normalised signal).

Both A1 and C1 showed a logical surface coverage trend. Based on normalised curves A1 showed and marginally larger surface coverage. The optimum coverage range was screened to be between 15 to 250 µg/mL. That range on concentration was estimated enough to provide best performance of the sensor.

Phase 3: Assay and Target Analyte Exploration

The more in-depth evaluation of the assay potential and the benefits of using Gii-Sens® as sensing electrochemical platform was conducted always in labeless assay format.

In parallel to that it was also explored a reagentless format, where the solutions used to both incubate and generate a read-out signal were just buffer, as described in the experimental section. The dynamic range of the assay was explored also at high concentrations also looking to identify the potential to extend that concentration range.

Due to the interesting results obtained during the investigations described above and general time limitations the sensitivity of the assay was explored down to 10 µg/mL and the aim was to explore the high concentration range up to 1000 ng/mL.

Labeless Assay Exploration

The labeless assay as described previously consisted in an assay that does not require a secondary antibody, but uses a particular electrochemical read out solution. During this investigation that electrochemical solution was also used as carrier solution, hence eliminating the need for washing steps or any other assay complications.

The first concentration range explored was from 10 ng/mL to 10 µg/mL, both for A1 and C1 modified sensors. See FIG. 82 which shows labeless dose response curve for A1 (top) and C1 (bottom) sensor vs. varying concentrations of N1 antigen. Surface coating>60 µg/mL and assay incubation time of 6 minutes for all cases.

Both A1 and C1 showed similar responses and achieved good preliminary dose response curve characteristics for the concentration range studied.

In order to further investigate how to enhance the performance of the assay the overall concentration range was divided and explored in different sensitivity ranges using the same data obtained.

Labeless and Reagentless Assay Exploration

The labeless assay as described previously consists of an assay that does not require a secondary antibody. In the case of reagentless the presence of an electrochemical read out solution is also unnecessary as all the incubations and measurements are done in just buffer solution that also acts as carrier solution, further eliminating the need for extra washing steps.

The first concentration range explored was from 10 ng/mL to 10 µg/mL, both for A1 and C1 modified sensors. See FIG. 83 which shows labeless and reagentless dose response curve for A1 (top) and C1 (bottom) sensor vs. varying concentrations of N1 antigen. Surface coating>60 µg/mL and assay incubation time of 6 minutes for all cases Both A1 and C1 showed similar responses and achieved good preliminary dose response curve characteristics for the concentration range studied.

Appendix 5 Sensor Implementations where a Receptor is Bonded to a 3D Carbon Foam Material Through a Linker Background Sensors are analytical devices that detect changes or reactions and respond to some type of input from the environment. In recent years, the use of sensors has increased owing to their advantages such as high specificity and sensitivity, rapid and reliable results, easy handling, and point of care diagnostics. Due to these advantages, sensors have paved their way into a variety of technical areas such as chemical and medical diagnostics, environmental impact analysis, food industry, and marine sectors.

Different forms of graphene and its derivatives have been utilized in the production and development of sensors, especially biosensors. The electrochemical, physical and chemical properties of graphene make it a material of interest for these applications. However, conventional graphene (e.g., a 2D graphene) is difficult to handle during practical applications, due to its ultra-thin structure and flexibility, which causes it to easily curl, crease and corrugate. This significantly decreases the analytical performance of the sensors, especially with respect to their sensitivities. To date, numerous strategies and techniques have been carried out to make different types of graphene (e.g., different morphologies, different surface properties, different functionalized derivatives such as graphene quantum dots, graphene oxide, or reduced graphene oxide) and these cause difference in the sensing performance among the sensors.

E. A. Obaje, G. Cummins, H. Schulze, S. Mahmood, M. P. Y. Desmulliez and T. T. Bachmann, Journal of Interdisciplinary Nanomedicine, 2016; 0(0), doi: 10.1002/jin2.16 investigates the electrochemical performance of a newly fabricated sensor in relation to the function of its underlying composite materials and evaluates the choice of carbon and dielectric pastes by characterising properties like surface roughness, wetting and susceptibility of unspecific DNA binding.

L. H. Hess, A. Lyuleeva, B. M. Blaschke, M. Sachsenhauser, M. Seifert, and J. A. Garrido, ACS Appl. Materials & Interfaces, 2014, 6, 9705-9710 describes a platform for biosensing applications based on polymer-modified CVD-grown graphene transistors.

C. Fenzl, P. Nayak, T. Hirsch, O. S. Wolfbeis, H. N. Alshareef, and A. J. Baeumner, ACS Sensors, 2017, 2, 616-620 describes a laser-scribed graphene (LSG) electrode as highly sensitive and reliable biosensor transducers in blood serum analysis.

S. Singal, A. K. Srivastava, S. Dhakate, A. M. Biradar and Rajesh, RSC Advances, 2015, 5, 74994-75003 describes electroactive graphene-multi-walled carbon nanotube hybrid supported impedimetric immunosensor for the detection of human cardiac troponin-I.

Despite all the prior art, there is a continued need to improve the sensing activities of those graphene-based sensors. Further, there remains a desire to improve sensitivities of said sensors without compromising at least one of the other aspects of those sensors such as their robustness, stability, durability, convenience of functionalization and/or ease of manufacturing.

Summary of this Appendix 5 Feature

In a first aspect, there is provided a sensor comprising: (i) a carbon foam electrode, (ii) a linker, and (iii) a receptor, wherein the receptor is bonded to the carbon foam electrode through the linker. The carbon foam electrode is made, at least in part, by the method defined in any of Features A-K above.

In a second aspect, there is provided a method of manufacturing a sensor according to the first aspect, comprising the steps in sequence of: (i) providing a carbon foam electrode as described in the first aspect; (ii) treating the carbon foam electrode with a linker; and (iii) treating the linker-modified carbon foam electrode obtained in step (ii) with a receptor.

In a third aspect, there is provided a method of sensing a target comprising the steps in sequence of: (i) providing a sensor according to the first aspect; (ii) contacting the sensor with a sample containing or suspected of containing the target; (iii) measuring a response of the sensor; and optionally (iv) correlating the response to the level of the target in the sample.

The carbon foam material typically has a folded structure, which affords the carbon foam a porous morphology with a high specific surface area. Without wishing to be bound by any theory, it is believed that the analytical performance of the sensors is affected by the morphology as well as the accessible surface area of the carbon foam. A 3D structure leads to an increase in the available surface area, allowing linkers and receptors such as enzymes, proteins, nucleic acids, and antibodies to be efficiently bonded to the carbon foam, thus improving sensor performance with respect to sensitivities.

Additionally, it is also desirable to build the sensors with a very thick carbon foam layer. Preferably the layer thickness of the carbon foam is more than 50 m. Since the carbon foam can be porous, this thick carbon foam layer is expected to provide even greater surface area, which is advantageous in enhancing analytical performance especially sensing properties as compared to other conventional graphene-based sensors.

The Linker

In the context of the present feature, the carbon foam is modified by a linker as part of the process to form a required sensor. The carbon foam described above (e.g., the thick, porous carbon foam with folded structure) provides an improved base for modification since increased surface area is available for interaction with the linker, leading to improved sensitivities of the sensors.

The modified carbon foam is then treated by a receptor to obtain the sensor. Therefore, the linker functions as an intermediate between the carbon foam and the receptor. It may be that at least part of the linker is disposed (e.g., dispersed) within the carbon foam. It may be that the whole linker is disposed (e.g., dispersed) within the carbon foam.

The linker can be selected from nanoparticles, polymers, polymer brushes, ligands, organic compounds comprising one or more functional groups, molecules bonded to the carbon foam covalently or non-covalently, or mixtures thereof. Typically, the linker is selected from polymers (e.g. (meth)acrylate polymers), organic compounds comprising one or more functional groups, carbodiimides, diazonium compounds, or mixtures thereof.

Typically, organic compounds described above comprises one or more functional groups which are independently selected from oxygen, nitrogen, sulphur, halide, hydroxyl, carbonyl, carboxyl, amine, amino, amide, hydrophilic polymers, or mixtures thereof, optionally in combination with linear, branched or cyclic alkyl, alkylenyl, alkynyl, aryl residues, acryl, acyl, acyloxy, alkoxy, alkyleneoxy, or mixtures thereof. In the same embodiments, said optional structures may be C1-C20 linear, branched or cyclic alkyl, alkylenyl, alkynyl, aryl residues, acryl, acyl, acyloxy, alkoxy, alkyleneoxy, or mixtures thereof. Still in the same embodiments, optionally, the organic compounds with the functional groups described above may further comprise one or more cyclic moieties that optionally comprise one or more heteroatoms, and at least one of the cyclic moieties is linked directly or indirectly to at least one of said functional groups, or the linker is a derivative that is an ester or salt of such an organic compound, or a compound that releases such an organic compound in reaction with the required 3D carbon foam. Representatively, the linker is selected from the organic compounds as described above in this paragraph.

Representatively, the linker is selected from 1-pyrenebutyric acid, N-hydroxysuccinimide (NHS), pyrene-1-carboxylic acid succinimidyl ester, 1-Aminopyrene, N-(1-pyrene) maleimide, or mixtures thereof.

The linker may be bonded to the carbon foam covalently or non-covalently. For example, diazonium compounds (e.g., diazonium salts) may be bonded to the carbon foam covalently. For non-covalent bonding, the linker may be bonded to the carbon foam by at least one of the followings: π-π interaction, ionic bonding, hydrogen bonding, hydrophobic or hydrophilic effect, electrostatic interaction, polymer wrapping, adsorption, grafting (e.g., photo grafting). For example, the linker comprising one or more cyclic moieties as described above (e.g., 1-pyrenebutyric acid, N-hydroxysuccinimide (NHS), pyrene-1-carboxylic acid succinimidyl ester, 1-Aminopyrene, N-(1-pyrene) maleimide, or mixtures thereof) may be bonded to the carbon foam by π-π interaction.

In the context of the present feature, a receptor is bonded to the carbon foam through the linker. The receptor is thus indirectly bonded. When at least part of the linker or preferably the whole linker is disposed (e.g., dispersed) within the carbon foam, it may be that at least part of or the whole receptor is also disposed (e.g., dispersed) within the carbon foam.

By 'receptor' herein is meant to encompass any molecule capable of responding to a target material (i.e., a target)

presented in a sample to be analysed. The sample can be a biological, chemical, optical, physical or mechanical sample, typically a biological sample. Hence, the target is meant to encompass but not limited to biological materials, chemical substances or mixtures, optical objects, physical or mechanical items, and the like, typically biological materials. The term 'responding' can include but are not limited to biological, and/or chemical, and/or optical, and/or physical, and/or mechanical interactions, typically biological and/or chemical interactions. These typical interactions can include but are not limited to bonding, or hybridising, or hydrophobic effects between the receptors and the targets.

Accordingly, the receptor can include but are not limited to one of the followings: an electrochemical receptor, a chemical receptor, a bioreceptor, an optical receptor, a physical or mechanical receptor. The receptor can be selected from but is not limited to crown ethers, ligands, catalysts, boric acids, carbohydrates, aptamers, proteins, enzymes, antibodies, antigens, microorganisms, nucleic acids, fatty acids, fatty acid esters, molecularly imprinted polymers, metal-organic frameworks, polypeptides or oligopeptides capable of forming a ligand binding, cells, cell organelles, or other cellular components, or mixtures thereof.

Typically, the receptor is a bioreceptor (i.e., the sensor is a biosensor). Typically, the receptor is selected from aptamers, proteins, enzymes, antibodies, antigens, microorganisms, nucleic acids, polypeptides or oligopeptides capable of forming a ligand binding, cells, cell organelles, or other cellular components, or mixtures thereof. More typically, the receptor is selected from proteins (e.g., immunoproteins, non-immunological proteins, immunoglobulin binding proteins, sugar binding proteins), nucleic acids, antibodies, enzymes (e.g., oxidoreductases enzymes (preferably glucose oxidase, alcohol oxidase or lactate oxidase enzymes), dehydrogenase enzymes), or mixtures thereof. Representatively, the receptor is selected from immunoglobulin A (IgA), glucose dehydrogenase, streptavidin, or mixtures thereof.

Typically, the target is a biomaterial. The biomaterial can include but are not limited to deoxyribonucleic acids (DNA), ribonucleic acids (RNA), peptides, proteins, protein complexes, nucleic acids, antibodies, antigens, lipids, fatty acids, fatty acid esters, vitamins, microorganisms, micelles, cells, cell organelles, or other cellular components, viruses, enzymes, or mixtures thereof. Typically, the biomaterial is selected from deoxyribonucleic acids (DNA), ribonucleic acids (RNA), peptides, proteins, nucleic acids, antibodies, antigens, enzymes, or mixtures thereof. More typically, the biomaterial is selected from proteins, nucleic acids, antibodies, enzymes or mixtures thereof. It is further understood that under the context of the present feature, both the bioreceptor and the biomaterial can be naturally occurred or synthetically produced.

The receptor can be attached to the linker. The receptor can be physically, biologically and/or chemically bonded to the linker. Typically, the receptor is chemically bonded to the linker. Herein, the chemical bond can include but are not limited to a covalent bond, a non-covalent bond (e.g., an ionic bond), a metallic bond, a hydrogen bond, a chelated bond, as well as those non-covalent interactions such as van der Waals force, π-π interaction, hydrophobic or hydrophilic effect and electrostatic interaction. Typically, the receptor (e.g., the bioreceptor) is covalently bonded to the linker. Typically, the receptor (e.g., the bioreceptor) is bonded (e.g., covalently) to one or more functional groups (e.g., functional groups of the organic compounds as described previously) comprised in the linker. For example, a bioreceptor can be covalently bonded to a carboxyl group, or an amino or amine, or an amide group of a linker (e.g., 1-pyrenebutyric acid, N-hydroxysuccinimide (NHS), pyrene-1-carboxylic acid succinimidyl ester, 1-Aminopyrene, N-(1-pyrene) maleimide).

The Sensors

The sensors according to the present feature typically comprise a layer of carbon foam that can be produced by the Dual Laser treatment methods disclosed earlier. Typically, the carbon foam has a layer thickness of more than 50 m, preferably more than 100 m, more preferably more than 200 m and still more preferably more than 300 m. Typically, at least part of the linker or the whole linker is disposed (e.g., dispersed) within the carbon foam. Optionally, at least part of the receptor or the whole receptor is also disposed (e.g., dispersed) within the carbon foam (i.e., when at least part of the linker or preferably the whole linker is disposed (e.g., dispersed) within the carbon foam). Typically, at least part of the linker and optionally at least part of the receptor is disposed (e.g., dispersed) at a depth below the surface of the carbon foam (e.g., the carbon foam layer) which is more than 1% of the total depth of said carbon foam, preferably more than 5% of the total depth, more preferably more than 10%, even more preferably more than 15%, still more preferably more than 20%. Typically, at least part of the linker and optionally at least part of the receptor is disposed (e.g., dispersed) at a depth below the surface of the carbon foam (e.g., the carbon foam layer) which is more than 1 m below the surface of said carbon foam, preferably more than 5 m, more preferably more than 10 m, even more preferably more than 15 am, most preferably more than 20 m. It may be that the whole linker and optionally the whole receptor is disposed (e.g., dispersed) at a depth below the surface of the carbon foam (e.g., the carbon foam layer) which is more than 1% of the total depth of said carbon foam. It may be that the carbon foam layer has a thickness of any of the ranges as describe above (e.g., at least more than 50 m). By 'dispersed' herein is meant that the linker (and optionally the receptor) molecules that are at least partly disposed within the carbon foam, are distributed therein to form a plurality of discrete domains other than a single cluster. It may be that said domains are distributed uniformly and/or continuously (e.g., distributed as a uniform and/or continuous layer) within said carbon foam. Without wishing to be bound by any theory, it is believed that the displacements of the linker (and optionally the receptor) lead to improved functionalisation of the carbon foam hence enhanced sensing activities (i.e., sensitivities) of the sensors.

Additionally, and optionally, neither the linker nor the receptor is disposed (e.g., dispersed) throughout the entire depth of the carbon foam (e.g., the carbon foam layer). In other words, the core of said carbon foam remains unmodified by either the linker or the receptor.

It may be that the linker is selected from 1-pyrenebutyric acid, N-hydroxysuccinimide (NHS), pyrene-1-carboxylic acid succinimidyl ester, 1-Aminopyrene, N-(1-pyrene) maleimide, or mixtures thereof and the receptor is selected from immunoglobulin A (IgA), glucose dehydrogenase, streptavidin, or mixtures thereof.

It may be that the sensor also includes a substrate. In the first method to obtain the carbon foam, if a carbon source is provided on or adjacent to a substrate, the final sensor may include said substrate as a component part. In the second method wherein use of a substrate is necessary, the final sensor may also include said substrate as a component part. Obtained by either method, the carbon foam may be optionally adhered to the substrate within the sensor. The substrate so included in the sensor may have the characteristics according to one of the features and/or one of the possible combinations of those features described previously for the substrate used in the production of the carbon foam. Alternatively, it is not necessary for the sensor to include a substrate. In other words, even if the carbon foam is produced adhered to a substrate, it may be removed therefrom as part of the preparation for the subsequent modification.

Typically, the sensor according to the present feature is a chemical, physical or mechanical, biological, or optical sensor, preferably a biosensor (i.e., when the receptor is a bioreceptor). Typically, the sensor (e.g., the biosensor) takes the form as an electrode or an electrode device. The sensor (e.g., the biosensor) may include a multi-electrode platform, for example, a three-electrode platform comprising a counter electrode (CE), a working electrode (WE) and a reference electrode (E or RE)). The electrode (e.g., WE) may be made up of modified carbon foam (i.e., carbon foam modified by a receptor through a linker) of the present feature. The other electrodes (e.g., CE and/or RE) may also be carbon foam based, preferably carbon foam based, more preferably the same carbon foam based without any modifications. All electrodes may have the same or different dimensions.

The sensor (e.g., the biosensor) may be provided as a product wherein said sensor is contained within a packaging, and the product preferably comprises instructions for use. Typically, the packaging comprises a primary packaging within which the sensor is contained. It may be that the sensor is provided on an adaptor which is contained within a primary packaging. Suitable examples for a primary packaging are protective covers, pockets, folders, envelopes, boxes, containers, cartons, cases, and the like. Optionally, the packaging further comprises a secondary packaging. Such secondary packaging is typically a packaging that holds one sensor or a plurality of sensors together. Suitable examples for a secondary packaging are plastic cartons, cardboard cartons, blister packs, boxes (e.g., cardboard or plastic boxes), cases, containers, cardboard or plastic crates, trays, wrapped bundles with or without one or more air pockets, and the like. Still optionally, the packaging may comprise a tertiary packaging which may be selected from boxes, cases, cartons, containers, and the like. Suitably, at least one of the packaging described above can protect the sensor from light (e.g., direct sunlight), moisture, physical and/or chemical damages and contaminants. The instructions may give detailed information for the steps of using the sensors in accordance with the third aspect of the feature. The instructions may be supplied in the printed form of a label, a booklet, a brochure, or a leaflet. The instructions may also be printed on the packaging of the product.

Manufacturing of the Sensors

In the second aspect, there is provided a method of manufacturing a sensor according to the first aspect, wherein the steps include: (i) providing carbon foam; (ii) treating the carbon foam with a linker; and (iii) treating the linker-modified carbon foam with a receptor.

It may be that the method comprises a step of manufacturing the carbon foam before providing and treating the carbon foam with a linker. The carbon foam is accordingly produced by one of the laser treatment methods disclosed herein, typically the first or the second method, more typically the first method. It may be that the carbon foam so produced is adhered to, attached to, or provided on a substrate. Typically, said carbon foam may be removed from said substrate before the treatment of a linker in step (ii). In other words, the carbon foam in step (i) is provided without a substrate. Alternatively, said carbon foam does not need to be removed (e.g., said carbon foam remains adhered to said substrate). In other words, the carbon foam in step (i) is provided with a substrate.

It may be that the carbon foam is incubated with the linker. It may be that the incubation happens in a buffer preferably a buffer solution. Additionally or optionally, the modification by linker may require at least one of the following conditions: light (ultraviolet light, visible light, or infrared radiation), or heat. After the incubation, the linker-modified carbon foam may be cleaned.

It may be that the linker-modified carbon foam is incubated with the receptor. After the incubation, the sensor so obtained may be cleaned prior to use. After cleaning, the sensor may be passivated. The passivation is understood to block the remaining activated sites that are not functionalised by the receptor.

The receptor used to treat the linker-modified carbon foam in step (iii).

The sensor may be an electrode or an electrode device comprising a multi-electrode platform. The manufacturing steps described above may thus be applicable to manufacturing of an electrode. When the sensor is an electrode device comprising a multi-electrode platform, the above-described manufacturing steps are applicable to producing a working electrode (WE), and the method further comprises the following additional steps of producing a counter electrode (CE) and a reference electrode (E or RE).

Use of the Sensors

In the third aspect, there is provided a method of using a sensor, comprising steps in sequence of: (i) providing a sensor according to the first aspect; (ii) contacting the sensor with a sample containing or suspected of containing a target, (iii) measuring a response of the sensor and (iv) optionally, the response is correlated to the level of the target in the sample.

The target can be a target disclosed herein, typically a biological material disclosed herein. The sample can be a sample disclosed herein, typically a biological sample disclosed herein.

Before use, the sensor (e.g., the biosensor) can be suitably stored at ambient conditions (e.g., room temperature around 20° C. and 1 atmospheric pressure). Typically, the sensor is stored in dry conditions. After use, the sensor can be suitably disposed (i.e., the sensor is a disposable sensor).

It may be that the sensor is immersed into a sample. The sample may contain a phosphate buffered saline (PBS). The concentration of a target in a sample may be at least 1ppm. The equilibration time may be at least 0.5 minute, or at least 1 minute, or at least 10 minutes, or at least 30 minutes, typically not more than 2 hours, or not more than 1 hour, or not more than 40 minutes. It may be that after contacting the sample, the sensor is cleaned before a response is being measured. It may be that the sensor is cleaned by rinsing with a PBS. It may be that after cleansing, the sensor is dried (e.g., by a gas flow, or by natural dry).

It may be that a response is measured by differential pulse voltammograms, and/or impedance spectroscopy. It may be that a response measured is further correlated to the level of the target in the sample. It may be that the method comprises steps (i), (ii) and (iii) as described above, and additionally comprises steps in sequence of (iv) contacting the sensor with one or more samples containing known levels of the target (i.e. control samples); (v) measuring response of the sensor to those one or more control samples; (vi) comparing the response to the sample containing or suspected of containing the target with the response to the one or more control samples; and (vii) correlating the response to the sample containing or suspected of containing the target to the level of said target in said sample.

Appendix 5 Concepts

1. A sensor comprising: (i) carbon foam (ii) a linker, and (iii) a receptor, wherein the receptor is bonded to the carbon foam through the linker.
2. A sensor according to concept 1, wherein the carbon foam is obtainable by a method of concentrating infrared radiation in at least one locus within a carbon source, thereby producing the carbon foam within said at least one locus, and said infrared radiation is provided by a laser beam that is an infrared laser beam.
3. A sensor according to concept 2, wherein concentrating infrared radiation comprises diffracting the infrared radiation to form an interference pattern each of whose fringes is within a locus within the carbon source.
4. A sensor according to concept 2 or concept 3, wherein the at least one locus is moved laterally within the carbon source and/or the at least one locus is moved within the depth of the carbon source.
5. A sensor according to any one of concepts 2 to 4, wherein the infrared radiation irradiates the carbon source directly, or the infrared radiation passes through a substrate prior to irradiating the carbon source, wherein said carbon source is provided on or adjacent to a surface of said substrate.
6. A sensor according to any one of concepts 2 to 5, wherein the carbon source is additionally irradiated with an additional radiation, and this additional irradiation is performed prior to, or simultaneously to, or following the step of concentrating infrared radiation in at least one locus within the carbon source.
7. A sensor according to concept 6, wherein the additional radiation is rastered over the surface of the carbon source.
8. A sensor according to concept 6 or concept 7, wherein the additional radiation irradiates the carbon source directly, or passes through the substrate as described in concept 5 prior to irradiating the carbon source.
9. A sensor according to any one of the preceding concepts, wherein at least part of the linker is disposed, preferably dispersed, within the carbon foam; and optionally at least part of the receptor is disposed preferably dispersed within the carbon foam.
10. A sensor according to any one of the concepts 2 to 9, wherein the carbon foam has a layer thickness of more than 50 m, preferably more than 100 m, more preferably more than 200 m and still more preferably more than 300 m.
11. A sensor according to concept 1, wherein the carbon foam is obtainable by a method of providing a carbon source on or adjacent to a surface of a substrate and exposing at least a portion of the carbon source comprising carbon-containing material and/or at least a portion of the substrate to a laser beam, thereby converting at least a portion of the carbon source into the carbon foam.
12. A sensor according to concept 5, 8 or 11, wherein the substrate comprises one or more of the followings: silicone, silicon dioxide, gallium nitride, gallium arsenide, zinc oxide; or alternatively one or more polymers; or alternatively one or more metals selected from aluminium, copper, gold or other metals, or oxides, nitrides or arsenides of said metals.
13. A sensor according to any one of the preceding concepts, wherein the carbon foam comprises oxygen at an atomic percentage of less than 3%, preferably less than 1.5%, and/or nitrogen at an atomic percentage of less than 3%,
14. A sensor according to any one of the preceding concepts, wherein the linker is selected from nanoparticles, polymers, polymer brushes, ligands, organic compounds comprising one or more functional groups, molecules bonded to the carbon foam covalently or non-covalently, or mixtures thereof.
15. A sensor according to concept 14, wherein the linker is selected from polymers preferably (meth)acrylate polymers, organic compounds comprising one or more functional groups, carbodiimides, diazonium compounds, or mixtures thereof.
16. A sensor according to concept 15, wherein the one or more functional groups are independently selected from oxygen, nitrogen, sulphur, halide, hydroxyl, carbonyl, carboxyl, amine, amino, amide, hydrophilic polymers, or mixtures thereof, optionally in combination with linear, branched or cyclic alkyl, alkylenyl, alkynyl, aryl residues, acryl, acyl, acyloxy, alkoxy, alkyleneoxy, or mixtures thereof.
17. A sensor according to concept 16, wherein the organic compound further comprises one or more cyclic moieties that optionally comprise one or more heteroatoms, and at least one of the cyclic moieties is linked directly or indirectly to at least one of the functional groups, or the linker is a derivative that is an ester or salt of said organic compound, or a compound that releases said organic compound in reaction with the carbon foam.
18. A sensor according to concept 17, wherein the linker is selected from 1-pyrenebutyric acid, N-hydroxysuccinimide (NHS), pyrene-1-carboxylic acid succinimidyl ester, 1-Aminopyrene, N-(1-pyrene) maleimide, or mixtures thereof.
19. A sensor according to concept 17 or concept 18, wherein the linker is bonded to the carbon foam by $\pi$-$\pi$ interaction,
20. A sensor according to any one of the preceding concepts, wherein the receptor is one of the followings: an electrochemical receptor, a chemical receptor, a bioreceptor, an optical receptor, a physical or mechanical receptor, preferably a bioreceptor.
21. A sensor according to claim 20, wherein the receptor is selected from crown ethers, catalysts, boric acids, concept, ligands, aptamers, proteins, enzymes, antibodies, antigens, microorganisms, nucleic acids, fatty acids, fatty acid esters, molecularly imprinted polymers, metal-organic frameworks, polypeptides or oligopeptides capable of forming a ligand binding, cells, cell organelles, or other cellular components, or mixtures thereof, preferably selected from proteins, nucleic acids, antibodies, enzymes, or mixtures thereof.
22. A sensor according to concept 21, wherein the receptor is selected from immunoglobulin A (IgA), glucose dehydrogenase, streptavidin, or mixtures thereof.
23. A sensor according to any one of the preceding concepts, wherein the receptor is physically, biologically and/or chemically bonded to the linker, preferably chemically bonded, more preferably covalently bonded.
24. A method of manufacturing a sensor according to any one of the preceding concept, comprising the steps in sequence of: (i) providing a carbon foam as described in any one of concept 1 to 13, 19; (ii) treating the carbon foam with a linker as described in any one of concept 1, 14 to 19, 23; and (iii) treating the linker-modified carbon foam obtained in step (ii) with a receptor as described in any one of concept 1, 20 to 23.

25. A method of sensing a target comprising the steps in sequence of: (i) providing a sensor according to any one of concept 1 to 23; (ii) contacting the sensor with a sample containing or suspected of containing the target; (iii) measuring a response of the sensor; and optionally (iv) correlating the response to the level of the target in the sample.

Note also that the sensor described in this Appendix 5 may be the Gii-Sens carbon foam sensor described earlier in this specification.

Appendix 6 Benchmark Experimental Conditions 1 mM Potassium Ferri/Ferrocyanide in 0.1 M Strontium Nitrate and minimum number of five replicates randomly picked. Cyclic voltammetry at 25 and 200 mV/s scan rate performed as comparative technique. Various features were investigated and conclusions were drawn to evaluate the difference electrode materials performances.

Electrochemical Impedance Spectroscopy was performed at equilibrium potential with 5 mV amplitude and from 0.1 to 100 kHz frequencies Sensor built-in or external silver/silver chloride reference electrode was used.

Gii Sens Carbon Foam Vs. Conventional Graphene Electrode Materials

Gii Sens carbon foam sensors were evaluated and compared against other commercially available graphene-based sensors. See FIG. 84.

The obtained reduction and oxidation peak current recorded shows a 25% greater efficiency in terms of current density per geometrical area. This is clear reflection of the larger available electrochemically available area provided by Gii Sens 3D carbon foam. See FIG. 85.

From cyclic voltammetry the evaluation of the reduction-oxidation peak separation can be interpreted as a measure of the electron redox responsiveness of the surface to voltage scan and its ability to effectively perform rapid redox reactions. The research shows that the reduction-oxidation peak separation remains below 70 mV and shows no increased separation from 25 to 200 mV/s.

Other graphene electrode surface showed larger voltage separation from reduction to oxidation, indicative of less efficient redox faradaic reaction and a clear detrimental effect associated with faster scan rates. See FIG. 86.

The value of charge transfer resistance at the different surfaces shows a dramatic improvement at Gii Sens sensor surface. This illustrates the massive potential of Gii Sens for implementing impedance based measurements with reliability and little background signal interference.

Gii Sens Vs. Other Carbon-Based Materials

Carbon based electrode materials are very common in electroanalytical applications. Carbon paste electrodes are a common material for screen printed sensors. They are most widespread electrode surface in real point-of-care applications due to their fabrication flexibility and affordability. On the other end of carbon-based materials they are glassy carbon surfaces, with expected better performance but a limited availability for flexible manufacturing and affordability. See FIG. 87.

The performance of Gii Sens carbon foam shows a match with that of pure glassy carbon material in terms of available electrochemically active area whilst increasing by 50% the area available at equivalent size carbon paste electrodes. See FIG. 88.

The reduction-oxidation peak separation obtained from cyclic voltammetry shows first the poor performance of carbon paste materials and its high dependence to slow scan rates to deliver relatively acceptable redox reactions at its surface. The response of Gii Sens even outperforms that of pure glassy carbon at any scan rate, showing its great potential to combine the flexibility in manufacturing terms and excellent performance. See FIG. 89.

The measure of surface charge transfer resistance comes to emphasize that Gii Sens holds a tremendous potential as impedance based sensing surface above glassy carbon and opening a field still unreachable for carbon paste electrode materials.

Gii Sens vs. Screen Printed Gold

Screen printed gold sensors are hosts of two of the most important properties to make a sensor material feasible for real electrochemistry sensing applications: Flexible fabrication procedures and excellent electrochemical response. Two commercially available examples of screen printed gold were evaluated. See FIG. 90. Gii Sens carbon foam proves to also host those properties whilst adding affordability.

The recorded reduction and oxidation peak current recorded shows at least a 20% increase in available electrochemically active area per geometrical area unit. See FIG. 91.

As expected screen printed gold shows the most responsive electrode surface material of the evaluated lot, however Gii-Sens matches and even improves that performance specially at fast scan rates. See FIG. 92.

Charge transfer resistance at the electrode surface comparing screen printed gold and Gii Sens also highlights the great potential of the Gii carbon foam material; in all cases it shows lower resistivity associated values.

The comparison of Gii Sens with screen printed gold aims to show the winning comparison in terms of ease of manufacturing and outstanding performance, whereas the affordability and scalability are definitively beneficial inherent features of Gii Sens sensors.

Conclusions

The performance of Gii Sens sensors outplays any other carbon-based or even graphene sensor available in the market. Even screen printed gold surfaces are outperformed, which eliminates any shadow of doubt over the total convenience of using Gii Sens surface as the ultimate electrochemical platform for sensing. Gii Sens shows for the first time the perfect choice for manufacturing and scalable material for electroanalytical applications while maintaining a top performance, ensuring maximum sensitivity and flexibility for implementing into large throughput and point-of-care applications.

Appendix 7 Optimisation of the Surface Immobilization of Anti Human Procalcitonin (cAb)

Objective:
Optimisation of the surface immobilization of anti human procalcitonin (cAb)

Summary of Results
Surface NHS production method selected. Matching existing standard manufacturing process Optimal cAb surface coverage achieved using 100 µg/ml cAb.

For standard bare Gii-Sens® sensors the usual % CV is 7%. For all sensors across the experiments shown in this report the % CV for the 100 µg/ml cAb coating is 10%.

Successful detection of 2000 µg/ml Ag in direct assay format using 100 µg/ml cAb coating. Signal output has a % CV of 10%.

Experimental Section
Solution Compositions
Surface chemistry
NHS Modification
Pyrene NHS
Capture Antibody (cAb):
Product Name: Anti—h PCT 4004 SPTN—5
Antigen (Ag):
Product Name: Recombinant PCT antigen
Echem Read out solution
1 mM K3Fe(CN)6+1 mM K4Fe(CN)6 in 20 mM KCl
cAb Immobilization Solution
Anti-h PCT in 1×PBS (pH 7.2)
Antigen (Ag) Detection Solution
1 mM K3Fe(CN)6+1 mM K4Fe(CN)6 in 20 mM KCl+Ag
Electrochemical Techniques
Electrochemical Impedance
Applied voltage: OCP
Amplitude: 0.01 VRMS
Frequency Range: 100000-0.1 Hz
Cyclic Voltammetry
Scan Rate: 25 mV/s
Start potential: −0.3 V
Upper potential: 0.6 V
V Lower potential: −0.3 V
Assay Procedures
NHS Immobilisation
Prepare 10 mM Pyr NHS in DMF
Drop-cast 10 µL of onto the working electrode of each sensor.
Place sensors inside an airtight box and leave incubating for 12 to 18 h
Confirm the PyrNHS/DMF has fully evaporated from the surface
cAb Immobilization Procedure
Place NHS GiiSens+ sensor onto a flat surface.
Drop-cast 10 µL of cAb onto the working electrode of each sensor.
Place sensors inside a sealed container with a water bath for 2 hours.
Remove sensors and gently rinse the solution off with a DI water before gently drying with N₂ gas stream.
Assay Procedure: Direct Assay 1—See FIG. 93
1) cAb readout—Electrochemical read out solution applied to sensor surface before EIS measurement taken.
2) Solution removal—Electrochemical read out solution removed from sensor surface.
3) t'1 readout—Antigen spiked electrochemical read out solution applied to sensor surface before EIS measurement taken. Approximately 1 min between solution addition & measurement.
4) t'2 readout—EIS measurement taken. Approximately 6 min between solution addition & measurement.
5) t'3 readout—EIS measurement taken. Approximately 11 min between solution addition & measurement.

See Annex for Electrochemical readout procedures
1. Characterisation Plots
Replicates per point, n=5 (minimum) different disposable sensors (single read out, sensors disposed)
Phase 1: Surface Chemistry The surface chemistry of choice was NHS modified carbon foam followed by conjugation of the cAb via amide bond formation following the scheme below. See FIG. 94: Surface immobilization reaction schematic.

The NHS production on the carbon foam surface was monitored using electrochemical impedance spectroscopy & cyclic voltammetry. See FIG. 95: Rct & ΔEp signal response for NHS functionalization of GiiSens® electrodes.

The increase in Ret & ΔEp relative to the bare electrode confirms NHS functionalization of the carbon foam electrode.

A range of cAb concentrations between 50-800 µg/ml were screened using electrochemical impedance spectroscopy. See FIG. 96: cAb immobilisation on GiiSens® electrodes.

A logical increase of Rct with cAb concentration is observed for immobilizations on NHS modified sensors. The optimum coverage was estimated 100 µg/ml cAb on NHS electrodes, that concentration was estimated to provide best performance of the sensor without wasting material for little gain. At this concentration an excellent level of reproducibility is observed (% CV 3%).

Phase 2: Electrochemical Signal

The electrochemical signal generated was evaluated for a direct assay, this means no utilization of a secondary antibody to assist the antigen detection.

An antigen concentration of 2000 µg/ml was selected for investigation of the direct assay. The surface antibody coating was fixed at 100 µg/ml as per the results in Phase 1 of this report. Ag-Ab incubation time was selected as a preliminary assay parameter for investigation. See FIG. 97: Signal response from 2000 µg/ml in direct assay format using 100 µg/ml cAb surface coating.

The 100 µg/ml cAb again shows a good level of reproducibility (% CV 8%). The distinction between the Avg. Rct of the cAb is clear, giving a distinct quantifiable signal output (ΔRct). The ΔRct signal output also shows an acceptable level of reproducibility with the % CV≥10% at each readout time. The stability of the output signal between 1, 6 & 11 m shows no additional Ab—Ag interaction takes place after the first measurement. The 5-minute time gap between measurements is due to the length of time the EIS measurement takes. The assay incubation time is optimal as low as 1 minute for a 2000 µg/ml Ag sample.

TABLE 9

Key experimental & electrochemical parameters for cAb immobilizations

| cAb Concentration (µg/ml) | Analysis Solution | Electrochemical Analysis Parameters | |
| --- | --- | --- | --- |
| 50, 100, 200, 400 & 800 | 20 mM KCl + 1 mM potassium ferricyanide + 1 mM potassium ferrocyanide | Cyclic Voltammetry Scan Rate: 25 mV/s Potential Window: −0.3-0.6 V | EIS Applied voltage: OCP Amplitude: 0.01 $V_{RMS}$ Frequency Range: 100000-0.1 Hz |

TABLE 10

Key experimental & electrochemical parameters for Ag detection

| Ag concentration (pg/ml) | cAb Concentration (µg/ml) | Analysis Solution | Electrochemical Analysis Parameters |
|---|---|---|---|
| 2000 | 100 | 20 mM KCl + 1 mM potassium ferricyanide + 1 mM potassium ferrocyanide | EIS Applied voltage: OCP Amplitude: 0.01 $V_{RMS}$ Frequency Range: 100000-0.1 Hz |

Appendix 8

Consolidated List of Features and Optional Features

This Appendix 8 is a consolidated list of Features and Optional Features. Note that any one or more of the following Features A-R may each be combined with any one or more other, compatible Features A-R and with any one or more of the Optional Features.

Group 1: Sub-Surface Carbon Foam
  Feature A: Carbon foam created in a sub-surface region of a carbon pre-cursor material
  Feature B: Carbon foam created in an encapsulated region of a carbon pre-cursor material
  Feature C: Carbon foam created in a region of a carbon pre-cursor material, where the region has no substantial gas escape pathways
  Feature D: Amorphous, non-graphene material adhering to the substrate Group 2: Dual Laser Processing
  Feature E: Carbon foam created by laser ablating a sub-surface carbon foam region
  Feature F: Non-graphene carbon foam created by laser ablating a sub-surface carbon foam region
  Feature G: Dual lasers
  Feature H: Electrical contacts positioned in carbon foam created by laser ablating a sub-surface carbon foam region
  Feature I: Printing electrical contacts on the polyimide film and then creating the exposed carbon foam
  Feature J: Tall tracks made in the carbon foam
  Feature K: Applying the first and second lasers in different manufacturing facilities Group 3: Products
  Feature L1: Biosensors
  Feature L2: Scalable, low-cost manufacture of a carbon foam biosensor using screen printing technology
  Feature L3: Adding functionalised groups to the biosensor at a different manufacturing facility
  Feature L4: Adding functionalised groups to the biosensor as part of the biosensor production process
  Feature L5: Biosensor manufacture using PPC: Post Printing Conversion
  Feature M1: Energy storage device: the supercapacitor
  Feature M2: Specifics of the carbon foam supercapacitor
  Feature M3: Carbon foam supercapacitor: the Common Collector
  Feature M4: Carbon foam supercapacitor: the PPC manufacturing process
  Feature M5: Carbon foam pseudo-capacitor: a metal oxide variant
  Feature M6: Carbon foam supercapacitor: using an ionic-gel in low humidity environment
  Feature N1: Electrical conductors
  Feature N2: Combined Sensor and Supercapacitor
  Feature N3: Combined Supercapacitor and Battery
  Feature N4: The Smart Label
  Feature N5: Combined Supercapacitor and Antenna
  Feature N6: Combined Energy Scavenger+Supercapacitor.
  Feature O1: 3D carbon foam structures: Gii-Thru for Gii-Cap
  Feature O2: 3D carbon foam structures: Gii-Thru Stackable Gii-Cap/Gii-Cap+
  Feature O3: 3D carbon foam structures: Gii-Thru for Gii-Sens: HISLOC
  Feature O4 3D carbon foam structures: Gii-Thru for Gii-Sens: HISLOC Manufacturing Process
Group 4: Miscellaneous
  Feature P: Scalable manufacturing of carbon foam: Gii 3
  Feature Q: Various other carbon foam applications
  Feature R: Non-graphene carbon foam Feature A: Carbon Foam Created in a Sub-Surface Region of a Carbon Pre-Cursor Material A method of manufacturing carbon foam material comprising the step of irradiating a sub-surface region of a carbon pre-cursor material, parameters of the laser beam being selected to create a carbon foam, in that sub-surface region.

A laser induced carbon foam material made by a laser beam configured to irradiate a sub-surface region of a carbon pre-cursor material, parameters of the laser beam being selected to create a carbon foam in that sub-surface region.

A device including a laser induced carbon foam material manufactured by irradiating a sub-surface region of a carbon pre-cursor material, parameters of the laser beam being selected to create a carbon foam in that sub-surface region.

Feature B: Carbon Foam Created in an Encapsulated Region of a Carbon Pre-Cursor Material A method of manufacturing carbon foam material comprising the step of irradiating an encapsulated region of a carbon pre-cursor material, parameters of the laser beam being selected to create a carbon foam in that encapsulated region.

A laser induced carbon foam material made by a laser beam configured to irradiate an encapsulated region of a carbon pre-cursor material, parameters of the laser beam being selected to create a carbon foam in that encapsulated region.

A device including a laser induced carbon foam material manufactured by irradiating an encapsulated region of a carbon pre-cursor material, parameters of the laser beam being selected to create a carbon foam in that encapsulated region.

Feature C: Carbon Foam Created in a Region of a Carbon Pre-Cursor Material, where the Region has No Substantial Gas Escape Pathways A method of manufacturing carbon foam material comprising the step of irradiating an encapsulated, sub-surface region of a carbon pre-cursor material, parameters of the laser beam being selected to create a carbon foam in that region and in which no substantial gas escape pathways to a surface of the pre-cursor material are created by the laser beam.

A laser induced carbon foam material by a laser beam configured to irradiate an encapsulated, sub-surface region of a carbon pre-cursor material, parameters of the laser beam being selected to create a carbon foam in that region and in which no substantial gas escape pathways to a surface of the pre-cursor material are created by the laser beam.

A device including a laser induced carbon foam material manufactured by irradiating an encapsulated, sub-surface region of a carbon pre-cursor material, parameters of the laser beam being selected to create a carbon foam, in that region and in which no substantial gas escape pathways to a surface of the pre-cursor material are created by the laser beam.

Feature D: Amorphous, Non-Graphene Material Adhering to the Substrate

A method of manufacturing carbon foam material comprising the step of irradiating an internal region of a carbon pre-cursor material, positioned on a substrate, parameters of the laser beam being selected to create a carbon foam in that region and to create a disorganised, amorphous, non-graphene material between the carbon foam region and the substrate; in which that disorganised, amorphous, non-graphene material is adhering or otherwise attaching directly to the substrate.

A laser induced carbon foam material made by a laser beam configured to irradiate an internal region of a carbon pre-cursor material, positioned on a substrate, parameters of the laser beam being selected to create a carbon foam in that region and to create a disorganised, amorphous, non-graphene material between the graphene region and the substrate, that disorganised, amorphous, non-graphene material adhering or otherwise attaching directly to the substrate.

A device including a laser induced carbon foam material manufactured by irradiating an internal region of a carbon pre-cursor material, positioned on a substrate, parameters of the laser beam being selected to create a carbon foam in that region and to create a disorganised, amorphous, non-graphene material between the graphene region and the substrate, that disorganised, amorphous, non-graphene material adhering or otherwise attaching directly to the substrate.

Feature E: Carbon Foam Created by Laser Ablating a Sub-Surface Carbon Foam Region A method of manufacturing graphene material comprising the steps of (a) a laser beam irradiating an encapsulated or sub-surface region of a carbon pre-cursor material, to create a carbon foam in that encapsulated or sub-surface region and a disorganised, amorphous non-graphene substance above the carbon foam, and then (b) laser ablation or treatment to remove at least some of the disorganised, amorphous non-graphene substance and to expose at least some of the carbon foam.

A laser induced, carbon foam made by (a) a laser beam irradiating an encapsulated or sub-surface region of a carbon pre-cursor material, to create a carbon foam in that encapsulated or sub-surface region and a disorganised, amorphous non-graphene substance above the carbon foam, and then (b) laser ablation or treatment to remove the disorganised, amorphous non-graphene substance and to expose at least some of the carbon foam.

A device including a laser induced carbon foam material manufactured by (a) a laser beam irradiating an encapsulated or sub-surface region of a carbon pre-cursor material, to create a carbon foam in that encapsulated or sub-surface region and a disorganised, amorphous non-graphene substance above the carbon foam, and then (b) laser ablation or treatment to remove the disorganised, amorphous non-graphene substance and to expose at least some of the carbon foam.

Feature F: Non-Graphene Carbon Foam Created by Laser Ablating a Sub-Surface Carbon Foam Region A method of manufacturing non-graphene carbon foam comprising the steps of
(a) a laser beam irradiating an encapsulated or sub-surface region of a carbon pre-cursor material to create a carbon foam in that encapsulated or sub-surface region in the carbon pre-cursor material, and a disorganised, amorphous non-graphene substance above the carbon foam, and then
(b) laser ablation or treatment to remove the disorganised, amorphous non-graphene substance and expose at least some of the underlying carbon foam and transform at least some of that underlying carbon foam into a non-graphene carbon foam.

A laser induced carbon foam made by:
(a) a laser beam irradiating an encapsulated or sub-surface region of a carbon pre-cursor material to create a carbon foam in that encapsulated or sub-surface region in the carbon pre-cursor material, and a disorganised, amorphous non-graphene substance above the carbon foam, and then
(b) laser ablation or treatment to remove the disorganised, amorphous non-graphene substance and expose at least some of the underlying carbon foam and transform at least some of that underlying carbon foam into a non-graphene carbon foam.

A device including a laser induced carbon foam made by:
(a) a laser beam irradiating an encapsulated or sub-surface region of a carbon pre-cursor material to create a carbon foam in that encapsulated or sub-surface region in the carbon pre-cursor material, and a disorganised, amorphous non-graphene substance above the carbon foam, and then
(b) laser ablation or treatment to remove the disorganised, amorphous non-graphene substance and expose at least some of the underlying carbon foam and transform at least some of that underlying carbon foam into a non-graphene carbon foam.

Feature G: Dual Lasers Operating at Different Frequency Bands

A method of manufacturing a carbon foam material comprising the steps of
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam.

A laser induced carbon foam made by:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam.

A device including a laser induced carbon foam material manufactured by
(a) using a laser beam operating at a first band to irradiate an encapsulated or sub-surface region of a carbon pre-cursor material below a surface of the material, to create carbon foam in that encapsulated or sub-surface region, and then (b) using a laser beam operating at a second band to remove or ablate material sitting above the carbon foam, to expose at least some of the carbon foam.

Feature H: Electrical Contacts Positioned in Carbon Foam Created by Laser Ablating a Sub-Surface Carbon Foam Region A method of manufacturing carbon foam material comprising the steps of:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam; and
(c) attaching, printing or locating one or more electrical contacts into the carbon foam.

A laser induced carbon foam made by:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam;
(c) attaching, printing or locating one or more electrical contacts into the carbon foam.

A device including a laser induced carbon foam material manufactured by:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam; and
(c) attaching, printing or locating one or more electrical contacts into the carbon foam.

Feature I: Printing Electrical Contacts on the Polyimide Film and then Creating the Exposed Carbon Foam A method of manufacturing carbon foam material comprising the steps of:
(a) screen printing electrical contacts onto or into a carbon pre-cursor material;
(b) using a laser beam operating at a first band to irradiate an encapsulated or sub-surface region of a carbon pre-cursor material below a surface of the material, to create carbon foam in that encapsulated or sub-surface region, and where steps (a) and (b) can be performed in the sequence (a) then (b) or (b) then (a); and
(c) using a laser beam operating at a second band to remove or ablate material sitting above the carbon foam, to expose at least some of the carbon foam to which the electrical contacts are connected.

A laser induced carbon foam material made by:
(a) screen printing electrical contacts onto or into a carbon pre-cursor material;
(b) using a laser beam operating at a first band to irradiate an encapsulated or sub-surface region of a carbon pre-cursor material below a surface of the material, to create carbon foam in that encapsulated or sub-surface region, and where steps (a) and (b) can be performed in the sequence (a) then (b) or (b) then (a); and
(c) using a laser beam operating at a second band to remove or ablate material sitting above the carbon foam, to expose at least some of the carbon foam to which the electrical contacts are connected.

A device including a laser induced carbon foam material manufactured by:
(a) screen printing electrical contacts onto or into a carbon pre-cursor material;
(b) using a laser beam operating at a first band to irradiate an encapsulated or sub-surface region of a carbon pre-cursor material below a surface of the material, to create carbon foam in that encapsulated or sub-surface region, and where steps (a) and (b) can be performed in the sequence (a) then (b) or (b) then (a); and
(c) using a laser beam operating at a second band to remove or ablate material sitting above the carbon foam, to expose at least some of the carbon foam to which the electrical contacts are connected.

Feature J: Tall Tracks Made in the Carbon Foam

A method of manufacturing carbon foam material comprising the steps:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam;
and where the carbon foam is at least 50 μm in thickness or depth.

A laser induced carbon foam material made by:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam;
and where the carbon foam is at least 50 μm in thickness or depth.

A device including a laser induced carbon foam material manufactured by:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam;
and where the carbon foam is at least 50 μm in thickness or depth.

Feature K: Applying the First and Second Lasers in Different Manufacturing Facilities A method of manufacturing a device comprising the steps:
(a) using a laser beam operating at a first band to irradiate an encapsulated or sub-surface region of a carbon pre-cursor material below a surface of the material, to create carbon foam in that encapsulated or sub-surface region, and then
(b) using a laser beam operating at a second band to remove or ablate material sitting above the carbon foam, to expose at least some of the carbon foam;
in which step (a) is performed at one manufacturing facility and step (b) is performed at a different facility.

A laser induced carbon foam material made by:
  (a) using a laser beam operating at a first band to irradiate an encapsulated or sub-surface region of a carbon pre-cursor material below a surface of the material, to create carbon foam in that encapsulated or sub-surface region, and then
  (b) using a laser beam operating at a second band to remove or ablate material sitting above the carbon foam, to expose at least some of the carbon foam;
  in which step (a) is performed at one manufacturing facility and step (b) is performed at a different facility.

A device including a laser induced carbon foam material manufactured by:
  (a) using a laser beam operating at a first band to irradiate an encapsulated or sub-surface region of a carbon pre-cursor material below a surface of the material, to create carbon foam in that encapsulated or sub-surface region, and then
  (b) using a laser beam operating at a second band to remove or ablate material sitting above the carbon foam, to at least some of the expose carbon foam;
  in which step (a) is performed at one manufacturing facility and step (b) is performed at a different facility.

Feature L1: Biosensor

A method of manufacturing a biosensor including a sensing electrode comprising carbon foam made, at least in part, by the method defined in any of Features A-K above.

A biosensor including a sensing electrode comprising carbon foam made, at least in part, by the method defined in any of Features A-K above.

A point of care diagnostics device including a biosensor with a sensing electrode comprising carbon foam made, at least in part, by the method defined in any of Features A-K above.

Feature L2: Scalable, Low-Cost Manufacture of a Carbon Foam Biosensor Using Screen Printing Technology A method of manufacturing a biosensor including sensor electrodes, such as a working electrode, and a counter electrode, each electrode comprising carbon foam made, at least in part, by the method defined in any of Features A-K above, and the method includes screen printing electrical connection tracks over each electrode and at least partly covering the electrodes and connection tracks with a screen printed dielectric.

A biosensor including sensor electrodes, such as a working electrode, and a counter electrode, each electrode comprising carbon foam made, at least in part, by the method defined in any of Features A-K above, and where the biosensor includes (i) electrical connection tracks that have been screen printed over each electrode and (ii) a screen printed dielectric that at least partly covers the electrodes and connection tracks.

Feature L3: Adding Functionalised Groups to the Biosensor at a Different Manufacturing Facility A method of manufacturing, in one manufacturing facility, a biosensor including sensor electrodes, such as a working electrode, a counter electrode, each comprising carbon foam made, at least in part, by the method defined in any of Features A-K above, and the method includes the further step of adding, at a different manufacturing facility, functionalised groups to at least the working electrode.

A biosensor including sensor electrodes, such as a working electrode, and a counter electrode, each electrode comprising carbon foam made, at least in part, by the method defined in any of Features A-K above at one manufacturing facility, and where the biosensor includes functionalised groups that have been added to at least the working electrode at a different manufacturing facility.

Feature L4: Adding Functionalised Groups to the Biosensor as Part of the Biosensor Production Process A method of manufacturing in one manufacturing facility a biosensor including sensor electrodes, such as a working electrode, a counter electrode, each comprising carbon foam made, at least in part, by the method defined in any of Features A-K above, and the method includes the further step of adding, at that manufacturing facility, functionalised groups to the working electrode.

A biosensor including sensor electrodes, such as a working electrode, and a counter electrode, each electrode comprising carbon foam made, at least in part, by the method defined in any of Features A-K above at one manufacturing facility, and where the biosensor includes functionalised groups that have been added to at least the working electrode at that same manufacturing facility.

Feature L5: Biosensor Manufacture Using PPC: Post Printing Conversion

A method of manufacturing a biosensor including sensor electrodes, such as a working electrode, and a counter electrode, each comprising carbon made, at least in part, by the method defined in any of Features A-K above, and the method includes the steps of (a) screen printing a carbon layer on a carbon pre-cursor substrate; (b) screen printing electrical connection tracks and a reference electrode; (c) screen printing a dielectric layer over the carbon layer and the electrical connection tracks and the reference electrode; and then (d) creating carbon foam sensor electrodes using a process defined in any of Features A-K above.

A biosensor including sensor electrodes, such as a working electrode, and a counter electrode, where the biosensor includes (a) a carbon layer screen printed on a carbon pre-cursor substrate; (b) screen printed electrical connection tracks and a screen printed reference electrode; (c) a dielectric layer screen printed over the carbon layer and the electrical connection tracks and the reference electrode; and then (d) carbon foam sensor electrodes made using a process defined in any of Features A-K above.

Feature M1: Energy Storage Device

A method of manufacturing an energy storage device, such as a supercapacitor or pseudo-capacitor, in which energy storage electrodes comprise carbon foam material made, at least in part, by the method defined in any of Features A-K above.

An energy storage device, such as a supercapacitor or pseudo-capacitor, in which the energy storage electrodes comprise carbon foam material made, at least in part, by the method defined in any of Features A-K above.

Feature M2: Screen Printing Layers of the Carbon Foam Supercapacitor

A method of manufacturing an energy storage device, such as a supercapacitor or pseudo-capacitor in which energy storage electrodes comprise carbon foam material made, at least in part, by the method defined in any of Features A-K above;
  and the method includes the step of screen printing electrical connection tracks over at least a part of each electrode and at least partly covering the electrodes and connection tracks with a screen printed dielectric layer.

An energy storage device, such as a supercapacitor or pseudo-capacitor, in which energy storage electrodes comprise carbon foam material made, at least in part, by the method defined in any of Features A-K above;
  including screen printed electrical connection tracks formed over at least a part of each electrode and a screen printed dielectric layer that at least partly covers the electrodes and connection tracks.

Feature M3: Carbon foam supercapacitor: the Common Collector

A method of manufacturing an energy storage device, such as a supercapacitor or pseudo-capacitor, in which energy storage electrodes comprise carbon foam material made, at least in part, by the method defined in any of Features A-K above and are arranged in an interdigitated pattern;

and the method includes the step of screen printing electrical connection tracks over at least a part of each electrode, in which a single electrical connection track connects to underlying digits that extend perpendicularly from both sides of the electrical connection track.

An energy storage device, such as a supercapacitor or pseudo-capacitor, in which energy storage electrodes comprise carbon foam material made, at least in part, by the method defined in any of Features A-K above and are arranged in an interdigitated pattern;

and in which screen printed electrical connection tracks are formed over at least a part of each electrode, and in which a single electrical connection track connects to underlying digits that extend perpendicularly from both sides of the electrical connection track.

Feature M4: Carbon Foam Supercapacitor: The PPC Manufacturing Process

A method of manufacturing an energy storage device, such as a supercapacitor or pseudo-capacitor;

and the method includes the step of (a) screen printing electrical connectors on to a substrate; (b) screen printing a carbon layer over the electrical collectors; (c) screen printing a dielectric over at least some of the carbon layer; then (d) creating carbon foam energy storage electrodes at least in part by the method defined in any of Features A-K above.

An energy storage device, such as a supercapacitor or pseudo-capacitor;

including (a) screen printed electrical connectors on a substrate; (b) screen printing a carbon layer over the electrical collectors; (c) screen printing a dielectric over at least some of the carbon layer; then (d) creating carbon foam energy storage electrodes at least in part by the method defined in any of Features A-K above.

Feature M5: Carbon Foam Super-Capacitor: A Metal Oxide Variant

A method of manufacturing an energy storage device, such as a supercapacitor or pseudo-capacitor, in which energy storage electrodes comprise carbon foam material made, at least in part, by the method defined in any of Features A-K above;

and the method includes the step of applying an electrochemical deposition process of a pseudo-capacitive material, such as a metal oxide, to the energy storage electrodes.

An energy storage device, such as a supercapacitor or pseudo-capacitor;

including (a) energy storage electrodes comprised of carbon foam material made, at least in part, by the method defined in any of Features A-K above; and (b) a pseudo-capacitive material, such as a metal oxide, applied to the energy storage electrodes.

Feature M6: Carbon Foam Supercapacitor: Using an Ionic-Gel in Low Humidity Environment A method of manufacturing an energy storage device, such as a supercapacitor or pseudo-capacitor, in which energy storage electrodes comprise carbon foam material made, at least in part, by the method defined in any of Features A-K above;

and the method includes the step of applying an ionic gel electrolyte in a low humidity but non-inert environment, in which the levels of $O_2$ and $H_2O$ in the environment and measured and controlled to optimise the capacitance of the energy storage device.

An energy storage device, such as a supercapacitor or pseudo-capacitor;

including (a) energy storage electrodes comprised of carbon foam material made, at least in part, by the method defined in any of Features A-K above; and (b) an ionic gel electrolyte that has been applied in a low humidity but non-inert environment, in which the levels of $O_2$ and $H_2O$ in the environment and measured and controlled to optimise the capacitance of the energy storage device.

Feature N1: Electrical Conductor

A method of manufacturing an electrical conductor, in which the electrical conductor comprises carbon foam made, at least in part, by the method defined in any of Features A-K above.

An electrical conductor including carbon foam made, at least in part, by the method defined in any of Features A-K above.

Feature N2: Combined Sensor and Supercapacitor

A method of manufacturing a device that includes both a sensor, and an energy storage device, such as a supercapacitor, in which both the sensor and the energy storage device comprise a carbon foam material made, at least in part, by the method defined in any of Features A-K above.

A sensor device, such as a biosensor, including (a) a sensing electrode comprising carbon foam material made, at least in part, by the method defined in any of Features A-K above and (b) an energy storage device, such as a supercapacitor, in which the energy storage device comprises carbon foam material made, at least in part, by the method defined in any of Features A-K above.

A point of care diagnostics device including (a) a sensing electrode comprising carbon foam material made, at least in part, by the method defined in any of Features A-K above and (b) an energy storage device, such as a supercapacitor, in which the energy storage device comprise carbon foam material made, at least in part, by the method defined in any of Features A-K above.

Feature N3: Combined Supercapacitor and Battery

A method of manufacturing an integrated device including a battery and a supercapacitor, the battery providing long term power and the supercapacitor providing short term power at a higher level than the battery, in which the supercapacitor comprises a carbon foam material made, at least in part, by the method defined in any of Features A-K above.

An integrated device including a battery and a supercapacitor, the battery providing long term power and the supercapacitor providing short term power at a higher level than the battery, in which the supercapacitor comprises carbon foam material made, at least in part, by the method defined in any of Features A-K above.

Feature N4: The Smart Label

A method of manufacturing a smart label comprising the steps of combining or integrating a battery and a supercapacitor, the battery providing long term power and the supercapacitor providing short term power at a higher level than the battery, in which the supercapacitor comprises carbon foam material made, at least in part, by the method defined in any of Features A-K above;

and the smart label includes electronics, such as sensor electronics, powered by the battery and a data transmitter powered by the supercapacitor.

A smart label including a battery and a supercapacitor, the battery providing long term power and the supercapacitor providing short term power at a higher level than the battery, in which the supercapacitor comprises carbon foam material made, at least in part, by the method defined in any of Features A-K above;

and the smart label includes electronics, such as sensor electronics, powered by the battery and a data transmitter powered by the supercapacitor.

Feature N5: Combined Supercapacitor and Antenna

A method of manufacturing an integrated device including an antenna and a supercapacitor, in which the supercapacitor powers the antenna and comprises carbon foam material made, at least in part, by the method defined in any of Features A-K above.

An integrated device including an antenna and a supercapacitor, in which the supercapacitor powers the antenna and comprises carbon foam material made, at least in part, by the method defined in any of Features A-K above.

Feature N6: Combined Energy Scavenger+Supercapacitor.

A method of manufacturing an integrated device comprising the steps of combining or integrating an energy scavenger system and a supercapacitor, in which the supercapacitor powers an antenna and comprises carbon foam material made, at least in part, by the method defined in any of Features A-K above.

A data logging device including an energy scavenger system and a supercapacitor, in which the supercapacitor powers an antenna and comprises carbon foam material made, at least in part, by the method defined in any of Features A-K above.

Feature O1: 3D Carbon Foam Structures: Gii-Thru for Gii-Cap

A method of manufacturing an energy storage device comprising the steps of
  (i) providing a carbon pre-cursor film;
  (ii) screen printing a conductive paste or ink layer, on the surface of the carbon pre-cursor film;
  (iii) screen printing a collector layer over the screen printed conductive paste or ink layer;
  (iv) screen printing a dielectric layer over the collector layer;
  (v) making energy storage electrodes that comprise carbon foam material from the carbon pre-cursor film at least in part by the method defined in any of Features A-K above
    and in which an electrically conductive path is formed from the carbon foam material to the collector layer, via the conductive paste or ink layer.

An energy storage device, such as a supercapacitor, including:
  (i) a carbon pre-cursor film;
  (ii) a screen printed conductive paste or ink layer, on the surface of the carbon pre-cursor film;
  (iii) a screen printed collector layer over the screen printed conductive paste or ink layer;
  (iv) a screen printed dielectric layer over the collector layer;
  (v) energy storage electrodes that comprise carbon foam material made from the carbon pre-cursor film at least in part by the method defined in any of Features A-K above, and in which an electrically conductive path is formed from the carbon foam material to the collector layer, via the conductive paste or ink layer.

Feature O2: 3D Carbon Foam Structures: Gii-Thru Stackable Gii-Cap/Gii-Cap+

A method of manufacturing an energy storage device comprising the steps of
  (i) providing a carbon pre-cursor film;
  (ii) screen printing a conductive paste or ink layer, on the surface of the carbon pre-cursor film;
  (iii) screen printing a collector layer over the screen printed conductive paste or ink layer;
  (iv) screen printing a dielectric layer over the collector layer;
  (v) making energy storage electrodes that comprise carbon foam material from the carbon pre-cursor film at least in part by the method defined in any of Features A-K above
    and in which an electrically conductive path is formed from the carbon foam material to the collector layer, via the conductive paste or ink layer;
    and in which multiple sub-assemblies are formed into a stack and in which adjacent energy storage electrodes are separated by an ionic gel electrolyte.

An energy storage device, such as a supercapacitor, including a sub-assembly comprising:
  (i) a carbon pre-cursor film;
  (ii) a screen printed conductive paste or ink layer, on the surface of the carbon pre-cursor film;
  (iii) a screen printed collector layer over the screen printed conductive paste or ink layer;
  (iv) a screen printed dielectric layer over the collector layer;
  (v) energy storage electrodes that comprise carbon foam material made from the carbon pre-cursor film at least in part by the method defined in any of Features A-K above, and in which an electrically conductive path is formed from the carbon foam material to the collector layer, via the conductive paste or ink layer;
    and in which multiple sub-assemblies are formed into a stack and in which adjacent energy storage electrodes are separated by an ionic gel electrolyte.

Feature O3: 3D Carbon Foam Structures: Gii-Thru for Gii-Sens: HISLOC

A microfluidic diagnostic device including sample wells positioned on an upper face of the device, reference, working and counter electrodes, made from a carbon pre-cursor film at least in part by the method defined in any of Features A-K above, are in a layer below the sample wells, and reference, working and counter electrode connections are in layer below the reference, working and counter electrodes.

Feature O4 3D Carbon Foam Structures: Gii-Thru for Gii-Sens: HISLOC Manufacturing Process A method of manufacturing a lab-on-chip device comprising the steps of
  (i) providing a carbon pre-cursor film;
  (ii) screen printing a conductive paste or ink layer on the surface of the carbon pre-cursor film;
  (iii) screen printing a conductive layer over the screen printed conductive paste or ink layer;
  (iv) screen printing a reference electrode;
  (v) screen printing a dielectric layer over the collector layer;
  (vi) making sensor electrodes that comprise carbon foam material from the carbon pre-cursor film at least in part by the method defined in any of Features A-K above;

and in which an electrically conductive path is formed from the carbon foam material to the conductive layer, via the conductive paste or ink layer.

A lab-on-chip device, including a sub-assembly comprising:
- (i) a carbon pre-cursor film;
- (ii) a screen printed conductive paste or ink layer, on the surface of the carbon pre-cursor film;
- (iii) a screen printed conductive layer over the screen printed conductive paste or ink layer;
- (iv) a screen printed reference electrode;
- (v) a screen printed dielectric layer over the collector layer;
- (vi) sensor electrodes that comprise carbon foam material made from the carbon pre-cursor film at least in part by the method defined in any of Features A-K above, and in which an electrically conductive path is formed from the carbon foam material to the conductive layer, via the conductive paste or ink layer.

Feature P: Scalable Manufacturing of Carbon Foam: Gii 3

A method of manufacturing a device including one or more electrodes, each comprising carbon foam material;
in which the method includes passing a continuous reel of a carbon pre-cursor film through a sequence of operations required to manufacture the carbon foam material made, at least in part, by the method defined in any of Features A-K above.

Feature Q: Various Other Carbon Foam Applications

A device including a carbon foam material made, at least in part, by the method defined in any of Features A-K above, where the device is one of the following types of devices:
- Hall effect sensor: the carbon foam shows a response to magnetic fields.
- Tactile sensor for e.g. robotics; prototype sensors using Gii carbon foam with polydimethylsiloxane (PDMS) embedded into and over the structure, as an active layer in a piezoresistive based pressure sensors for use in robotic touch sensing applications.
- Infectious diseases sensor.
- Biosensor where the Gii carbon foam is subject to π-π non-covalent functionalization with pyrene carboxylic acid (PCA) for interleukin 10 impedimetric detection.
- Constant monitoring chemical sensor.
- Glucose monitoring sensor: A reversible polymer displacement sensor mechanism for electrochemical glucose monitoring; a pyrene-derivatised boronic acid chemo-receptor for glucose is adsorbed onto a carbon foam electrode, competitively binding with poly-nor-dihydroguaiaretic acid.
- Lactic acid sensor: Synthetic organic receptor molecules are employed based on boronic acids attached to carbon foam to provide functionality and selectivity in competitive analyte binding, using surface redox polymer indicator displacement.
- Gas detection sensor, such as hydrogen peroxide and oxygen detection using Gii carbon foam immersed in a phosphate buffer solution of pH 7 nanoparticulate polymer of intrinsic microporosity (PIM-1).
- Optical detector.
- Self-charging hybrid energy generation device.
- Green gas conversion into useful chemical.
- Fuel cell, e.g. hydrogen fuel cell.
- Filters, including gas permeable filter.
- Heating device.

Feature R: Non-Graphene Carbon Material Foam

A carbon foam material made, at least in part, by the method defined in any of Features A-K above and that is hydrophilic, with a contact angle below 20°.

A carbon foam material made, at least in part, by the method defined in any of Features A-K above and with a Raman spectrum exhibiting a significant D peak; the 2D peak is less than the G peak; the peak D: peak G ratio is above zero.

A carbon nano-onion material made, at least in part, by the method defined in any of Features A-K above.

A device including a carbon foam material made, at least in part, by the method defined in any of Features A-K above and that is hydrophilic, with a contact angle below 200.

A device including a carbon foam material made, at least in part, by the method defined in any of Features A-K above with a Raman spectrum exhibiting a significant D peak; the 2D peak is less than the G peak; the peak D: peak G ratio is above zero.

A device including a carbon nano-onion material, made, at least in part, by the method defined in any of Features A-K above.

Optional Features

Note that any one or more of the following optional features may each be combined with any one or more other, compatible optional features and with any one or more of the main Features A-R.

The Manufacturing Processes
- the manufacturing process is a room temperature process.
- the manufacturing process is an ambient pressure process.
- can be done on a plastic substrate (compatible with any manufacturing process, not just silicon chip fabrication).
- can be done without a catalyst.
- the manufacturing process takes approximately 2 minutes or less to manufacture 1 $cm^2$ of approximately 50 μm thick carbon foam onto a plastic substrate.
- the manufacturing process enables a 3D carbon foam to be created on a flexible substrate.
- the manufacturing process requires no graphene or graphene oxide precursor.
- the manufacturing process creates carbon foam material solely in the encapsulated, sub-surface region of the carbon pre-cursor material and not at any surface of the carbon pre-cursor material.
- the manufacturing process uses a combination of industry standard, low cost and scalable (i) screen printing technology and (ii) computer-controlled laser scanning technology.
- the manufacturing process uses, or can be adapted for, high-speed, high volume reel-to-reel or reel-to-sheet production.

The First Laser Beam Parameters and Control Scheme
- the first laser beam and the second laser beam are generated by different laser systems.
- the first laser beam and the second laser beam are generated by the same laser systems.
- parameters of the laser beam that irradiates the sub-surface or encapsulated region include one or more of: intensity, wavelength, pulse frequency, pulse duration, pulse profile, scanning speed, focal distance, heat generated at the sub-surface or encapsulated region.
- varying the laser parameters alters the carbon foam material properties, enabling carbon foam to be produced with properties that are optimised for different applications.
- varying the laser parameters alters one or more of the following carbon foam material properties or parameters: type of carbon nanostructures present (e.g. carbon nano-onion etc), size of defects, distribution of defects, extent of defects, type of defects, of the Raman D and 2D peaks, relative size of the Raman D and 2D peaks, thickness or depth, flexibility, adhesion, porosity, electrical conductivity, capacitance, absorption of organic solvents and water-based solutions, hydrophilicity, EMI shielding, electrode quality, wettability, contact angle, anti-fouling.

laser beam generates a temperature of higher than 500° C. at the sub-surface or encapsulated region to form carbon foam.

laser beam generates a temperature of over 500° C. at the sub-surface or encapsulated region to form carbon foam.

laser pulse duration is between 1 ns and 10 μs, giving a heating rate of between around $5 \times 10^{7}$° C./s and $2 \times 10^{12}$° C./s.

laser power is within a typical working range of 8-20 watts, with 12 W optimum.

laser focal distance is within a typical working range of 50 mm-400 mm.

laser pulse frequency is between 50 kHz and 500 kHz.

laser pulse frequency is between 1 kHz and 2 MHz.

laser wavelength is between 0.7 μm-2.5 μm.

laser is scanned at between 9 cm/s and 40 cm/s (or ±50% of these ranges).

parameters of the laser beam include focus parameters.

parameters of the laser beam include diffraction parameters.

parameters of the laser beam include interference pattern parameters.

focus of the laser beam moves through the depth of the carbon pre-cursor material to generate carbon foam in the sub-surface or encapsulated region of the carbon pre-cursor focus of the laser beam moves at least approximately 50 μm through the depth of the carbon pre-cursor material to generate carbon foam in the sub-surface or encapsulated region of the carbon pre-cursor.

focus of the laser beam moves at least 100 μm through the depth of the carbon pre-cursor material to generate carbon foam in the sub-surface or encapsulated region of the carbon pre-cursor.

laser beam scans (e.g., raster scans) or moves laterally across the carbon pre-cursor material to form a desired pattern.

laser beam scans or moves laterally across the carbon pre-cursor material to form a desired pattern that includes non-overlapping regions or lines.

laser beam is repeatedly scanned (e.g., raster scanned) or moved laterally across the carbon pre-cursor material with a focus or intensity maximum arranged to multiple different depths withing the carbon pre-cursor material until carbon foam of the required pattern and depth has been created.

laser beam is scanned at a scan rate of between 1.7 mm/s and 3550 m/s, or more typically between 35 mm/s and 350 mm/s and the scanning may be such that the number of pulses per inch (PPI) is between 100 and 10000 (relevant to the production of individual approximately polyimide sheets of size 220 mm×180 mm).

laser beam has a wavelength with substantially no, or very low, absorbance by the carbon pre-cursor material.

laser beam has a wavelength with very low, absorbance by the carbon pre-cursor material where the radiation absorbance per cm (base 10) is below 50, or below 20 or below 10.

laser beam is an IR laser.

laser beam is an IR laser with wavelength of between 0.7 μm-2.5 μm.

laser beam is an IR laser with wavelength of between 0.75 μm-1.40 μm.

Attributes of the Sub-Surface or Encapsulated Region a desired depth of the sub-surface or encapsulated region in the carbon pre-cursor material is achieved by moving the focus of the first laser beam through that depth.

sub-surface or encapsulated region is at least 10 m below the surface of the carbon pre-cursor material.

sub-surface or encapsulated region is at least 20 m below the surface of the carbon pre-cursor material.

sub-surface or encapsulated region is at least 30 m below the surface of the carbon pre-cursor material.

sub-surface or encapsulated region is at least 40 am below the surface of the carbon pre-cursor material.

sub-surface or encapsulated region is at least 50 μm below the surface of the carbon pre-cursor material.

unlike conventional graphene foams, the sub-surface or encapsulated region can be over approximately 50 μm in thickness.

sub-surface or encapsulated region has a thickness of between 10 μm and 200 μm.

the sub-surface or encapsulated region can be at different depths below the surface of the carbon pre-cursor material facing the incident laser; the exact depth at which the sub-surface or encapsulated region is a function of various factors, such as laser intensity or other laser parameters, the choice of carbon pre-cursor material used etc. For example, the sub-surface or encapsulated region can be at least approximately 10 μm, 20 μm, 30 μm, 40 μm, 50 μm or more below the surface of the carbon pre-cursor material.

sub-surface or encapsulated region is at a distance below the surface of the carbon pre-cursor material that is at least 1% of the total thickness of the carbon pre-cursor material, or at least 10% of the total thickness of the carbon pre-cursor material, or at least 20% of the total thickness of the carbon pre-cursor material, or at least 30% of the total thickness of the carbon pre-cursor material, or at least 40% of the total thickness of the carbon pre-cursor material.

sub-surface or encapsulated region is volume of space centred at the centre of the minimum cross-section of the first laser beam and the volume is within 500 microns of this centre, or 100 microns of this centre, or 1 micron of this centre.

The Carbon Pre-Cursor Material the carbon pre-cursor material is made substantially of thermo-setting material.

the carbon pre-cursor material is made substantially of non-thermo-plastic material.

the carbon pre-cursor material is a thermo-setting film.

the thermo-setting film is a polyimide film.

carbon pre-cursor is a polyimide film.

carbon pre-cursor is a polyimide film, the wavelength of the first laser is within the range of 0.7 μm to 2.5 μm.

carbon pre-cursor is at least 50% carbon by mass, or at least 75% carbon by mass, or at least 90% carbon by mass.

carbon pre-cursor is a film or sheet.

the carbon pre-cursor material is flexible.

the carbon pre-cursor material is a printed layer, such as a screen-printed layer.

the carbon pre-cursor material has a thickness greater than 5 µm, or between 5 µm and 120 µm, or greater than 120 µm.

the carbon pre-cursor material is substantially planar or flat and is oriented perpendicular to the first laser beam.

the carbon pre-cursor material is homogeneous.

the carbon pre-cursor material is heterogenous, and comprises several different materials.

carbon pre-cursor is supported on a substrate that is not made of a carbon pre-cursor.

the absorption coefficient of the carbon pre-cursor material at the first laser beam wavelength is low.

the absorption coefficient of the carbon pre-cursor material for the first laser beam is below 50 $cm^{-1}$, or below 20 $cm^{-1}$, or below 10 $cm^{-1}$ the absorption coefficient of the carbon pre-cursor material for the second or ablation laser beam is below 300 $cm^{-1}$ the absorption coefficient of the carbon pre-cursor material for the second or ablation laser beam is 300±50 $cm^{-1}$ the carbon pre-cursor material has a thermal conductivity of less than 1.0 W/mK (using a method according to ASTM D5470).

the carbon pre-cursor material has a thermal conductivity of less than 0.5 W/mK (using a method according to ASTM D5470).

carbon pre-cursor material is mounted on a substrate that is substantially optically transparent at the wavelength or wavelengths of the laser beam.

the carbon pre-cursor material carbon source comprises or is formed from one or more polymers.

the carbon pre-cursor material comprises one or more of the following materials: polyimides (for example, poly (4,4'-oxydiphenylene-pyromellitimide), otherwise known as polyimide), polyetherimides (PEI), poly(m-ethyl methacrylate) (PMMA) (e.g., spray-coated PMMA), polyurethanes (PU), polyesters, vinyl polymers, carbonized polymers, photoresist polymers, alkyds, urea-formaldehyde.

the carbon pre-cursor comprises one or more of the following materials: poly(amic acids) (for example an aryl-containing poly (amic acid)) (for example poly (pyromellitic dianhydride-co-4,4'-oxydianiline), amic acid—otherwise known as polyamic acid); dianhydrides (for example aryl dianhydrides) (for example pyromellitic dianhydride); derivatives of said poly (amic acids); derivatives of said dianhydrides (e.g., derivates of pyromellitic dianhydride).

the carbon pre-cursor comprises one or more of the following materials: aromatic materials (e.g., aromatic polymers); heteroaromatic materials (e.g., heteroaromatic polymers); polymers containing aromatic moieties; cyclic materials (e.g., polymers containing cyclic moieties); heterocyclic materials (e.g., polymers containing heterocyclic moieties); heteroaromatic materials (e.g., polymers containing heteroaromatic moieties).

the carbon pre-cursor comprises material: containing one or more of aromatic bonds, or heteroaromatic bonds or hetero bonds (e.g., imide bonds).

The Substrate Supporting the Carbon Pre-Cursor Material the substrate is a plastic body, film, or foil.

the substrate is flexible.

the substrate is a polyimide circuit board.

the substrate has very low absorbance of the first laser beam.

the substrate is substantially optically transparent at the wavelength or wavelengths of the first laser beam.

the substrate has a high absorbance of the first laser beam, absorbing greater than 60% of the first laser beam.

the substrate has a high absorbance of the first laser beam, absorbing greater than 60% of the first laser beam and has a thermal conductivity of at least 10 W/mK.

the surface of the carbon pre-cursor material is converted to a disorganised, amorphous, non-graphene substance by the laser beam and that disorganised, amorphous, non-graphene substance adheres or bonds to the substrate and hence indirectly attaches the 3D carbon material foam to the substrate.

the substrate is formed from one or more of the following: silicon (Si), silicon dioxide (SiO2), gallium nitride (GaN), gallium arsenide (GaAs), zinc oxide (ZnO).

the substrate is silicon wafer.

the substrate is a silicon dioxide wafer.

the substrate is a wafer comprising both silicon and silicon dioxide.

the substrate is a carbon source.

the substrate is not a carbon source, e.g. is a metal, dielectric material, a screen-printed dielectric material.

the carbon pre-cursor is positioned 'above' the substrate (e.g. the carbon pre-cursor is positioned closer to the laser sources than the substrate).

the carbon pre-cursor is positioned 'below' the substrate (e.g. the carbon pre-cursor is positioned further from the laser sources than the substrate).

The Carbonisation at the Surface that the Laser Beam is Incident on the surface of the carbon pre-cursor material is converted to a disorganised, amorphous, non-graphene substance by the laser beam.

disorganised, amorphous, non-graphene substance occupies a thickness from the surface of the adjacent carbon pre-cursor material that is approximately 1%, or less than approximately 1%, or less than approximately 5%, or less than approximately 10%, of the total thickness of the carbon pre-cursor material.

disorganised, amorphous, non-graphene substance extends a distance from its surface into the body of the carbon pre-cursor material that is at least 10 m.

the disorganised, amorphous, non-graphene substance extends from its outer surface into the body of the carbon pre-cursor material to a depth of 10 m or less, or to a depth of 20 m or less, or to a depth of 30 m or less, or to a depth of 40 m or less, or to a depth of 50 m or less, or to a depth of 100 m or less.

The Carbonisation at the Physical Interface with a Substrate Supporting the Carbon Pre-cursor material the carbon pre-cursor material is converted to a disorganised, amorphous, non-graphene substance by the laser beam at the physical interface with the substrate to a depth defined by parameters of the laser beam.

the disorganised, amorphous, non-graphene substance is at one region adhering or otherwise attaching to the carbon foam and is at another region adhering or otherwise attaching to the substrate, hence giving stability to the carbon foam.

the disorganised, amorphous, non-graphene substance occupies a thickness, measured from the interface of the carbon pre-cursor material with the substrate, that is approximately 1%, or less than approximately 1%, or less than approximately 5%, or less than approximately 10%, of the total thickness of the carbon pre-cursor material.

the disorganised, amorphous, non-graphene substance occupies a thickness from the interface of the carbon pre-cursor material with the substrate that is at least 10 µm.

the disorganised, amorphous, non-graphene substance extends from the interface of the carbon pre-cursor material with the substrate to a depth of 10 µm or less, or to a depth of 20 µm or less, or to a depth of 30 µm or less, or to a depth of 40 µm or less, or to a depth of 50 µm or less, or to a depth of 100 µm or less.

The Ablation Laser Beam or Second Laser Beam parameters of the laser beam include one or more of: intensity, wavelength, pulse frequency, pulse duration, pulse profile, scanning speed, focal distance, heat generated at the sub-surface or encapsulated region.

varying the laser parameters alters the carbon foam material properties, enabling carbon foam to be produced with properties that are optimised for different applications.

varying the laser parameters alters one or more of the following carbon foam material properties or parameters: type of carbon nanostructures present (e.g. carbon nano-onion etc), size of defects, distribution of defects, extent of defects, type of defects, of the Raman D and 2D peaks, relative size of the Raman D and 2D peaks, thickness or depth, flexibility, adhesion, porosity, electrical conductivity, capacitance, absorption of organic solvents and water-based solutions, hydrophilicity, EMI shielding, electrode quality, wettability, contact angle, anti-fouling.

laser beam that ablates the amorphous, non-graphene substance that is formed above the encapsulated or sub-surface region in the carbon pre-cursor (the 'second laser beam') is a CO2 laser.

the second laser beam alters the carbon foam as part of the process of exposing it.

the second laser beam alters the morphology of the carbon foam as part of the process of exposing it.

the second laser beam is automatically controlled to be scanned across the same regions, and/or overlapping regions and/or non-overlapping regions.

wavelength of the laser beam that ablates the amorphous, non-graphene substance is between 8 µm-15 µm.

the second laser beam is a long IR laser, or a UV laser or a visible light laser.

the second laser beam has a pulse frequency of between 50 kHz and 500 kHz and a scan speed of between 9 cm/s and 40 cm/s.

the absorption coefficient of the carbon pre-cursor material is above 100 $cm^{-1}$ for the second laser beam, or above 200 $cm^{-1}$ for the second laser beam.

the absorption coefficient of the carbon pre-cursor material is 300±50 $cm^{-1}$ for the second laser beam.

laser power is within a typical working range of 8-20 watts, with 12 W optimum.

laser focal distance is within a typical working range of 50 mm-400 mm.

the second laser beam is scanned in a pattern (e.g., a raster) that includes non-overlapping regions or lines.

the second laser beam is scanned in a pattern that matches the scan pattern of the first laser beam.

the second laser beam is de-focussed.

the second laser beam is the same as the laser beam that irradiates the encapsulated or sub-surface region of a carbon pre-cursor material, to create a carbon foam in that encapsulated or sub-surface region.

the manufacturing process is a three-stage process involving the steps: (a) the first laser beam irradiating a sub-surface region of a carbon pre-cursor material at a manufacturing site to produce unfinished carbon foam product; (b) the unfinished carbon foam product being transferred to a customer-controlled manufacturing site; and (c) the laser ablation or treatment taking place at the customer-controlled manufacturing site.

The Carbon Foam the carbon foam is a multilayer twisted or turbostratic carbon foam.

the carbon foam is a non-graphene carbon foam.

the carbon foam includes carbonaceous nanostructures, such as carbon nano-onion, carbon nano-horn, carbon nano-tubes, carbon nano-dots, nanodiamonds and fullerene, or combinations of any of these.

the carbon foam is at least approximately 50 µm in thickness.

the carbon foam is between approximately 50 µm to 300 µm in thickness.

the carbon foam is or includes a twisted or turbostratic multilayer foam.

the carbon foam is or includes a carbon foam with a spatial distribution of defects leading to high electrochemical reactivity.

the carbon foam is or includes a carbon foam with vacancy position basal plane defects leading to high electrochemical reactivity.

the carbon foam has a Carbon: Oxygen ratio of between 25:1 and 50:1.

the carbon foam has a fast electron transfer constant.

the carbon foam has one or more of the following properties compared to conventional graphene foam made using conventional laser processes: a more readily controlled thickness or depth; greater flexibility compared to the highly brittle graphene made using conventional laser processes; stronger adhesion to an underlying flexible substrate; higher porosity; higher electrical conductivity; increased capacitance or charge storage: faster absorption of organic solvents and water-based solutions; higher hydrophilicity; a contact angle of below approximately 20°; enhanced anti-fouling properties; higher EMI shielding; enhanced electrode quality.

Biosensor Use Case the carbon foam is functionalised as a biosensor.

the carbon foam is functionalised as a biosensor by adding a receptor that is specific to a target or analyte.

the carbon foam is functionalised as a biosensor with a reversible polymer displacement sensor mechanism for electrochemical glucose monitoring.

the reversible polymer displacement sensor includes a pyrene-derivatised boronic acid chemo-receptor for glucose that is adsorbed onto an electrode comprising the carbon foam.

the carbon foam is functionalised as a biosensor by adding a receptor that is specific to a target or analyte, and a linker that enables the receptor to attach to the carbon foam.

the linker is selected from nanoparticles, polymers, polymer brushes, ligands, organic compounds comprising one or more functional groups, molecules bonded to the carbon foam covalently or non-covalently, or mixtures thereof.

the linker is selected from polymers preferably (meth) acrylate polymers, organic compounds comprising one or more functional groups, carbodiimides, diazonium compounds, or mixtures thereof.

the one or more functional groups are independently selected from oxygen, nitrogen, sulphur, halide, hydroxyl, carbonyl, carboxyl, amine, amino, amide, hydrophilic polymers, or mixtures thereof, optionally in combination with linear, branched or cyclic alkyl, alkylenyl, alkynyl, aryl residues, acryl, acyl, acyloxy, alkoxy, alkyleneoxy, or mixtures thereof.

the organic compound further comprises one or more cyclic moieties that optionally comprise one or more heteroatoms, and at least one of the cyclic moieties is linked directly or indirectly to at least one of the functional groups, or the linker is a derivative that is an ester or salt of said organic compound, or a compound that releases said organic compound in reaction with the carbon foam.

the linker is selected from 1-pyrenebutyric acid, N-hydroxysuccinimide (NHS), pyrene-1-carboxylic acid succinimidyl ester, 1-Aminopyrene, N-(1-pyrene) maleimide, or mixtures thereof.

the linker is bonded to the carbon foam by π-π interaction.

the receptor is one of the followings: an electrochemical receptor, a chemical receptor, a bioreceptor, an optical receptor, a physical or mechanical receptor, preferably a bioreceptor.

the receptor is selected from crown ethers, catalysts, boric acids, concept, ligands, aptamers, proteins, enzymes, antibodies, antigens, microorganisms, nucleic acids, fatty acids, fatty acid esters, molecularly imprinted polymers, metal-organic frameworks, polypeptides or oligopeptides capable of forming a ligand binding, cells, cell organelles, or other cellular components, or mixtures thereof, preferably selected from proteins, nucleic acids, antibodies, enzymes, or mixtures thereof.

the receptor is selected from immunoglobulin A (IgA), glucose dehydrogenase, streptavidin, or mixtures thereof.

the receptor is physically, biologically and/or chemically bonded to the linker, preferably chemically bonded, more preferably covalently bonded.

Supercapacitor Use Case the carbon foam forms an electrode in an energy storage device, such as an electrochemical capacitor, a supercapacitor, pseudo-capacitor or capacitor.

the carbon foam is treated with a metal oxide film to provide pseudo-capacitance.

the carbon foam forms at least one electrode in an energy storage device, such as an electrochemical capacitor, a supercapacitor, pseudo-capacitor or capacitor, and a hydrogel electrolyte envelops the or each electrode in an active area to produce an enhanced operational voltage window.

the carbon foam forms an electrode in a battery.

the carbon foam forms an electrical conductor.

The invention claimed is:

1. A method of producing an environmental monitor sensor, comprising the steps of:
   (a) using a first laser beam configured to irradiate an encapsulated, sub-surface region of a carbon pre-cursor material below a surface of the carbon pre-cursor material, the parameters of the first laser beam being selected to create carbon foam in that encapsulated, sub-surface region and a carbon-based material above the carbon foam; and
   (b) using a second laser beam configured to remove or ablate the carbon-based material sitting above the carbon foam, the parameters of the second laser beam being selected to expose or alter at least some of the carbon foam, to produce a resultant carbon foam material; and
   (c) functionalising the resultant carbon foam material by adding a receptor or recognition element that is specific to a target or analyte to the resultant carbon foam material or a linker that is attached to the resultant carbon foam material;
   (d) providing the functionalised carbon foam material for use as environmental monitor sensor.

2. The method of claim 1 in which the first laser beam operates at a first band and the second laser beam operates at a second band.

3. The method of claim 1 in which parameters of the first laser beam that irradiates the sub-surface, encapsulated region include one or more of: intensity, wavelength, pulse frequency, pulse duration, pulse profile, scanning speed, focal distance, heat generated at the sub-surface, encapsulated region, and in which varying the laser parameters of the first laser beam alters the carbon foam properties, enabling the resultant carbon foam material to be produced with properties that are optimised for different applications.

4. The method of claim 3 in which varying the laser parameters of the first laser beam alters one or more of the following resultant carbon foam material properties or parameters: type of carbon nanostructures present, size of defects, distribution of defects, extent of defects, type of defects, of the Raman D and peaks, relative size of the Raman D and 2D peaks, thickness or depth, flexibility, adhesion, porosity, electrical conductivity, capacitance, absorption of organic solvents and water-based solutions, hydrophilicity, EMI shielding, electrode quality, wettability, contact angle, anti-fouling.

5. The method of claim 1 in which no substantial gas escape pathways to a surface of the pre-cursor material are created by the first laser beam.

6. The method of claim 1 in which the first laser beam has a wavelength with substantially no, or very low, absorbance by the carbon pre-cursor material.

7. The method of claim 1 in which the sub-surface, encapsulated region has a thickness of between 10 μm and 200 μm.

8. The method of claim 1 in which the carbon pre-cursor material is made substantially of one of the following: thermo-setting material, non-thermo-plastic material; one or more polymers.

9. The method of claim 1 in which a surface of the carbon pre-cursor material is positioned on or adjacent to a substrate and in which the surface of the carbon pre-cursor material is converted to a disorganised, amorphous, non-graphene substance by the first laser beam and that disorganised, amorphous, non-graphene substance adheres or bonds to the substrate and hence indirectly attaches the carbon foam to the substrate.

10. The method of claim 1 in which the carbon-based material created above the carbon foam by the first laser beam is a disorganised, amorphous, non-graphene substance.

11. The method of claim 1 in which parameters of the second laser beam include one or more of: intensity, wavelength, pulse frequency, pulse duration, pulse profile, scanning speed, focal distance, heat generated at the sub-surface or encapsulated region;

in which varying the second laser parameters alters the resultant carbon foam material properties, enabling the resultant carbon foam material to be produced with properties that are optimised for different applications; and in which varying the laser parameters of the second laser beam alters one or more of the following resultant carbon foam material properties or parameters: type of carbon nanostructures present, size of defects, distribution of defects, extent of defects, type of defects, of the Raman D and 2D peaks, relative size of the Raman D and 2D peaks, thickness or depth, flexibility, adhesion, porosity, electrical conductivity, capacitance, absorption of organic solvents and water-based solutions, hydrophilicity, EMI shielding, electrode quality, wettability, contact angle, anti-fouling.

12. The method of claim 1 in which the second laser beam alters the carbon foam to the resultant carbon foam material as part of the process of exposing the carbon foam.

13. The method of claim 1 in which the second laser beam alters the morphology of the carbon foam as part of the process of creating the resultant carbon foam material and exposing the resultant carbon foam material.

14. The method of claim 1 in which the resultant carbon foam material is or includes one or both of the following: a multilayer twisted or turbostratic carbon foam; a non-graphene carbon foam.

15. The method of claim 1 in which the resultant carbon foam material is between approximately 50 µm to 300 µm in thickness.

16. The method of claim 1 in which the resultant carbon foam material is or includes a carbon foam with a spatial distribution of defects or vacancy position basal plane defects leading to high electrochemical reactivity.

17. The method of claim 1 in which the resultant carbon foam material has one or more of the following properties compared to conventional graphene foam made using conventional laser processes: a more readily controlled thickness or depth; greater flexibility compared to the highly brittle graphene made using conventional laser processes; stronger adhesion to an underlying flexible substrate; higher porosity; higher electrical conductivity; increased capacitance or charge storage; faster absorption of organic solvents and water-based solutions; higher hydrophilicity; a contact angle of below approximately 20°; enhanced anti-fouling properties; higher EMI shielding; enhanced electrode quality.

18. The method of claim 1 including the step of using computer-controlled laser scanning technology for the first and the second laser beams.

19. The method of claim 1 including the step of using high-speed, high volume reel-to-reel or reel-to-sheet production systems to pass reels or sheets of the carbon pre-cursor material past computer-controlled laser scanning technology that delivers the first and the second laser beams.

20. The method of claim 1 including the step of configuring the environmental monitor sensor to detect any one or more of the following environmental parameters: CO2 level, volatile organic compounds and other atmospheric pollutants.

21. The method of claim 1 including the step of configuring the environmental monitor sensor to detect any one or more of the following environmental parameters: temperature, humidity and pressure.

22. The method of claim 1 including the step of using the environmental monitor sensor in an environmental monitor that includes a wireless data transmission system to transmit environmental data.

23. The method of claim 1 including the step of using the environmental monitor sensor in an environmental monitor that includes a supercapacitor configured to provides peak bursts of power needed for data transmission.

24. The method of claim 1 including the step of using the environmental monitor sensor in an environmental monitor that includes a PV solar cell.

25. The method of claim 1 including the step of using the environmental monitor sensor in an environmental monitor that includes a primary or secondary battery, such as a primary or secondary printed battery.

26. A method of providing an environmental monitor sensor comprising the steps of:
(a) using a first laser beam configured to irradiate an encapsulated, sub-surface region of a carbon pre-cursor material below a surface of the carbon pre-cursor material, the parameters of the first laser beam being selected to create carbon foam in that encapsulated, sub-surface region and a carbon-based material above the carbon foam; and
(b) using a second laser beam configured to remove or ablate the carbon-based material sitting above the carbon foam, the parameters of the second laser beam being selected to expose or alter at least some of the carbon foam, to produce a resultant carbon foam material; and
(c) using the resultant carbon foam material as an environmental monitor sensor.

* * * * *